US011781069B2

(12) United States Patent
Liao

(10) Patent No.: US 11,781,069 B2
(45) Date of Patent: Oct. 10, 2023

(54) LIQUID-CRYSTAL MEDIUM

(71) Applicant: MERCK PATENT GMBH, Darmstadt (DE)

(72) Inventor: Kirsten (Min-Chu) Liao, Taipei (TW)

(73) Assignee: MERCK PATENT GMBH, Darmstadt (DE)

( * ) Notice: Subject to any disclaimer, the term of this patent is extended or adjusted under 35 U.S.C. 154(b) by 30 days.

(21) Appl. No.: 16/225,508

(22) Filed: Dec. 19, 2018

(65) Prior Publication Data

US 2019/0185748 A1 Jun. 20, 2019

(30) Foreign Application Priority Data

Dec. 20, 2017 (EP) .................................... 17208846
Feb. 9, 2018 (EP) .................................... 18156003

(51) Int. Cl.

| | |
|---|---|
| ***G02F 1/1333*** | (2006.01) |
| ***C09K 19/30*** | (2006.01) |
| ***C09K 19/34*** | (2006.01) |
| ***C09K 19/06*** | (2006.01) |
| ***C09K 19/54*** | (2006.01) |
| ***C09K 19/32*** | (2006.01) |
| ***C09K 19/20*** | (2006.01) |
| ***C09K 19/56*** | (2006.01) |
| ***C09K 19/58*** | (2006.01) |
| ***C09K 19/16*** | (2006.01) |
| ***C09K 19/04*** | (2006.01) |
| ***C09K 19/36*** | (2006.01) |
| ***C09K 19/14*** | (2006.01) |
| ***C09K 19/12*** | (2006.01) |

(52) U.S. Cl.

CPC ...... *C09K 19/3003* (2013.01); *C09K 19/0403* (2013.01); *C09K 19/062* (2013.01); *C09K 19/068* (2013.01); *C09K 19/12* (2013.01); *C09K 19/14* (2013.01); *C09K 19/16* (2013.01); *C09K 19/20* (2013.01); *C09K 19/2007* (2013.01); *C09K 19/32* (2013.01); *C09K 19/322* (2013.01); *C09K 19/3402* (2013.01); *C09K 19/3447* (2013.01); *C09K 19/3458* (2013.01); *C09K 19/3491* (2013.01); *C09K 19/36* (2013.01); *C09K 19/542* (2013.01); *C09K 19/56* (2013.01); *C09K 19/586* (2013.01); *C09K 19/588* (2013.01); *C09K 2019/0448* (2013.01); *C09K 2019/0466* (2013.01); *C09K 2019/0481* (2013.01); *C09K 2019/122* (2013.01); *C09K 2019/123* (2013.01); *C09K 2019/2042* (2013.01); *C09K 2019/2078* (2013.01); *C09K 2019/301* (2013.01); *C09K 2019/3009* (2013.01); *C09K 2019/3016* (2013.01); *C09K 2019/3018* (2013.01); *C09K 2019/3027* (2013.01); *C09K 2019/328* (2013.01); *C09K 2019/3408* (2013.01); *C09K 2019/3422* (2013.01); *C09K 2019/3425* (2013.01); *C09K 2019/548* (2013.01)

(58) Field of Classification Search

CPC ............ C09K 19/3003; C09K 19/0403; C09K 19/062; C09K 19/068; C09K 19/12; C09K 19/14; C09K 19/16; C09K 19/20; C09K 19/2007; C09K 19/32; C09K 19/322; C09K 19/3402; C09K 19/3447; C09K 19/3458; C09K 19/3491; C09K 19/36; C09K 19/542; C09K 19/56; C09K 19/586; C09K 19/588; G02F 1/1333

USPC .................................................... 252/299.61

See application file for complete search history.

(56) References Cited

U.S. PATENT DOCUMENTS 4,826,620 A 5/1989 Heppke et al.
4,988,458 A 1/1991 Heppke et al.
5,043,095 A 8/1991 Bahr et al.
5,236,618 A 8/1993 Heppke et al.
5,788,880 A 8/1998 Schierlinger et al.
5,886,242 A 3/1999 Etzbach et al.
6,468,444 B1 10/2002 Meyer et al.
6,861,107 B2 3/2005 Klasen-Memmer et al.
6,903,796 B2 6/2005 Kataoka
7,277,140 B2 * 10/2007 Kurihara ............. H04N 9/3108 349/5
8,202,584 B2 * 6/2012 Klasen-Memmer ........................ C09K 19/3491 428/1.1

(Continued)

FOREIGN PATENT DOCUMENTS

CN 105001879 A 10/2015
DE 3534777 A1 4/1987

(Continued)

OTHER PUBLICATIONS

Office Action in corresponding Chinese Application for Invention No. 201811560527.4 dated Mar. 29, 2023 (pp. 1-14) and english translation thereof.

*Primary Examiner* — Geraldina Visconti
(74) *Attorney, Agent, or Firm* — MILLEN WHITE ZELANO & BRANIGAN, PC; Brion Heaney

(57) ABSTRACT

The present invention relates to an LC medium comprising and a liquid-crystalline host consisting of an LC component H) comprising one or more mesogenic or liquid-crystalline compounds and an optically active component D) and optionally a polymerizable component P) comprising one or more polymerizable compounds; and to the use of the polymerizable compounds and LC media for optical, electro-optical and electronic purposes, in particular in LC displays, especially in LC displays of the polymer sustained alignment type.

18 Claims, No Drawings

(56) References Cited

U.S. PATENT DOCUMENTS

| | | | | |
|---|---|---|---|---|
| 8,313,669 | B2 * | 11/2012 | Bernatz | G02F 1/133711 252/299.01 |
| 8,846,164 | B2 * | 9/2014 | Kubo | C07D 309/06 252/299.63 |
| 9,951,274 | B2 * | 4/2018 | Hirschmann | C09K 19/12 |
| 9,982,194 | B2 * | 5/2018 | Klasen-Memmer | C09K 19/10 |
| 11,214,736 | B2 | 1/2022 | Archetti et al. | |
| 2004/0191428 | A1 | 9/2004 | Tsuda et al. | |
| 2006/0066793 | A1 | 3/2006 | Ohmuro et al. | |
| 2006/0103804 | A1 | 5/2006 | Hirosawa | |
| 2012/0145958 | A1 | 6/2012 | Masukawa et al. | |
| 2013/0126783 | A1 | 5/2013 | Kubo et al. | |
| 2013/0141676 | A1 | 6/2013 | Hsieh et al. | |
| 2013/0182202 | A1 | 7/2013 | Graziano et al. | |
| 2015/0166890 | A1 | 6/2015 | Archetti et al. | |
| 2015/0252265 | A1 | 9/2015 | Archetti et al. | |
| 2018/0171231 | A1 * | 6/2018 | Archetti | C09K 19/3098 |

FOREIGN PATENT DOCUMENTS

| | | | |
|---|---|---|---|
| DE | 3534778 | A1 | 4/1987 |
| DE | 3534780 | A1 | 4/1987 |
| DE | 4342280 | A1 | 6/1995 |
| DE | 19541820 | A1 | 5/1997 |
| EP | 0168043 | B1 | 11/1990 |
| EP | 1038941 | B1 | 5/2003 |
| EP | 1170626 | B1 | 9/2011 |
| WO | 2010012363 | A1 | 2/2010 |
| WO | 2017038616 | A1 | 3/2017 |
| WO | 2017041893 | A1 | 3/2017 |

* cited by examiner

LIQUID-CRYSTAL MEDIUM

The present invention relates to liquid-crystal (LC) media and to the use of the LC media for optical, electro-optical and electronic purposes, in particular in LC displays, especially in LC displays of the polymer sustained alignment type.

One of the liquid-crystal display (LCD) modes used at present is the TN ("twisted nematic") mode. However, TN LCDs have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative dielectric anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been reported (see, inter alia, S. H. Jung et al., Jpn. J. Appl. Phys., Volume 43, No. 3, 2004, 1028), which contain two electrodes on the same substrate, one of which structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

FFS displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays, but comprise a layer of an LC medium with negative dielectric anisotropy instead of an LC medium with positive dielectric anisotropy. The LC medium with negative dielectric anisotropy shows a more favorable director orientation that has less tilt and more twist orientation compared to the LC medium with positive dielectric anisotropy, as a result of which these displays have a higher transmission. The displays further comprise an alignment layer, preferably of polyimide provided on at least one of the substrates that is in contact with the LC medium and induces planar alignment of the LC molecules of the LC medium.

These displays are also known as "Ultra Brightness FFS (UB-FFS)" mode displays. These displays require an LC medium with high reliability.

The term "reliability" as used hereinafter means the quality of the performance of the display during time and with different stress loads, such as light load, temperature, humidity, voltage, and comprises display effects such as image sticking (area and line image sticking), mura, yogore etc. which are known to the skilled person in the field of LC displays. As a standard parameter for categorizing the reliability usually the voltage holding ratio (VHR) value is used, which is a measure for maintaining a constant electrical voltage in a test display. Among other factors, a high VHR is a prerequisite for a high reliability of the LC medium.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In so-called PVA ("patterned VA") displays, protrusions are rendered completely superfluous in that both electrodes are structured by means of slits on the opposite sides, which results in increased contrast and improved transparency to light, but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

A further development are displays of the so-called PS ("polymer sustained") or PSA ("polymer sustained alignment") type, for which the term "polymer stabilized" is also occasionally used. In these, a small amount (for example 0.3% by weight, typically <1% by weight) of one or more polymerizable, compound(s), preferably polymerizable monomeric compound(s), is added to the LC medium and, after filling the LC medium into the display, is polymerized or crosslinked in situ, usually by UV photopolymerization, optionally while a voltage is applied to the electrodes of the display. The polymerization is carried out at a temperature where the LC medium exhibits a liquid crystal phase, usually at room temperature. The addition of polymerizable mesogenic or liquid-crystalline compounds, also known as reactive mesogens or "RMs", to the LC mixture has proven particularly suitable.

Unless indicated otherwise, the term "PSA" is used hereinafter when referring to displays of the polymer sustained alignment type in general, and the term "PS" is used when referring to specific display modes, like PS-VA, PS-TN and the like.

Also, unless indicated otherwise, the term "RM" is used hereinafter when referring to a polymerizable mesogenic or liquid-crystalline compound.

In the meantime, the PS(A) principle is being used in various conventional LC display modes. Thus, for example, PS-VA, PS-OCB (OCB=optically compensated bend cell or optically compensated birefringence), PS-IPS (IPS=in-plane switching), PS-FFS, PS-UB-FFS and PS-TN displays are known. The polymerization of the RMs preferably takes place with an applied voltage in the case of PS-VA and PS-OCB displays, and with or without, preferably without, an applied voltage in the case of PS-IPS displays. As can be demonstrated in test cells, the PS(A) method results in a pretilt in the cell. In the case of PS-VA displays, the pretilt has a positive effect on response times. For PS-VA displays, a standard MVA or PVA pixel and electrode layout can be used. In addition, however, it is also possible, for example, to manage with only one structured electrode side and no protrusions, which significantly simplifies production and at the same time results in very good contrast and in very good transparency to light.

PS-VA displays are described, for example, in EP 1 170 626 A2, U.S. Pat. Nos. 6,861,107, 7,169,449, US 2004/0191428 A1, US 2006/0066793 A1 and US 2006/0103804 A1. PS-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

Below the layer formed by the phase-separated and polymerized RMs which induce the above mentioned pretilt angle, the PSA display typically contains an alignment layer, for example of polyimide, that provides the initial alignment of the LC molecules before the polymer stabilization step.

Rubbed polyimide layers have been used for a long time as alignment layers. However, the rubbing process causes a number of problems, like mura, contamination, problems with static discharge, debris, etc. Therefore instead of rubbed polyimide layers it was proposed to use polyimide layers prepared by photoalignment, utilizing a light-induced orientational ordering of the alignment surface. This can be achieved through photodecomposition, photodimerization or photoisomerization by means of polarized light.

However, still a suitably derivatized polyimide layer is required that comprises the photoreactive group. Generally the effort and costs for production of such a polyimide layer, treatment of the polyimide and improvement with bumps or polymer layers are relatively great.

In addition, it was observed that unfavorable interaction of the polyimide alignment layer with certain compounds of the LC medium often leads to a reduction of the electrical resistance of the display. The number of suitable and available LC compounds is thus significantly reduced, at the expense of display parameters like viewing-angle dependence, contrast, and response times which are aimed to be improved by the use of such LC compounds. It was therefore desired to omit the polyimide alignment layers.

For some display modes this was achieved by adding a self alignment agent or additive to the LC medium that induces the desired alignment, for example homeotropic or planar alignment, in situ by a self assembling mechanism. Thereby the alignment layer can be omitted on one or both of the substrates. These display modes are also known as "self-aligned" or "self-aligning" (SA) modes.

In SA displays a small amount, typically 0.1 to 2.5%, of a self-aligning additive is added to the LC medium. Suitable self-aligning additives are for example compounds having an organic core group and attached thereto one or more polar anchor groups, which are capable of interacting with the substrate surface, causing the additives on the substrate surface to align and induce the desired alignment also in the LC molecules. Preferred self-aligning additives comprise for example a mesogenic group and a straight-chain or branched alkyl side chain that is terminated with one or more polar anchor groups, for example selected from hydroxy, carboxy, amino or thiol groups. The self-aligning additives may also contain one or more polymerizable groups that can be polymerized under similar conditions as the RMs used in the PSA process.

Hitherto SA-VA displays and SA-FFS displays haven been disclosed. Suitable self-aligning additives to induce homeotropic alignment, especially for use in SA-VA mode displays, are disclosed for example in US 2013/0182202 A1, US 2014/0838581 A1, US 2015/0166890 A1 and US 2015/0252265 A1.

The SA mode can also be used in combination with the PSA mode. An LC medium for use in a display of such a combined mode thus contains both one or more RMs and one or more self-aligning additives.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

The PSA display may also comprise an alignment layer on one or both of the substrates forming the display cell. The alignment layer is usually applied on the electrodes (where such electrodes are present) such that it is in contact with the LC medium and induces initial alignment of the LC molecules. The alignment layer may comprise or consist of, for example, a polyimide, which may also be rubbed, or may be prepared by a photoalignment method.

In particular for monitor and especially TV applications, optimization of the response times, but also of the contrast and luminance (thus also transmission) of the LC display continues to be demanded. The PSA method can provide significant advantages here. In particular in the case of PS-VA, PS-IPS and PS-FFS displays, a shortening of the response times, which correlate with a measurable pretilt in test cells, can be achieved without significant adverse effects on other parameters. Prior art has suggested biphenyl diacrylates or dimethacrylates, which are optionally fluorinated as RMs for use in PSA displays However, the problem arises that not all combinations consisting of an LC mixture and one or more RMs are suitable for use in PSA displays because, for example, an inadequate tilt or none at all becomes established or since, for example, the VHR is inadequate for TFT display applications. In addition, it has been found that, on use in PSA displays, the LC mixtures and RMs known from the prior art do still have some disadvantages. Thus, not every known RM which is soluble in LC mixtures is suitable for use in PSA displays. In addition, it is often difficult to find a suitable selection criterion for the RM besides direct measurement of the pretilt in the PSA display. The choice of suitable RMs becomes even smaller if polymerization by means of UV light without the addition of photoinitiators is desired, which may be advantageous for certain applications.

In addition, the selected combination of LC host mixture/RM should have the lowest possible rotational viscosity and the best possible electrical properties. In particular, it should have the highest possible VHR. In PSA displays, a high VHR after irradiation with UV light is particularly necessary since UV exposure is a requisite part of the display production process, but also occurs as normal exposure during operation of the finished display.

In particular, it would be desirable to have available novel materials for PSA displays which produce a particularly small pretilt angle. Preferred materials here are those which produce a lower pretilt angle during polymerization for the same exposure time than the materials known to date, and/or through the use of which the (higher) pretilt angle that can be achieved with known materials can already be achieved after a shorter exposure time. The production time ("tact time") of the display could thus be shortened and the costs of the production process reduced.

A further problem in the production of PSA displays is the presence or removal of residual amounts of unpolymerized RMs, in particular after the polymerization step for production of the pretilt angle in the display. For example, unreacted RMs of this type may adversely affect the properties of the display by, for example, polymerizing in an uncontrolled manner during operation after finishing of the display.

Thus, the PSA displays known from the prior art often exhibit the undesired effect of so-called "image sticking" or "image burn", i.e. the image produced in the LC display by temporary addressing of individual pixels still remains visible even after the electric field in these pixels has been switched off or after other pixels have been addressed.

This "image sticking" can occur on the one hand if LC host mixtures having a low VHR are used. The UV component of daylight or the backlighting can cause undesired decomposition reactions of the LC molecules therein and thus initiate the production of ionic or free-radical impurities. These may accumulate, in particular, at the electrodes or the alignment layers, where they may reduce the effective applied voltage. This effect can also be observed in conventional LC displays without a polymer component.

In addition, an additional "image sticking" effect caused by the presence of unpolymerized RMs is often observed in PSA displays. Uncontrolled polymerization of the residual RMs is initiated here by UV light from the environment or by the backlighting. In the switched display areas, this changes the tilt angle after a number of addressing cycles. As a result, a change in transmission in the switched areas may occur, while it remains unchanged in the unswitched areas.

It is therefore desirable for the polymerization of the RMs to proceed as completely as possible during production of the PSA display and for the presence of unpolymerized RMs in the display to be excluded as far as possible or reduced to a minimum. Thus, RMs and LC mixtures are required which enable or support highly effective and complete polymerization of the RMs. In addition, controlled reaction of the residual RM amounts would be desirable. This would be simpler if the RM polymerized more rapidly and effectively than the compounds known to date.

A further problem that has been observed in the operation of PSA displays is the stability of the pretilt angle. Thus, it was observed that the pretilt angle, which was generated during display manufacture by polymerizing the RM as described above, does not remain constant but can deteriorate after the display was subjected to voltage stress during its operation. This can negatively affect the display performance, e.g. by increasing the black state transmission and hence lowering the contrast.

Another problem to be solved is that the RMs of prior art do often have high melting points, and do only show limited solubility in many currently common LC mixtures, and therefore frequently tend to spontaneously crystallize out of the mixture. In addition, the risk of spontaneous polymerization prevents the LC host mixture being warmed in order to dissolve the polymerizable component, meaning that the best possible solubility even at room temperature is necessary. In addition, there is a risk of separation, for example on introduction of the LC medium into the LC display (chromatography effect), which may greatly impair the homogeneity of the display. This is further increased by the fact that the LC media are usually introduced at low temperatures in order to reduce the risk of spontaneous polymerization (see above), which in turn has an adverse effect on the solubility.

Another problem observed in prior art is that the use of conventional LC media in LC displays, including but not limited to displays of the PSA type, often leads to the occurrence of mura in the display, especially when the LC medium is filled in the display cell manufactured using the one drop filling (ODF) method. This phenomenon is also known as "ODF mura". It is therefore desirable to provide LC media which lead to reduced ODF mura.

Another problem observed in prior art is that LC media for use in PSA displays, including but not limited to displays of the PSA type, do often exhibit high viscosities and, as a consequence, high switching times. In order to reduce the viscosity and switching time of the LC medium, it has been suggested in prior art to add LC compounds with an alkenyl group. However, it was observed that LC media containing alkenyl compounds often show a decrease of the reliability and stability, and a decrease of the VHR especially after exposure to UV radiation. Especially for use in PSA displays this is a considerable disadvantage, because the photopolymerization of the RMs in the PSA display is usually carried out by exposure to UV radiation, which may cause a VHR drop in the LC medium.

There is thus still a great demand for PSA displays and LC media and polymerizable compounds for use in such displays, which do not show the drawbacks as described above, or only do so to a small extent, and have improved properties.

Especially in view of mobile devices there is great demand for displays with high transmission, which enable the use of less intensive backlight, and, hence, leads to longer battery lifetime. Alternatively, of course, displays with higher brightness can be achieved having improved contrast especially under ambient light.

In addition there is a great demand for PSA displays, and LC media and polymerizable compounds for use in such PSA displays, which enable a high specific resistance at the same time as a large working-temperature range, short response times, even at low temperatures, and a low threshold voltage, a low pretilt angle, a multiplicity of grey shades, high contrast and a broad viewing angle, have high reliability and high values for the VHR after UV exposure, and, in case of the polymerizable compounds, have low melting points and a high solubility in the LC host mixtures. In PSA displays for mobile applications, it is especially desired to have available LC media that show low threshold voltage and high birefringence.

The invention is based on the object of providing novel suitable materials, in LC media comprising reactive mesogens (RM), for use in PSA displays, which do not have the disadvantages indicated above or do so to a reduced extent.

In particular, the invention is based on the object of LC media comprising RMs for use in PSA displays, which enable displays with high transmittance and at the same time very high specific resistance values, high VHR values, high reliability, low threshold voltages, short response times, high birefringence, show good UV absorption especially at longer wavelengths, enable quick and complete polymerization of the RMs, allow the generation of a low pretilt angle, preferably as quickly as possible, enable a high stability of the pretilt even after longer time and/or after UV exposure, reduce or prevent the occurrence of “image sticking” and “ODF mura” in the display, and in case of the RMs polymerize as rapidly and completely as possible and show a high solubility in the LC media which are typically used as host mixtures in PSA displays.

These objects have been achieved in accordance with the present invention by materials and processes as described in the present application. In particular, it has been found, surprisingly, that the use of liquid crystalline hosts as described hereinafter allows achieving the advantageous effects as mentioned above. These hosts are characterized by comprising an optically active component, also known as chiral dopant.

In the field of liquid crystals it is known to add a chiral dopant, e.g., into a nematic liquid crystal host mixtures. At low concentrations of the chiral dopant a chiral-nematic phase, also called a cholesteric phase is obtained. In the field of twisted nematic liquid crystal displays it is required to add a dopant to achieve a uniform twist direction and thus to avoid disclination lines. Increased concentrations are used in order to achieve a shorter pitch, required, e.g., in super twist LCDs (STN displays).

It was surprisingly found that the use of these liquid crystalline hosts and of LC media comprising them, in VA or PS-VA displays, enables displays with improved transmission while maintaining excellent performance regarding process relevant parameters, i.e. in the case of PSA displays a quick and complete UV-photopolymerization reaction in particular at longer UV wavelengths in the range from 300-380 nm and especially above 320 nm, even without the addition of photoinitiator, a fast generation of a large and stable pretilt angle, reduced image sticking and ODF mura in the display, a high reliability and a high VHR value after UV photopolymerization, especially in case of LC host mixtures containing LC compounds with an alkenyl group, and generally fast response times, a low threshold voltage and a high birefringence.

The invention relates to an LC medium comprising

- a liquid-crystalline host consisting of an LC component H) comprising one or more mesogenic or liquid-crystalline compounds, and an optically active component D),
- optionally a polymerizable component P) comprising one or more polymerizable compounds,
- optionally a self alignment additive for vertical alignment (hereinafter referred to as SA-VA additive)

wherein the LC component H) comprises one or more compounds selected from the group of compounds of the formulae CY and/or PY:

CY

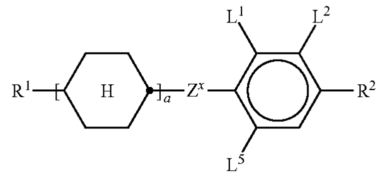

PY

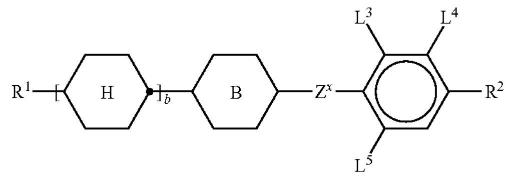

in which the individual radicals have the following meanings:

a denotes 1 or 2, b denotes 0 or 1,

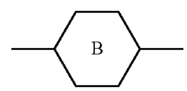
denotes
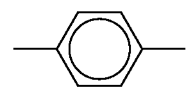
or
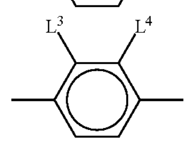

$R^1$ and $R^2$ each, independently of one another, denote alkyl having 1 to 12 C atoms, where one or more H atoms may each be replaced by fluorine and where one or two non-adjacent $CH_2$ groups may each be replaced by

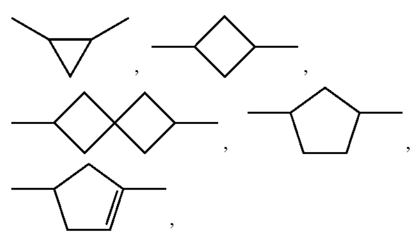

—O—, —CH═CH—, —CO—, —O—CO— or —CO—O— in such a way that O atoms are not linked directly to one another, $Z^x$ denotes —CH═CH—, —$CH_2$O—, —O$CH_2$—, —$CF_2$O—, —O$CF_2$—, —O—, —$CH_2$—, —$CH_2CH_2$— or a single bond, preferably a single bond, $L^{1-4}$ each, independently of one another, denote F, Cl, $OCF_3$, $CF_3$, $CH_3$, $CH_2F$, $CHF_2$; preferably, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl, $L^5$ denotes H or has one of the meanings given for $L^{1-4}$ preferably denotes H or $CH_3$, particularly preferably H, and where the optional polymerizable component, component P) comprises one or more compounds of formula R $$\text{P-Sp-A}^1\text{-(Z}^1\text{-A}^2)_z\text{-R} \qquad \text{R}$$

wherein the individual radicals, independently of each other and on each occurrence identically or differently, have the following meanings P a polymerizable group, Sp a spacer group or a single bond, $A^1$, $A^2$ an aromatic, heteroaromatic, alicyclic or heterocyclic group, preferably having 4 to 25 ring atoms, which may also contain fused rings, and which is unsubstituted, or mono- or polysubstituted by L, $Z^1$ —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^0R^{00}$—, or a single bond, $R^0$, $R^{00}$ H or alkyl having 1 to 12 C atoms, R H, L, or P-Sp-, L F, Cl, —CN, P-Sp- or straight chain, branched or cyclic alkyl having 1 to 25 C atoms, wherein one or more non-adjacent $CH_2$-groups are each optionally replaced by —O—, —S—, —CO—, —CO—O—, —O—CO—, or —O—CO—O— in such a manner that O- and/or S-atoms are not directly connected with each other, and wherein one or more H atoms are each optionally replaced by P-Sp-, F or Cl, z 0, 1, 2 or 3, n1 1, 2, 3 or 4, The invention relates to a liquid-crystalline medium based on a mixture of polar compounds comprising a self-alignment additive for vertical alignment and optionally at least one compound of formula ST-8 as described more closely within this disclosure (reactive hindered amine), especially for vertically aligned display applications.

The liquid-crystalline component H) of an LC medium according to the present invention is hereinafter also referred to as "LC host mixture", and preferably comprises one or more, preferably at least two mesogenic or LC compounds selected from low-molecular-weight compounds which are unpolymerizable.

The invention furthermore relates to an LC display comprising an LC medium described above.

The invention furthermore relates to an LC medium or LC display as described above, wherein the compounds of formula R, or the polymerizable compounds of component P), are polymerized.

The invention furthermore relates to a process for preparing an LC medium as described above and below, comprising the steps of mixing one or more mesogenic or LC compounds, or an LC host mixture or LC component H) as described above and below, with one or more chiral dopants (component D)) and optionally with one or more compounds of formula R, and optionally with further LC compounds and/or additives.

The invention furthermore relates to the use of LC media according to the invention in PSA displays, in particular the use in PSA displays containing an LC medium, for the production of a tilt angle in the LC medium by in-situ polymerization of the compound(s) of the formula R in the PSA display, preferably in an electric or magnetic field.

The invention furthermore relates to an LC display comprising an LC medium according to the invention, in particular a VA or PSA display, particularly preferably a VA or a PS-VA display.

The invention furthermore relates to the use of LC media according to the invention in polymer stabilized SA-VA displays, and to a polymer stabilized SA-VA display comprising the LC medium according to the invention.

The invention furthermore relates to an LC display of the VA or PSA type comprising two substrates, at least one which is transparent to light, an electrode provided on each substrate or two electrodes provided on only one of the substrates, and located between the substrates a layer of an LC medium that optionally comprises one or more polymerizable compounds and an LC component as described above and below, wherein the polymerizable compounds are polymerized between the substrates of the display.

The invention furthermore relates to a process for manufacturing an LC display as described above and below, comprising the steps of filling or otherwise providing an LC medium, which optionally comprises one or more polymerizable compounds as described above and below, between the substrates of the display, and optionally polymerizing the polymerizable compounds.

The PSA displays according to the invention have two electrodes, preferably in the form of transparent layers, which are applied to one or both of the substrates. In some displays, for example in PS-VA displays, one electrode is applied to each of the two substrates In a preferred embodiment the polymerizable component is polymerized in the LC display while a voltage is applied to the electrodes of the display.

The polymerizable compounds of the polymerizable component are preferably polymerized by photopolymerization, very preferably by UV photopolymerization.

The LC media according to the invention show the following advantageous properties when used in VA displays:

improved transmission of the display a high voltage-holding-ratio, fast switching, good tilt stability, sufficient stability against heat, The LC media according to the invention show the following advantageous properties when used in PSA displays:

improved transmission of the display a suitable tilt generation which is inside a certain process window, fast polymerization leading to minimal residues of RM after the UV-process, a high voltage-holding-ratio after the UV-process, good tilt stability, sufficient stability against heat, fast switching.

The use of chiral dopants in nematic liquid crystals is known to the skilled person. For a review see, e.g., A. Taugerbeck, Ch. Booth, 2013. Design and Synthesis of Chiral Nematic Liquid Crystals. Handbook of Liquid Crystals. 3:111:14:1-63.

It has to be noted here that, as a first approximation, the HTP of a mixture of chiral compounds, i.e. of conventional chiral dopants, as well as of chiral reactive mesogens, may be approximated by the addition of their individual HTP values weighted by their respective concentrations in the medium.

The cholesteric pitch of the modulation medium in the cholesteric phase, also referred to as the chiral nematic phase, can be reproduced to a first approximation by equation (1).

$$P=(\mathrm{HTP}\cdot c)^{-1} \quad (1)$$

in which P denotes the cholesteric pitch, c denotes the concentration of the chiral component D) and HTP (helical twisting power) is a constant which characterizes the twisting power of the chiral substance and depends on the chiral substance (component D)) and on the achiral component H).

If the pitch is to be determined more accurately, equation (1) can be correspondingly modified. To this end, the development of the cholesteric pitch in the form of a polynomial (2) is usually used.

$$P=(\mathrm{HTP}\cdot c)^{-1}+((\alpha_1\cdot c)^{-2}+(\alpha_2\cdot c)^{-3}+\ldots \quad (2)$$

in which the parameters are as defined above for equation (1) and $\alpha_1$ and $\alpha_2$ denote constants which depend on the chiral component (D) and on the achiral component (H).

The polynomial can be continued up to the degree, which enables the desired accuracy.

Typically the parameters of the polynomial HTP (sometimes also called $\alpha_1$, $\alpha_2$, $\alpha_3$ and so forth) do depend more strongly on the type of the chiral dopant, and, to some degree, also on the specific liquid crystal mixture used.

Obviously, they do also depend on the enantiomeric excess of the respective chiral dopant. They have their respective largest absolute values for the pure enantiomers and are zero for racemates. In this application the values given are those for the pure enantiomers, having an enantiomeric excess of 98% or more, unless explicitly stated otherwise.

If the optically active component D) consists of two or more compounds, equation (1) is modified to give equation (3).

$$P=[\Sigma_i(\mathrm{HTP}(i)\cdot c_i)]^{-1} \quad (3)$$

in which P denotes the cholesteric pitch, $c_i$ denotes the concentration of the i-th compound of the chiral component D) and HTP(i) denotes the HTP of the i-th compound of the optically active component D) in the achiral liquid crystal component (H).

The temperature dependence of the HTP is usually represented in a polynomial development (4), which, however, for practical purposes often can be terminated already right after the linear element ($\beta_1$).

$$\mathrm{HTP}(T)=\mathrm{HTP}(T_0)+\beta_1\cdot(T-T_0)+\beta_2\cdot(T-T_0)^2+\ldots \quad (4)$$

in which the parameters are as defined above for equation (1) and

T denotes the temperature, $T_0$ denotes the reference temperature,

HTP(T) denotes the HTP at temperature T,

HTP($T_0$) denotes the HTP at temperature $T_0$ and $\beta_1$ and $\beta_2$ denote constants which depend on the chiral component (D) and on the achiral LC component (H).

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerization and are also referred to as "polymerizable group" or "P".

Unless stated otherwise, the term "polymerizable compound" as used herein will be understood to mean a polymerizable monomeric compound.

As used herein, the term "low-molecular-weight compound" will be understood to mean to a compound that is monomeric and/or is not prepared by a polymerization reaction, as opposed to a "polymeric compound" or a "polymer".

As used herein, the term "unpolymerizable compound" will be understood to mean a compound that does not contain a functional group that is suitable for polymerization under the conditions usually applied for the polymerization of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behavior only after mixing with other compounds and/or after polymerization. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

As used herein, the terms "optically active" and "chiral" are synonyms for materials that are able to induce a helical pitch in a nematic host material, also referred to as "chiral dopants".

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerizable group(s) in a polymerizable mesogenic compound.

Above and below,

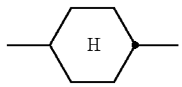

denotes a trans-1,4-cyclohexylene ring, and

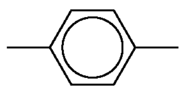

denotes a 1,4-phenylene ring.

In a group

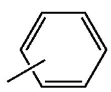

the single bond shown between the two ring atoms can be attached to any free position of the benzene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I, preferably F or Cl.

—CO—, —C(═O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)═C($R^x$)—, —C≡C—, —N($R^x$)—, —O—, —S—, —CO—, —CO—O—, —O—CO—, or —O—CO—O— in such a way that O and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may each be replaced by —O—, —S—, —CO—, —CO—O—, —O—CO—, or —O—CO—O— and in which one or more H atoms may each be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may each be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiophene, benzothiadiazo-thiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be each replaced by Si and/or one or more CH groups may each be replaced by N and/or one or more non-adjacent $CH_2$ groups may each be replaced by —O— or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as "$L^S$", are, for example, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are each optionally replaced by —O—, —S—, —CO—, —CO—O—, —O—CO—, or —O—CO—O— in such a manner that O- and/or S-atoms are not directly connected with each other, and wherein one or more H atoms are each optionally replaced by F, Cl, P- or P-Sp-, and $Y^1$ denotes halogen.

"Substituted silyl or aryl" preferably means substituted by halogen, —CN, $R^0$, —O$R^0$, —CO—$R^0$, —CO—O—$R^0$, —O—CO—$R^0$ or —O—CO—O—$R^0$, wherein $R^0$ denotes H or alkyl with 1 to 20 C atoms.

Particularly preferred substituents $L^S$ are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C═C double bond or —C≡C— triple bond, and groups which are suitable for polymerization with ring opening, such as, for example, oxetane or epoxide groups.

Preferred groups P are selected from the group consisting of $CH_2$═C$W^1$—CO—O—, $CH_2$═C$W^1$—CO—,

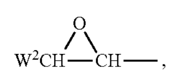

,
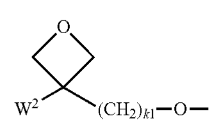

,
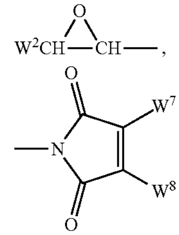

,
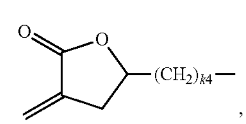

, $CH_2$═C$W^2$—(O)$_{k3}$—, C$W^1$═CH—CO—(O)$_{k3}$—, C$W^1$═CH—CO—NH—, $CH_2$═C$W^1$—CO—NH—, $CH_3$—CH═CH—O—, ($CH_2$═CH)$_2$CH—OCO—, ($CH_2$═CH—$CH_2$)$_2$CH—OCO—, ($CH_2$═CH)$_2$CH—O—, ($CH_2$═CH—$CH_2$)$_2$N—, ($CH_2$═CH—$CH_2$)$_2$N—CO—, HO—C$W^2W^3$—, HS—C$W^2W^3$—, H$W^2$N—, HO—C$W^2W^3$—NH—, $CH_2$═C$W^1$—CO—NH—, $CH_2$═CH—(COO)$_{k1}$-Phe-(O)$_{k2}$—, $CH_2$═CH—(CO)$_{k1}$-Phe-(O)$_{k2}$—, Phe-CH═CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above in formula R which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2{=}CW^1$—CO—O—, $CH_2{=}CW^1$—CO—,

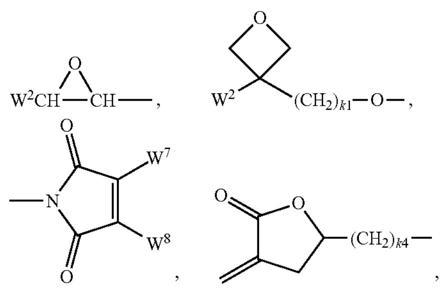

$CH_2{=}CW^2$—O—, $CH_2{=}CW^2$—, $CW^1{=}CH$—CO—$(O)_{k3}$—, $CW^1{=}CH$—CO—NH—, $CH_2{=}CW^1$—CO—NH—, $(CH_2{=}CH)_2CH$—OCO—, $(CH_2{=}CH{-}CH_2)_2CH$—OCO—, $(CH_2{=}CH)_2CH$—O—, $(CH_2{=}CH{-}CH_2)_2N$—, $(CH_2{=}CH{-}CH_2)_2N$—CO—, $CH_2{=}CW^1$—CO—NH—, $CH_2{=}CH$—$(COO)_{k1}$-Phe-$(O)_{k2}$—, $CH_2{=}CH$—$(CO)_{k1}$-Phe-$(O)_{k2}$—, Phe-CH═CH— and $W^4W^5W^6Si$—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2{=}CW^1$—CO—O—, in particular $CH_2{=}CH$—CO—O—, $CH_2{=}C(CH_3)$—CO—O— and $CH_2{=}CF$—CO—O—, furthermore $CH_2{=}CH$—O—, $(CH_2{=}CH)_2CH$—O—CO—, $(CH_2{=}CH)_2CH$—O—,

Further preferred polymerizable groups P are selected from the group consisting of vinyloxy, acrylate, methacrylate, fluoroacrylate, chloroacrylate, oxetane and epoxide, most preferably from acrylate and methacrylate.

If the spacer group Sp is different from a single bond, it is preferably of the formula Sp"-X", so that the respective radical P-Sp- conforms to the formula P-Sp"-X"—, wherein
Sp" denotes linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH═CH— or —C≡C— in such a way that O and/or S atoms are not linked directly to one another, X" denotes —O—, —S—, —CO—, —CO—O—, —O—CO—, —O—CO—O—, —CO—N($R^0$)—, —N($R^0$)—CO—, —N($R^0$)—CO—N($R^{00}$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═$CR^0$—, —$CY^2$═$CY^3$—, —C≡C—, —CH═CH—CO—O—, —O—CO—CH═CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, —CO—$NR^0$—, —$NR^0$—CO—, —$NR^0$—CO—$NR^{00}$— or a single bond.

Typical spacer groups Sp and -Sp"-X"— are, for example, —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, —$(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^0R^{00}$—$O)_{p1}$—, in which p1 is an integer from 1 to 12, q1 is an integer from 1 to 3, and $R^0$ and $R^{00}$ have the meanings indicated above.

Particularly preferred groups Sp and -Sp"-X"— are —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, in which p1 has the meaning indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a preferred embodiment of the invention the compounds of formula R and its subformulae contain a spacer group Sp that is substituted by one or more polymerizable groups P, so that the group Sp-P corresponds to $Sp(P)_s$, with s being ≥2 (branched polymerizable groups).

Preferred compounds of formula R according to this preferred embodiment are those wherein s is 2, i.e. compounds which contain a group $Sp(P)_2$. Very preferred compounds of formula R according to this preferred embodiment contain a group selected from the following formulae:

—X-alkyl-CHPP S1

—X-alkyl-CH($(CH_2)_{aa}$P)($(CH_2)_{bb}$P) S2

—X—N($(CH_2)_{aa}$P)($(CH_2)_{bb}$P) S3

—X-alkyl-CHP—$CH_2$—$CH_2$P S4

—X-alkyl-C($CH_2$P)($CH_2$P)—$C_{aa}H_{2aa+1}$ S5

—X-alkyl-CHP—$CH_2$P S6

—X-alkyl-CPP—$C_{aa}H_{2aa+1}$ S7

—X-alkyl-CHPCHP—$C_{aa}H_{2aa+1}$ S8 in which P is as defined in formula R, alkyl denotes a single bond or straight-chain or branched alkylene having 1 to 12 C atoms which is unsubstituted or mono- or polysubstituted by F, Cl or CN and in which one or more non-adjacent $CH_2$ groups may each, independently of one another, be replaced by —C($R^0$)═C($R^0$)—, —C≡C—, —N($R^0$)—, —O—, —S—, —CO—, —CO—O—, —O—CO—, —O—CO—O— in such a way that O and/or S atoms are not linked directly to one another, where $R^0$ denotes H or alkyl with 1 to 20 C atoms, aa and bb each, independently of one another, denote 0, 1, 2, 3, 4, 5 or 6, X has one of the meanings indicated for X", and is preferably O, CO, $SO_2$, O—CO—, CO—O or a single bond.

Preferred spacer groups $Sp(P)_2$ are selected from formulae S1, S2 and S3.

Very preferred spacer groups $Sp(P)_2$ are selected from the following subformulae:

—CHPP S1a

—O—CHPP S1b

—$CH_2$—CHPP S1c

—$OCH_2$—CHPP S1d

—CH($CH_2$—P)($CH_2$—P) S2a

—OCH($CH_2$—P)($CH_2$—P) S2b

—$CH_2$—CH($CH_2$—P)($CH_2$—P) S2c

—$OCH_2$—CH($CH_2$—P)($CH_2$—P) S2d

—CO—NH($(CH_2)_2$P)($(CH_2)_2$P) S3a

In the compounds of formula R and its subformulae as described above and below, P is preferably selected from the group consisting of vinyloxy, acrylate, methacrylate, fluoroacrylate, chloroacrylate, oxetane and epoxide, most preferably from acrylate and methacrylate.

Further preferred are compounds of formula R and its subformulae as described above and below, wherein all polymerizable groups P that are present in the compound have the same meaning, and very preferably denote acrylate or methacrylate, most preferably methacrylate.

In the compounds of formula R and its subformulae as described above and below, R preferably denotes P-Sp-.

Further preferred are compounds of formula R and its subformulae as described above and below, wherein Sp denotes a single bond or —$(CH_2)_{p1}$—, —O—$(CH_2)_{p1}$—, —O—CO—$(CH_2)_{pl1}$, or —CO—O—$(CH_2)_{p1}$, wherein p1 is 2, 3, 4, 5 or 6, and, if Sp is —O—$(CH_2)_{p1}$—, —O—CO—$(CH_2)_{p1}$ or —CO—O—$(CH_2)_{p1}$ the O-atom or CO-group, respectively, is linked to a benzene ring.

Further preferred are compounds of formula R and its subformulae as described above and below, wherein at least one group Sp is a single bond.

Further preferred are compounds of formula R and its subformulae as described above and below, wherein at least one group Sp is different from a single bond, and is preferably selected from —$(CH_2)_{p1}$—, —O—$(CH_2)_{p1}$—, —O—CO—$(CH_2)_{p1}$, or —CO—O—$(CH_2)_{p1}$, wherein p1 is 2, 3, 4, 5 or 6, and, if Sp is —O—$(CH_2)_{p1}$—, —O—CO—$(CH_2)_{p1}$ or —CO—O—$(CH_2)_{p1}$ the O-atom or CO-group, respectively, is linked to a benzene ring.

Very preferred groups -$A^1$-(Z-$A^2$)$_z$- in formula R are selected from the following formulae

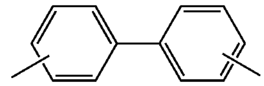

A1

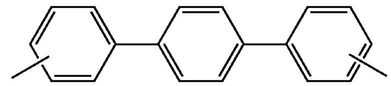

A2

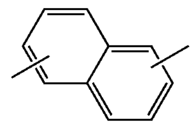

A3

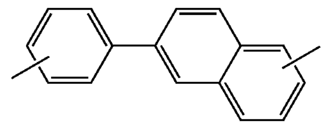

A4

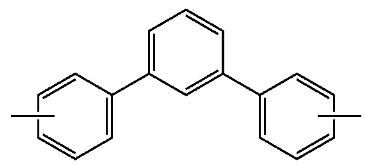

A5

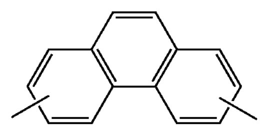

A6 wherein at least one benzene ring is optionally substituted by one or more groups L or P-Sp-.

Preferred compounds of formula R and their subformulae are selected from the following preferred embodiments, including any combination thereof:

All groups P in the compound have the same meaning,

-$A^1$-(Z-$A^2$)$_z$- is selected from formulae A1, A2 and A5, the compounds contain exactly two polymerizable groups (represented by the groups P), the compounds contain exactly three polymerizable groups (represented by the groups P), P is selected from the group consisting of acrylate, methacrylate and oxetane, very preferably acrylate or methacrylate, P is methacrylate, all groups Sp are a single bond, at least one of the groups Sp is a single bond and at least one of the groups Sp is different from a single bond, Sp, when being different from a single bond, is —$(CH_2)_{p2}$—, —$(CH_2)_{p2}$—O—, —$(CH_2)_{p2}$—CO—O—, —$(CH_2)_{p2}$—O—CO—, wherein p2 is 2, 3, 4, 5 or 6, and the O-atom or the CO-group, respectively, is connected to a benzene ring, Sp is a single bond or denotes —$(CH_2)_{p2}$—, —$(CH_2)_{p2}$—O—, —$(CH_2)_{p2}$—CO—O—, —$(CH_2)_{p2}$—O—CO—, wherein p2 is 2, 3, 4, 5 or 6, and the O-atom or the CO-group, respectively, is connected to a benzene ring, $Sp(P)_2$ is selected from subformulae S1-S8, R denotes P-Sp-, R does not denote or contain a polymerizable group, R does not denote or contain a polymerizable group and denotes straight chain, branched or cyclic alkyl having 1 to 25 C atoms, wherein one or more non-adjacent $CH_2$-groups are each optionally replaced by —O—, —S—, —CO—, —CO—O—, —O—CO—, or —O—CO—O— in such a manner that O- and/or S-atoms are not directly connected with each other, and wherein one or more H atoms are each optionally replaced by F, Cl or $L^a$, L denotes F, Cl or CN.

For the production of PSA displays, the polymerizable compounds contained in the LC medium are polymerized or crosslinked (if one compound contains two or more polymerizable groups) by in-situ polymerization in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the color filter side is unstructured and only the electrode on the TFT side has slots. Particularly suitable and preferred electrode structures for PS-VA displays are described, for example, in US 2006/0066793 A1.

A preferred PSA type LC display of the present invention comprises:

- a first substrate including a pixel electrode defining pixel areas, the pixel electrode being connected to a switching element disposed in each pixel area and optionally including a micro-slit pattern, and optionally a first alignment layer disposed on the pixel electrode,
- a second substrate including a common electrode layer, which may be disposed on the entire portion of the second substrate facing the first substrate, and optionally a second alignment layer,
- an LC layer disposed between the first and second substrates and including an LC medium comprising a polymerizable component P) and a liquid crystal component H) including a chiral component D) as described above and below, wherein the polymerizable component P) may also be polymerized.

The first and/or second alignment layer controls the alignment direction of the LC molecules of the LC layer. For example, in PS-VA displays the alignment layer is selected such that it imparts to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The LC layer with the LC medium can be deposited between the substrates of the display by methods that are conventionally used by display manufacturers, for example the so-called one-drop-filling (ODF) method. The polymerizable component of the LC medium is then polymerized for example by UV photopolymerization. The polymerization can be carried out in one step or in two or more steps.

The PSA display may comprise further elements, like a color filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example, for PS-VA displays a multi-domain orientation of the LC molecules can be induced by providing electrodes having slits and/or bumps or protrusions in order to create two, four or more different tilt alignment directions.

Upon polymerization the polymerizable compounds form a crosslinked polymer, which causes a certain pretilt of the LC molecules in the LC medium. Without wishing to be bound to a specific theory, it is believed that at least a part of the crosslinked polymer, which is formed by the polymerizable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerization can be carried out in one step. It is also possible firstly to carry out the polymerization, optionally while applying a voltage, in a first step in order to produce a pretilt angle, and subsequently, in a second polymerization step without an applied voltage, to polymerize or crosslink the compounds which have not reacted in the first step ("end curing").

Suitable and preferred polymerization methods are, for example, thermal or photopolymerization, preferably photopolymerization, in particular UV induced photopolymerization, which can be achieved by exposure of the polymerizable compounds to UV radiation.

Optionally one or more polymerization initiators are added to the LC medium. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocurel 173® (Ciba AG). If a polymerization initiator is employed, its proportion is preferably 0.001 to 5% by weight, particularly preferably 0.001 to 1% by weight.

The polymerizable compounds according to the invention are also suitable for polymerization without an initiator, which is accompanied by considerable advantages, such, for example, lower material costs and in particular less contamination of the LC medium by possible residual amounts of the initiator or degradation products thereof. The polymerization can thus also be carried out without the addition of an initiator. In a preferred embodiment, the LC medium thus does not contain a polymerization initiator.

The LC medium may also comprise one or more stabilizers in order to prevent undesired spontaneous polymerization of the RMs, for example during storage or transport. Suitable types and amounts of stabilizers are known to the person skilled in the art and are described in the literature. Particularly suitable are, for example, the commercially available stabilizers from the Irganox® series (Ciba AG), such as, for example, Irganox® 1076. If stabilizers are employed, their proportion, based on the total amount of RMs or the polymerizable component (component P), is preferably 10-500,000 ppm, particularly preferably 50-50,000 ppm.

The polymerizable compounds of formula R do in particular show good UV absorption in, and are therefore especially suitable for, a process of preparing a PSA display including one or more of the following features:

- the polymerizable medium is exposed to UV light in the display in a 2-step process, including a first UV exposure step ("UV-1 step") to generate the tilt angle, and a second UV exposure step ("UV-2 step") to finish polymerization,
- the polymerizable medium is exposed to UV light in the display generated by an energy-saving UV lamp (also known as "green UV lamps"). These lamps are characterized by a relative low intensity (1/100-1/10 of a conventional UV1 lamp) in their absorption spectra from 300-380 nm, and are preferably used in the UV-2 step, but are optionally also used in the UV-1 step when avoiding high intensity is necessary for the process.

the polymerizable medium is exposed to UV light in the display generated by a UV lamp with a radiation spectrum that is shifted to longer wavelengths, preferably 340 nm or more, to avoid short UV light exposure in the PS-VA process. Both using lower intensity and a UV shift to longer wavelengths protect the organic layer against damage that may be caused by the UV light.

A preferred embodiment of the present invention relates to a process for preparing a PSA display as described above and below, comprising one or more of the following features:

the polymerizable LC medium is exposed to UV light in a 2-step process, including a first UV exposure step ("UV-1 step") to generate the tilt angle, and a second UV exposure step ("UV-2 step") to finish polymerization, the polymerizable LC medium is exposed to UV light generated by a UV lamp having an intensity of from 0.5 $mW/cm^2$ to 10 $mW/cm^2$ in the wavelength range from 300-380 nm, preferably used in the UV-2 step, and optionally also in the UV-1 step, the polymerizable LC medium is exposed to UV light having a wavelength of 340 nm or more, and preferably 400 nm or less.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 340 nm is desired, UV exposure can be carried out using a cut-off filter being substantially transmissive for wavelengths λ>340 nm.

"Substantially transmissive" means that the filter transmits a substantial part, preferably at least 50% of the intensity, of incident light of the desired wavelength(s). "Substantially blocking" means that the filter does not transmit a substantial part, preferably at least 50% of the intensity, of incident light of the undesired wavelengths. "Desired (undesired) wavelength", e.g., in case of a band pass filter means the wavelengths inside (outside) the given range of A, and in case of a cut-off filter means the wavelengths above (below) the given value of A.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

Preferably the LC medium according to the present invention does essentially consist of a polymerizable component P), or one or more polymerizable compounds of formula R, and an LC component H), or LC host mixture, and an optically active component D) comprising one or more chiral dopants, as described above and below. However, the LC medium may additionally comprise one or more further components or additives, preferably selected from the list including but not limited to co-monomers, polymerization initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colorants, dyes, pigments and nanoparticles.

Particular preference is given to LC media comprising one, two or three chiral dopants, very preferably one chiral dopant.

Particular preference is given to LC media comprising one, two or three polymerizable compounds of formula R.

Preference is furthermore given to LC media in which the polymerizable component P) comprises exclusively polymerizable compounds of formula R.

Preference is furthermore given to LC media in which the liquid-crystalline component H) or the LC host mixture has a chiral nematic LC phase.

The LC component H), or LC host mixture, is preferably a nematic LC mixture.

Preferably the proportion of the polymerizable component P) in the LC medium is from >0 to <5%, very preferably from >0 to <1%, most preferably from 0.01 to 0.5%.

Preferably the proportion of compounds of formula R in the LC medium is from >0 to <5%, very preferably from >0 to <1%, most preferably from 0.01 to 0.5%.

Preferably the proportion of the LC component H), comprising one or more mesogenic or liquid-crystalline compounds and an optically active component D), in the LC medium is from 95 to <100%, very preferably from 99 to <100%.

In a preferred embodiment the polymerizable compounds of the polymerizable component H) are exclusively selected from formula R.

Preferred compounds or formula R are selected from the following formulae:

R1

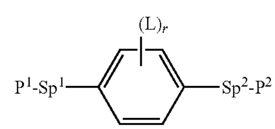

R2

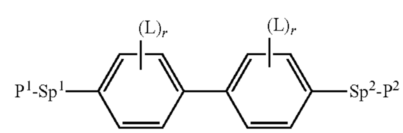

R3

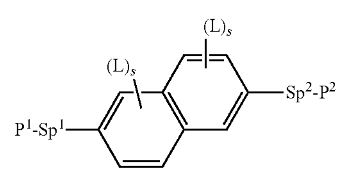

R4

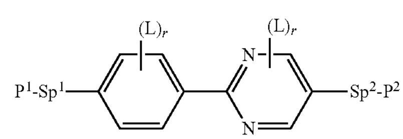

R5

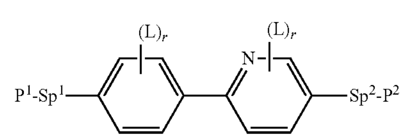

-continued
R6
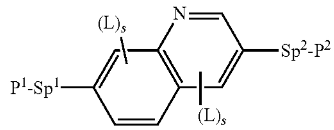
R7
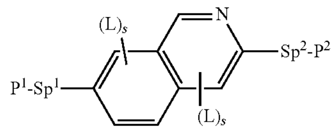
R8
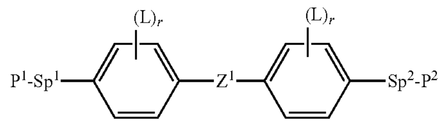
R9
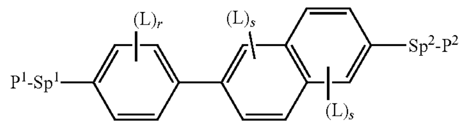
R10
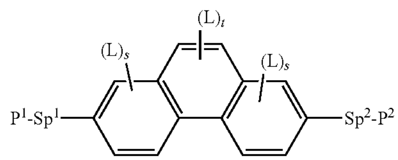
R11
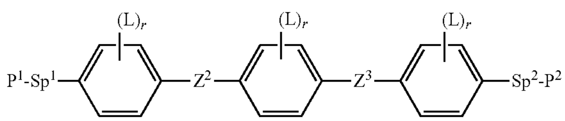
R12
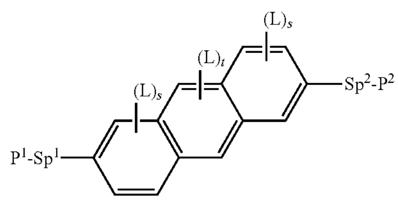
R13
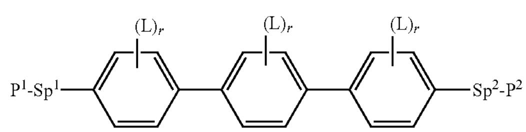
R14
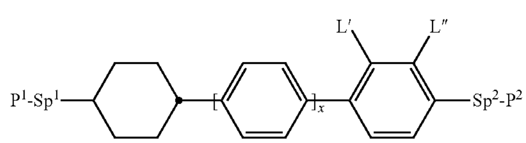
R15
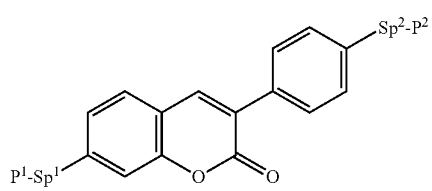
-continued
R16
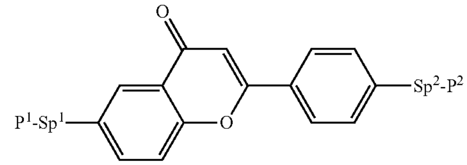
R17
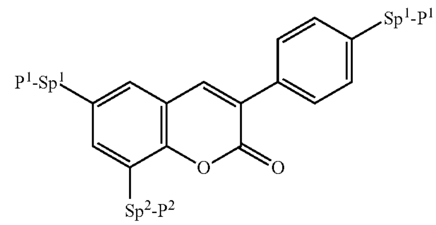
R18
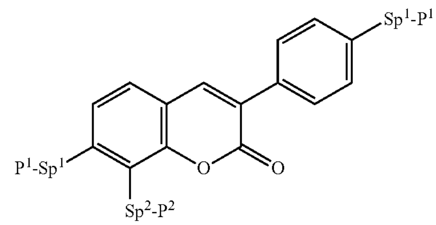
R19
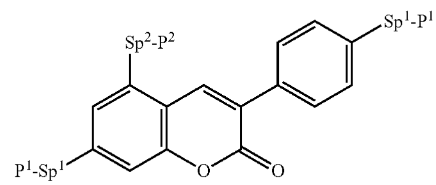
R20
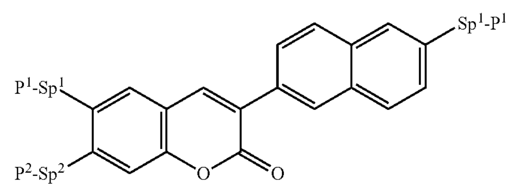
R21
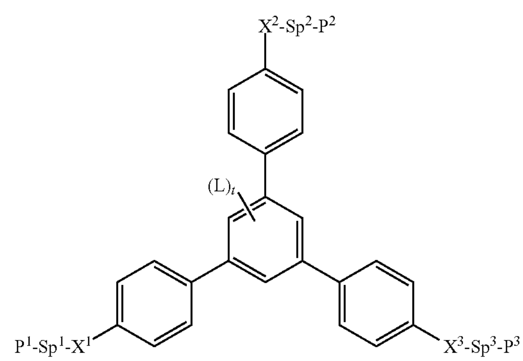

-continued

R22

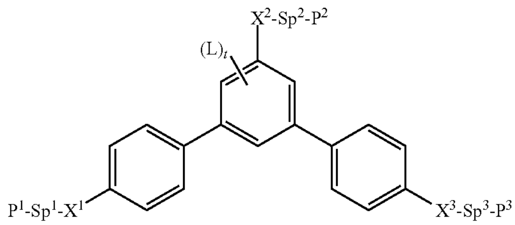

R23

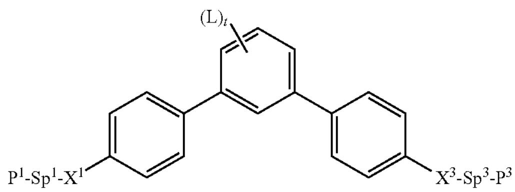

R24

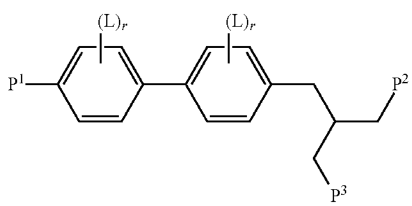

R25

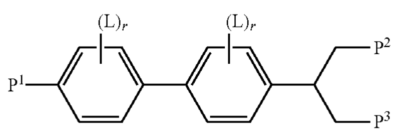

R26

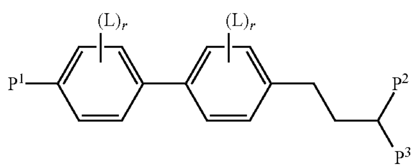

R27

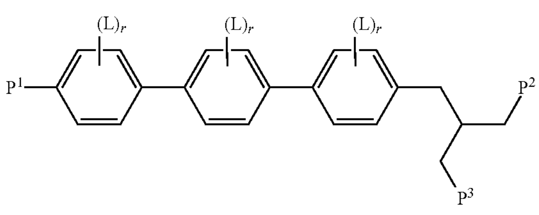

R28

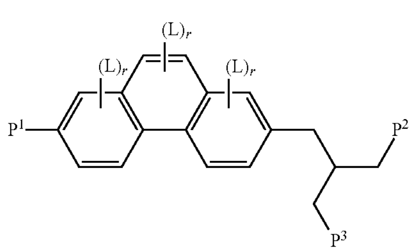

-continued

R29

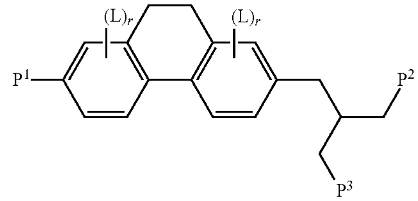

R30

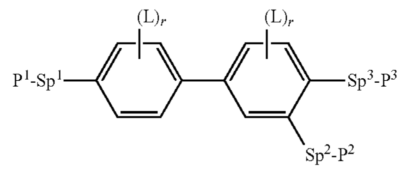

R31

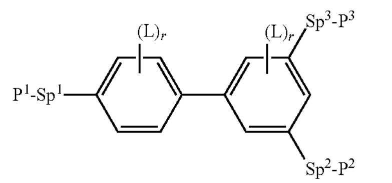

in which the individual radicals have the following meanings:

$P^1$, $P^2$ and $P^3$ each, independently of one another, denote an acrylate or methacrylate group, $Sp^1$, $Sp^2$ and $Sp^3$ each, independently of one another, denote a single bond or a spacer group having one of the meanings indicated above and below for Sp, and particularly preferably denote —$(CH_2)_{p1}$—, —$(CH_2)_{p1}$—O—, —$(CH_2)_{p1}$—CO—O—, —$(CH_2)_{p1}$—O—CO— or —$(CH_2)_{p1}$—O—CO—O—, in which p1 is an integer from 1 to 12, where, in addition, one or more of the radicals $P^1$-$Sp^1$-, $P^1$—$Sp^2$- and $P^3$—$Sp^3$- may denote $R^{aa}$, with the proviso that at least one of the radicals $P^1$-$Sp^1$-, $P^2$—$Sp^2$ and $P^3$—$Sp^3$- present is different from $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)$=$C(R^{00})$—, —C≡C—, —$N(R^0)$—, —O—, —S—, —CO—, —CO—O—, —O—CO—, or —O—CO—O— in such a way that O and/or S atoms are not linked directly to one another, and in which, in addition, one or more H atoms may each be replaced by F, Cl, CN or $P^1$—$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ each, independently of one another and identically or differently on each occurrence, denote H or alkyl having 1 to 12 C atoms, $X^1$, $X^2$ and $X^3$ each, independently of one another, denote —CO—O—, —O—CO— or a single bond, $Z^1$ denotes —O—, —CO—, —$C(R^yR^z)$— or —$CF_2CF_2$—, $R^y$ and $R^z$ each, independently of one another, denote H, F, $CH_3$ or $CF_3$, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$—, where n is 2, 3 or 4, L on each occurrence, identically or differently, denotes F, Cl, CN or straight-chain or branched, optionally mono- or poly-fluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, r denotes 0, 1, 2, 3 or 4, s denotes 0, 1, 2 or 3, t denotes 0, 1 or 2, x denotes 0 or 1.

Especially preferred are compounds of formulae R2, R13, R17, R22, R23, R24 and R30.

Further preferred are trireactive compounds R17 to R31, in particular R17, R18, R19, R22, R23, R24, R25, R26, R30 and R31.

In the compounds of formulae R1 to R31 the group

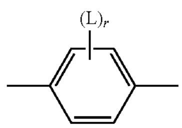

is preferably

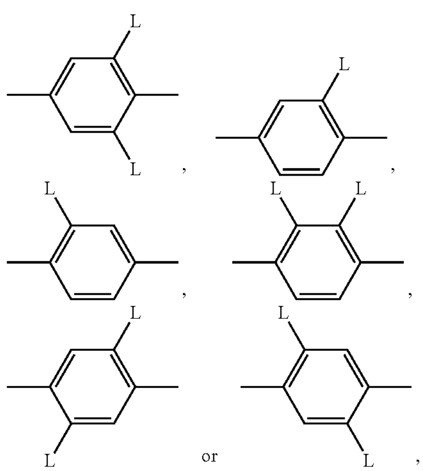

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, especially F or $CH_3$.

Besides the polymerizable compounds described above, the LC media for use in the LC displays according to the invention comprise an LC mixture ("host mixture") comprising one or more, preferably two or more LC compounds which are selected from low-molecular-weight compounds that are unpolymerizable. These LC compounds are selected such that they stable and/or unreactive to a polymerization reaction under the conditions applied to the polymerization of the polymerizable compounds.

In principle, any LC mixture which is suitable for use in conventional displays is suitable as host mixture. Suitable LC mixtures are known to the person skilled in the art and are described in the literature, for example mixtures in VA displays in EP 1 378 557.

The polymerizable compounds of formula R are especially suitable for use in an LC host mixture that comprises one or more mesogenic or LC compounds comprising an alkenyl group (hereinafter also referred to as "alkenyl compounds"), wherein said alkenyl group is stable to a polymerization reaction under the conditions used for polymerization of the compounds of formula R and of the other polymerizable compounds contained in the LC medium. Compared to RMs known from prior art the compounds of formula R do in such an LC host mixture exhibit improved properties, like solubility, reactivity or capability of generating a tilt angle.

Thus, in addition to the polymerizable compounds of formula R, the LC medium according to the present invention comprises one or more mesogenic or liquid crystalline compounds comprising an alkenyl group, ("alkenyl compound"), where this alkenyl group is preferably stable to a polymerization reaction under the conditions used for the polymerization of the polymerizable compounds of formula R or of the other polymerizable compounds contained in the LC medium.

The alkenyl groups in the alkenyl compounds are preferably selected from straight-chain, branched or cyclic alkenyl, in particular having 2 to 25 C atoms, particularly preferably having 2 to 12 C atoms, in which, in addition, one or more non-adjacent $CH_2$ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F or Cl.

Preferred alkenyl groups are straight-chain alkenyl having 2 to 7 C atoms and cyclohexenyl, in particular ethenyl, propenyl, butenyl, pentenyl, hexenyl, heptenyl, 1,4-cyclohexen-1-yl and 1,4-cyclohexen-3-yl.

The concentration of compounds containing an alkenyl group in the LC host mixture (i.e. without any polymerizable compounds) is preferably from 5% to 100%, very preferably from 20% to 60%.

Especially preferred are LC mixtures containing 1 to 5, preferably 1, 2 or 3 compounds having an alkenyl group.

The mesogenic and LC compounds containing an alkenyl group are preferably selected from formulae AN and AY as defined below.

Besides the polymerizable component P) as described above, the LC media according to the present invention comprise an LC component H), or LC host mixture, comprising one or more, preferably two or more LC compounds which are selected from low-molecular-weight compounds that are unpolymerizable. These LC compounds are selected such that they stable and/or unreactive to a polymerization reaction under the conditions applied to the polymerization of the polymerizable compounds.

The media according to the present invention comprise one or more chiral dopants. Preferably these chiral dopants have an absolute value of the helical twisting power (short: HTP) in the range of from 1 $\mu m^{-1}$ to 150 $\mu m^{-1}$, preferably in the range of from 10 $\mu m^{-1}$ to 100 $\mu m^{-1}$. In case the media comprise two or more chiral dopants, these may have opposite signs of their HTP-values. This condition is preferred for some specific embodiments, as it allows to compensate the chirality of the respective compounds to some degree and, thus, may be used to compensate various temperature dependent properties of the resulting media in the devices. Generally, however, it is preferred that most, preferably all of the chiral compounds present in the media according to the present invention have the same sign of their HTP-values.

Preferably the chiral dopants present in the media according to the instant application are mesogenic compounds and most preferably they exhibit a mesophase on their own.

In a preferred embodiment of the present invention, the chiral component D) consists of two or more chiral compounds which all have the same algebraic sign of the HTP.

The temperature dependence of the HTP of the individual compounds may be high or low. The temperature dependence of the pitch of the medium can be compensated by mixing compounds having different temperature dependence of the HTP in corresponding ratios.

For the optically active component, a multiplicity of chiral dopants, some of which are commercially available, is available to the person skilled in the art, such as, for example, cholesteryl nonanoate, R- and S-811, R- and S-1011, R- and S-2011, R- and S-3011 R- and S-4011, $B(OC)_2C^*H$—C-3 or CB15 (all Merck KGaA, Darmstadt).

Particularly suitable dopants are compounds which contain one or more chiral groups and one or more mesogenic groups, or one or more aromatic or alicyclic groups which form a mesogenic group with the chiral group.

Suitable chiral groups are, for example, chiral branched hydrocarbon radicals, chiral ethanediols, binaphthols or dioxolanes, furthermore mono- or polyvalent chiral groups selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral groups are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4:3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, in which one or more $CH_2$ groups are substituted by alkyl or alkoxy; amino acids, such as, for example, alanine, valine, phenylglycine or phenylalanine, or sequences of from 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

The optically active component D) preferably consists of chiral dopants which are selected from the group of known chiral dopants. Suitable chiral groups and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820. Examples are also compounds listed in Table B below.

Chiral compounds preferably used according to the present invention are selected from the group consisting of the formulae shown below.

Particular preference is given to chiral dopants selected from the group consisting of compounds of the following formulae A-I to A-III and A-Ch:

A-I

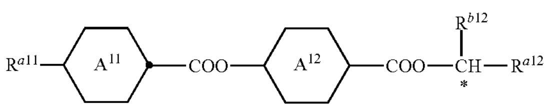

A-II

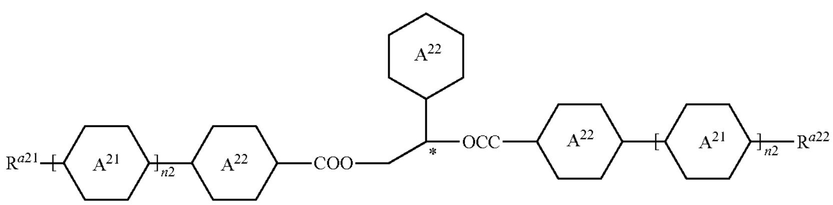

A-III

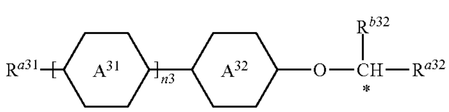

A-Ch

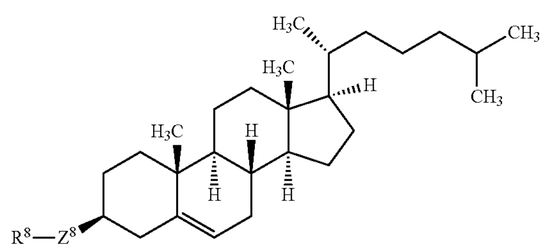

in which $R^{a11}$, $R^{a12}$ and $R^{b12}$, independently of one another, denote alkyl having 1 to 15 C atoms, in which, in addition, one or more non-adjacent $CH_2$ groups may each be replaced, independently of one another, by —C($R^z$)═C($R^z$)—, —C≡C—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, preferably alkyl, more preferably n-alkyl, with the proviso that $R^{a12}$ is different from $R^{b12}$, $R^{a21}$ and $R^{a22}$, independently of one another, denote alkyl having 1 to 15 C atoms, in which, in addition, one or more non-adjacent $CH_2$ groups may each be replaced, independently of one another, by —C($R^z$)═C($R^z$)—, —C≡C—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, preferably both are alkyl, more preferably n-alkyl, $R^{a31}$, $R^{a32}$ and $R^{b32}$, independently of one another, denote straight-chain or branched alkyl having 1 to 15 C atoms, in which, in addition, one or more non-adjacent $CH_2$ groups may each be replaced, independently of one another, by —C($R^z$)═C($R^z$)—, —C≡C—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, preferably alkyl, more preferably n-alkyl,
with the proviso that $R^{a32}$ is different from $R^{b32}$;

$R^z$ denotes H, $CH_3$, F, Cl, or CN, preferably H or F, $R^8$ has one of the meanings of $R^{a11}$ given above, preferably alkyl, more preferably n-alkyl having 1 to 15 C atoms, $Z^8$ denotes —C(O)O—, $CH_2O$, $CF_2O$ or a single bond, preferably —C(O)O—, $A^{11}$ is defined as $A^{12}$ below, or alternatively denotes

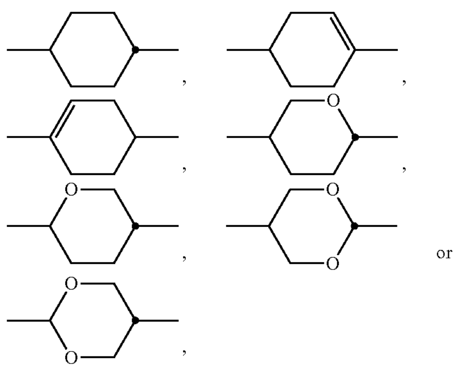

$A^{12}$ denotes

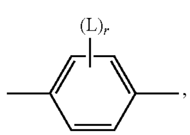

preferably

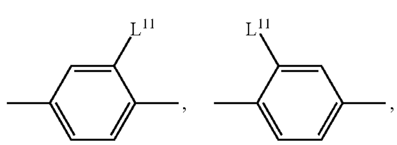

-continued

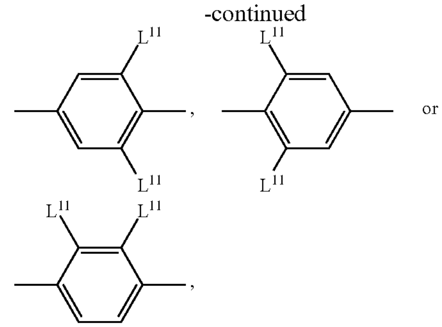

in which $L^{11}$, on each occurrence, independently of one another, has one of the meanings indicated above for L in formula R, preferably Me (methyl), Et (ethyl), Cl or F, particularly preferably F.

$A^{21}$ denotes

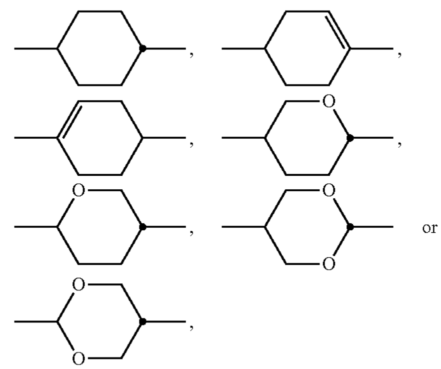

$A^{22}$ has the meanings given for A12

$A^{31}$ has the meanings given for $A^{12}$, or alternatively denotes

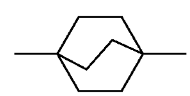

$A^{32}$ has the meanings given for $A^{12}$, n2 on each occurrence, identically or differently, is 0, 1 or 2, and n3 is 1, 2 or 3.

Particular preference is given to dopants selected from the group consisting of the compounds of the following formulae:

A-I-1

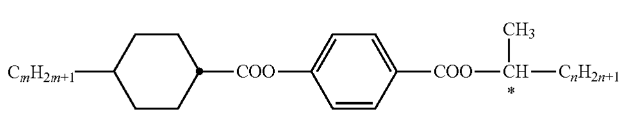

A-II-1

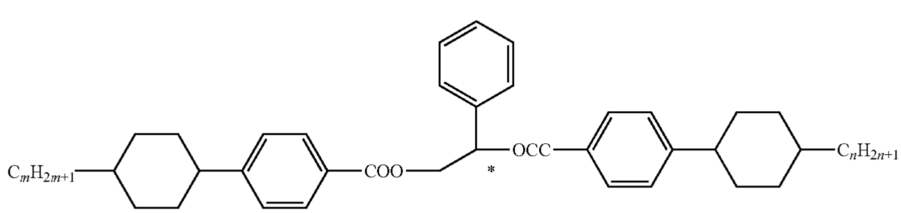

-continued

A-III-1

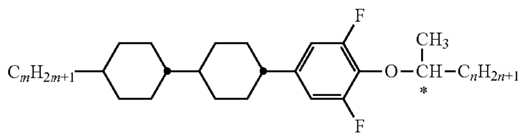

A-III-2

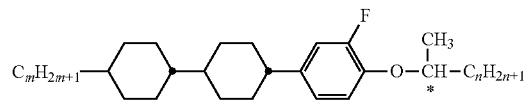

A-III-3

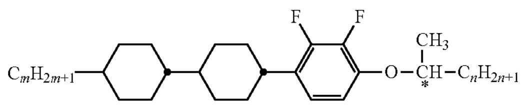

A-III-4

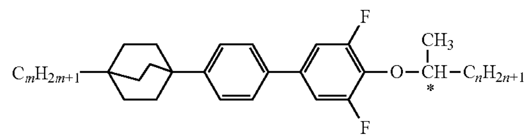

A-III-5

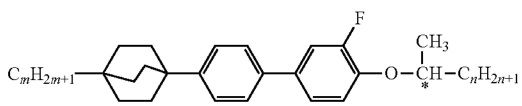

A-III-6

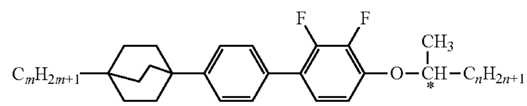

A-III-7

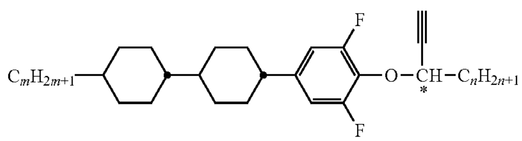

A-III-8

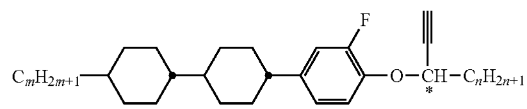

A-III-9

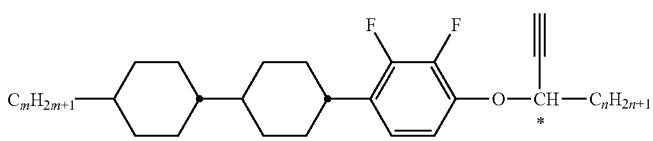

in which m is, on each occurrence, identically or differently, an integer from 1 to 9 and n is, on each occurrence, identically or differently, an integer from 2 to 9.

Particularly preferred compounds of formula A are compounds of formula A-III.

Further preferred dopants are derivatives of the isosorbide, isomannitol or isoiditol of the following formula A-IV:

A-IV

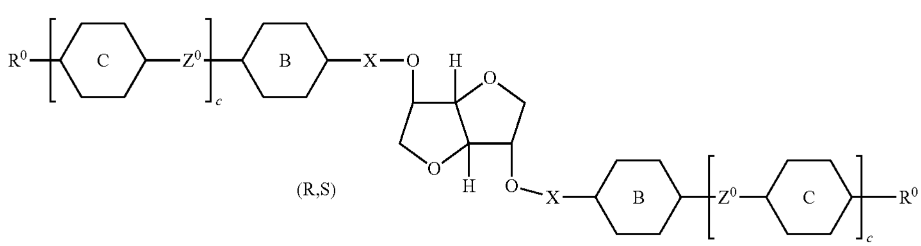

in which the group is

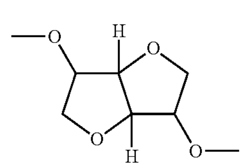

is

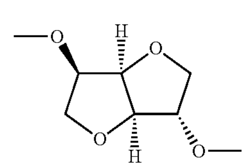

(dianhydrosorbitol)

-continued

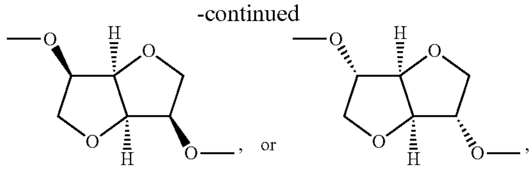

(dianhydromannitol) (dianhydroiditol)

preferably dianhydrosorbitol, and chiral ethanediols, such as, for example, diphenylethanediol (hydrobenzoin), in particular mesogenic hydrobenzoin derivatives of the following formula A-V:

A-V

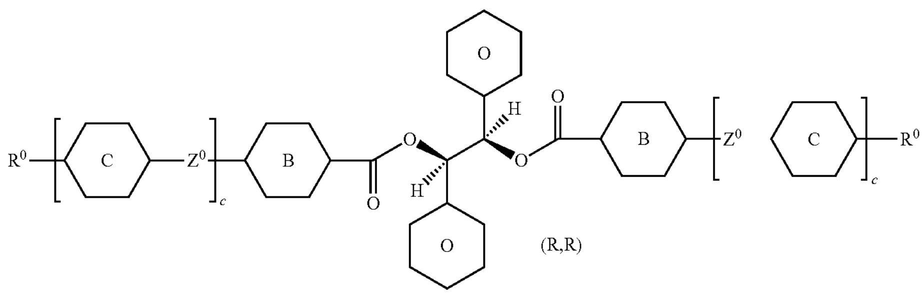

including the (R,S), (S,R), (R,R) and (S,S) enantiomers, which are not shown, in which

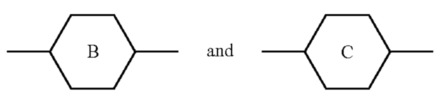

are each, independently of one another, 1,4-phenylene, which may also be mono-, di- or trisubstituted by L, or 1,4-cyclohexylene, L is H, F, Cl, CN or optionally halogenated alkyl, alkoxy, alkylcarbonyl, alkoxycarbonyl or alkoxycarbonyloxy having 1-7 carbon atoms, c is 0 or 1, X is $CH_2$ or —C(O)—, $Z^0$ is —COO—, —OCO—, —$CH_2CH_2$— or a single bond, and $R^0$ is alkyl, alkoxy, alkylcarbonyl, alkoxycarbonyl or alkylcarbonyloxy having 1-12 carbon atoms.

Chiral compounds preferably used according to the present invention are selected from the group consisting of the formulae shown below.

Examples of compounds of formula A-IV are:

A-IV-1

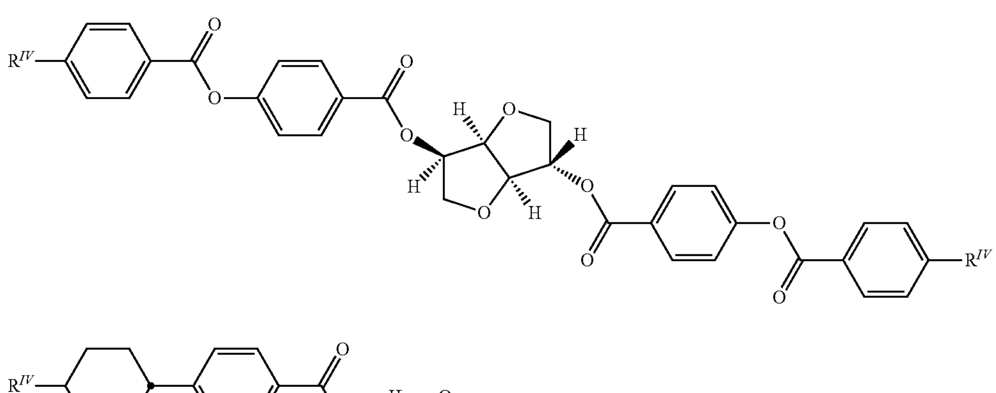

A-IV-2

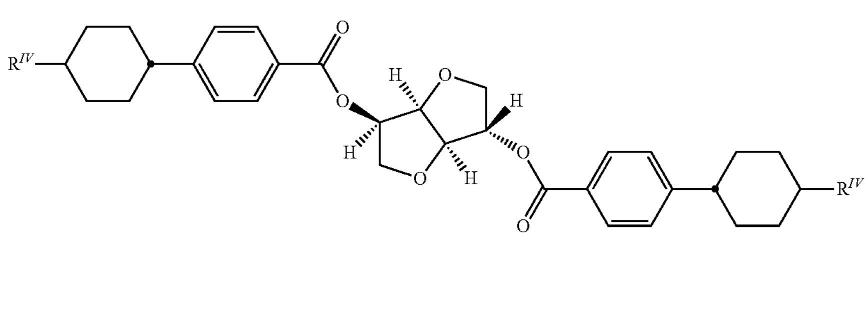

-continued

A-IV-3

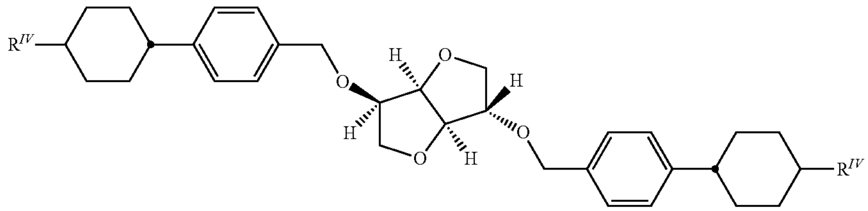

A-IV-4

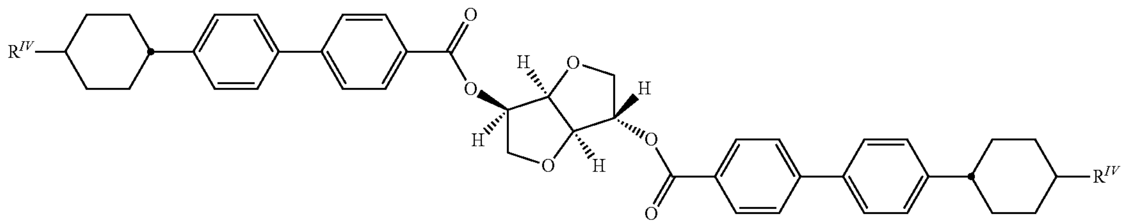

A-IV-5

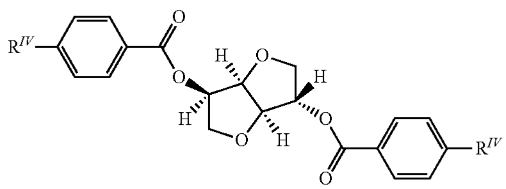

A-IV-6

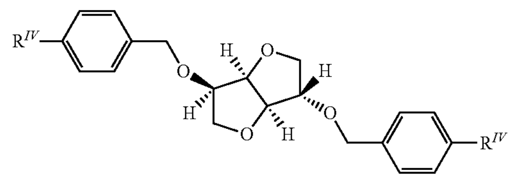

A-IV-7

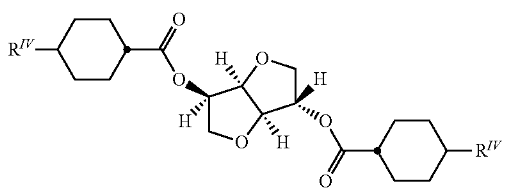

A-IV-8

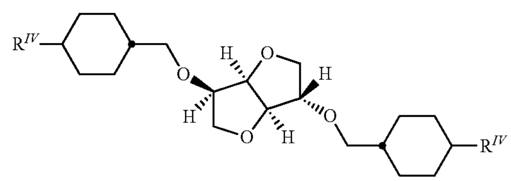

The compounds of the formula A-V are described in GB-A-2,328,207.

Very particularly preferred dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one fluorinated bridging group and a terminal or central chiral group, as described in WO 02/06196 and WO 02/06195.

Particular preference is given to chiral compounds of the formula A-VI

A-VI

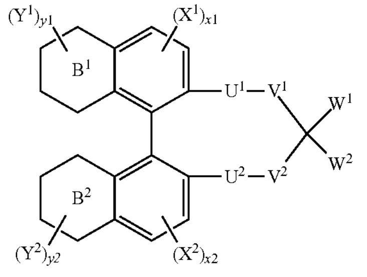

in which $X^1$, $X^2$, $Y^1$ and $Y^2$ are each, independently of one another, F, Cl, Br, I, CN, SCN, $SF_5$, straight-chain or branched alkyl having from 1 to 25 carbon atoms, which is unsubstituted or monosubstituted or polysubstituted by F, Cl, Br, I or CN and in which, in addition, one or more non-adjacent $CH_2$ groups may each, independently of one another, be replaced by —O—, —S—, —NH—, $NR^0$—, —CO—, —COO—, —OCO—, —OCOO—, —S—CO—, —CO—S—, —CH═CH— or —C≡C— in such a way that O and/or S atoms are not bonded directly to one another, a polymerizable group or cycloalkyl or aryl having up to 20 carbon atoms, which may optionally be monosubstituted or polysubstituted by halogen, preferably F, or by a polymerizable group, $R^0$ is H or alkyl having 1 to 12 C atoms, $x^1$ and $X^2$ are each, independently of one another, 0, 1 or 2, $y^1$ and $y^2$ are each, independently of one another, 0, 1, 2, 3 or 4, $B^1$ and $B^2$ are each, independently of one another, an aromatic or partially or fully saturated aliphatic six-membered ring in which one or more CH groups may each be replaced by N and one or more non-adjacent $CH_2$ groups may each be replaced by O or S, $W^1$ and $W^2$ are each, independently of one another, $—Z^1-A^1-(Z^2-A^2)_m-R$, and one of the two is alternatively $R^1$ or $A^3$, but both are not simultaneously H, or

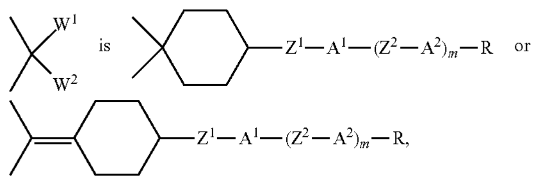

$U^1$ and $U^2$ are each, independently of one another, $CH_2$, O, S, CO or CS, $V^1$ and $V^2$ are each, independently of one another, $(CH_2)_n$, in which from one to four non-adjacent $CH_2$ groups may each be replaced by O or S, and one of $V^1$ and $V^2$ and, in the case where

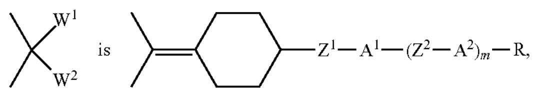

both are a single bond, n is 1, 2 or 3, $Z^1$ and $Z^2$ are each, independently of one another, —O—, —S—, —CO—, —COO—, —OCO—, —O—COO—, —CO—NR$^0$—, —NR$^0$—CO—, —O—$CH_2$—, —$CH_2$—O—, —S—$CH_2$—, —$CH_2$—S—, —$CF_2$—O—, —O—$CF_2$—, —$CF_2$—S—, —S—$CF_2$—, —$CH_2$—$CH_2$—, —$CF_2$—$CH_2$—, —$CH_2$—$CF_2$—, —$CF_2$—$CF_2$—, —CH═N—, —N═CH—, —N═N—, —CH═CH—, —CF═CH—, —CH═CF—, —CF═CF—, —C≡C—, a combination of two of these groups, where no two O and/or S and/or N atoms are bonded directly to one another (preferably —CH═CH—COO—, or —COO—CH═CH—), or a single bond, $A^1$, $A^2$ and $A^3$ are each, independently of one another, 1,4-phenylene, in which one or two non-adjacent CH groups may each be replaced by N, 1,4-cyclohexylene, in which one or two non-adjacent $CH_2$ groups may each be replaced by O or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where each of these groups is unsubstituted or monosubstituted or polysubstituted by L, and in addition $A^1$ can be a single bond, L is a halogen atom, preferably F, CN, $NO_2$, alkyl, alkoxy, alkylcarbonyl, alkoxycarbonyl or alkoxycarbonyloxy having 1-7 carbon atoms, in which one or more H atoms may each be replaced by F or Cl, m is in each case, independently, 0, 1, 2 or 3, and R and $R^1$ are each, independently of one another, H, F, Cl, Br, I, CN, SCN, $SF_5$, straight-chain or branched alkyl having from 1 or 3 to 25 carbon atoms respectively, which may optionally be mono-substituted or polysubstituted by F, Cl, Br, I or CN, and in which one or more non-adjacent $CH_2$ groups may each be replaced by —O—, —S—, —NH—, —NR$^0$—, —CO—, —COO—, —OCO—, —O—COO—, —S—CO—, —CO—S—, —CH═CH— or —C≡C—, where no two O and/or S atoms are bonded directly to one another, or a polymerizable group.

Particular preference is given to chiral binaphthyl derivatives of the formula A-VI-1

A-VI-1

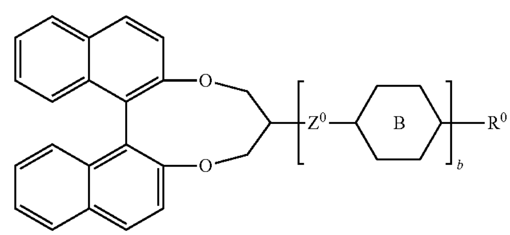

in which ring B, $R^0$ and $Z^0$ are as defined for the formulae A-IV and A-V, and b is 0, 1, or 2, in particular those selected from the following formulae A-VI-1a to A-VI-1c:

A-VI-1a

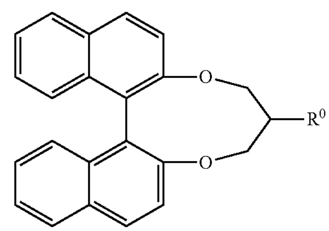

A-VI-1b

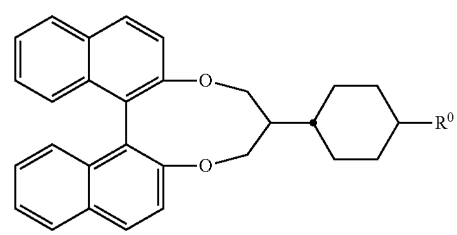

A-VI-1c

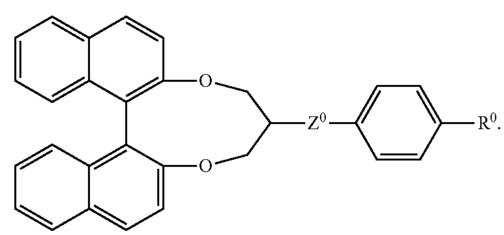

$Z^0$ is, in particular, —OCO— or a single bond.

Particular p reference is furthermore given to chiral binaphthyl derivatives of the formula A-VI-2

A-VI-2

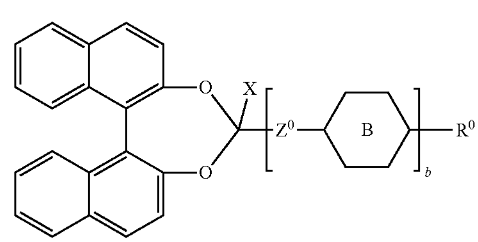

in particular those selected from the following formulae A-VI-2a to A-VI-2f:

A-VI-2a

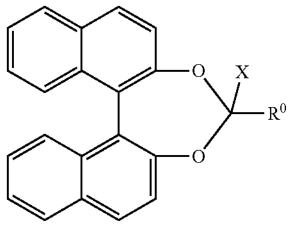

A-VI-2b

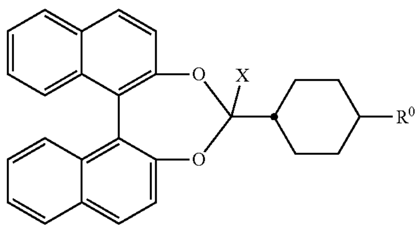

A-VI-2c

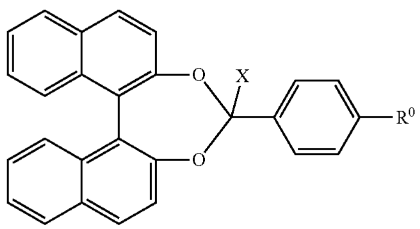

A-VI-2d

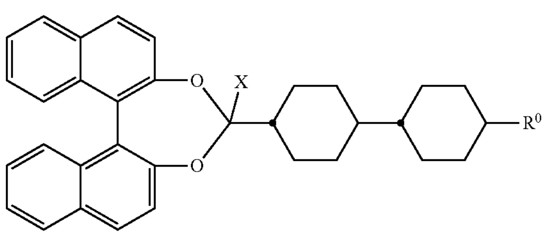

A-VI-2e

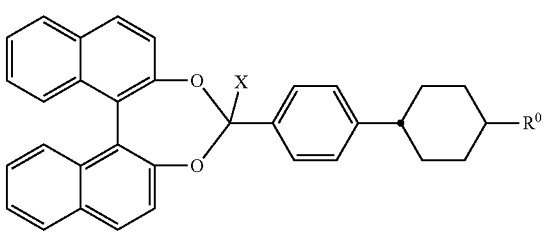

A-VI-2f

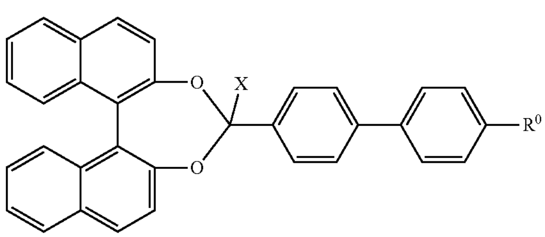

in which $R^0$ is as defined for the formula A-VI, and X is H, F, Cl, CN or $R^0$, preferably F.

The concentration of the one or more chiral dopant(s), in the LC medium is preferably in the range from 0.001% to 20%, preferably from 0.05% to 5%, more preferably from 0.1% to 2%, and, most preferably from 0.5% to 1.5%. These preferred concentration ranges apply in particular to the chiral dopant S-4011 or R-4011 (both from Merck KGaA) and for chiral dopants having the same or a similar HTP. For chiral dopants having either a higher or a lower absolute value of the HTP compared to S-4011, these preferred concentrations have to be decreased, respectively increased, proportionally according to the ratio of their HTP values relatively to that of S-4011.

The pitch p of the LC media or host mixtures according to the invention is preferably in the range of from 5 to 50 μm, more preferably from 8 to 30 m and particularly preferably from 10 to 20 μm.

The cell gap d, or thickness of the LC layer of the display according to the invention is preferably in the range of from 2 μm to 10 μm, more preferably 3 μm to 5 μm. Based on this, according to the invention, a preferable range of the ratio d/p between the cell gap d and the chiral pitch p is set to 0.04 to 2, preferably 0.1 to 1, very preferably 0.2 to 0.3.

The term "alignment agent for vertical alignment" (here shortly "alignment agent") refers to certain substances as disclosed in, e.g., WO 2012/038026 and EP 2918658, WO 2016/015803 or WO 2017/045740. An alignment agent can optionally have one, two or more polymerizable groups attached to its structure. Herein an alignment agent (or additive) is preferably a molecular compound with two or more rings and a polar anchor group (e.g. —OH, —SH, —$NH_2$), where the molecular compound can become part of a polymer in the process of its use, if it bears one, two or more polymerizable groups. In this disclosure, the term alignment agent refers to both the molecular and any polymerized form of the agent, unless indicated otherwise.

The self-alignment additive for vertical alignment is preferably selected of formula SA $$\text{MES-}R^A \qquad \text{SA}$$

in which

MES is a mesogenic group comprising one or more rings, which are connected directly or indirectly to each other, and optionally one or more polymerizable groups, which are connected to MES directly or via a spacer, and $R^A$ is a polar anchor group, preferably comprising at least one —OH, —SH or primary or secondary amine function. More preferably $R^A$ is a group $R^a$ as defined more closely in the following, including definition of $R^a$ in formula SAa.

Preferably the polar anchor group $R^A$ is a linear or branched alkyl group with 1 to 12 carbon atoms, wherein any —$CH_2$— is optionally replaced by —O—, —S—, —$NR^0$— or —NH—, and which is substituted with one, two or three polar groups selected from —OH, —$NH_2$ and —$NR^0$H, wherein $R^0$ is alkyl with 1 to 10 carbon atoms. More preferably $R^A$ is a group $R^a$ as defined below.

More preferably the self-alignment additive for vertical alignment is preferably selected of formula SAa $$R^1\text{-}[A^2\text{-}Z^2]_m\text{-}A^1\text{-}R^a \qquad \text{SAa}$$

in which $A^1$, $A^2$ each, independently of one another, denote an aromatic, heteroaromatic, alicyclic or heterocyclic group, which may also contain fused rings, and which may also be mono- or polysubstituted by any of groups L and -Sp-P, L in each case, independently of one another, denotes H, F, Cl, Br, I, —CN, —$NO_2$, —NCO, —NCS, —OCN, —SCN, —C(═O)N($R^0$)$_2$, —C(═O)R, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may each be replaced by F or Cl, P denotes a polymerizable group, Sp denotes a spacer group or a single bond, $Z^2$ in each case, independently of one another, denotes a single bond, —O—, —S—, —CO—, —CO—O—, —OCO—, —O—CO—O—, $—OCH_2—$, $—CH_2O—$, $—SCH_2—$, $—CH_2S—$, $—CF_2O—$, $—OCF_2—$, $—CF_2S—$, $—SCF_2—$, $—(CH_2)_{n1}—$, $—CF_2CH_2—$, $—CH_2CF_2—$, $—(CF_2)_{n1}—$, —CH═CH—, —CF═CF—, —C≡C—, —CH═CH—COO—, —OCO—CH═CH—, $—(CR^0R^{00})_{n1}—$, —CH(-Sp-P)—, $—CH_2CH$(-Sp-P)—, or —CH(-Sp-P)CH(-Sp-P)—, n1 denotes 1, 2, 3 or 4, m denotes 1, 2, 3, 4, 5 or 6, preferably 2, 3 or 4, $R^0$ in each case, independently of one another, denotes alkyl having 1 to 12 C atoms, $R^0$ in each case, independently of one another, denotes H or alkyl having 1 to 12 C atoms, $R^1$ independently of one another, denotes H, halogen, straight-chain, branched or cyclic alkyl having 1 to 25 C atoms, in which, in addition, one or more non-adjacent $CH_2$ groups may each be replaced by —O—, —S—, —CO—, —CO—O—, —O—CO—, or —O—CO—O— in such a way that O and/or S atoms are not linked directly to one another and in which, in addition, one or more H atoms may each be replaced by F or Cl, or a group -Sp-P, and $R^a$ denotes a polar anchor group having at least one group selected from —OH, $—NH_2$, $NHR^{11}$, —SH, C(O)OH and —CHO, where $R^{11}$ denotes alkyl having 1 to 12 C atoms.

The anchor group $R^a$ or $R^A$ of the self-alignment additive is preferably defined as $R^a$ an anchor group of the formula

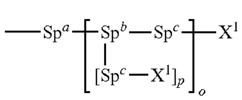

or

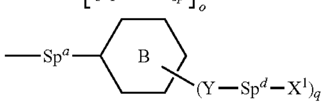

wherein p denotes 1 or 2, q denotes 2 or 3,

B denotes a substituted or unsubstituted ring system or condensed ring system, preferably a ring system selected from benzene, pyridine, cyclohexane, dioxane and tetrahydropyran, Y, independently of one another, denotes —O—, —S—, —C(O)—, —C(O)O—, —OC(O)—, $—NR^{11}—$ or a single bond, denotes 0 or 1, $X^1$, independently of one another, denotes H, alkyl, fluoroalkyl, OH, $NH_2$, $NHR^{11}$, $NR^{11}{}_2$, —SH, $OR^{11}$, C(O)OH, —CHO, where at least one group $X^1$ denotes a radical selected from —OH, $—NH_2$, $NHR^{11}$, —SH, C(O)OH and —CHO, $R^{11}$ denotes alkyl having 1 to 12 C atoms, $Sp^a$, $Sp^c$, $Sp^d$ each, independently of one another, denote a spacer group or a single bond, and $Sp^b$ denotes a tri- or tetravalent group, preferably CH, N or C.

The compound of formula SA/SAa optionally includes polymerizable compounds. Within this disclosure the "medium comprising a compound of formula SA" refers to both, the medium comprising the compound of formula SA and, alternatively, to the compound in its polymerized form in connection with the medium.

In the compounds of the formulae SAa $Z^2$ preferably denotes a single bond, $—C_2H_4—$, $—CF_2O—$ or $—CH_2O—$. In a specifically preferred embodiment $Z^2$ denotes a single bond.

In the compounds of the formula SAa $L^1$ and $L^2$ each independently preferably denote F or alkyl, preferably F, $CH_3$, $C_2H_5$ or $C_3H_7$.

In the compound of formula SAa $A^1$ preferably is a 1,4-phenylene ring, optionally substituted by one or two groups -Sp-P and/or one, two or more groups L.

Preferred compounds of the formula SA/SAa are illustrated by the following sub-formulae SA-A to SA-I

SA-A

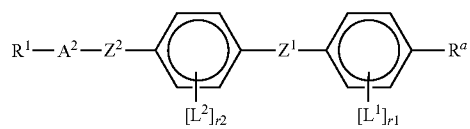

SA-B

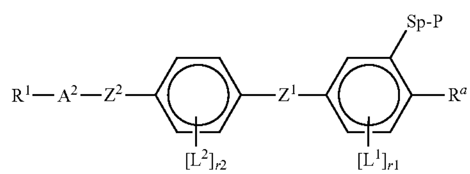

SA-C

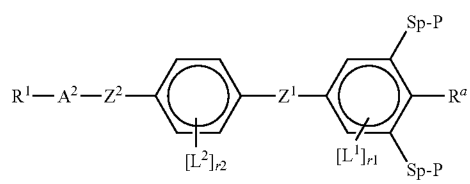

SA-D

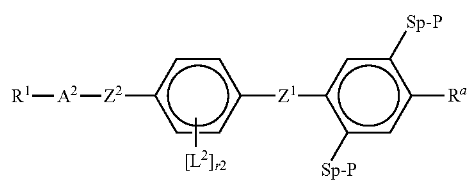

SA-E

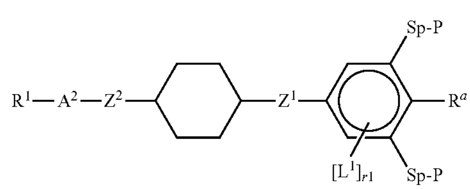

SA-F

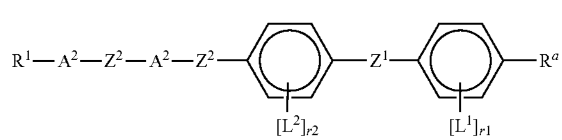

-continued

SA-G

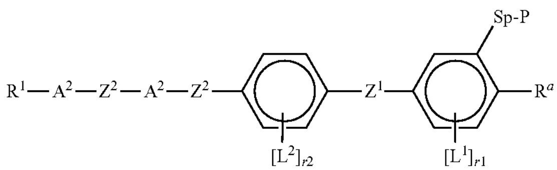

SA-H

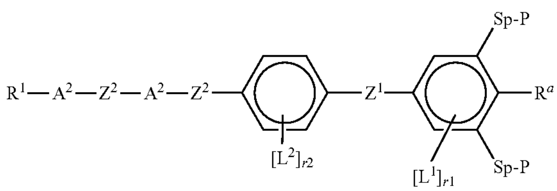

SA-I

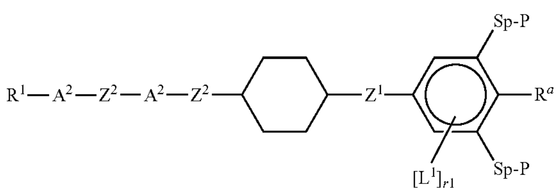

in which $R^1$, $R^a$, $A^2$, $Z^2$, Sp, and P independently have the meanings as defined for formula SAa above, $Z^1$ has a meaning of $Z^2$ as defined in formula SAa, $L^1$, $L^2$ are independently defined as L in formula SAa above, and r1, r2 independently are 0, 1, 2, 3, or 4, preferably 0, 1 or 2.

In a preferred embodiment, r2 denotes 1 and/or r1 denotes 0.

The polymerizable group P preferably has the preferred meanings provided for P in formula R, most preferably methacrylate.

In the above formulae SAa or SA-A to SA-I, $Z^1$ and $Z^2$ preferably independently denote a single bond or —$CH_2CH_2$—, and very particularly a single bond.

In the formula SA/SAa and its subformulae the group $R^A$/$R^a$ denotes preferably a partial group selected from

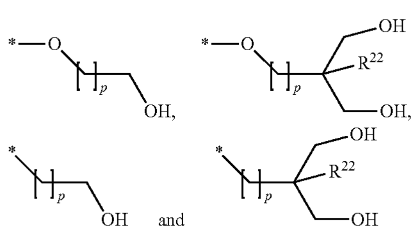

wherein p=1, 2, 3, 4, 5 or 6, and $R^{22}$ is H, methyl, ethyl, n-propyl, i-propyl, n-butyl, tert-butyl, $CH_2CH_2$-tert-butyl or n-pentyl, and * denotes the point of attachment of the group, in particular

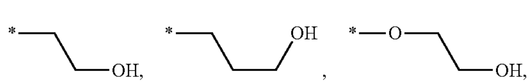

-continued

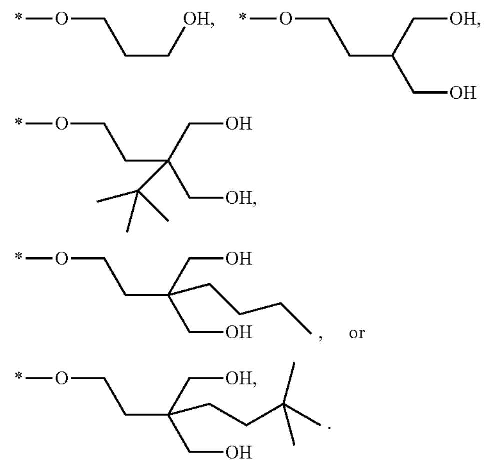

In the formula SA/SAa and in the sub-formulae of the formulae SA or SAa $R^1$ preferably denotes a straight-chain alkyl or branched alkyl radical having 1-8 C atoms, preferably a straight-chain alkyl radical. In the compounds of the formulae SA or SAa $R^1$ more preferably denotes $CH_3$, $C_2H_5$, n-$C_3H_7$, n-$C_4H_9$, n-$C_5H_{11}$, n-$C_6H_{13}$ or $CH_2CH(C_2H_5)C_4H_9$. $R^1$ furthermore may denote alkenyloxy, in particular $OCH_2CH{=}CH_2$, $OCH_2CH{=}CHCH_3$, $OCH_2CH{=}CHC_2H_5$, or alkoxy, in particular $OC_2H_5$, $OC_3H_7$, $OC_4H_9$, $OC_5H_{11}$ and $OC_6H_{13}$. Particularly preferable $R^1$ denotes a straight chain alkyl residue, preferably $C_5H_{11}$.

Particularly preferred compounds of the formula SA are selected from the compounds of the sub-formulae SA-1 to SA-79,

SA-1

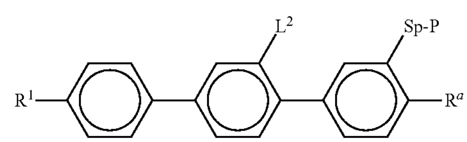

SA-2

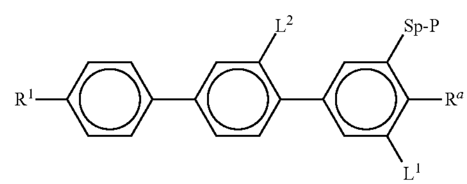

SA-3

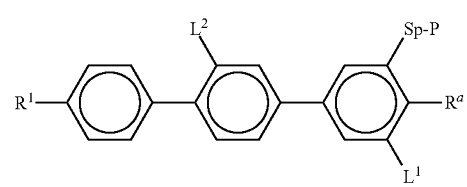

SA-4

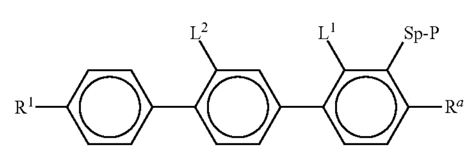

-continued
SA-5
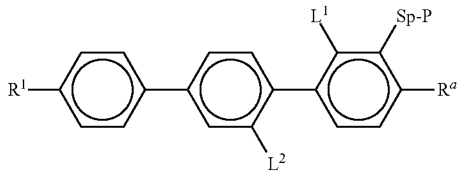
SA-6
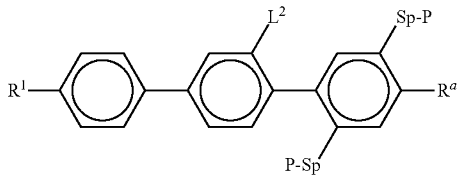
SA-7
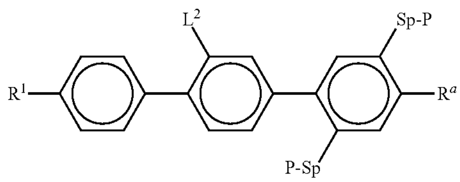
SA-8
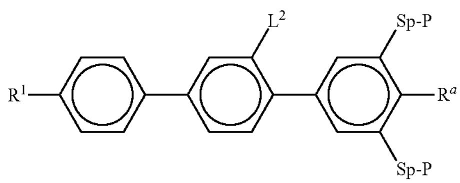
SA-9
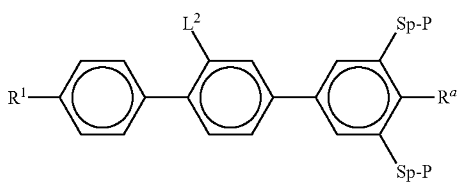
SA-10
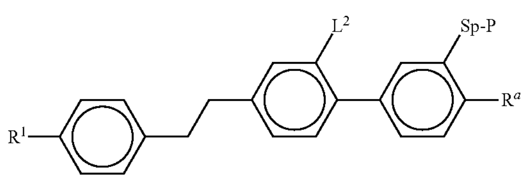
SA-11
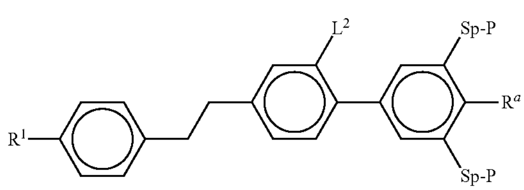
SA-12
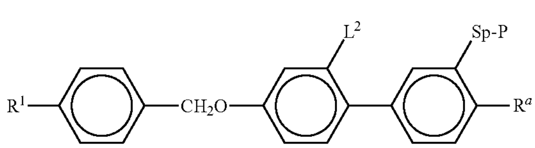
-continued
SA-13
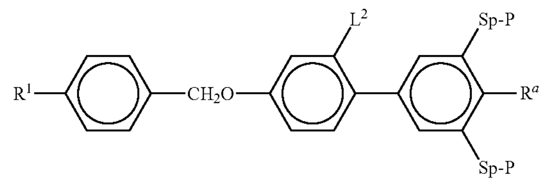
SA-14
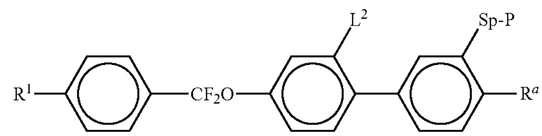
SA-15
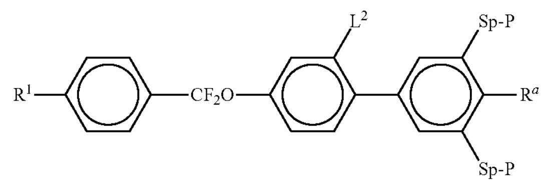
SA-16
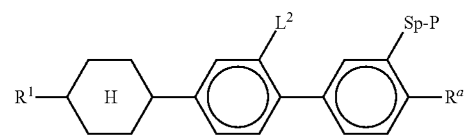
SA-17
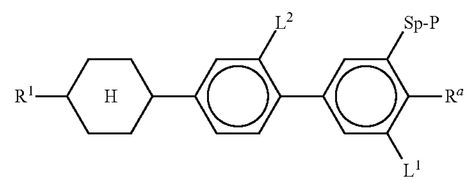
SA-18
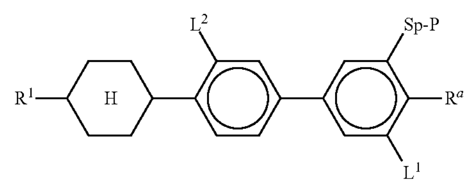
SA-19
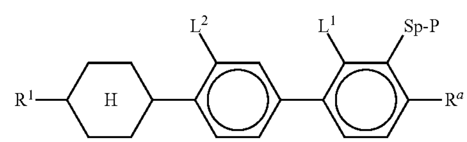
SA-20
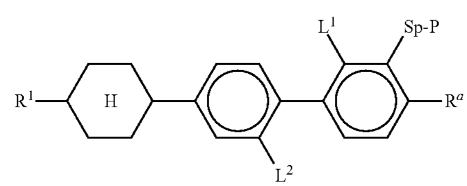
SA-21
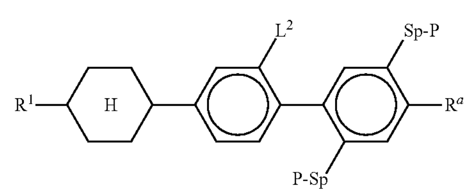

-continued
SA-22
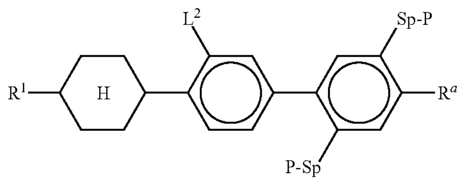
SA-23
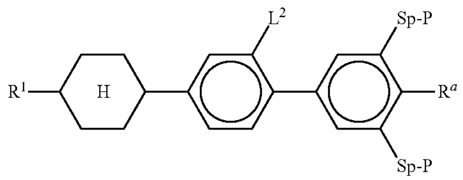
SA-24
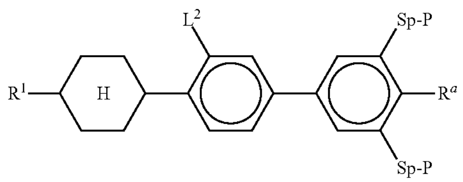
SA-25
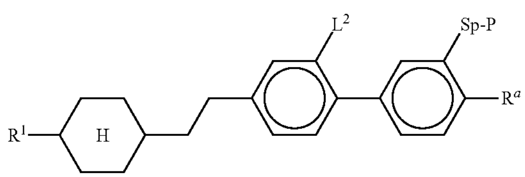
SA-26
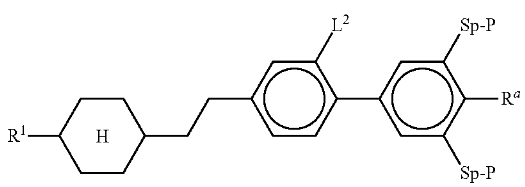
SA-27
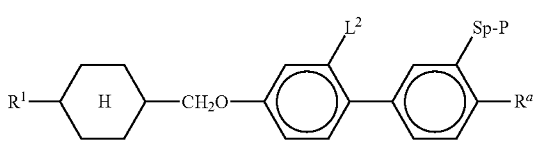
SA-28
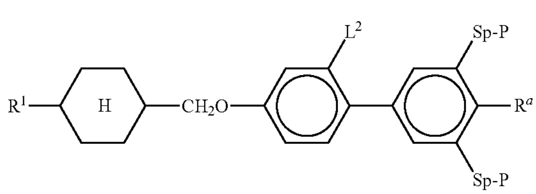
SA-29
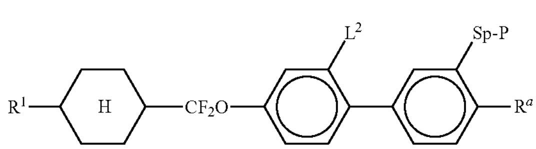
-continued
SA-30
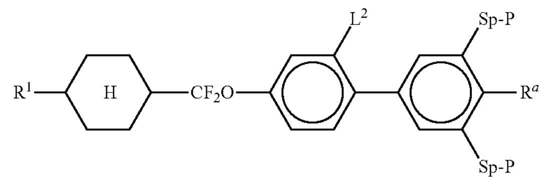
SA-31
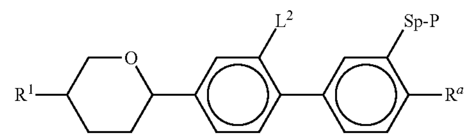
SA-32
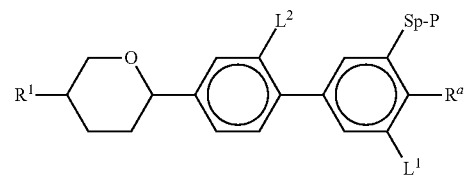
SA-33
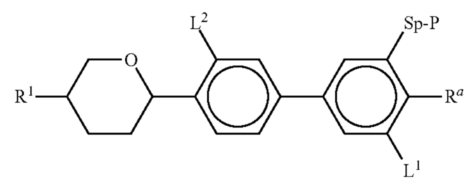
SA-34
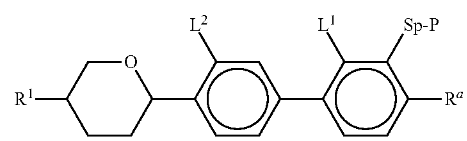
SA-35
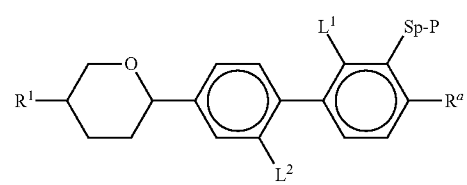
SA-36
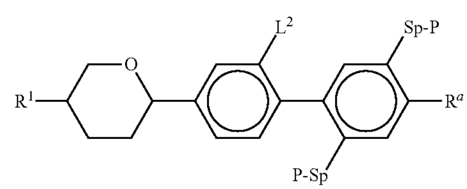
SA-37
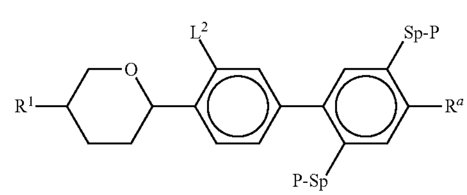
SA-38
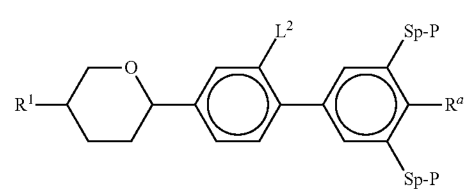

-continued
SA-39
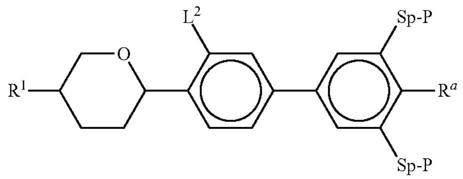
SA-40
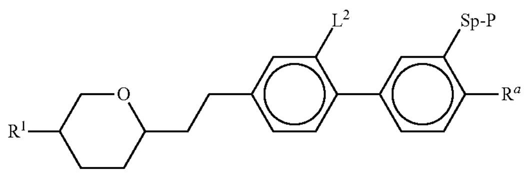
SA-41
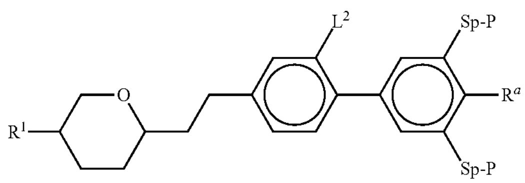
SA-42
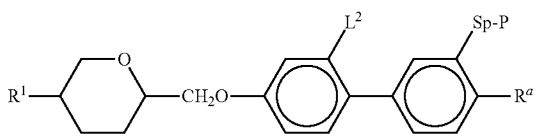
SA-43
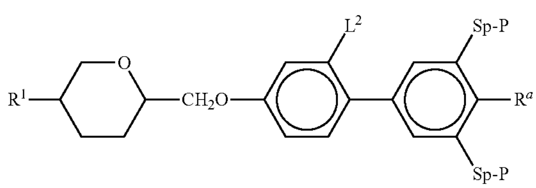
SA-44
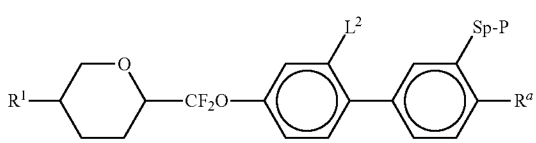
SA-45
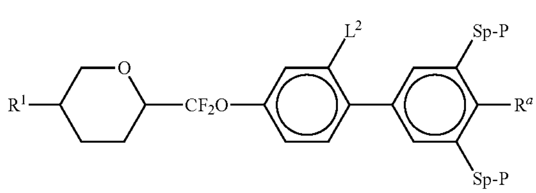
SA-46
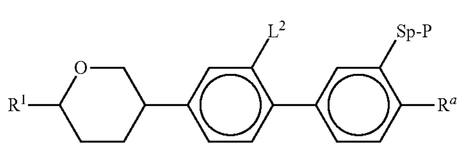
-continued
SA-47
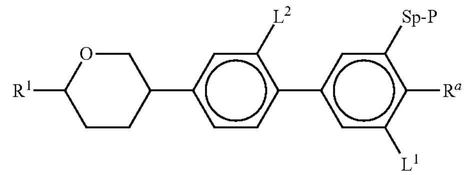
SA-48
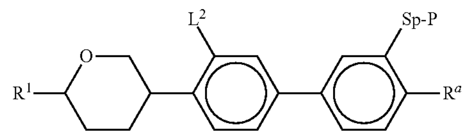
SA-49
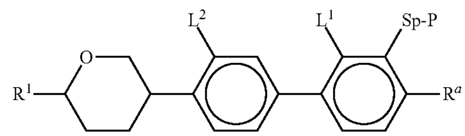
SA-50
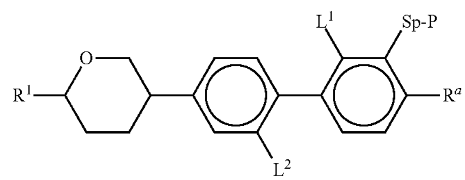
SA-51
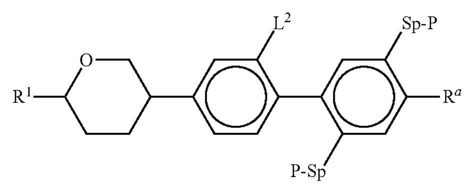
SA-52
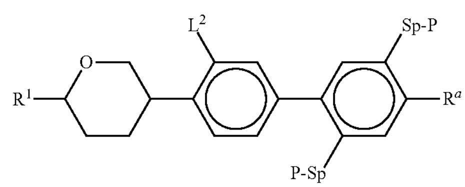
SA-53
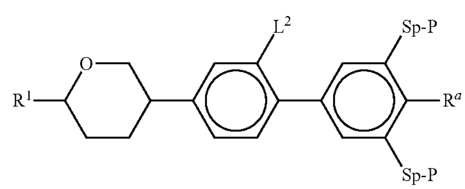
SA-54
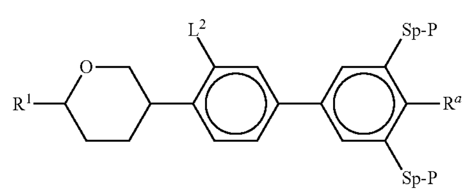
SA-55
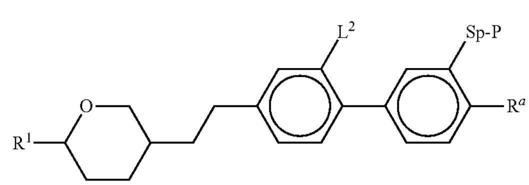

-continued
SA-56
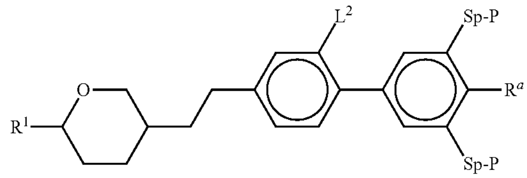
SA-57
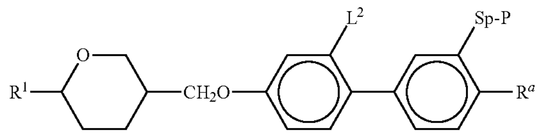
SA-58
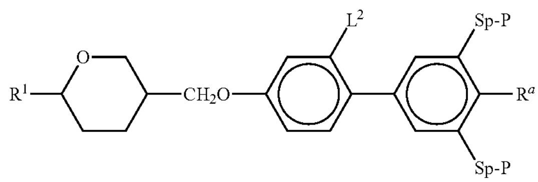
SA-59
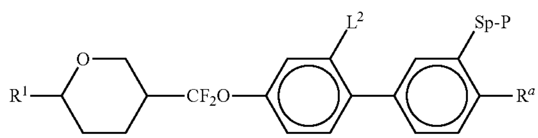
SA-60
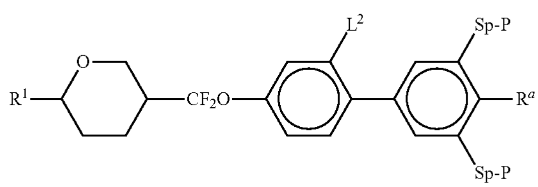
SA-61
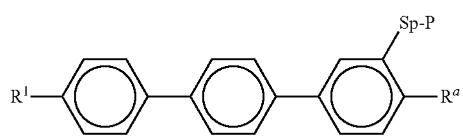
SA-62
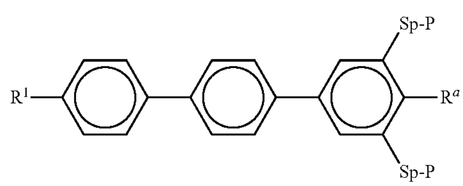
SA-63
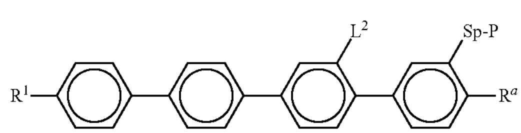
SA-64
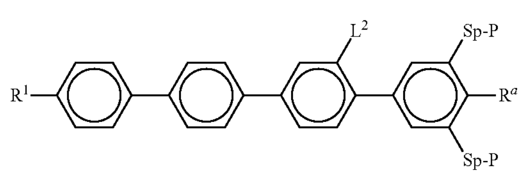
-continued
SA-65
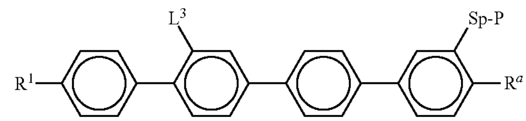
SA-66
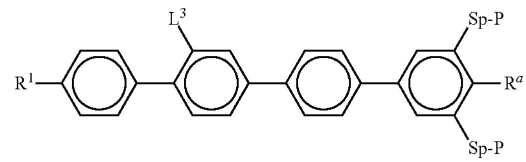
SA-67
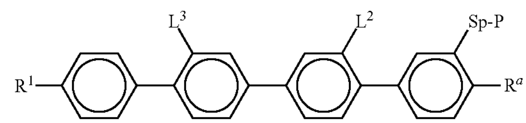
SA-68
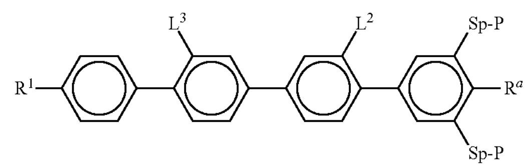
SA-69
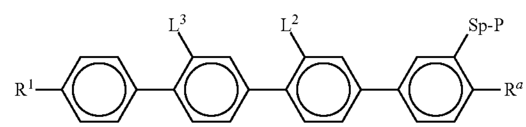
SA-70
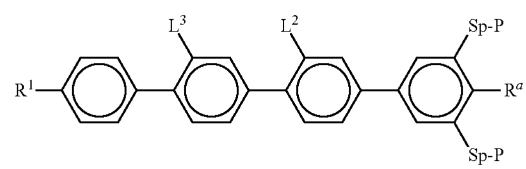
SA-71
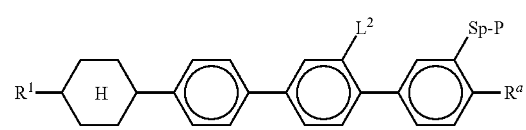
SA-72
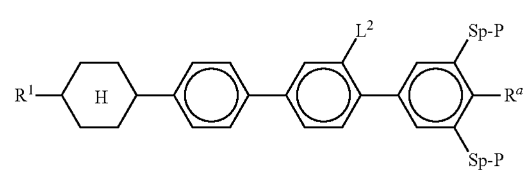
SA-73
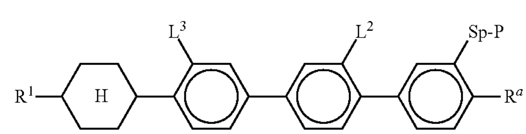

-continued
SA-74
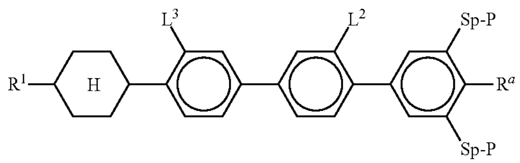
SA-75
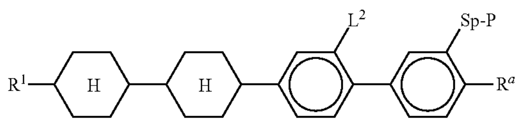
SA-76
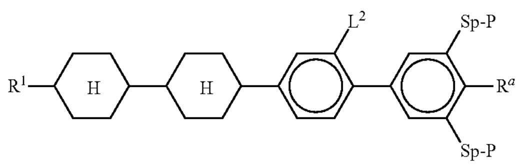
SA-77
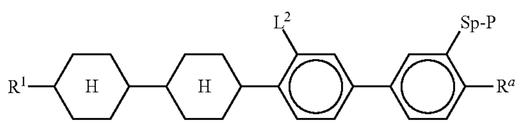
SA-78
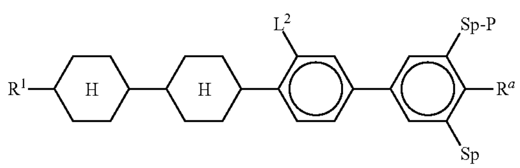
SA-79
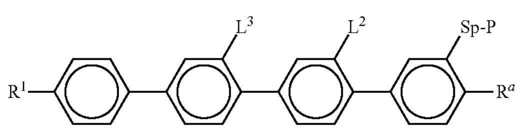
in which $R^1$, $L^1$, $L^2$, Sp, P and $R^a$ have the meanings as given above, and $L^3$ is defined as $L^2$.
The mixtures according to the invention very particularly preferably contain at least one self-alignment additive selected from the following group of compounds of the sub-formulae of formula SA:
SA-1a
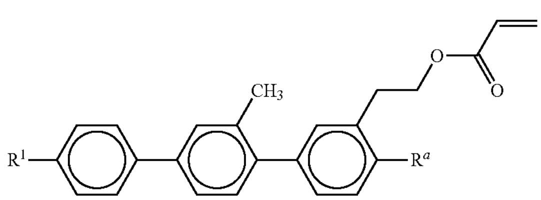
-continued
SA-1b
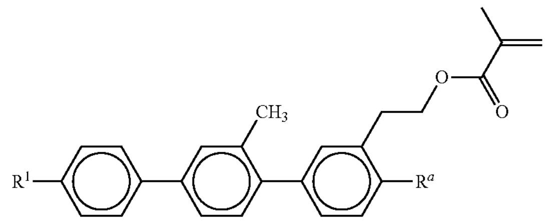
SA-1c
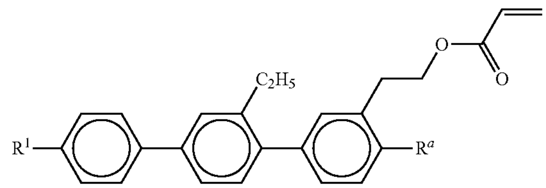
SA-1d
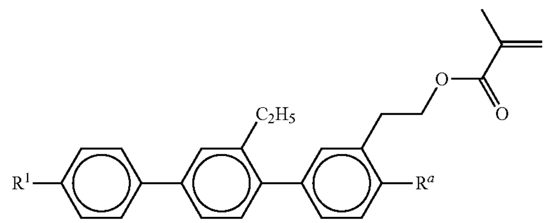
SA-1e
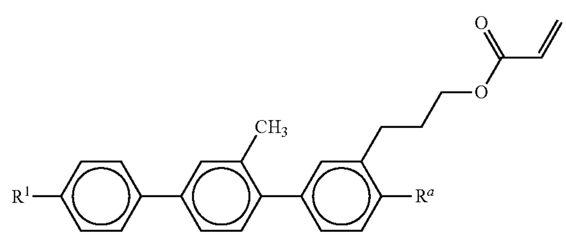
SA-1f
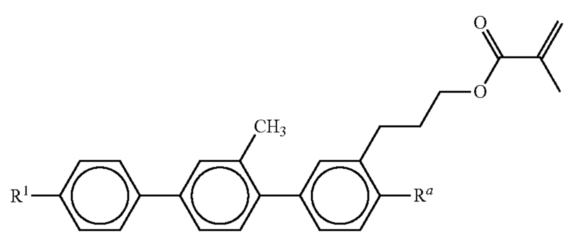
SA-1g
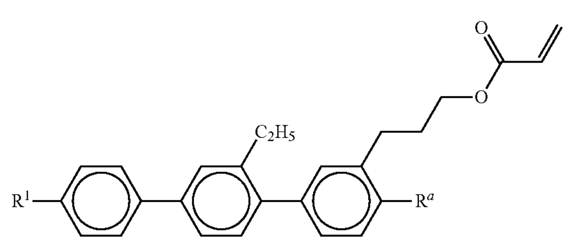

-continued
SA-1h
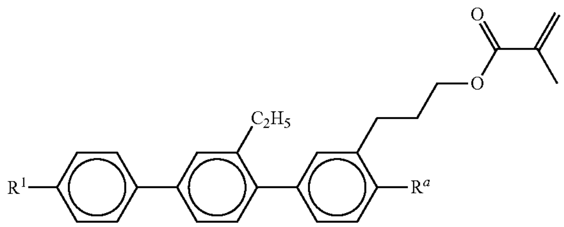
SA-8a
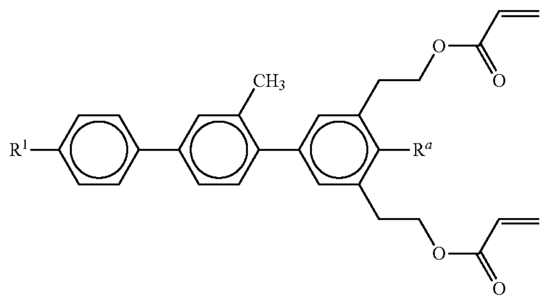
SA-8b
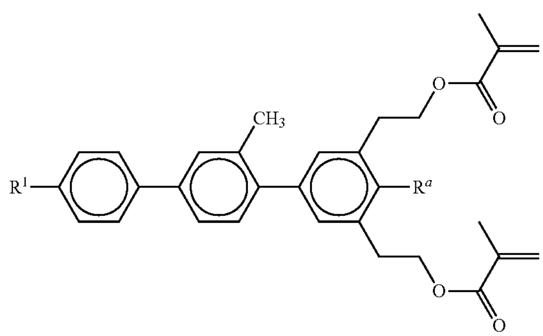
SA-8c
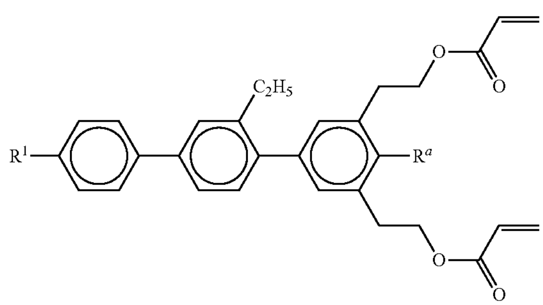
SA-8d
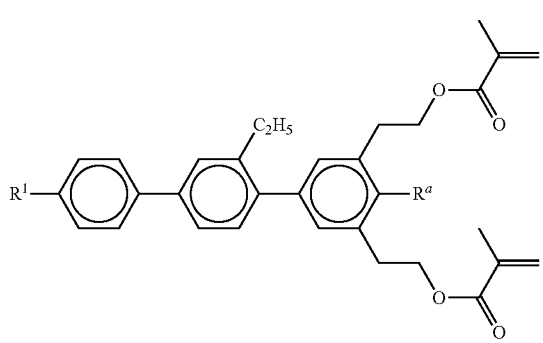
-continued
SA-8e
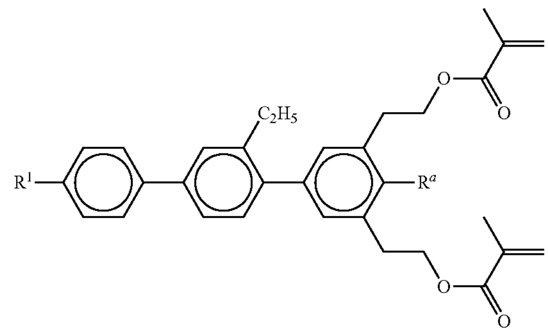
SA-8f
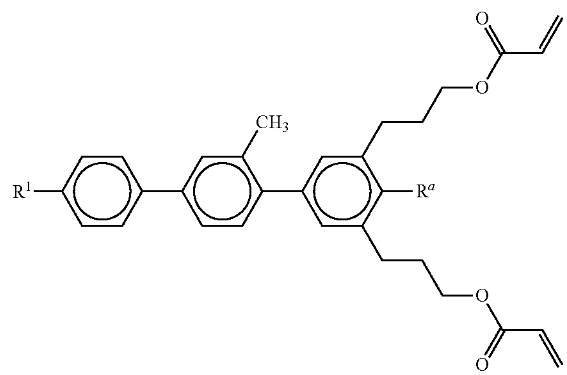
SA-8g
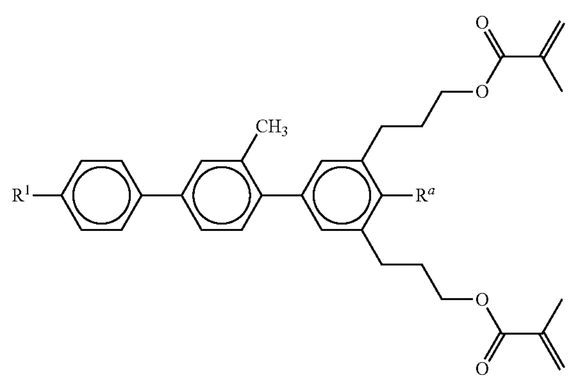
SA-8h
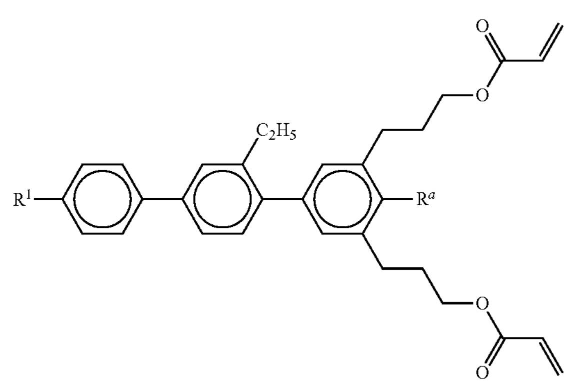

-continued
SA-8i
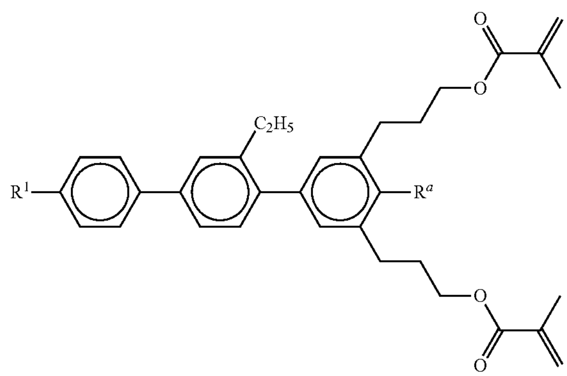
SA-10a
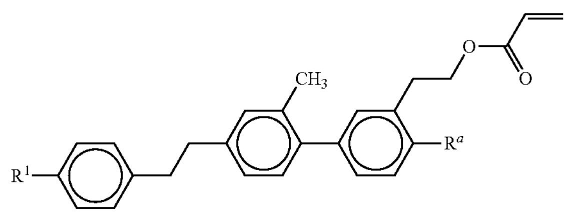
SA-10b
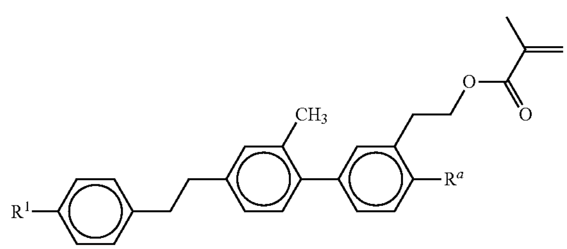
SA-10c
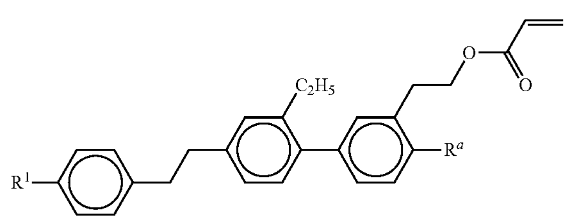
SA-10d
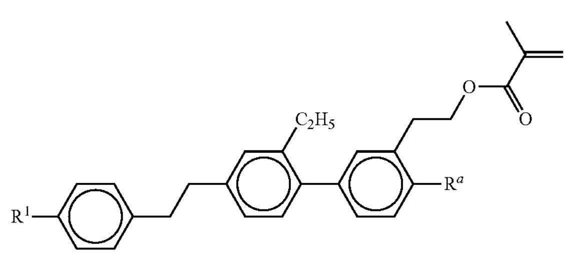
-continued
SA-10e
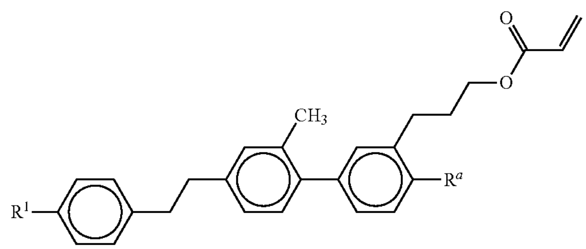
SA-10f
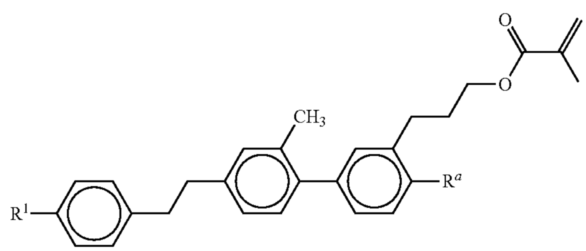
SA-10g
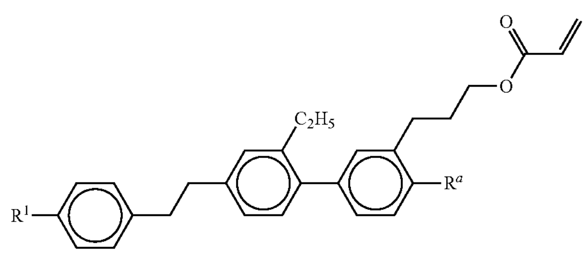
SA-10h
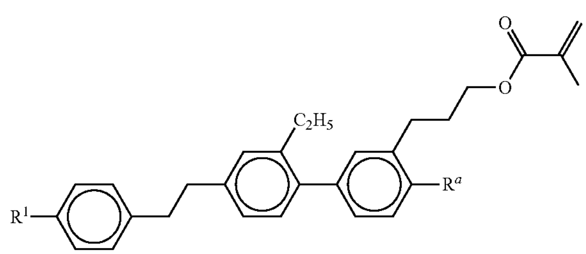
SA-16a
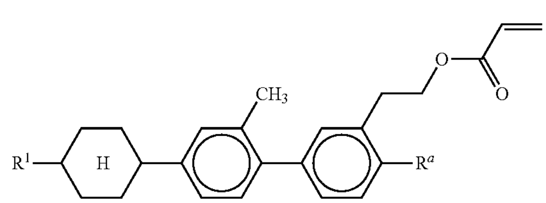
SA-16b
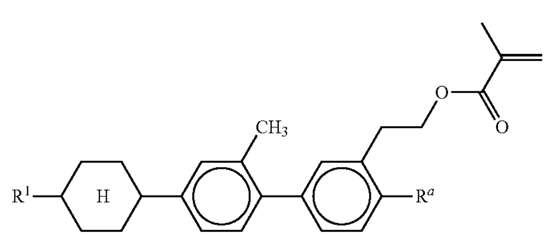

SA-16c
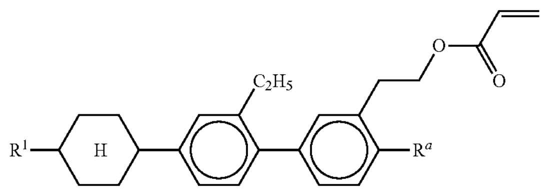
SA-16d
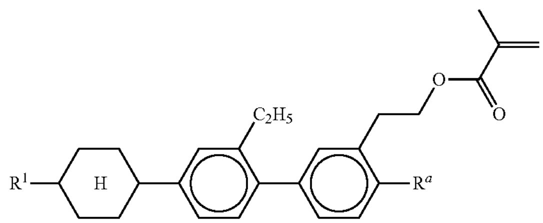
SA-16e
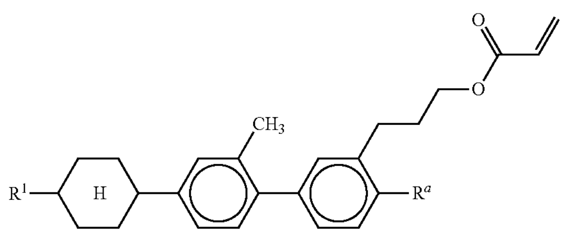
SA-16f
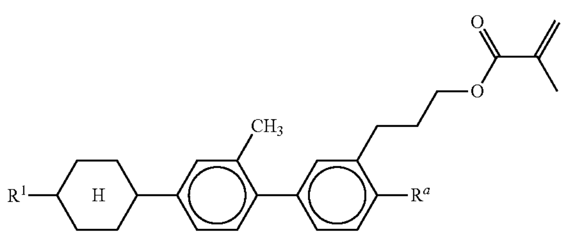
SA-16g
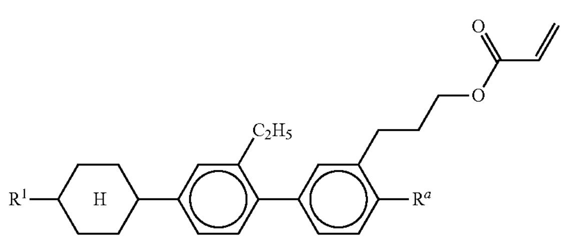
SA-16h
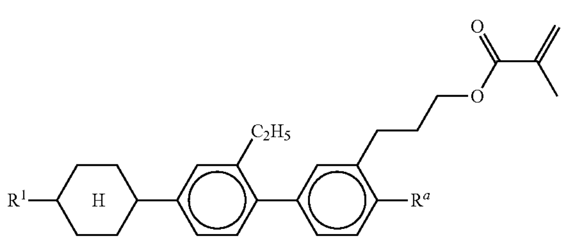
SA-23a
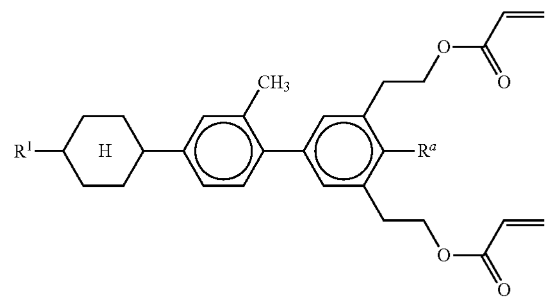
SA-23b
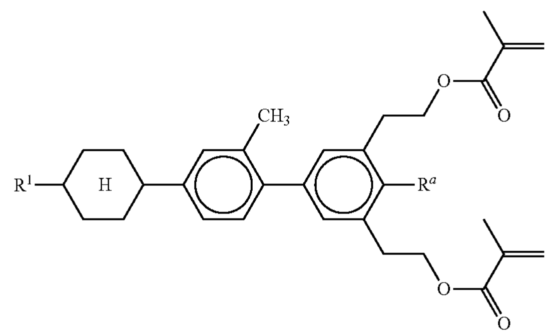
SA-23c
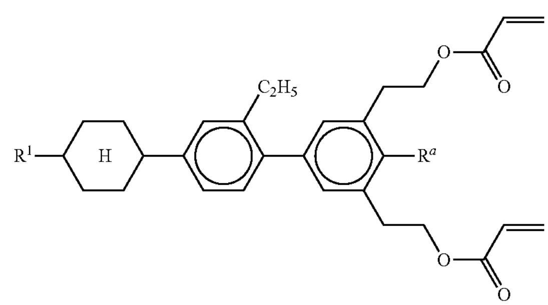
SA-23d
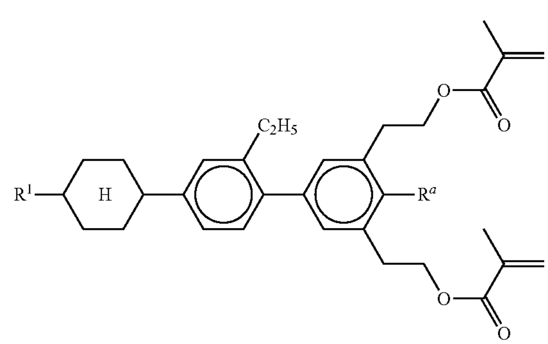

SA-23e
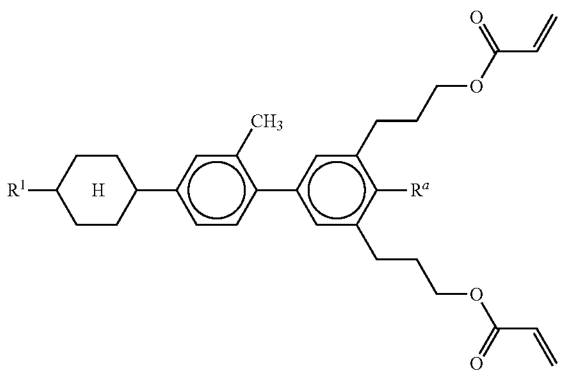
SA-23f
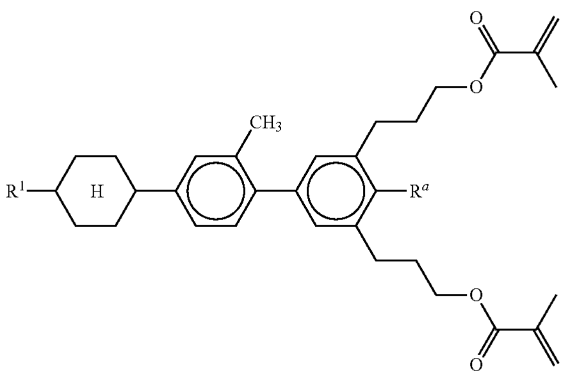
SA-23g
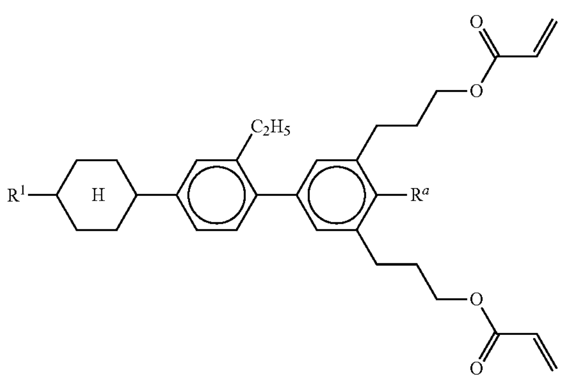
SA-23h
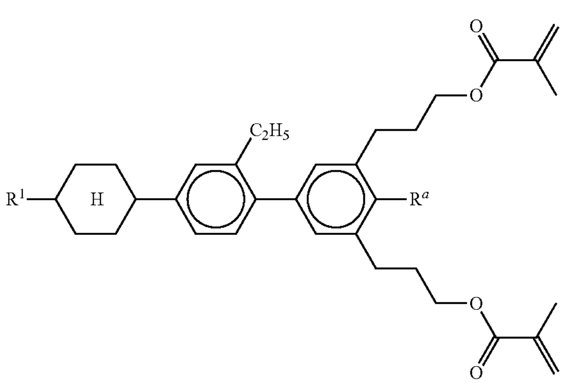
SA-62a
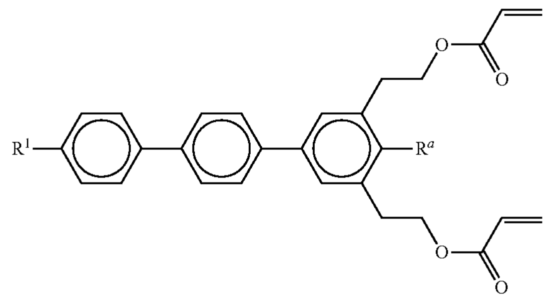
SA-62b
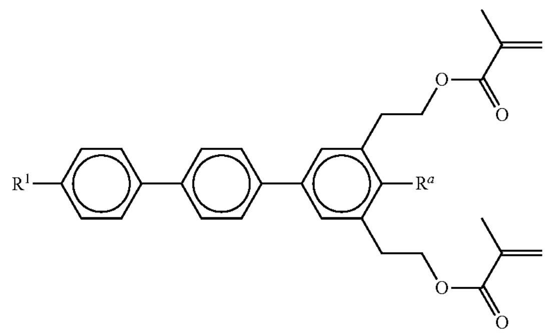
SA-62c
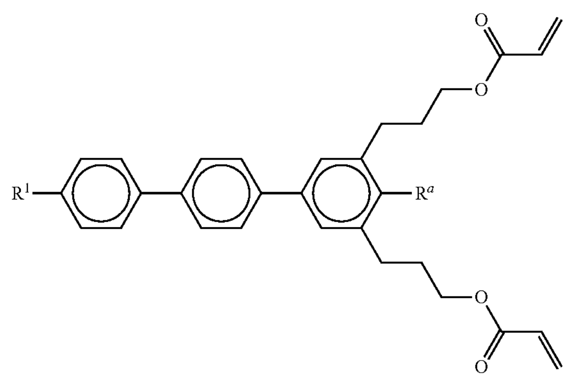
SA-62d
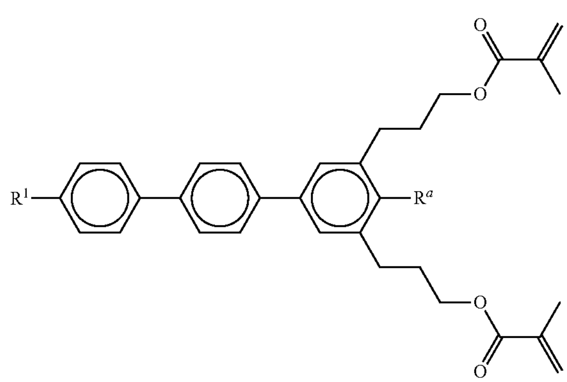
SA-67a
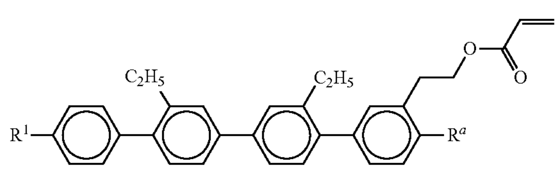

-continued
SA-67b
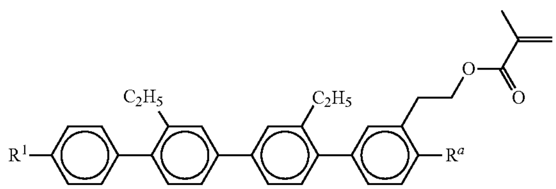
SA-67c
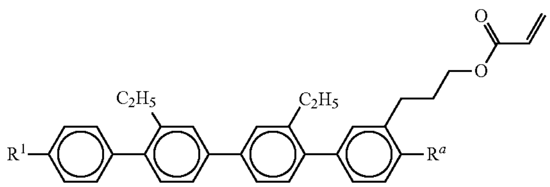
SA-67d
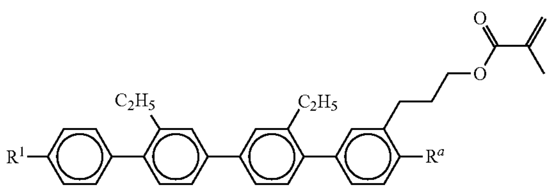
SA-68a
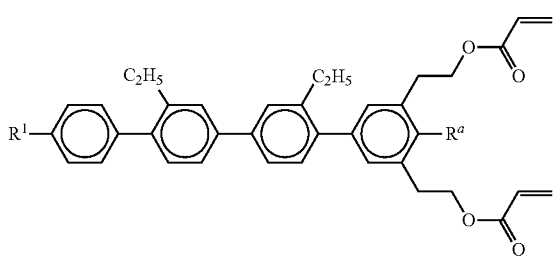
SA-68b
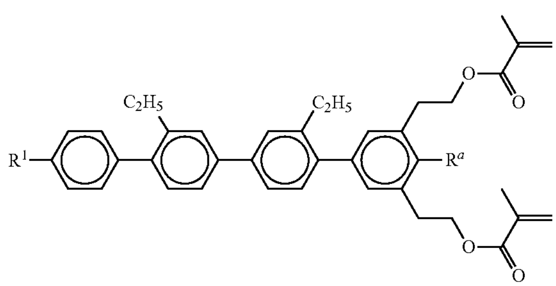
SA-68c
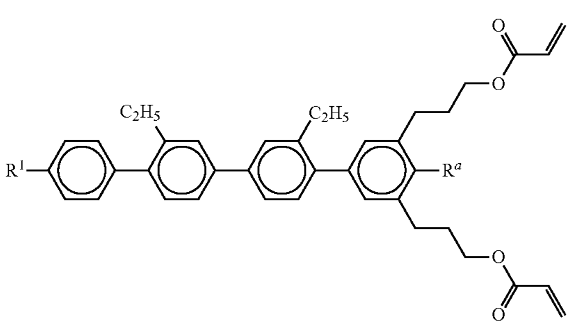
-continued
SA-68d
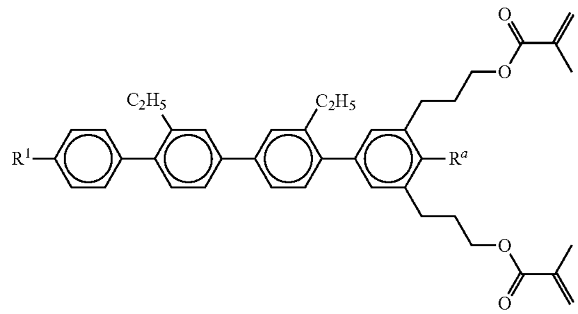
SA-69a
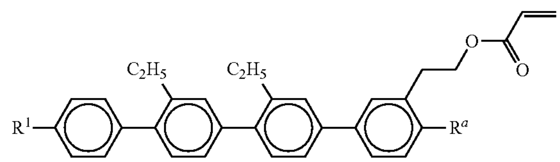
SA-69b
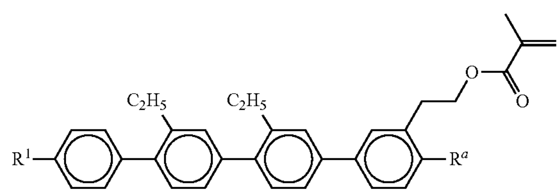
SA-69c
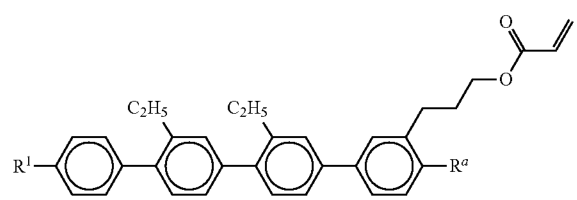
SA-69d
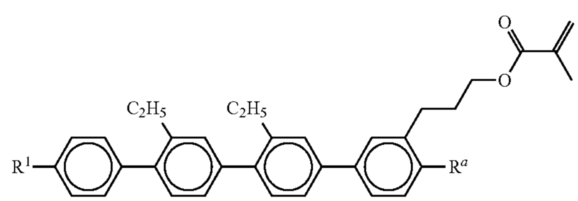
SA-70a
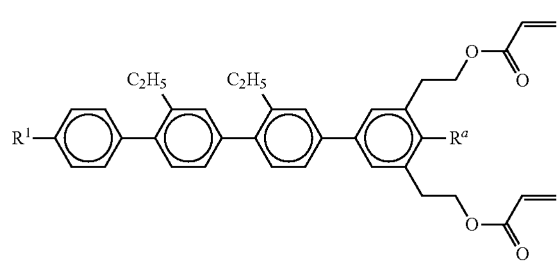

-continued
SA-70b
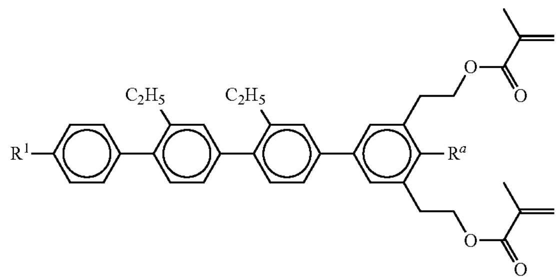
SA-70c
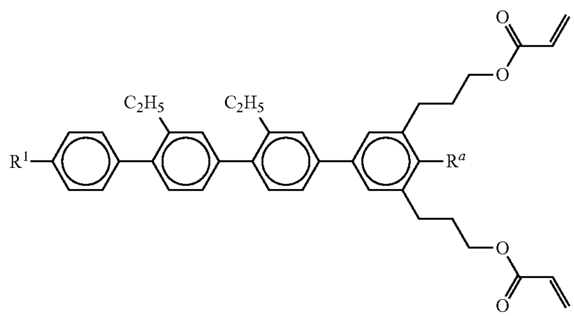
SA-70d
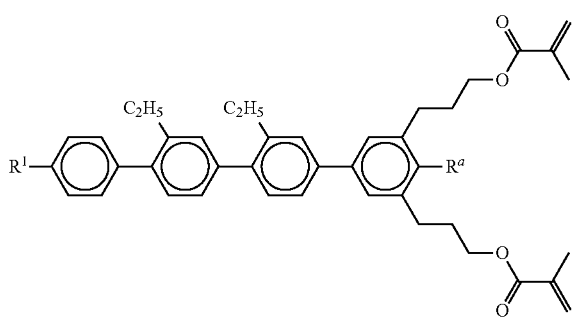
SA-71a
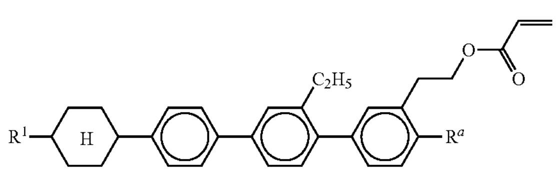
SA-71b
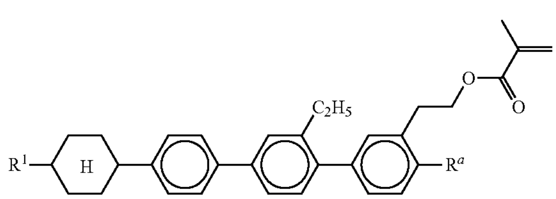
SA-71c
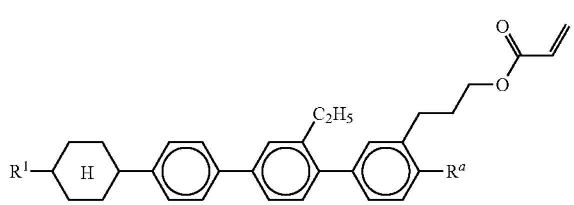
-continued
SA-71d
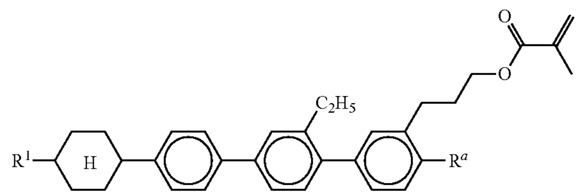
SA-72a
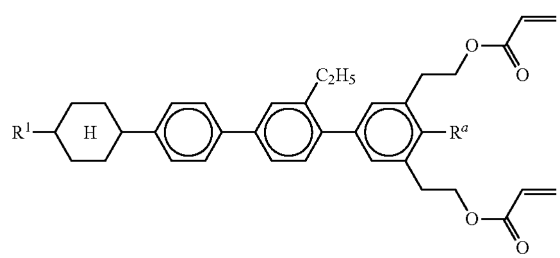
SA-72b
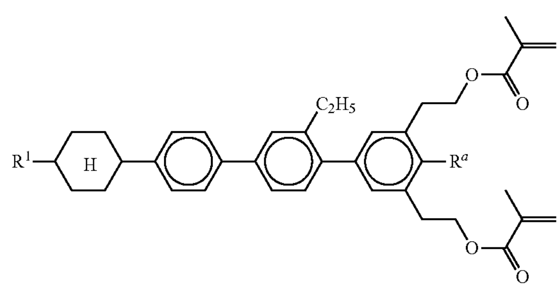
SA-72c
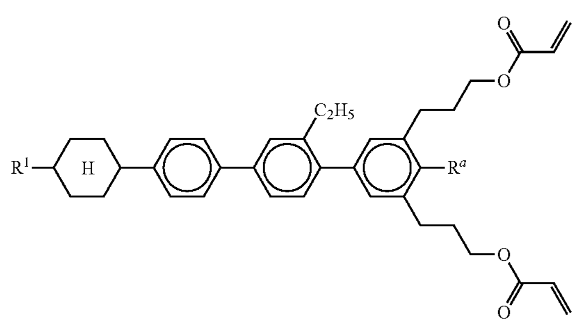
SA-72d
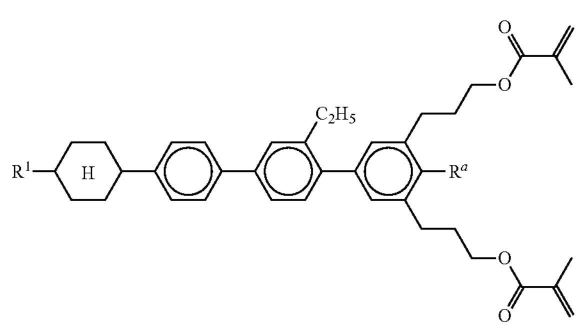

-continued

SA-76a

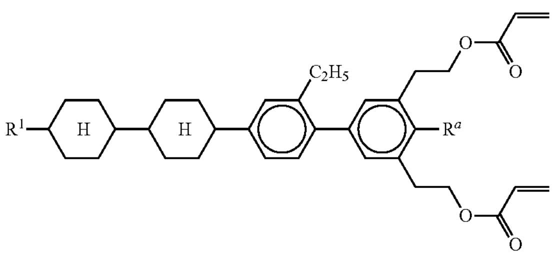

SA-76b

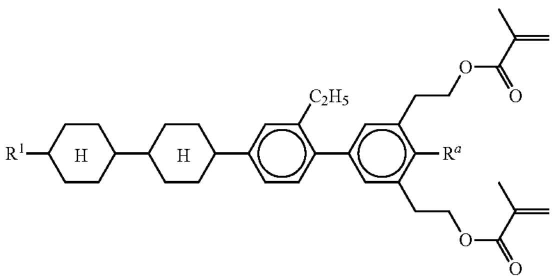

SA-76c

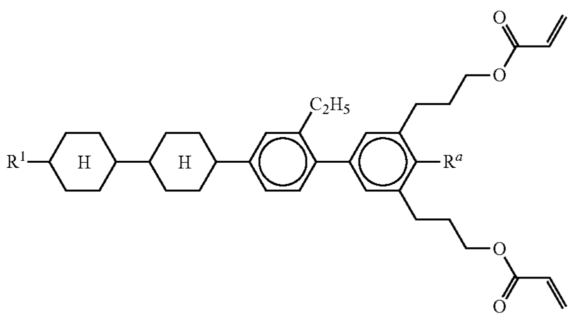

SA-76d

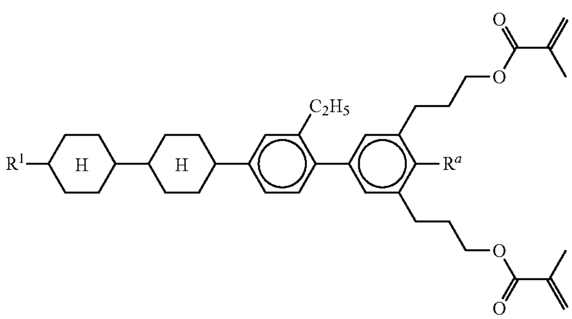

in which $R^a$ denotes an anchor group as described above and below, one of its preferred meanings, or preferably a group of formula

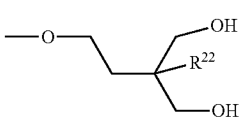

wherein $R^{22}$ is H, methyl, ethyl, n-propyl, i-propyl, n-butyl, tert-butyl, $CH_2CH_2$-tert-butyl or n-pentyl, most preferably H, and $R^1$ has the meanings given in formula SAa above, preferably denotes a straight-chain alkyl radical having 1 to 8 carbon atoms, preferably $C_2H_5$, n-$C_3H_7$, n-$C_4H_9$, n-$C_5H_{11}$, n-$C_6H_{13}$ or n-$C_7H_{15}$, most preferably n-$C_5H_{11}$.

Preferred LC mixtures according to the present invention contain at least one compound of the formula SA or its preferred formulae.

The self-alignment additives of the formula SA are preferably employed in the liquid-crystalline medium in amounts of ≥0.01% by weight, preferably 0.1-5% by weight, based on the mixture as a whole. Particular preference is given to liquid-crystalline media which contain 0.1-5%, preferably 0.2-3%, by weight of one or more self-alignment additives, based on the total mixture.

The use of preferably 0.2 to 3% by weight of one or more compounds of the formula SA results in a complete homeotropic alignment of the LC layer for conventional LC thickness (3 to 4 μm) and for the substrate materials used in display industry. Special surface treatment may allow to significantly reduce the amount of the compound(s) of the formula SA to amounts in the lower range.

The preferred mixtures contain:

at least one self-alignment additive selected from the compounds of the formulae SA-1c or SA-8i SA-1c

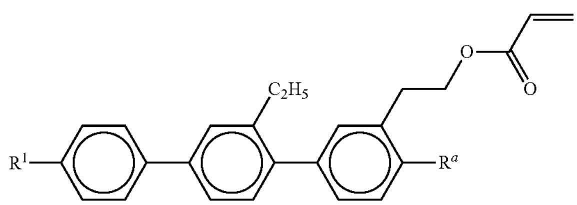

SA-8i

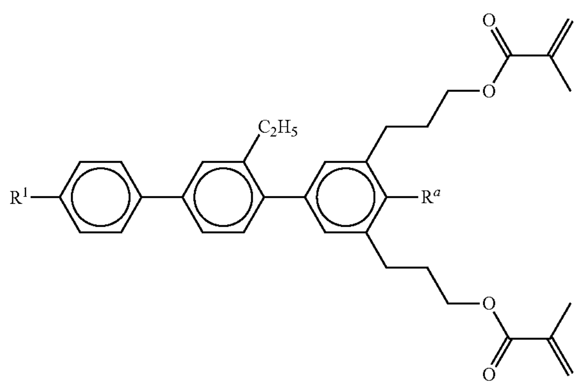

preferably in amounts of 0.1-5 wt. %, in particular 0.2-2 wt. %.

Preferably, the media according to the invention, comprise a stabilizer selected from the group of compounds of the formulae ST-1 to ST-18.

ST-1
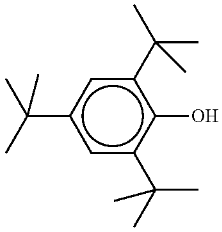
ST-2
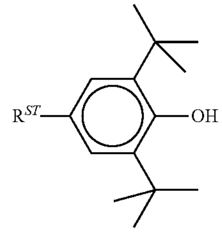
ST-3
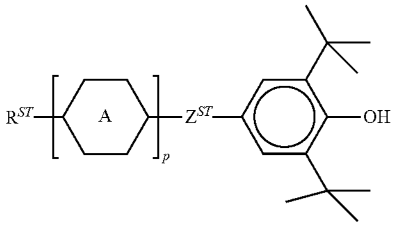
ST-4
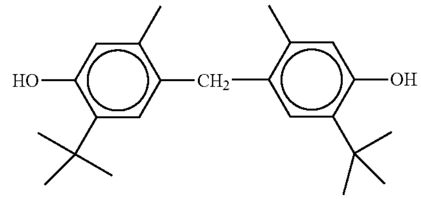
ST-5
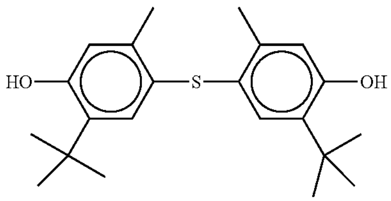
ST-6
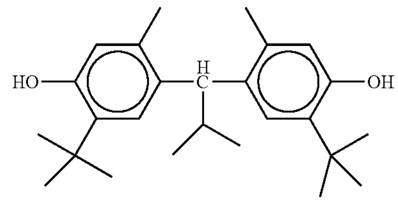
ST-7
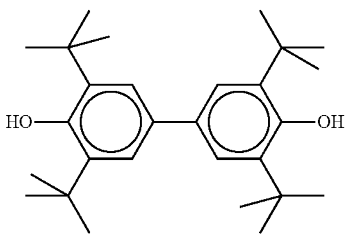
ST-8
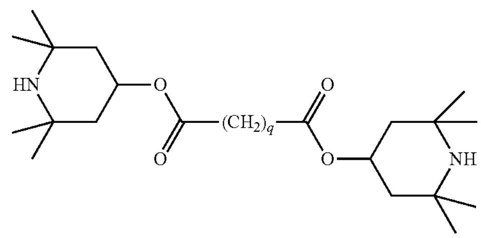
ST-9
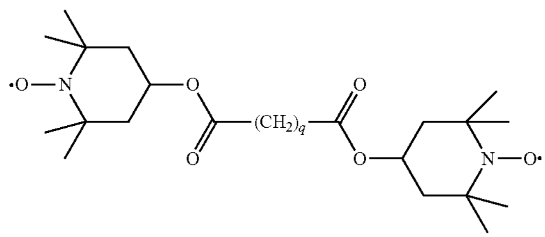
ST-10
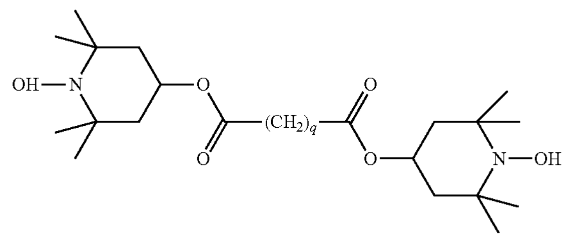
ST-11
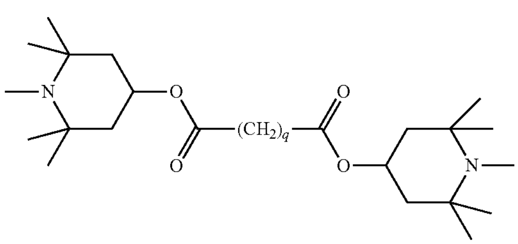
ST-12
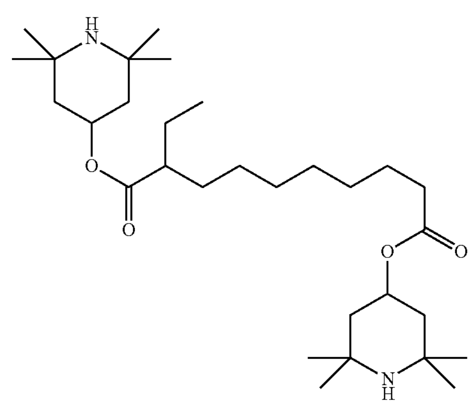

-continued
ST-13
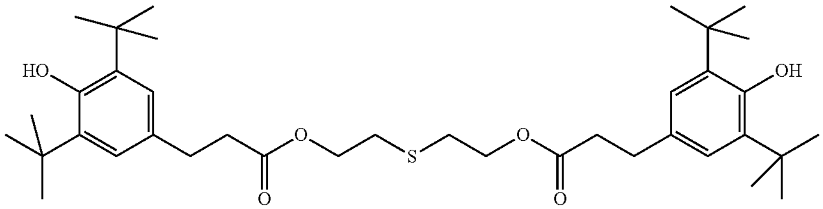
ST-14
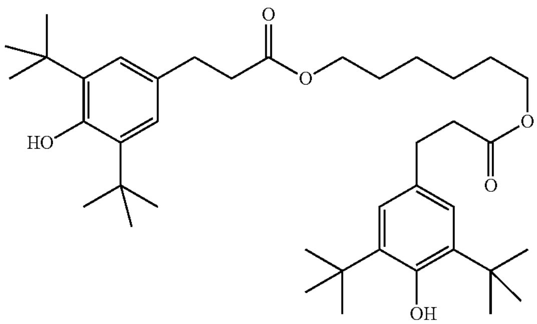
ST-15
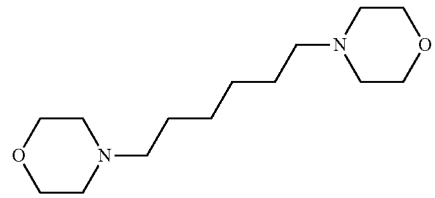
ST-16
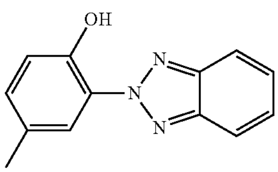
ST-17
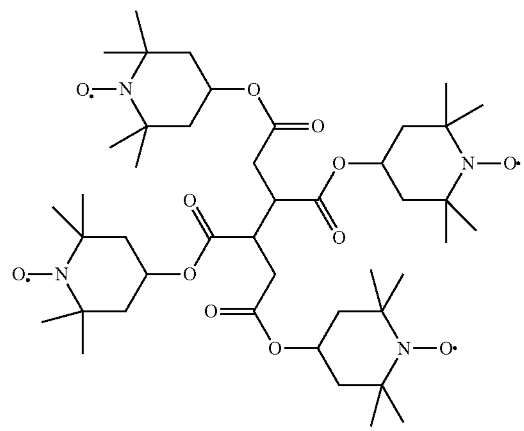
ST-18
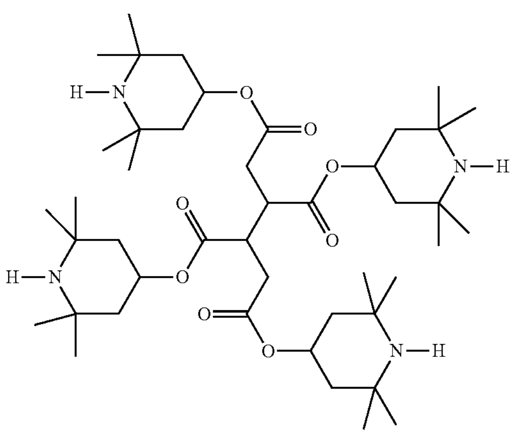
in which
$R^{ST}$ denotes H, an alkyl or alkoxy radical having 1 to 15 C atoms, where, in addition, one or more $CH_2$ groups in these radicals may each be replaced, independently of one another, by —C≡C—, —$CF_2O$—, —$OCF_2$—, —CH═CH—,
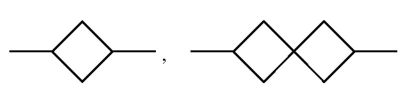

—O—, —CO—O—, or —O—CO— in such a way that O atoms are not linked directly to one another, and in which, in addition, one or more H atoms may each be replaced by halogen,
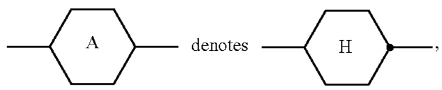
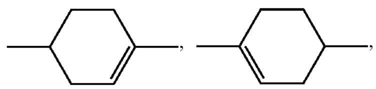
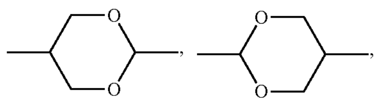
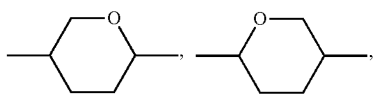
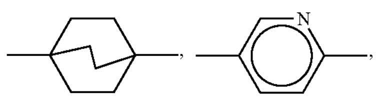
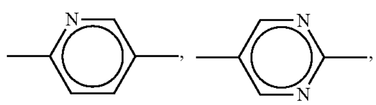
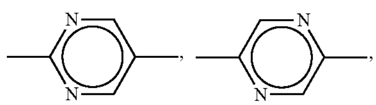
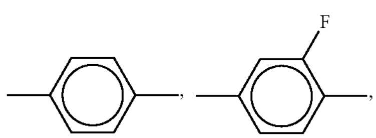
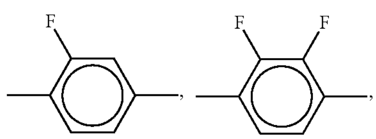
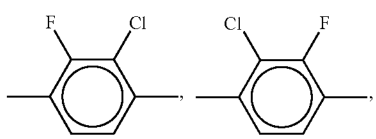
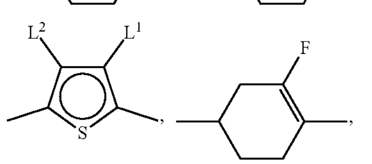
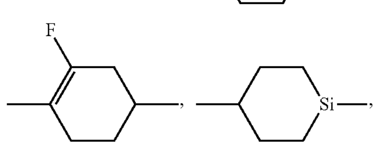
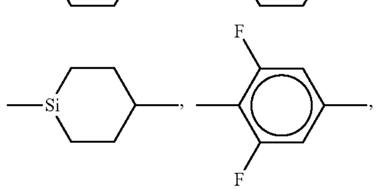
-continued
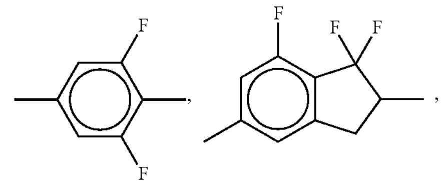
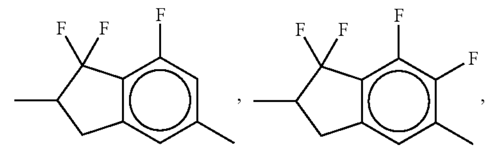
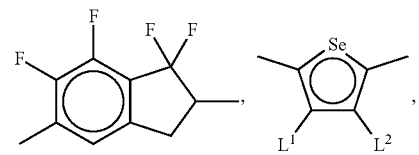
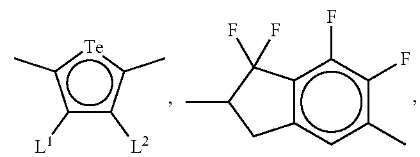
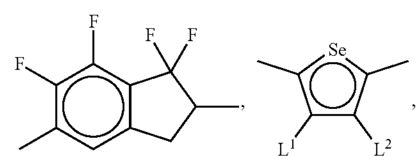
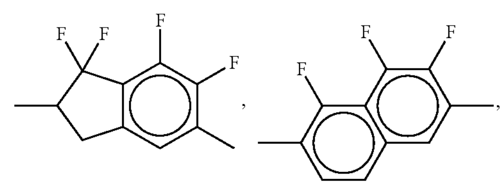
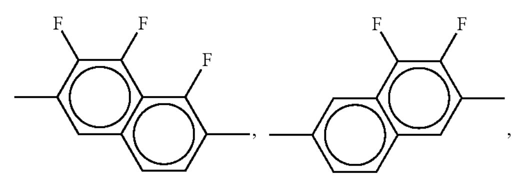
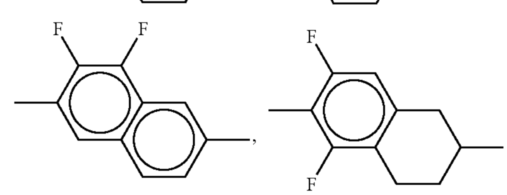
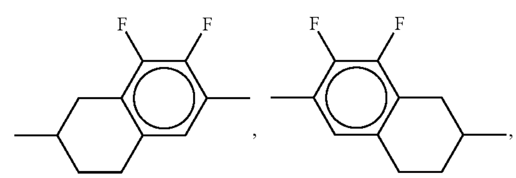
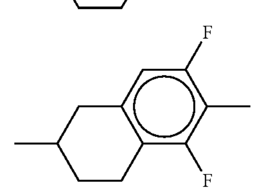

-continued

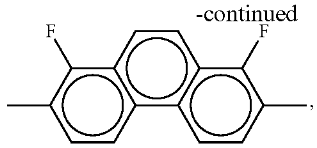

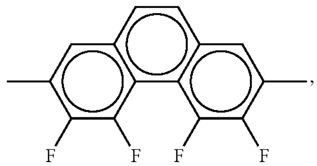

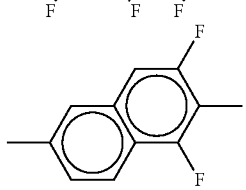

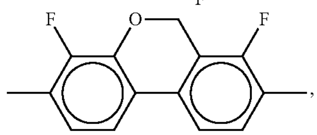

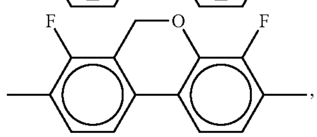

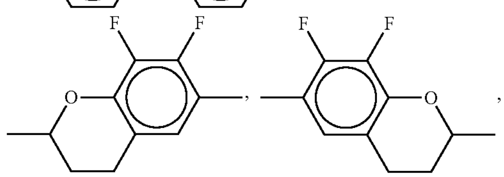

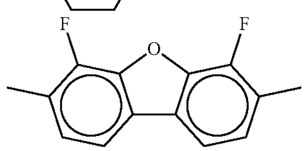

$Z^{ST}$ each, independently of one another, denote —CO—O—, —O—CO—, —$CF_2O$—, —$OCF_2$—, —$CH_2O$—, —$OCH_2$—, —$CH_2$, —$CH_2CH_2$—, —$(CH_2)_4$—, —CH═CH—$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, $L^1$ and $L^2$ each, independently of one another, denote F, Cl, $CF_3$ or $CHF_2$, p denotes 1 or 2, q denotes 1, 2, 3, 4, 5, 6, 7, 8, 9 or 10.

Of the compounds of the ST-1 to ST-18, special preference is given to the compounds of the formulae

ST-1

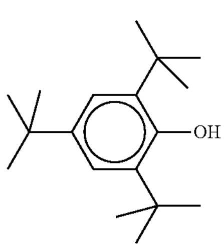

-continued

ST-2a

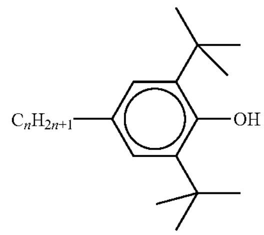

where n=1, 2, 3, 4, 5, 6 or 7, preferably n=1 or 7

ST-3a

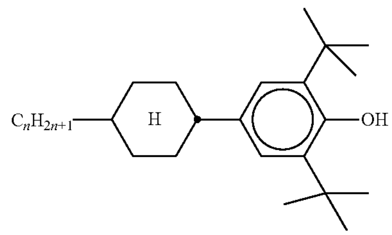

where n=1, 2, 3, 4, 5, 6 or 7, preferably n=3

ST-3b

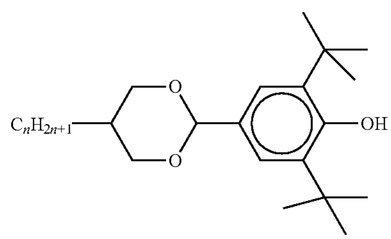

where n=1, 2, 3, 4, 5, 6 or 7, preferably n=3

ST-8-1

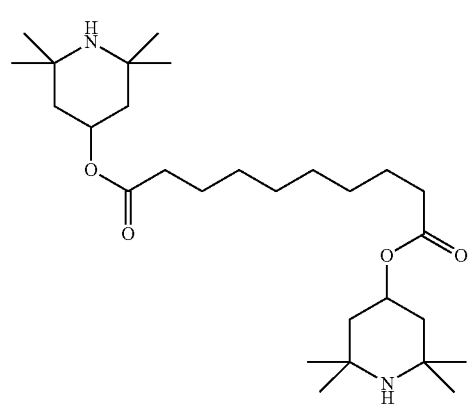

-continued
ST-9-1
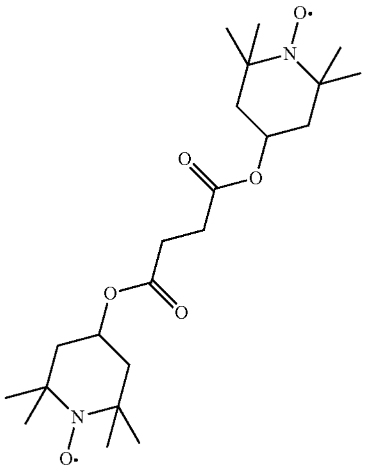
ST-12
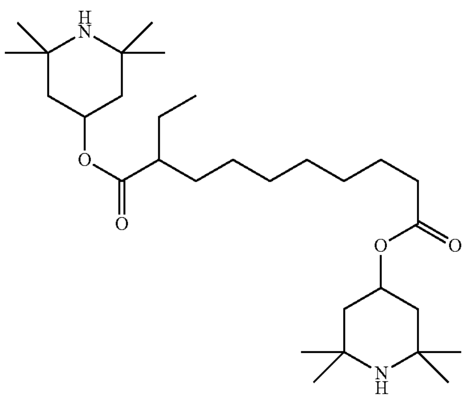
ST-16
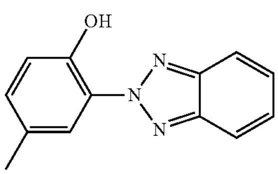
ST-17
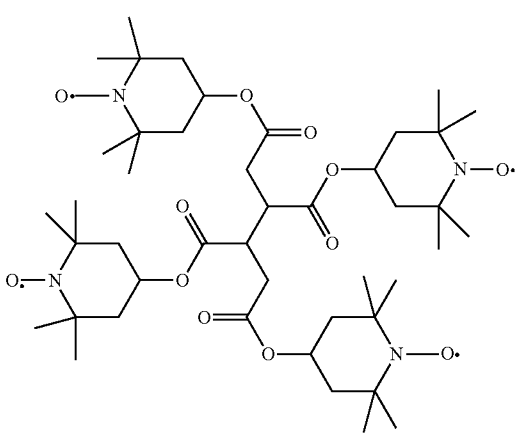
-continued
ST-18
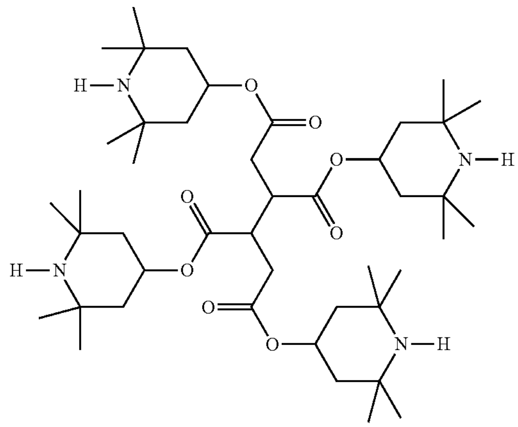
In the compounds of the formulae ST-3a and ST-3b, n preferably denotes 3. In the compounds of the formula ST-2a, n preferably denotes 7.
Very particularly preferred mixtures according to the invention comprise one or more stabilizers from the group of the compounds of the formulae ST-2a-1, ST-3a-1, ST-3b-1, ST-8-1, ST-9-1 and ST-12:
ST-2a-1
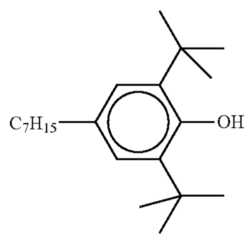
ST-3a-1
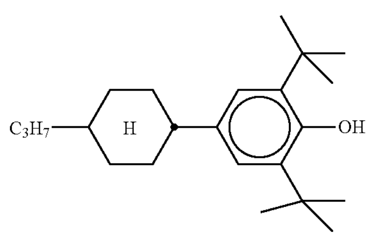
ST-3b-1
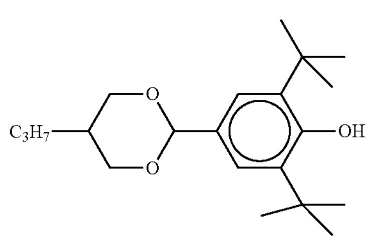

-continued

ST-8-1

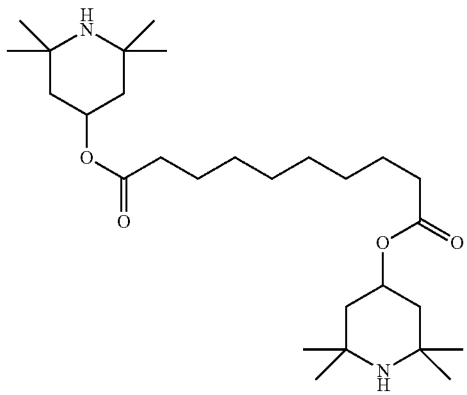

ST-9-1

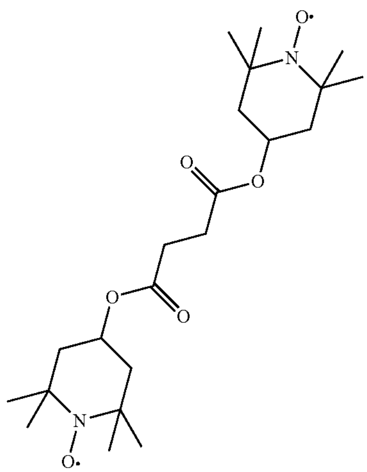

ST-12

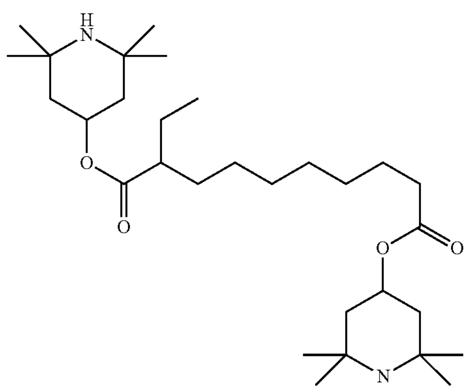

The compounds of the formulae ST-1 to ST-18 are preferably each present in the liquid-crystal mixtures according to the invention in amounts of 0.005-0.5%, based on the mixture.

If the mixtures according to the invention comprise two or more compounds from the group of the compounds of the formulae ST-1 to ST-18, the concentration correspondingly increases to 0.01-1% in the case of two compounds, based on the mixtures.

However, the total proportion of the compounds of the formulae ST-1 to ST-18, based on the mixture according to the invention, should not exceed 2%.

The LC medium contains an LC component H), or LC host mixture, based on compounds with negative dielectric anisotropy. Such LC media are especially suitable for use in PS-VA and PVA displays. Particularly preferred embodiments of such an LC medium are those of sections a)-hh) below, where the acronyms used are explained in Table A below.

a) LC medium where the one or more compounds selected from formulae CY and PY according to claim 1 are preferably selected from the group consisting of the following sub-formulae:

CY1

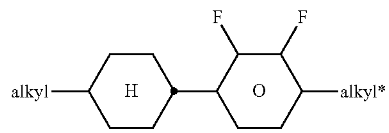

CY2

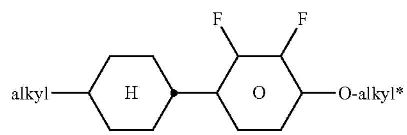

CY3

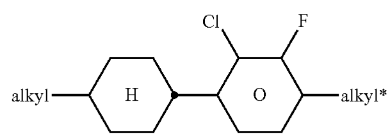

CY4

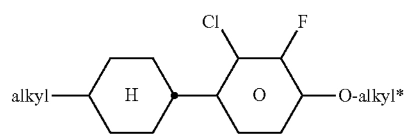

CY5

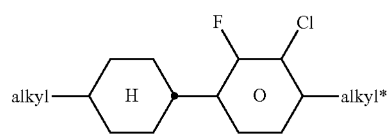

CY6

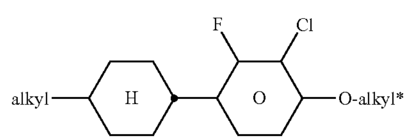

CY7

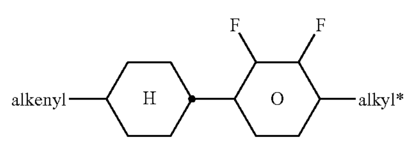

CY8

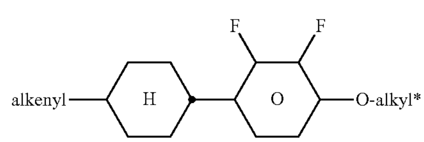

CY9

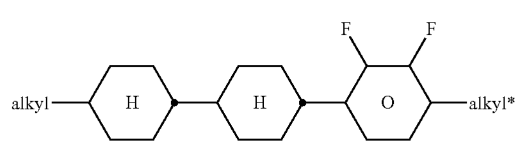

-continued
CY10
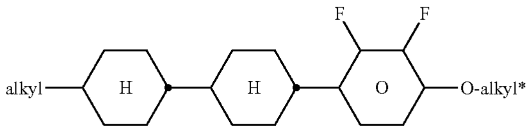
CY11
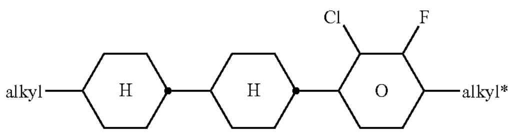
CY12
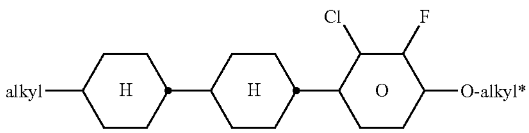
CY13
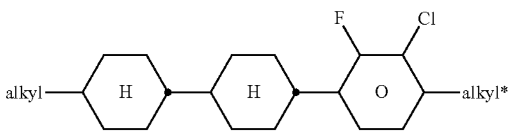
CY14
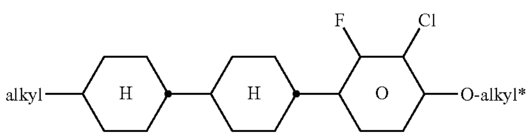
CY15
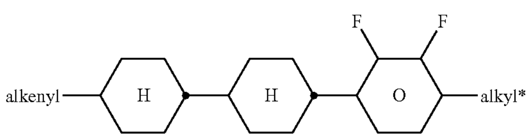
CY16
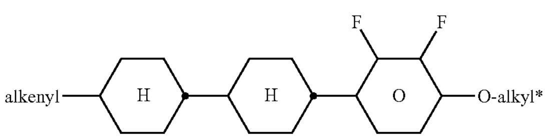
CY17
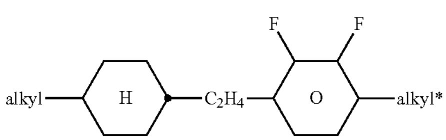
CY18
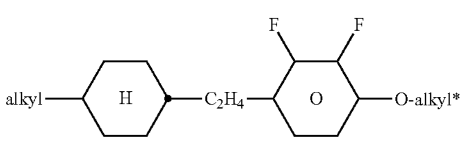
CY19
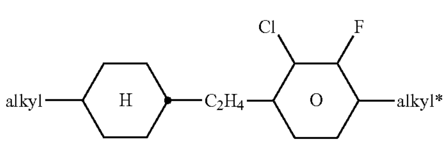
-continued
CY20
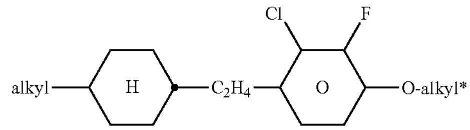
CY21
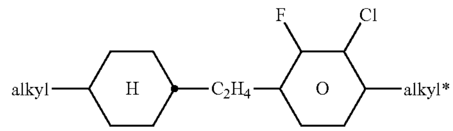
CY22
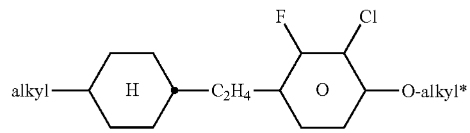
CY23
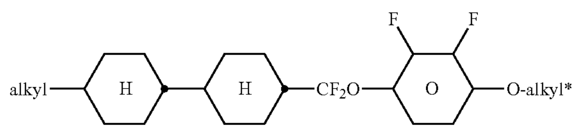
CY24
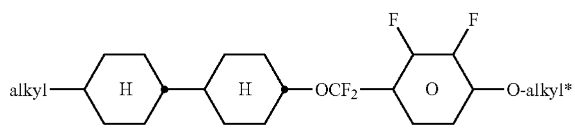
CY25
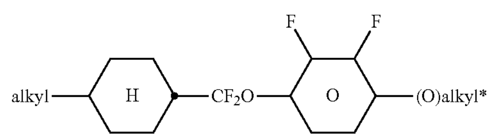
CY26
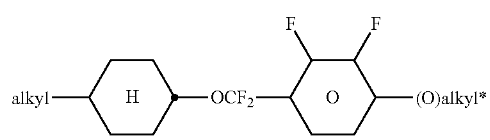
CY27
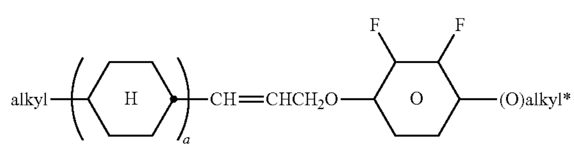
CY28
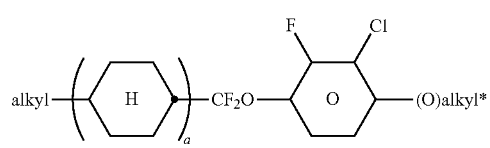
CY29
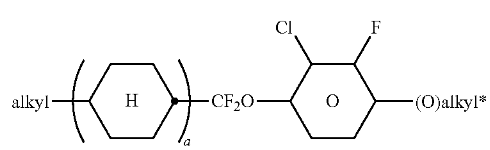

-continued

CY30

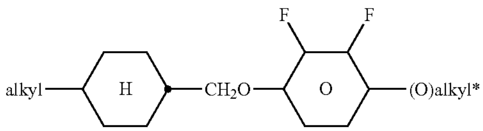

CY31

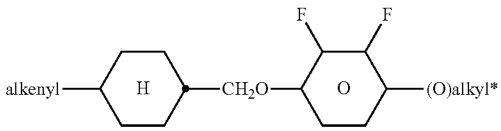

CY32

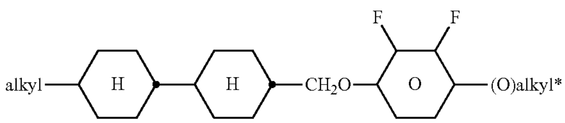

CY33

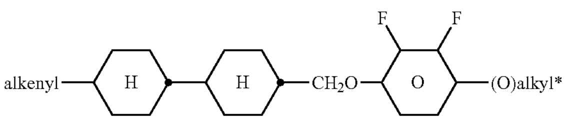

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (0) denotes an oxygen atom or a single bond. Alkenyl preferably denotes $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

The compounds of the formula PY are preferably selected from the group consisting of the following sub-formulae:

PY1

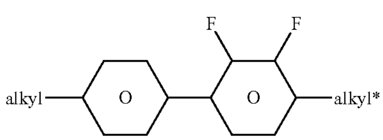

PY2

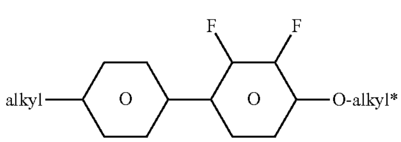

PY3

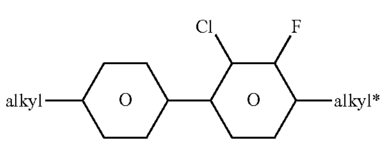

PY4

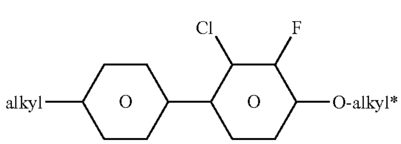

-continued

PY5

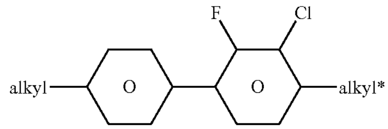

PY6

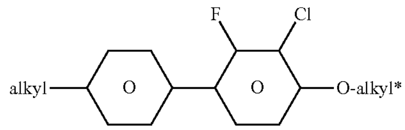

PY7

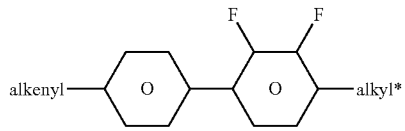

PY8

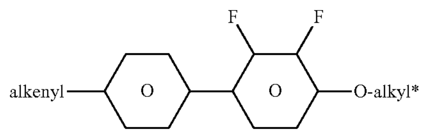

PY9

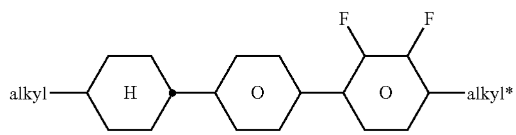

PY10

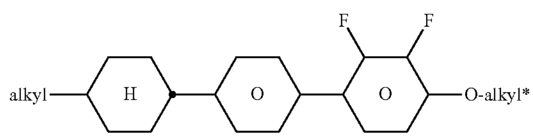

PY11

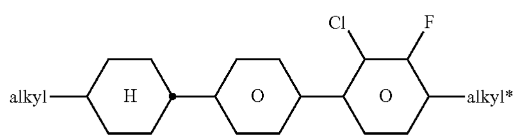

PY12

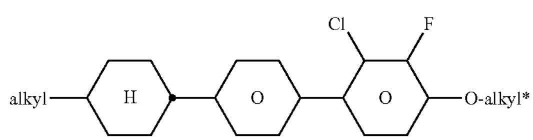

PY13

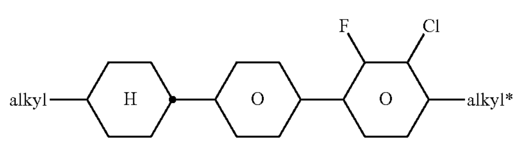

PY14

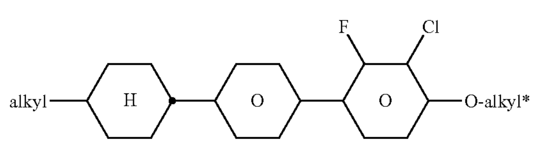

-continued

PY15

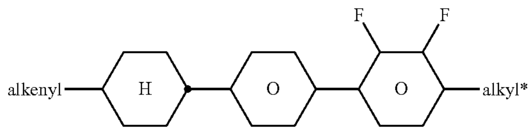

PY16

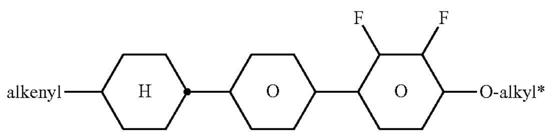

PY17

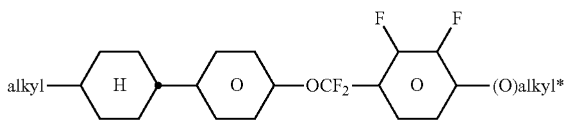

PY18

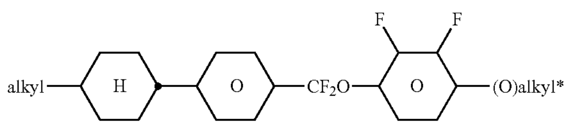

in which alkyl and alkyl* each, independently of one another, denote a straight-chain alkyl radical having 1-6 C atoms, and alkenyl denotes a straight-chain alkenyl radical having 2-6 C atoms, and (0) denotes an oxygen atom or a single bond. Alkenyl preferably denotes $CH_2{=}CH$—, $CH_2{=}CHCH_2CH_2$—, $CH_3$—$CH{=}CH$—, $CH_3$—$CH_2$—$CH{=}CH$—, $CH_3$—$(CH_2)_2$—$CH{=}CH$—, $CH_3$—$(CH_2)_3$—$CH{=}CH$— or $CH_3$—$CH{=}CH$—$(CH_2)_2$—.

b) LC medium wherein the component H) or LC host mixture comprises one or more mesogenic or LC compounds comprising an alkenyl group (hereinafter also referred to as "alkenyl compounds"), wherein said alkenyl group is stable to a polymerization reaction under the conditions used for polymerization of the polymerizable compounds contained in the LC medium.

Preferably the component H) or LC host mixture comprises one or more alkenyl compounds selected from formulae AN and AY

AN

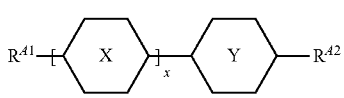

AY

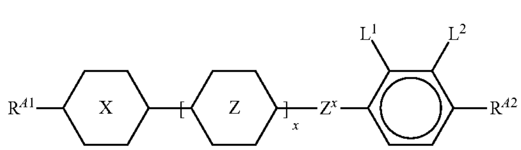

in which the individual radicals, on each occurrence identically or differently, and each, independently of one another, have the following meaning:

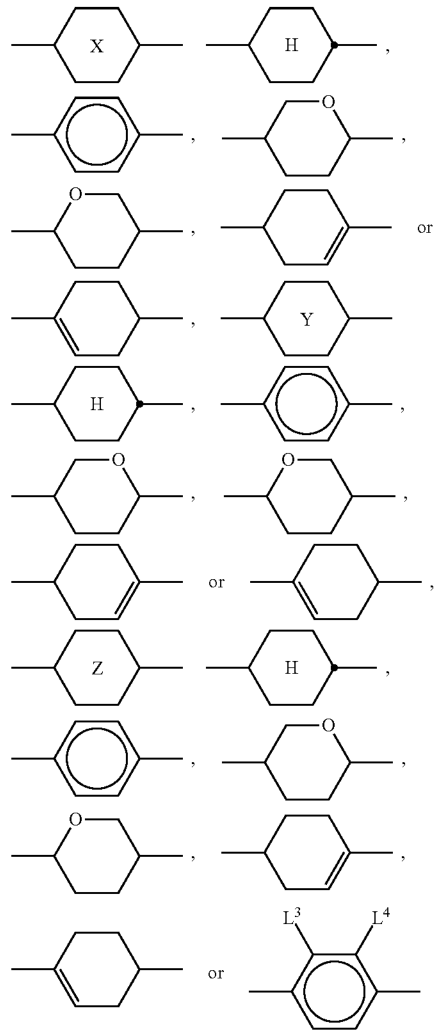

$R^{A1}$ alkenyl having 2 to 9 C atoms or, if at least one of the rings X, Y and Z denotes cyclohexenyl, also one of the meanings of $R^{A2}$, $R^{A2}$ alkyl having 1 to 12 C atoms, in which, in addition, one or two non-adjacent $CH_2$ groups may each be replaced by —O—, —CH═CH—, —CO—, —OCO— or —COO— in such a way that O atoms are not linked directly to one another, $Z^x$ —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$—, or a single bond, preferably a single bond, $L^{1,2}$ H, F, Cl, $OCF_3$, $CF_3$, $CH_3$, $CH_2F$ or $CHF_2H$, preferably H, F or Cl, x 1 or 2, z 0 or 1.

Preferred compounds of formula AN and AY are those wherein $R^{A2}$ is selected from ethenyl, propenyl, butenyl, pentenyl, hexenyl and heptenyl.

In a preferred embodiment the component H) or LC host mixture comprises one or more compounds of formula AN selected from the following sub-formulae:

AN1

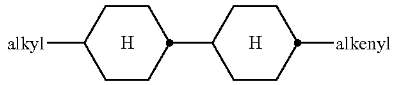

AN2

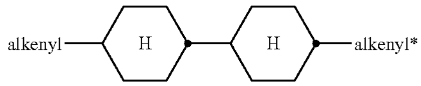

AN3

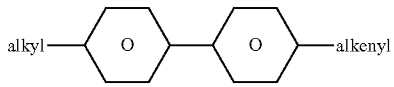

AN4

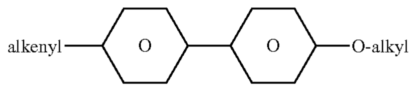

AN5

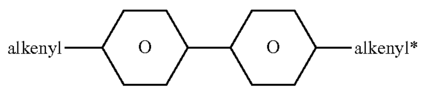

AN6

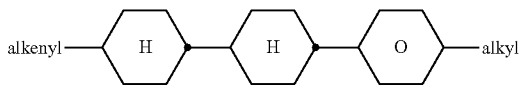

AN7

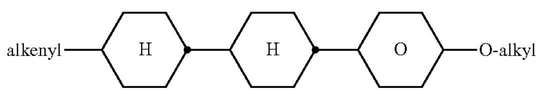

AN8

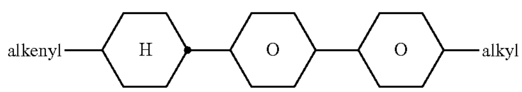

AN9

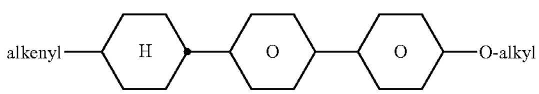

AN10

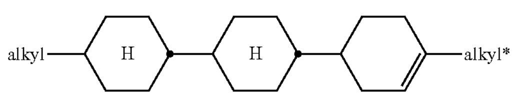

AN11

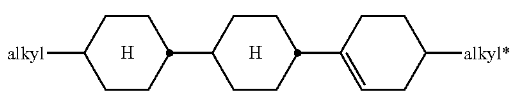

AN12

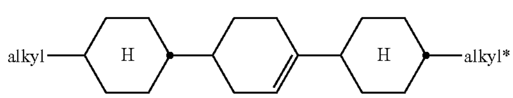

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Preferably the component H) or LC host mixture comprises one or more compounds selected from formulae AN1, AN2, AN3 and AN6, very preferably one or more compounds of formula AN1.

In another preferred embodiment the component H) or LC host mixture comprises one or more compounds of formula AN selected from the following sub-formulae:

AN1a

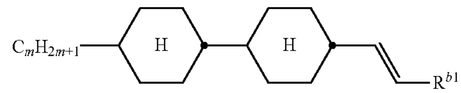

AN3a

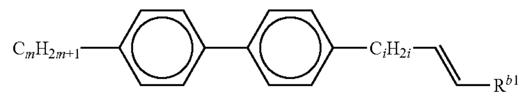

AN6a

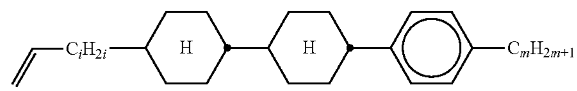

in which m denotes 1, 2, 3, 4, 5 or 6, i denotes 0, 1, 2 or 3, and $R^{b1}$ denotes H, $CH_3$ or $C_2H_5$.

In another preferred embodiment the component H) or LC host mixture comprises one or more compounds selected from the following sub-formulae:

AN1a1

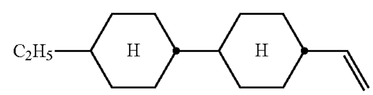

AN1a2

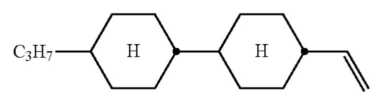

AN1a3

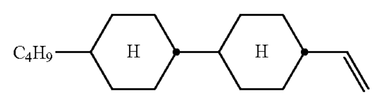

AN1a4

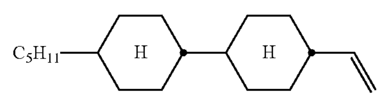

AN1a5

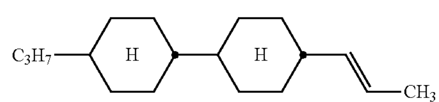

Most preferred are compounds of formula AN1a2 and AN1a5.

In another preferred embodiment the component H) or LC host mixture comprises one or more compounds of formula AY selected from the following sub-formulae:

AY1

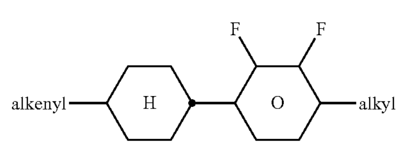

-continued
AY2
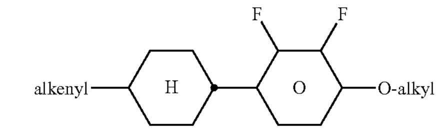
AY3
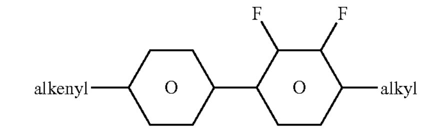
AY4
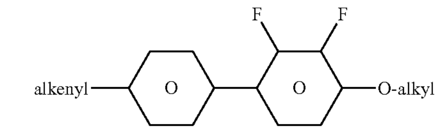
AY5
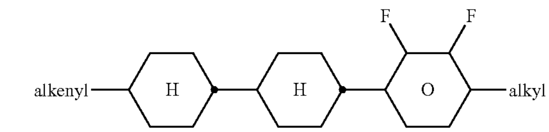
AY6
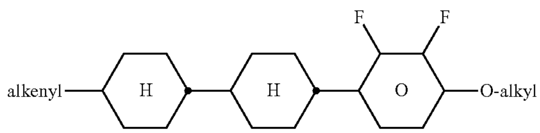
AY7
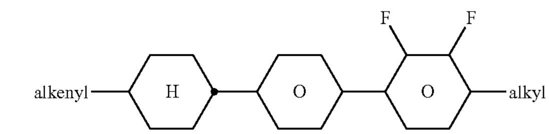
AY8
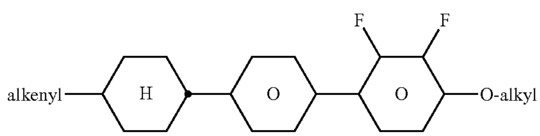
AY9
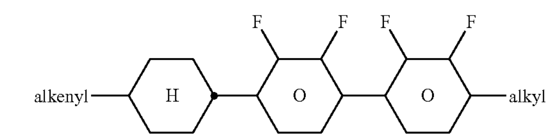
AY10
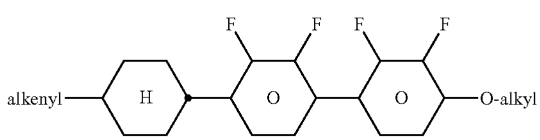
AY11
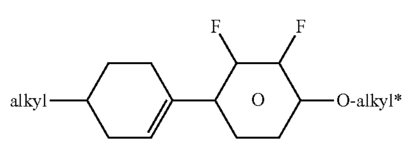
-continued
AY12
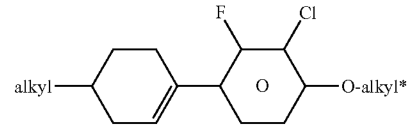
AY13
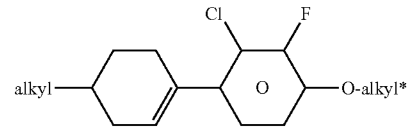
AY14
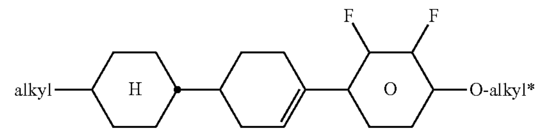
AY15
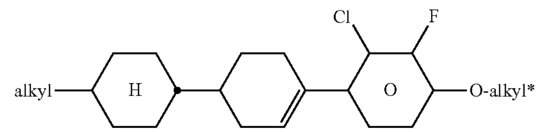
AY16
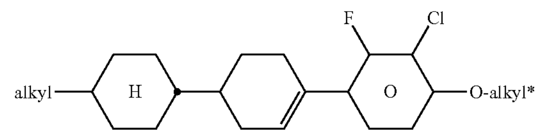
AY17
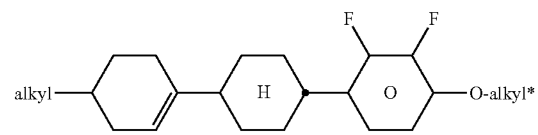
AY18
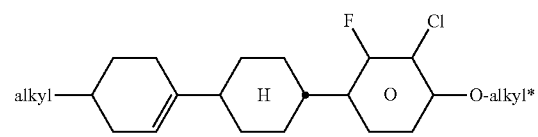
AY19
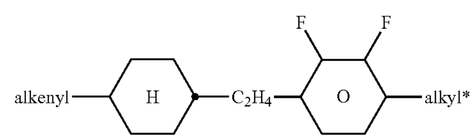
AY20
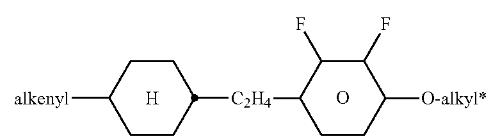
AY21
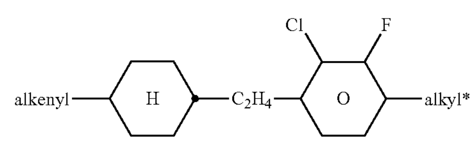

-continued

AY22

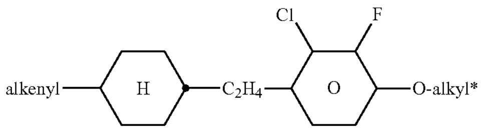

AY23

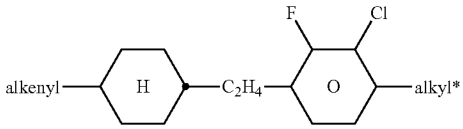

AY24

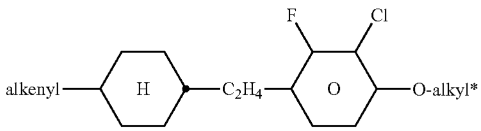

AY25

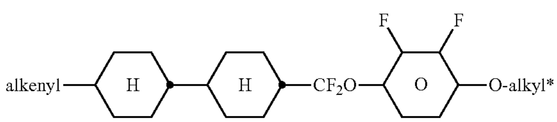

AY26

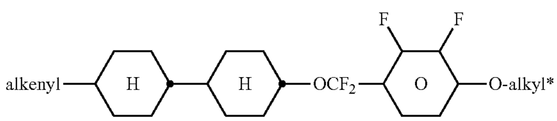

AY27

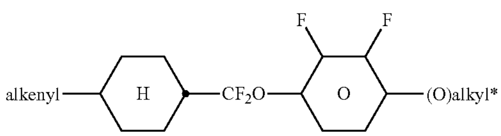

AY28

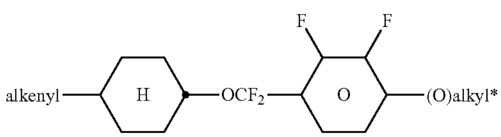

AY29

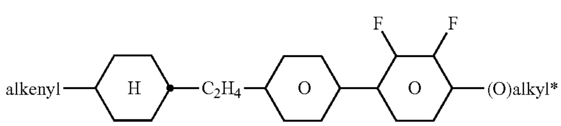

AY30

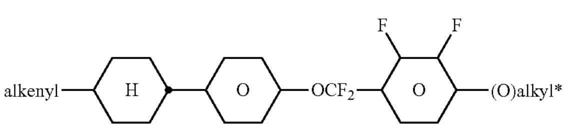

AY31

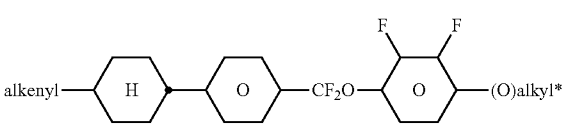

in which alkyl and alkyl* each, independently of one another, denote a straight-chain alkyl radical having 1-6 C atoms, "(0)" denotes an O-atom or a single bond, and alkenyl denotes a straight-chain alkenyl radical having 2-7 C atoms. Alkenyl preferably denotes $CH_2{=}CH$—, $CH_2{=}CHCH_2CH_2$—, $CH_3$—$CH{=}CH$—, $CH_3$—$CH_2$—$CH{=}CH$—, $CH_3$—$(CH_2)_2$—$CH{=}CH$—, $CH_3$—$(CH_2)_3$—$CH{=}CH$— or $CH_3$—$CH{=}CH$—$(CH_2)_2$—.

In another preferred embodiment the component H) or LC host mixture comprises one or more compounds of formula AY selected from the following sub-formulae:

AY5a

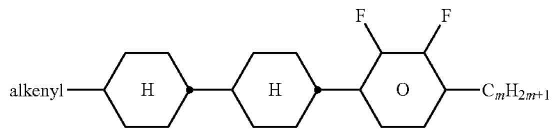

AY6a

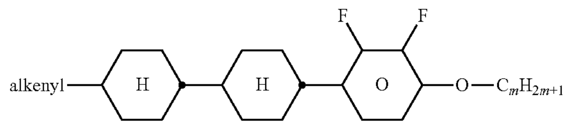

AY9a

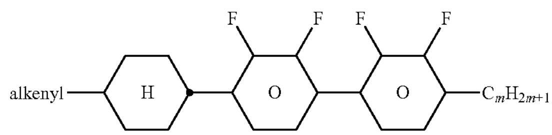

AY10a

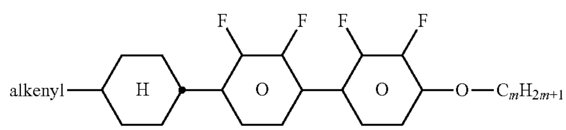

AY11a

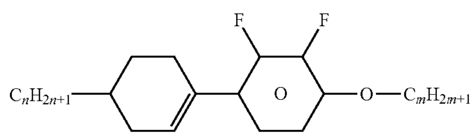

AY14a

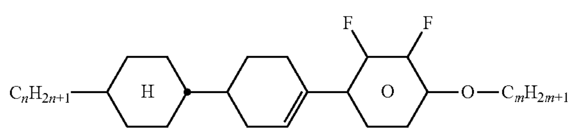

in which m and n each, independently of one another, denote 1, 2, 3, 4, 5 or 6, and alkenyl denotes $CH_2{=}CH$—, $CH_2{=}CHCH_2CH_2$—, $CH_3$—$CH{=}CH$—, $CH_3$—$CH_2$—$CH{=}CH$—, $CH_3$—$(CH_2)_2$—$CH{=}CH$—, $CH_3$—$(CH_2)_3$—$CH{=}CH$— or $CH_3$—$CH{=}CH$—$(CH_2)_2$—.

Preferably the proportion of compounds of formulae AN and AY in the LC medium is from 2 to 70% by weight, very preferably from 5 to 60% by weight, most preferably from 10 to 50% by weight.

Preferably the LC medium or LC host mixture contains 1 to 5, preferably 1, 2 or 3 compounds selected from formulae AN and AY.

In another preferred embodiment of the present invention the LC medium comprises one or more compounds of formula AY14, very preferably of AY14a. The proportion of compounds of formula AY14 or AY14a in the LC medium is preferably 3 to 20% by weight.

The addition of alkenyl compounds of formula AN and/or AY enables a reduction of the viscosity and response time of the LC medium.

c) LC medium wherein the component H) or LC host mixture comprises one or more compounds of the following formula:

ZK

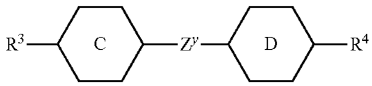

in which the individual radicals have the following meanings:

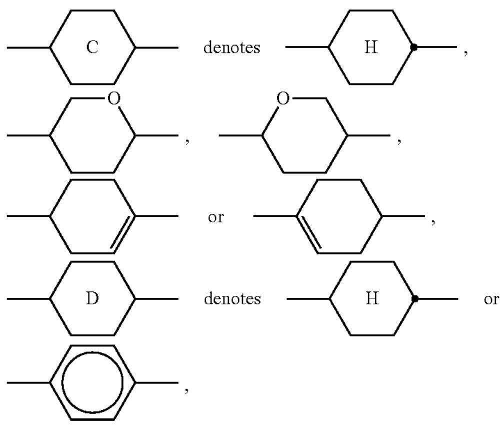

$R^3$ and $R^4$ each, independently of one another, denote alkyl having 1 to 12 C atoms, in which, in addition, one or two non-adjacent $CH_2$ groups may each be replaced by —O—, —CH═CH—, —CO—, —O—CO— or —CO—O— in such a way that O atoms are not linked directly to one another, $Z^y$ denotes $—CH_2CH_2—$, —CH═CH—, $—CF_2O—$, $—OCF_2—$, $—CH_2O—$, $—OCH_2—$, —CO—O—, —O—CO—, $—C_2F_4—$, —CF═CF—, —CH═CH— $CH_2O—$ or a single bond, preferably a single bond.

The compounds of the formula ZK are preferably selected from the group consisting of the following sub-formulae:

ZK1

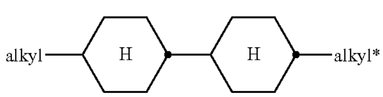

ZK2

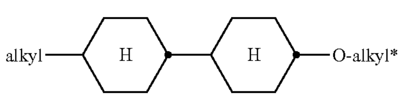

ZK3

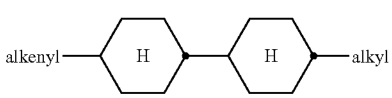

ZK4

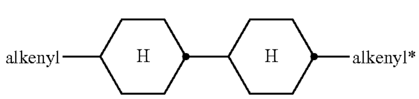

ZK5

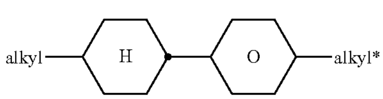

-continued

ZK6

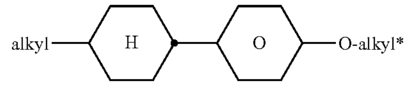

ZK7

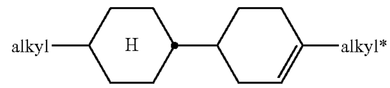

ZK8

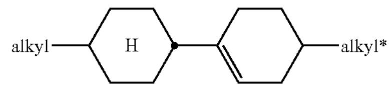

ZK9

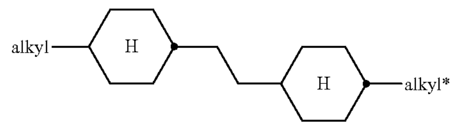

ZK10

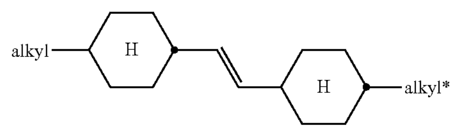

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Especially preferred are compounds of formula ZK1.

Particularly preferred compounds of formula ZK are selected from the following sub-formulae:

ZK1a

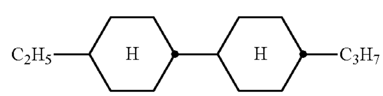

ZK1b

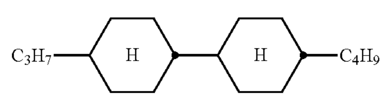

ZK1c

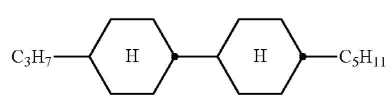

ZK1d

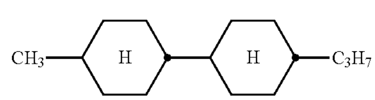

wherein the propyl, butyl and pentyl groups are straight-chain groups.

Most preferred are compounds of formula ZK1a.

d) LC medium wherein component H) or the LC host mixture additionally comprises one or more compounds of the following formula:

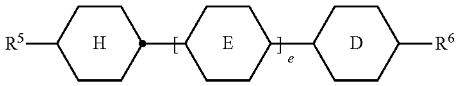

DK in which the individual radicals on each occurrence, identically or differently, have the following meanings:

$R^5$ and $R^6$ each, independently of one another, denote alkyl having 1 to 12 C atoms, where, in addition, one or two non-adjacent $CH_2$ groups may each be replaced by —O—, —CH═CH—, —CO—, —OCO— or —COO— in such a way that O atoms are not linked directly to one another, preferably alkyl or alkoxy having 1 to 6 C atoms,

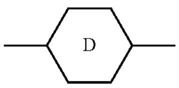 denotes 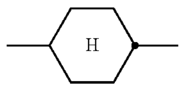 or 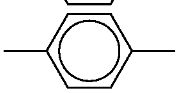,

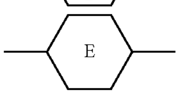 denotes 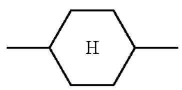, 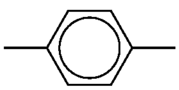 or 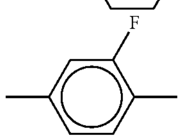, and e denotes 1 or 2.

The compounds of the formula DK are preferably selected from the group consisting of the following sub-formulae:

DK1

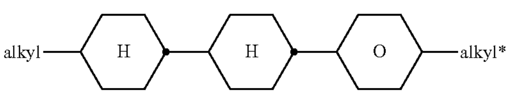

DK2

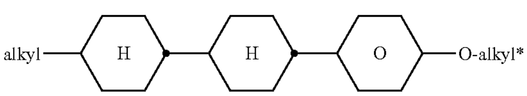

DK3

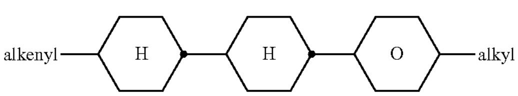

DK4

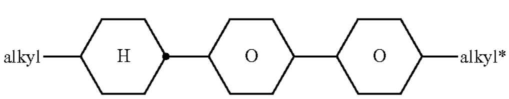

DK5

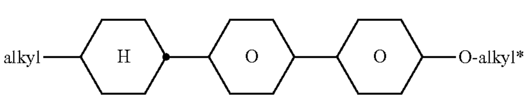

-continued

DK6

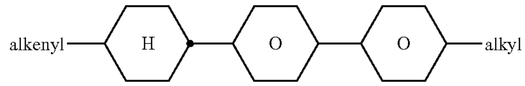

DK7

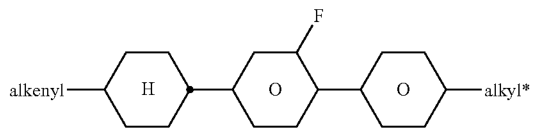

DK8

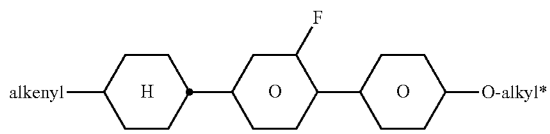

DK9

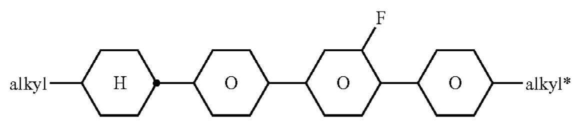

DK10

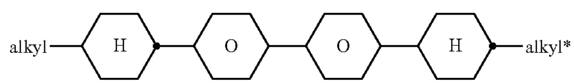

DK11

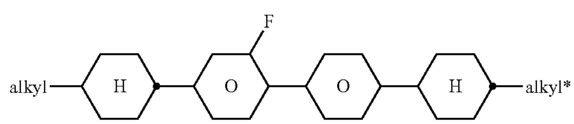

DK12

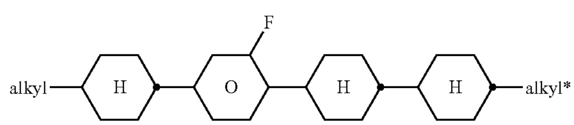

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

e) LC medium wherein component H) or the LC host mixture additionally comprises one or more compounds of the following formula:

LY

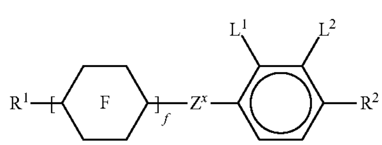

in which the individual radicals have the following meanings:

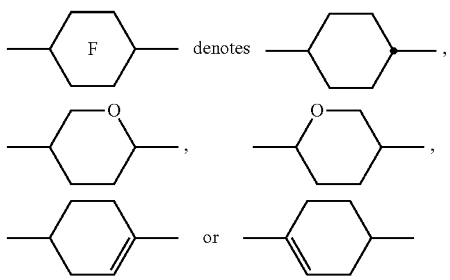

with at least one ring F being different from cyclohexylene, f denotes 1 or 2, $R^1$ and $R^2$ each, independently of one another, denote alkyl having 1 to 12 C atoms, where, in addition, one or two non-adjacent $CH_2$ groups may each be replaced by —O—, —CH═CH—, —CO—, —OCO— or —COO— in such a way that O atoms are not linked directly to one another, $Z^x$ denotes —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond, $L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

LY1

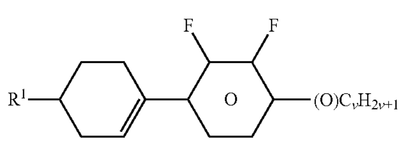

LY2

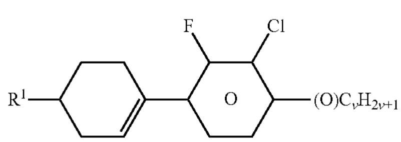

LY3

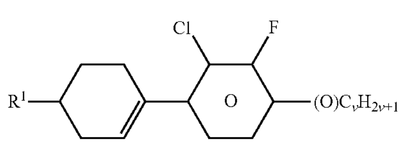

LY4

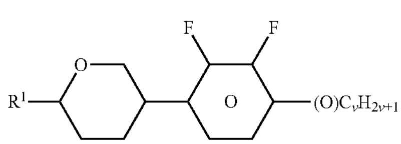

LY5

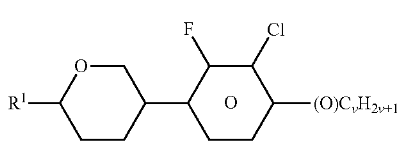

-continued

LY6

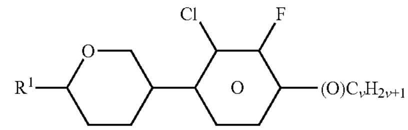

LY7

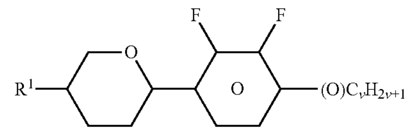

LY8

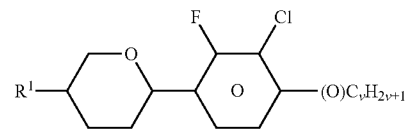

LY9

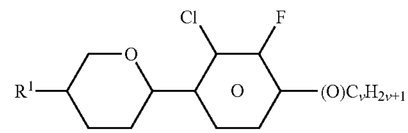

LY10

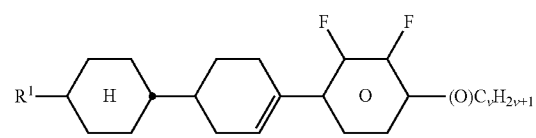

LY11

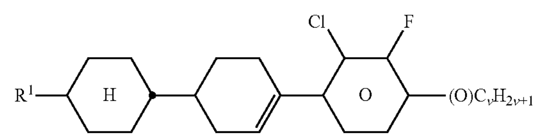

LY12

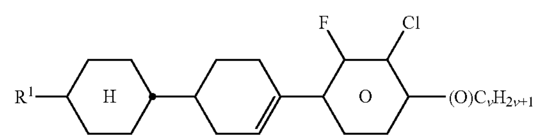

LY13

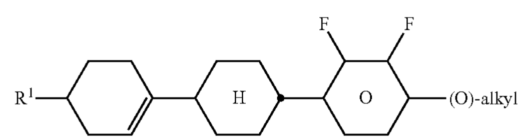

LY14

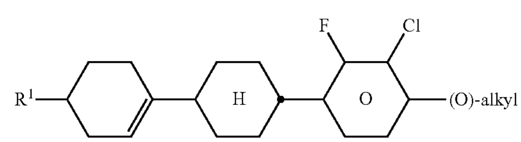

LY15

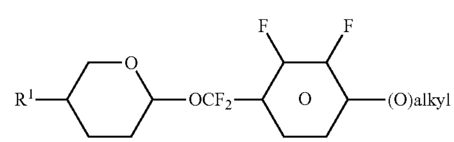

LY16

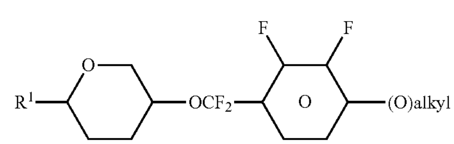

-continued

LY17

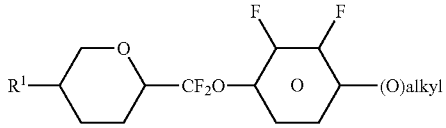

LY18

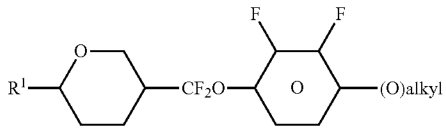

LY19

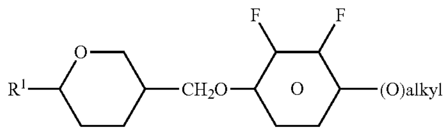

LY20

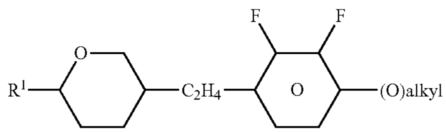

LY21

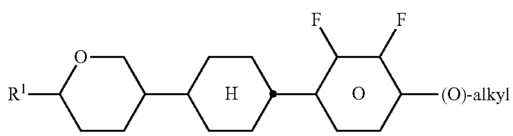

LY22

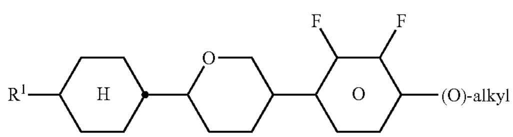

LY23

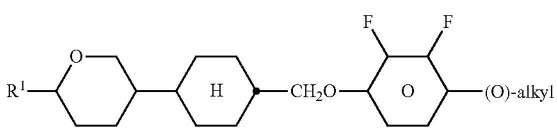

LY24

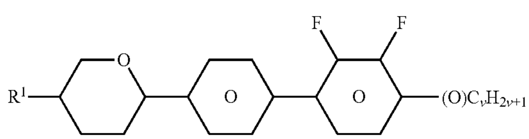

in which $R^1$ has the meaning indicated in formula LY, alkyl denotes a straight-chain alkyl radical having 1-6 C atoms, (0) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

f) LC medium wherein component H) or the LC host mixture additionally comprises one or more compounds selected from the group consisting of the following formulae:

G1

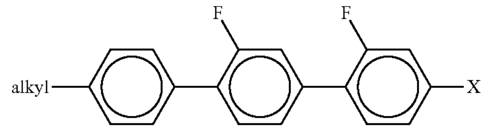

G2

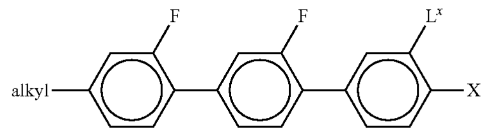

G3

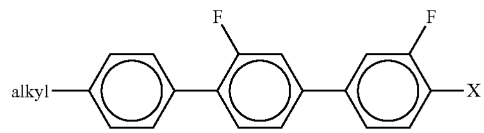

G4

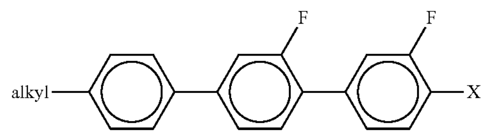

in which alkyl denotes $C_{1-6}$-alkyl, $L^x$ denotes H or F, and X denotes F, Cl, $OCF_3$, $OCHF_2$ or OCH=$CF_2$. Particular preference is given to compounds of the formula G1 in which X denotes F.

g) LC medium wherein component H) or the LC host mixture additionally comprises one or more compounds selected from the group consisting of the following formulae:

Y1

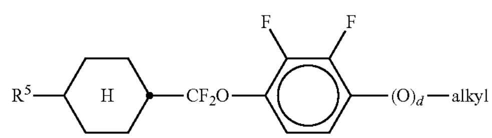

Y2

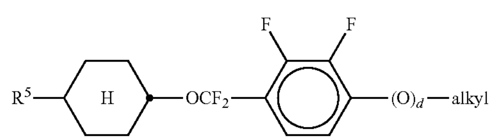

Y3

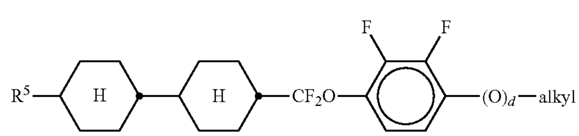

Y4

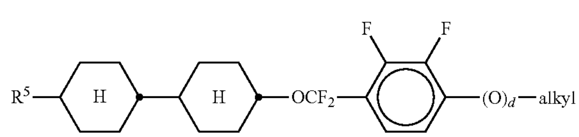

Y5

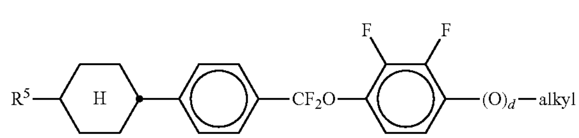

-continued

Y6

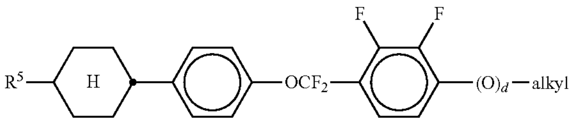

Y7

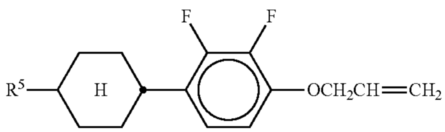

Y8

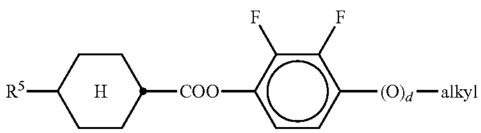

Y9

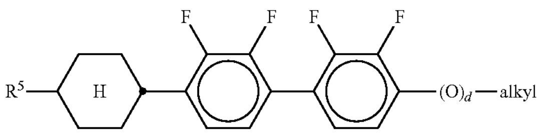

Y10

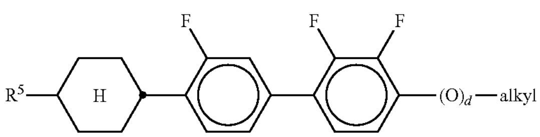

Y11

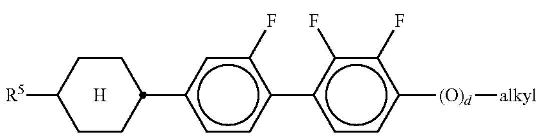

Y12

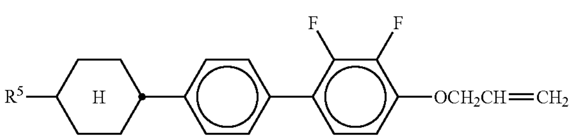

Y13

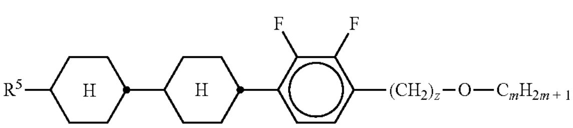

Y14

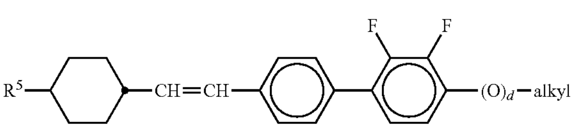

Y15

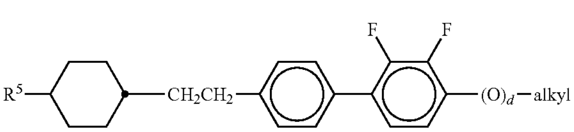

-continued

Y16

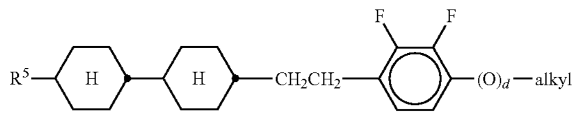

in which $R^5$ has one of the meanings indicated for $R^1$ in formula CY, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

h) LC medium wherein component H) or the LC host mixture additionally comprises one or more biphenyl compounds selected from the group consisting of the following formulae:

B1

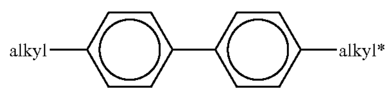

B2

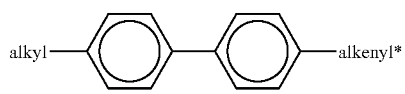

B3

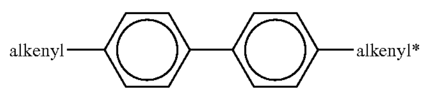

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

The proportion of the biphenyls of the formulae B1 to B3 in the LC host mixture is preferably at least 3% by weight, in particular ≥5% by weight.

The compounds of the formula B2 are particularly preferred.

The compounds of the formulae B1 to B3 are preferably selected from the group consisting of the following sub-formulae:

B1a

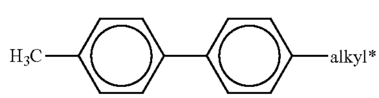

B2a

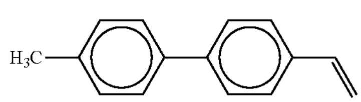

B2b

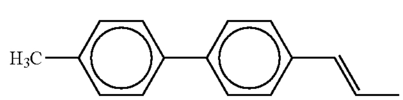

-continued

B2c

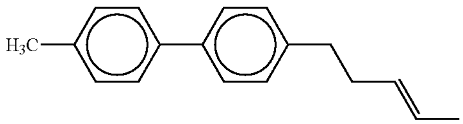

in which alkyl* denotes an alkyl radical having 1-6 C atoms. The medium according to the invention particularly preferably comprises one or more compounds of the formulae B1a and/or B2c.

i) LC medium wherein component H) or the LC host mixture additionally comprises one or more terphenyl compounds of the following formula:

T

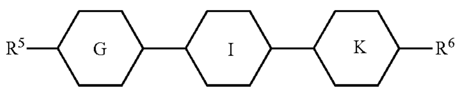

in which $R^5$ and $R^6$ each, independently of one another, have one of the meanings indicated in formula DK, and

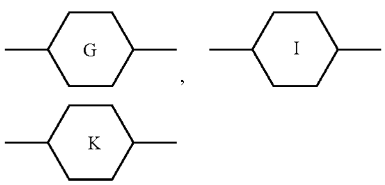

and each, independently of one another, denote

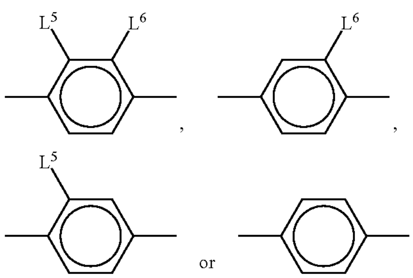

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

T1

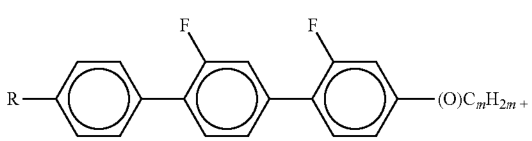

-continued

T2

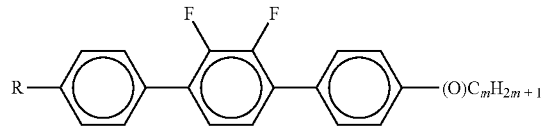

T3

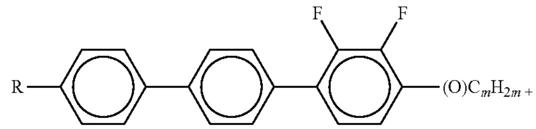

T4

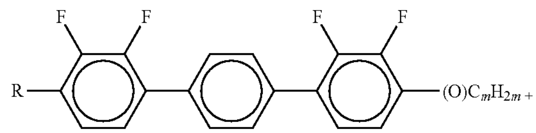

T5

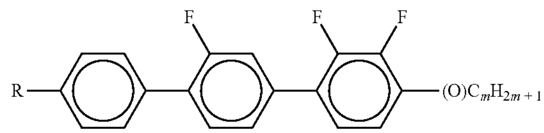

T6

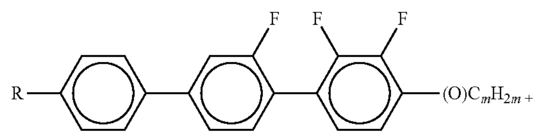

T7

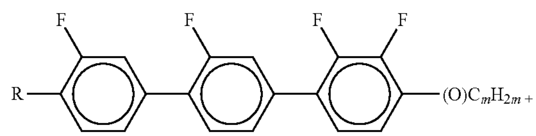

T8

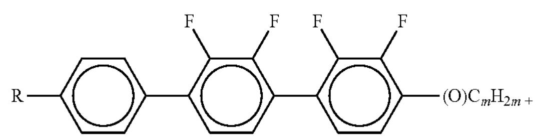

T9

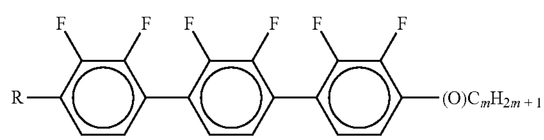

T10

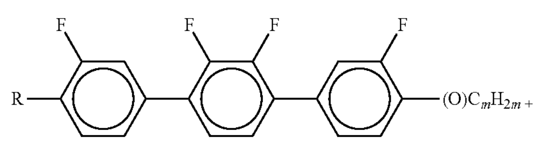

T11

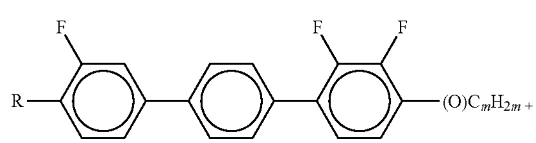

-continued

T12

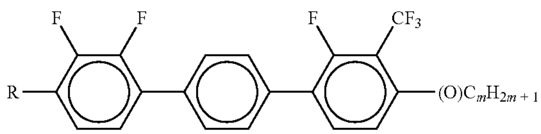

T13

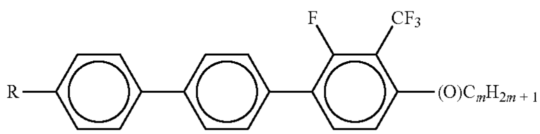

T14

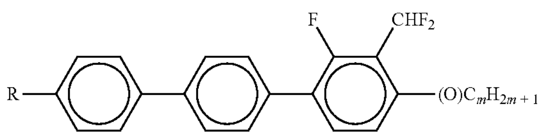

T15

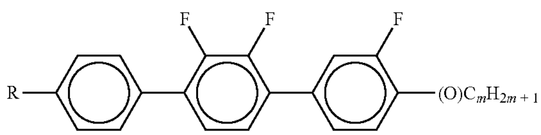

T16

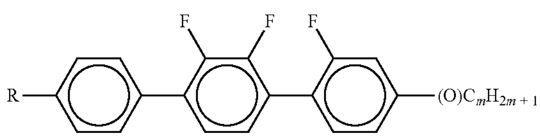

T17

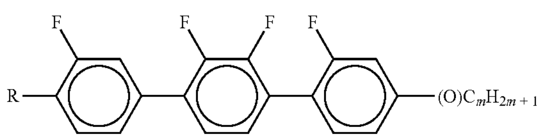

T18

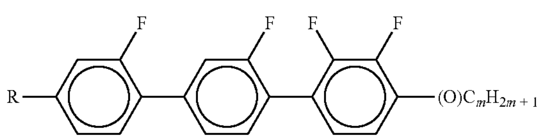

T19

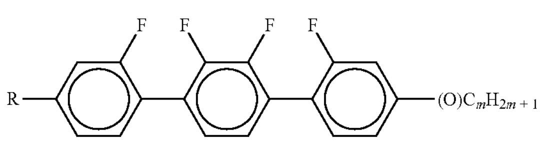

T20

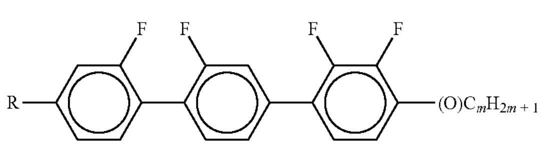

T21

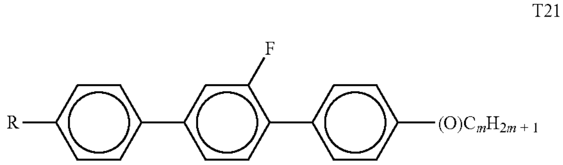

-continued

T22

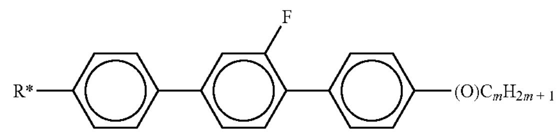

T23

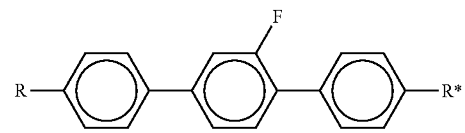

T24

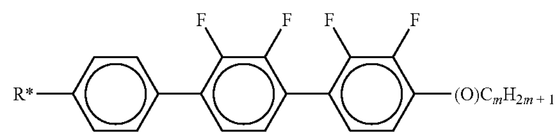

in which R denotes a straight-chain alkyl or alkoxy radical having 1-7 C atoms, R* denotes a straight-chain alkenyl radical having 2-7 C atoms, (0) denotes an oxygen atom or a single bond, and m denotes an integer from 1 to 6. R* preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

R preferably denotes methyl, ethyl, propyl, butyl, pentyl, hexyl, methoxy, ethoxy, propoxy, butoxy or pentoxy.

The LC host mixture according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in LC media according to the invention if the Δn value of the mixture is to be ≥0.1. Preferred LC media comprise 2-20% by weight of one or more terphenyl compounds of the formula T, preferably selected from the group of compounds T1 to T22.

k) LC medium wherein component H) or the LC host mixture additionally comprises one or more quaterphenyl compounds selected from the group consisting of the following formulae:

Q

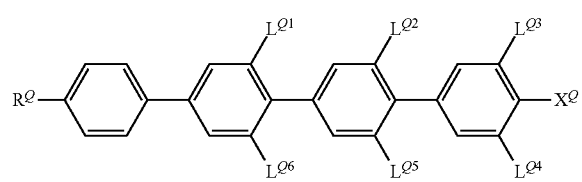

wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or halogenated alkenyl or alkenyloxy having 2 to 6 C atoms, $L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denotes F or $OCF_3$, very preferably F.

The compounds of formula Q are preferably selected from the following subformulae

Q1

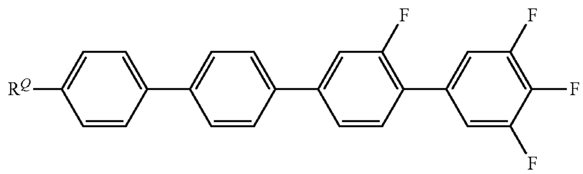

Q2

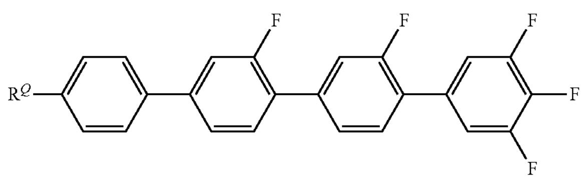

wherein $R^Q$ has one of the meanings indicated in formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC host mixture is from >0 to 55% by weight, very preferably from 0.1 to 2% by weight, most preferably from 0.2 to 1.5% by weight.

Preferably the LC host mixture contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerization, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon_{\parallel}$ and $\varepsilon_{\perp}$ and in particular enables to achieve a high value of the dielectric constant $\varepsilon_{\parallel}$ while keeping the dielectric anisotropy $\Delta\varepsilon$ constant, thereby reducing the kick-back voltage and reducing image sticking.

l) LC medium wherein component H) or the LC host mixture additionally comprises one or more compounds of formula C:

C

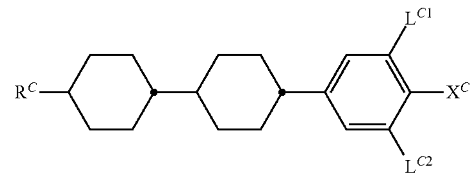

wherein $R^C$ denotes alkyl, alkoxy, oxaalkyl or alkoxyalkyl having 1 to 9 C atoms or alkenyl or alkenyloxy having 2 to 9 C atoms, all of which are optionally fluorinated, $X^C$ denotes F, Cl, halogenated alkyl or alkoxy having 1 to 6 C atoms or halogenated alkenyl or alkenyloxy having 2 to 6 C atoms, $L^{C1}$, $L^{C2}$ independently of each other denote H or F, with at least one of $L^{C1}$ and $L^{C2}$ being F.

Preferred compounds of formula C are those wherein $R^C$ denotes straight-chain alkyl with 2 to 6 C-atoms, very preferably ethyl, n-propyl or n-butyl.

Preferred compounds of formula C are those wherein $L^{C0}$ and $L^{C2}$ are F.

Preferred compounds of formula C are those wherein $X^C$ denotes F or $OCF_3$, very preferably F.

Preferred compounds of formula C are selected from the following formula

C1

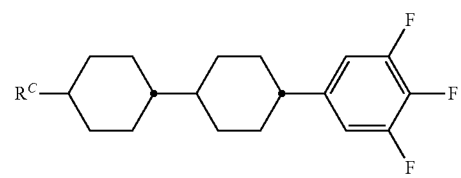

wherein $R^C$ has one of the meanings indicated in formula C or one of its preferred meanings given above and below, and is preferably ethyl, n-propyl or n-butyl, very preferably n-propyl.

Preferably the proportion of compounds of formula C in the LC host mixture is from >0 to ≤10% by weight, very preferably from 0.1 to 8% by weight, most preferably from 0.2 to 5% by weight.

Preferably the LC host mixture contains 1 to 5, preferably 1, 2 or 3 compounds of formula C.

The addition of compounds of formula C, which have positive dielectric anisotropy, to the LC medium with negative dielectric anisotropy allows a better control of the values of the dielectric constants $\varepsilon_{\parallel}$ and $\varepsilon_{\perp}$, and in particular enables to achieve a high value of the dielectric constant $\varepsilon_{\parallel}$ while keeping the dielectric anisotropy $\Delta\varepsilon$ constant, thereby reducing the kick-back voltage and reducing image sticking. Besides, the addition of compounds of formula C enables to reduce the viscosity and the response time of the LC medium.

m) LC medium wherein component H) or the LC host mixture additionally comprises one or more compounds selected from the group consisting of the following formulae:

O1

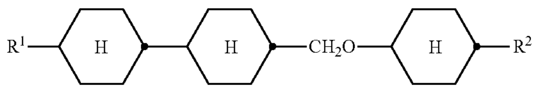

O2

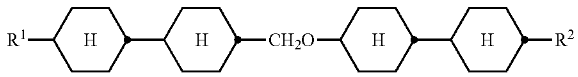

O3

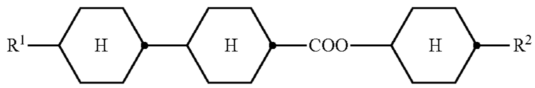

O4

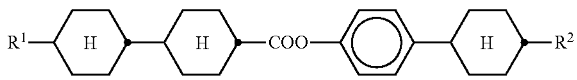

O5

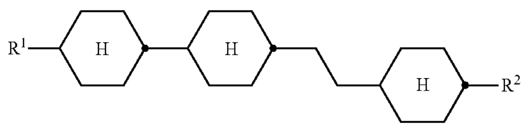

O6

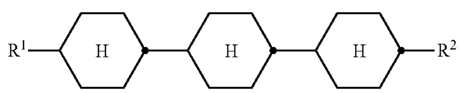

O7

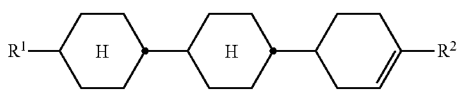

O8

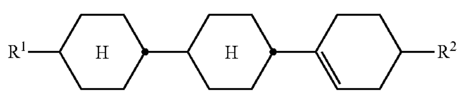

O9

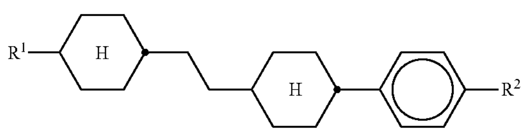

O10

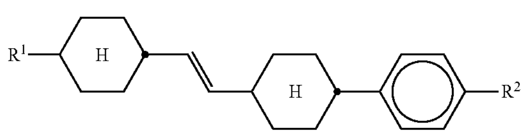

O11

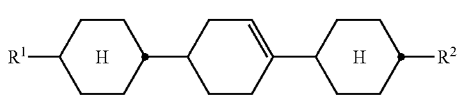

in which $R^1$ and $R^2$ have the meanings indicated for $R^3$ in formula ZK and preferably each, independently of one another, denote straight-chain alkyl having 1 to 6 C atoms or straight-chain alkenyl having 2 to 6 C atoms.

Preferred media comprise one or more compounds selected from the formulae 01, 03 and 04.

n) LC medium wherein component H) or the LC host mixture additionally comprises one or more compounds of the following formula:

FI

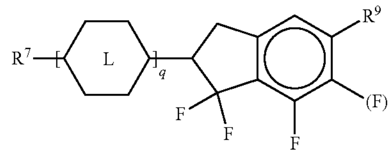

in which

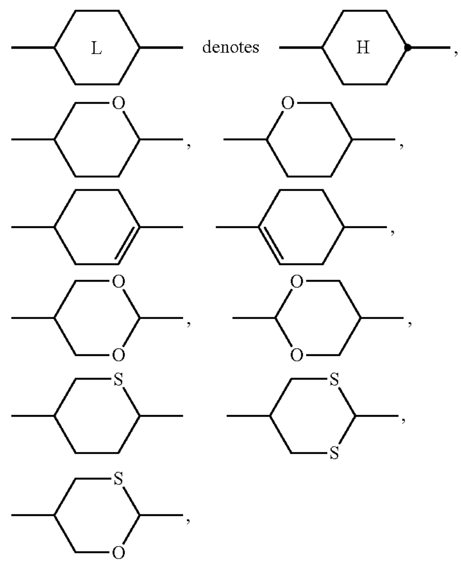

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$ in formula CY, preferably in amounts of >3% by weight, in particular ≥5% by weight and very particularly preferably 5-30% by weight.

Particularly preferred compounds of the formula FI are selected from the group consisting of the following sub-formulae:

FI1

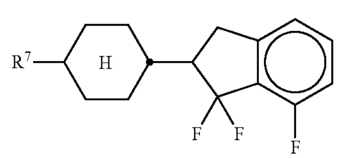

FI2

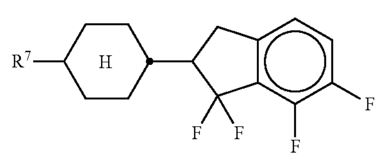

FI3

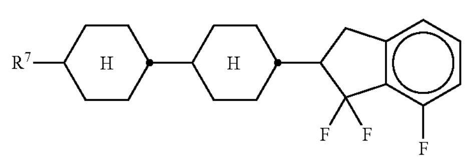

FI4

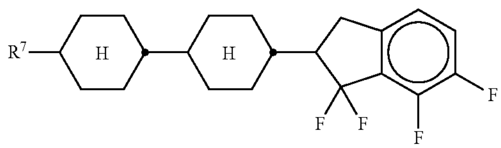

FI5

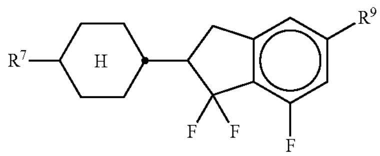

FI6

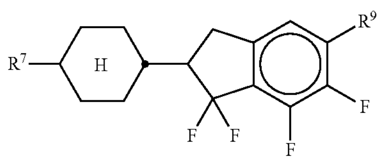

FI7

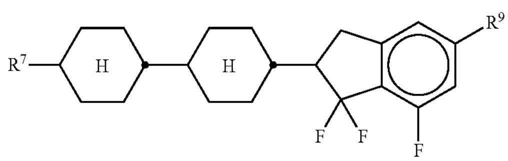

FI8

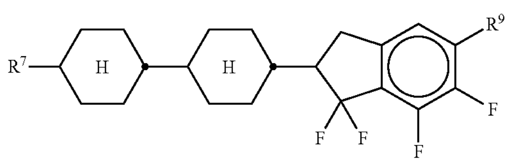

in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

o) LC medium wherein component H) or the LC host mixture additionally comprises one or more compounds selected from the group consisting of the following formulae:

VK1

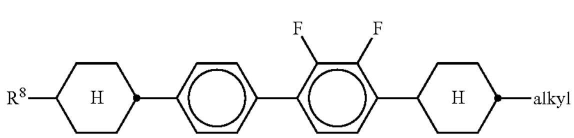

VK2

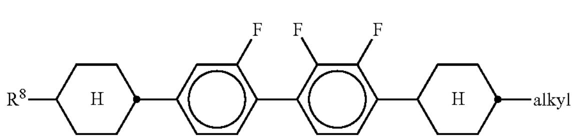

VK3

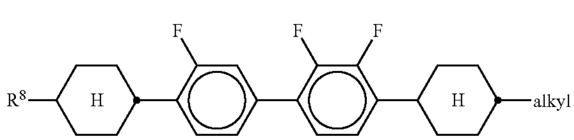

VK4

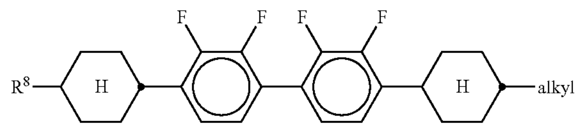

in which $R^8$ has the meaning indicated for $R^1$ in formula CY and alkyl denotes a straight-chain alkyl radical having 1-6 C atoms.

p) LC medium wherein component H) or the LC host mixture additionally comprises one or more compounds which contain a tetrahydronaphthyl or naphthyl unit, such as, for example, the compounds selected from the group consisting of the following formulae:

N1

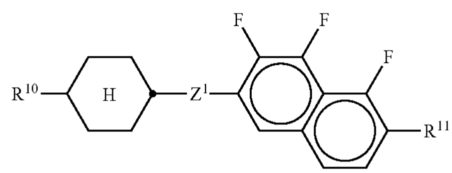

N2

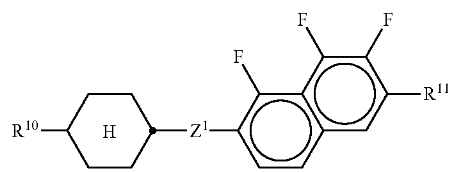

N3

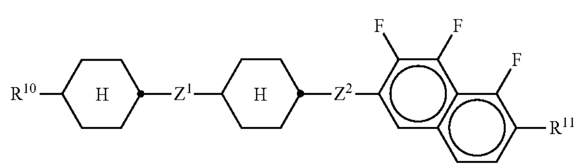

N4

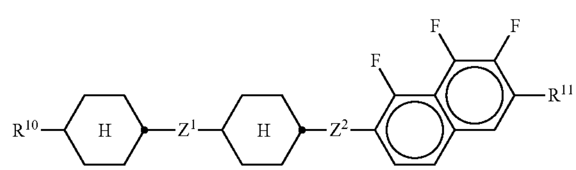

N5

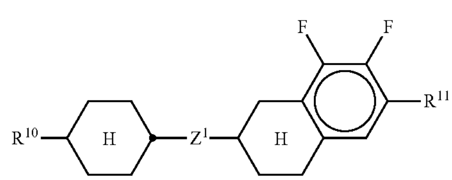

N6

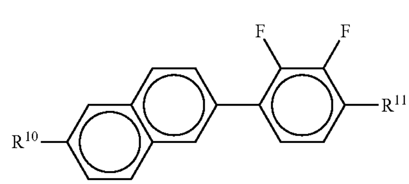

-continued

N7

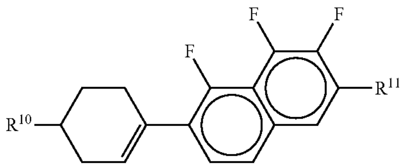

N8

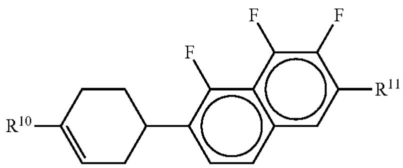

N9

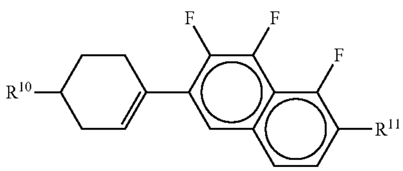

N10

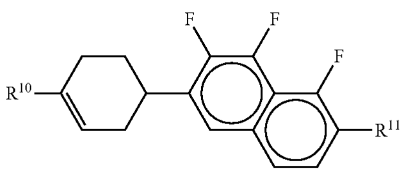

in which $R^{10}$ and $R^{11}$ each, independently of one another, denote alkyl having 1 to 12 C atoms, where, in addition, one or two non-adjacent $CH_2$ groups may each be replaced by —O—, —CH═CH—, —CO—, —OCO— or —COO— in such a way that O atoms are not linked directly to one another, preferably alkyl or alkoxy having 1 to 6 C atoms, and $R^{10}$ and $R^{11}$ preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH═CH—, —$(CH_2)_4$—, —$(CH_2)_3$O—, —O$(CH_2)_3$—, —CH═CH—$CH_2CH_2$—, —$CH_2CH_2$CH═CH—, —$CH_2$O—, —O$CH_2$—, —CO—O—, —O—CO—, —$C_2F_4$—, —CF═CF—, —CF═CH—, —CH═CF—, —$CH_2$— or a single bond.

q) LC medium wherein component H) or the LC host mixture additionally comprises one or more difluorodibenzochromans and/or chromans of the following formulae:

BC

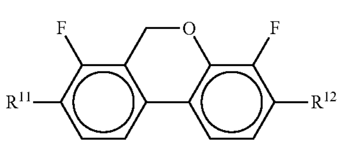

CR

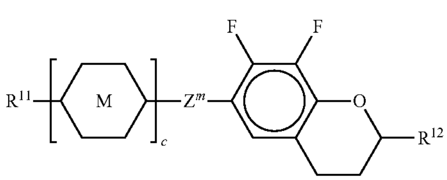

-continued

RC

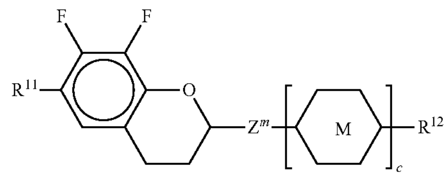

in which $R^{11}$ and $R^{12}$ each, independently of one another, have one of the meanings indicated above for $R^{11}$ in formula N1, ring M is trans-1,4-cyclohexylene or 1,4-phenylene, $Z^m$ —$C_2H_4$—, —$CH_2$O—, —O$CH_2$—, —CO—O— or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:

BC1

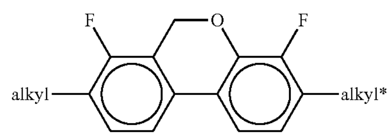

BC2

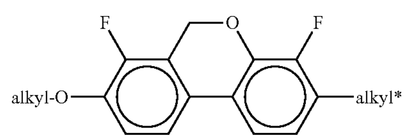

BC3

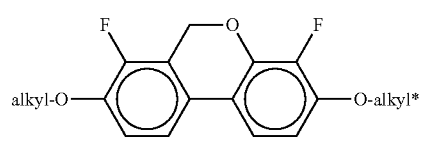

BC4

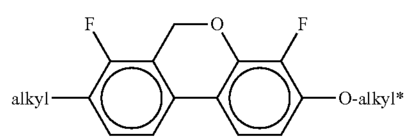

BC5

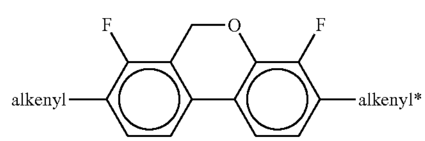

BC6

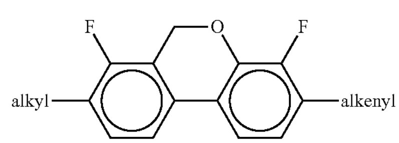

BC7

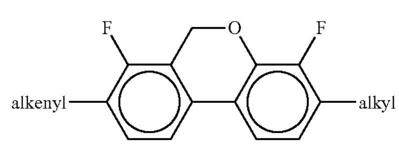

-continued

CR1

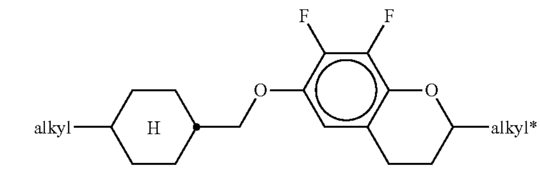

CR2

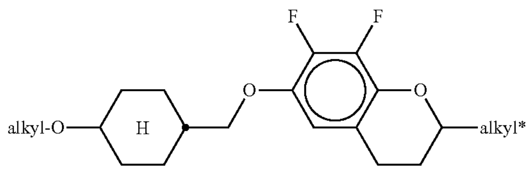

CR3

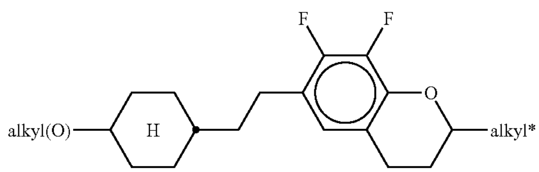

CR4

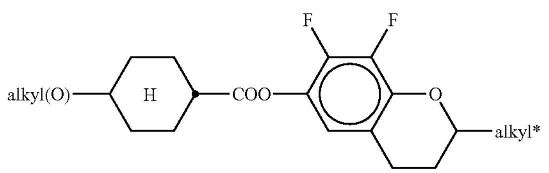

CR5

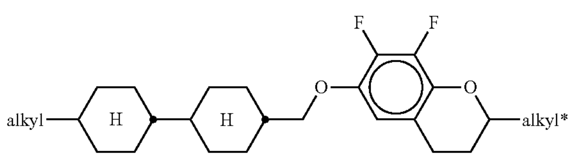

CR6

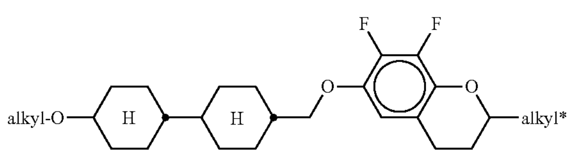

CR7

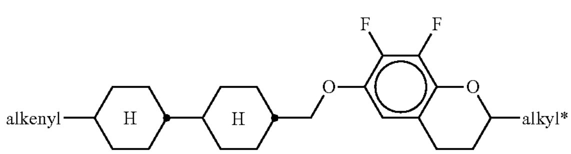

CR8

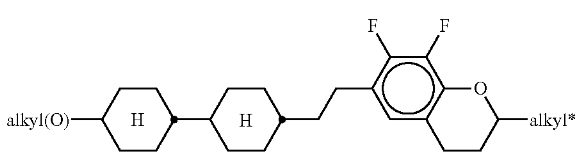

CR9

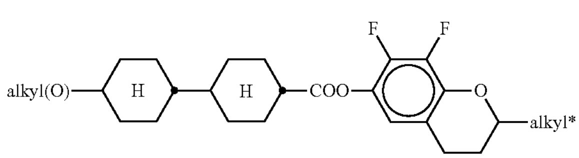

-continued

RC1

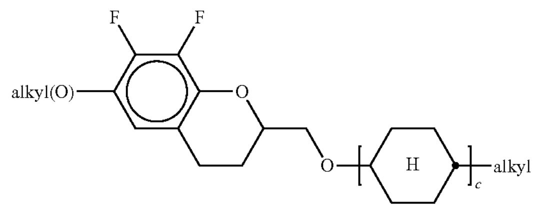

RC2

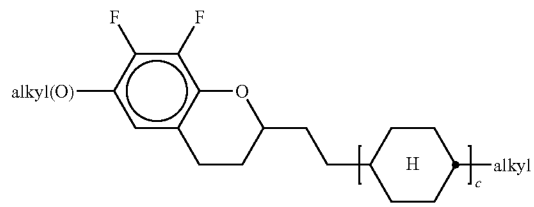

RC3

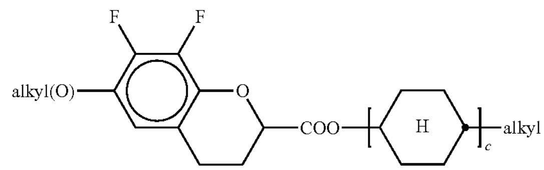

in which alkyl and alkyl* each, independently of one another, denote a straight-chain alkyl radical having 1-6 C atoms, (0) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Very particular preference is given to LC host mixtures comprising one, two or three compounds of the formula BC-2.

r) LC medium wherein component H) or the LC host mixture additionally comprises one or more fluorinated phenanthrenes and/or dibenzofurans and/or dibenzothiophenes of the following formulae:

PH

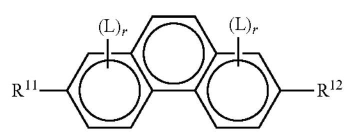

BF

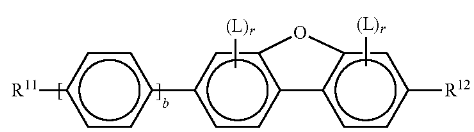

BT

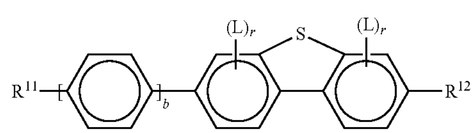

in which $R^{11}$ and $R^{12}$ each, independently of one another, have one of the meanings indicated above for $R^{11}$ in formula N1, b denotes 0 or 1, L denotes F, and r denotes 1, 2 or 3.

Particularly preferred compounds of the formulae PH, BF and BT are selected from the group consisting of the following sub-formulae:

PH1

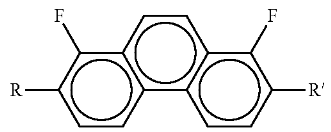

PH2

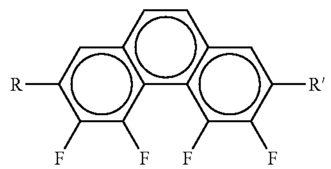

BF1

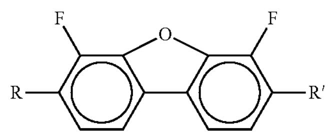

BF2

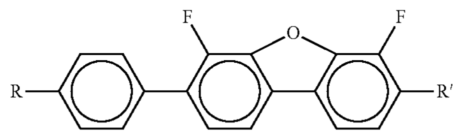

BT1

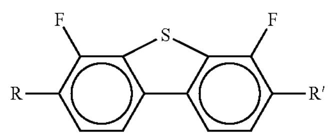

BT2

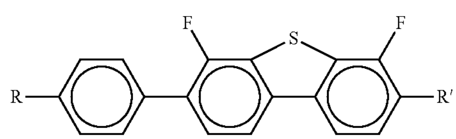

in which R and R' each, independently of one another, denote a straight-chain alkyl or alkoxy radical having 1-7 C atoms.

s) LC medium wherein component H) or the LC host mixture additionally comprises one or more monocyclic compounds of the following formula

Y

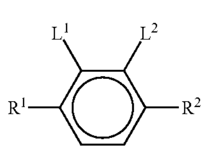

wherein $R^1$ and $R^2$ each, independently of one another, denote alkyl having 1 to 12 C atoms, where, in addition, one or two non-adjacent $CH_2$ groups may each be replaced by —O—, —CH═CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, or $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

Y1

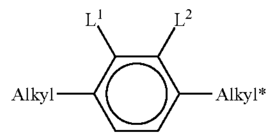

Y2

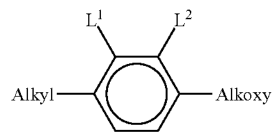

Y3

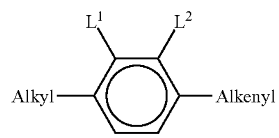

Y4

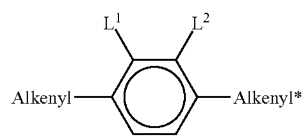

Y5

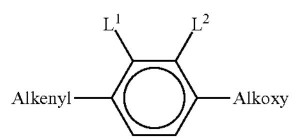

Y6

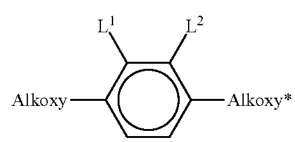

Y7

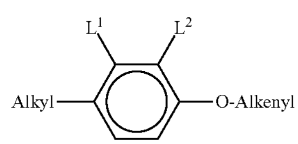

Y8

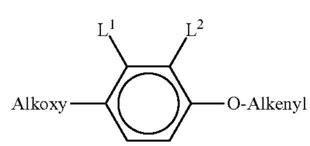

Y9

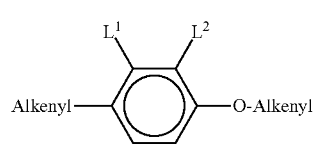

-continued

Y10

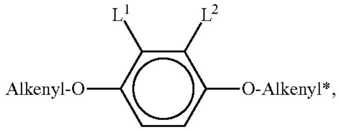

in which, Alkyl and Alkyl* each, independently of one another, denote a straight-chain alkyl radical having 1-6 C atoms, Alkoxy and Alkoxy* each, independently of one another, denote a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Particularly preferred compounds of the formula Y are selected from the group consisting of the following sub-formulae:

Y6A

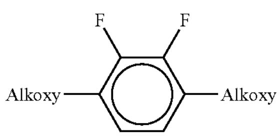

Y6B

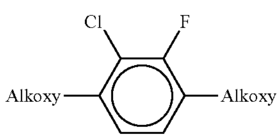

wherein Alkoxy preferably denotes straight-chain alkoxy with 3, 4, or 5 C atoms.

t) LC medium which, apart from the polymerizable compounds as described above and below, does not contain a compound which contains a terminal vinyloxy group (—O—CH═$CH_2$).

u) LC medium wherein component H) or the LC host mixture comprises one or more compounds of formula PY in a total concentration in the range of from 5-60%, more preferably from 15-50%, particularly preferably from 20-45%.

v) LC medium wherein component H) or the LC host mixture comprises 1 to 8, preferably 1 to 5, compounds of the formulae CY1, CY2, PY1 and/or PY2. The proportion of these compounds in the LC host mixture as a whole is preferably 5 to 60%, particularly preferably 10 to 40%. The content of these individual compounds is preferably in each case 2 to 20%.

w) LC medium wherein component H) or the LC host mixture comprises one or more compounds of formula PY2, preferably in a total concentration in the range of from 3 to 30%, more preferably from 3 to 25%, particularly from 10 to 25%. The compounds of formula PY2 are preferably selected from the compounds PY-1-02, PY-3-02, PY-1-04, PY-4-02.

x) LC medium wherein component H) or the LC host mixture comprises 1 to 8, preferably 1 to 5, compounds of the formulae CY9, CY10, PY9 and/or PY10. The proportion of these compounds in the LC host mixture as a whole is preferably 5 to 60%, particularly preferably 10 to 35%. The content of these individual compounds is preferably in each case 2 to 30%.

y) LC medium wherein component H) or the LC host mixture comprises one or more compounds of formula PY10 in a total concentration in the range of from 5-30%, more preferably from 7-25%, particularly preferably from 10-30%. Very preferred compounds are CPY-2-02 and/or CPY-3-02.

z) LC medium wherein component H) or the LC host mixture comprises 1 to 10, preferably 1 to 8, compounds of the formula ZK, in particular compounds of the formulae ZK1, ZK2 and/or ZK6. The proportion of these compounds in the LC host mixture as a whole is preferably 3 to 45%, more preferably 5 to 40%, particularly preferably 10 to 35%. The content of these individual compounds is preferably in each case 2 to 20%.

aa) LC medium in which the proportion of compounds of the formulae CY, PY and ZK in the LC host mixture as a whole is greater than 70%, preferably greater than 80%.

bb) LC medium wherein component H) or the LC host mixture contains one or more, preferably 1 to 5, compounds selected of formula PY1-PY8, very preferably of formula PY2. The proportion of these compounds in the LC host mixture as a whole is preferably 1 to 55%, particularly preferably 15 to 50%, very preferably 20-45%. The content of these individual compounds is preferably in each case 1 to 20%.

cc) LC medium in which the LC host mixture contains one or more compounds selected from formulae CY and PY, and one or more compounds selected from formula T.

dd) LC medium wherein component H) or the LC host mixture contains one or more, preferably 1, 2 or 3, compounds selected from formulae T1, T2 and T5, very preferably from formula T2. The content of these compounds in the LC host mixture as a whole is preferably 1 to 30%, more preferably 5 to 25%, particularly preferably 10 to 22%.

ee) LC medium wherein component H) or the LC host mixture comprises one or more compounds of the formula DK, in particular compounds of the formulae DK1 and/or DK4. The proportion of these compounds in the LC host mixture as a whole is preferably 1 to 30%, more preferably 2 to 25%, particularly preferably 2 to 20%.

ff) LC medium wherein component H) or the LC host mixture comprises one or more, preferably 1 to 3, compounds of the formula BT, in particular compounds of the formula BT1. The proportion of these compounds in the LC host mixture as a whole is preferably 0.5 to 25%, more preferably 1 to 20%, particularly preferably 2 to 15%.

gg) LC medium wherein component H) or the LC host mixture comprises one or more, preferably 1 to 3, compounds of the formulae B1-B3, in particular compounds of the formula B2c. The proportion of these compounds in the LC host mixture as a whole is preferably 0.5 to 20%, more preferably 1 to 15%, particularly preferably 3 to 15%.

hh) LC medium wherein component H) or the LC host mixture comprises one or more compounds of formula CPY-n-Om, one or more compounds of formula PY-n-Om and one or more compounds of formula PYP-n-m in a total concentration in the range of from 45 to 70%.

The combination of compounds of the preferred embodiments mentioned above with the polymerized compounds described above causes low threshold voltages, low rotational viscosities and very good low-temperature stabilities in the LC media according to the invention at the same time as constantly high clearing points and high HR values, and allows the rapid establishment of a particularly low pretilt angle in PSA displays. In particular, the LC media exhibit significantly shortened response times, in particular also the grey-shade response times, in PSA displays compared with the media from the prior art.

The LC media and LC host mixtures of the present invention preferably have a nematic phase range of at least 80 K, particularly preferably at least 100 K, and a rotational viscosity ≤250 mPa·s, preferably ≤200 mPa·s, at 20° C.

In the VA-type displays according to the invention, the molecules in the layer of the LC medium in the switched-off state are aligned perpendicular to the electrode surfaces (homeotropically) or have a tilted homeotropic alignment. On application of an electrical voltage to the electrodes, a realignment of the LC molecules takes place with the longitudinal molecular axes parallel to the electrode surfaces.

LC media according to the invention based on compounds with negative dielectric anisotropy according to the first preferred embodiment, in particular for use in displays of the PS-VA and PS-UB-FFS type, have a negative dielectric anisotropy Δε, preferably from −0.5 to −10, in particular from −2.5 to −7.5, at 20° C. and 1 kHz.

In another preferred embodiment, the LC media according to the invention have a negative dielectric anisotropy Δε, preferably from −1.5 to −6.0, in particular from −2.0 to −4.0, and very preferably from −2.5 to −3.5, at 20° C. and 1 kHz.

The birefringence Δn in LC media according to the invention for use in displays of the PS-VA and PS-UB-FFS type is preferably 0.16 or below, in the range from 0.06 to 0.16, preferably in the range of from 0.110 to 0.150, more preferably from 0.120 to 0.140, particularly preferably from 0.125 to 0.137.

In the OCB-type displays according to the invention, the molecules in the layer of the LC medium have a "bend" alignment. On application of an electrical voltage, a realignment of the LC molecules takes place with the longitudinal molecular axes perpendicular to the electrode surfaces.

LC media according to the invention for use in displays of the PS-IPS, and PS-FFS type are preferably those based on compounds with positive dielectric anisotropy according to the second preferred embodiment, and preferably have a positive dielectric anisotropy Δε from +4 to +17 at 20° C. and 1 kHz.

The birefringence Δn in LC media according to the invention for use in displays of the PS-OCB type is preferably from 0.14 to 0.22, particularly preferably from 0.16 to 0.22.

The birefringence Δn in LC media according to the invention for use in displays of the PS-IPS- or PS-FFS-type is preferably from 0.07 to 0.15, particularly preferably from 0.08 to 0.13.

The LC media according to the invention may also comprise further additives which are known to the person skilled in the art and are described in the literature, such as, for example, polymerization initiators, inhibitors, stabilizers, surface-active substances or chiral dopants. These may be polymerizable or non-polymerizable. Polymerizable additives are accordingly ascribed to the polymerizable component or component P). Non-polymerizable additives are accordingly ascribed to the non-polymerizable component or component H).

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-hh) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Preferred mixture components are shown in Table A below.

TABLE A

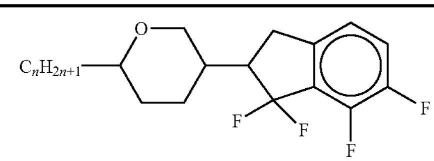

AIK-*n*-F

TABLE A-continued
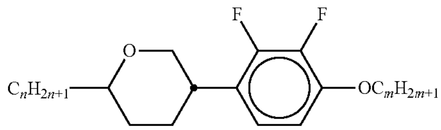
AIY-*n*-O*m*
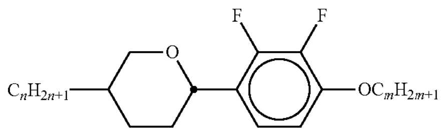
AY-*n*-O*m*
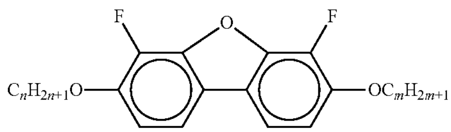
B-*n*O-O*m*
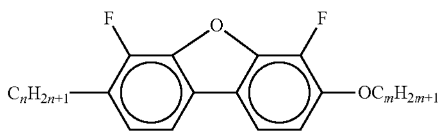
B-*n*-O*m*
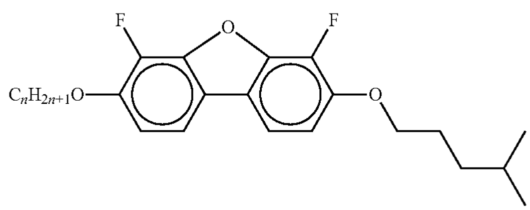
B-*n*O-O5i
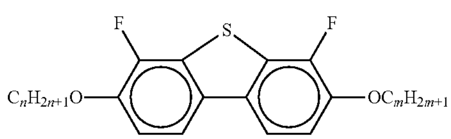
B(S)-*n*O-O*m*
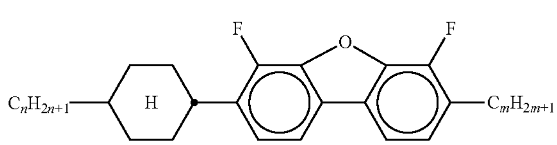
CB-*n*-*m*
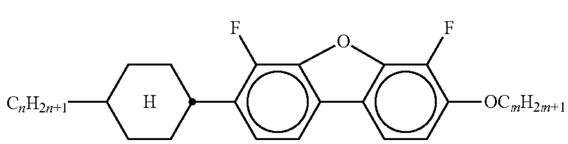
CB-*n*-O*m*

TABLE A-continued
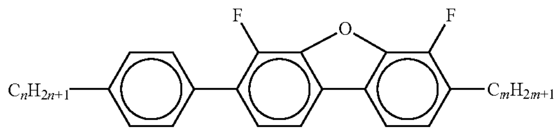
PB-*n*-*m*
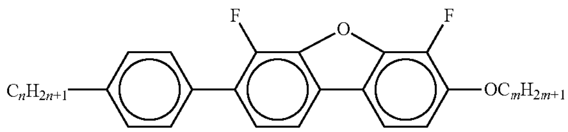
PB-*n*-O*m*
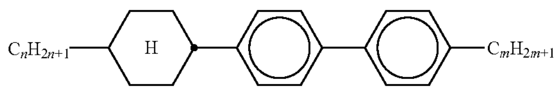
BCH-*nm*
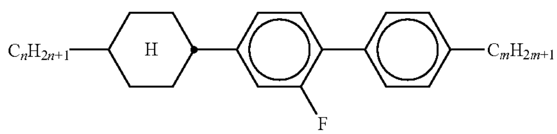
BCH-*nm*F
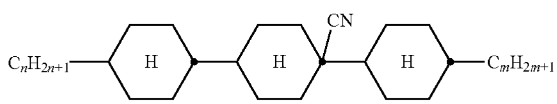
BCN-*nm*
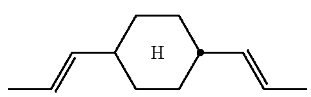
C-1V-V1
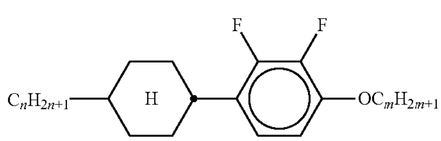
CY-*n*-O*m*
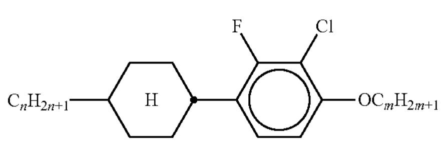
CY(F,Cl)-*n*-O*m*
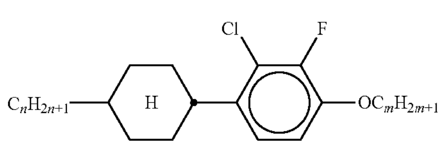
CY(Cl,F)-*n*-O*m*

TABLE A-continued
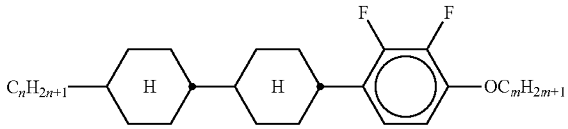
CCY-*n*-O*m*
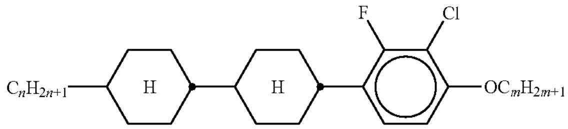
CCY(F,Cl)-*n*-O*m*
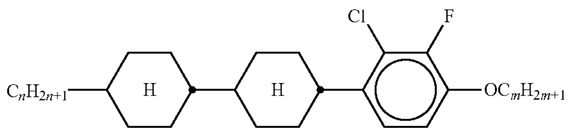
CCY(Cl,F)-*n*-O*m*
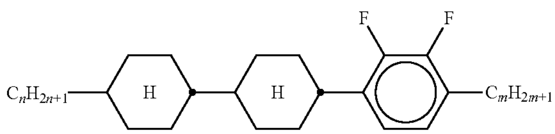
CCY-*n*-*m*
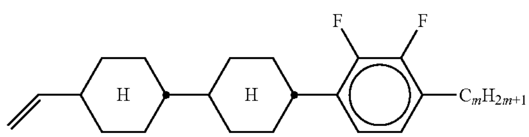
CCY-V-*m*
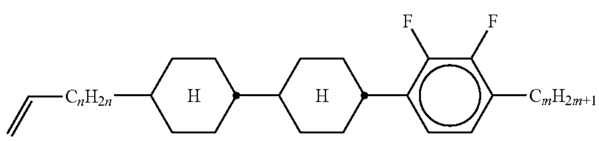
CCY-V*n*-*m*
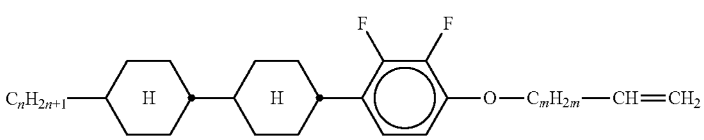
CCY-*n*-O*m*V
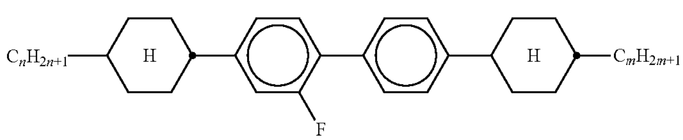
CBC-*nm*F
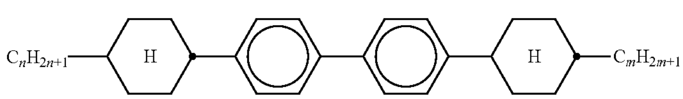
CBC-*nm*

TABLE A-continued
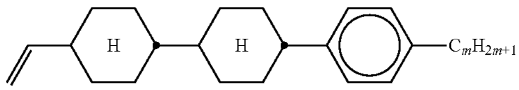
CCP-V-*m*
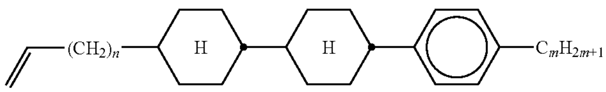
CCP-V*n*-*m*
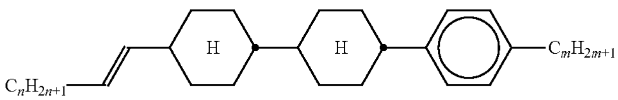
CCP-*n*V-*m*
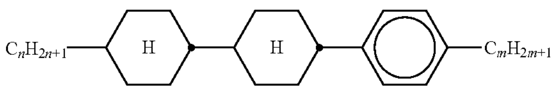
CCP-*n*-*m*
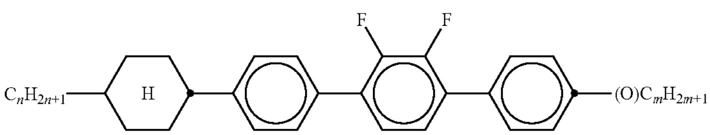
CPYP-*n*-(O)*m*
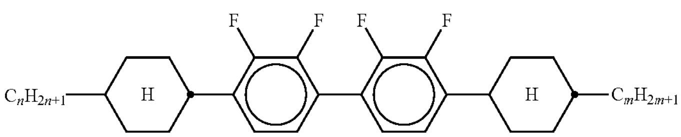
CYYC-*n*-*m*
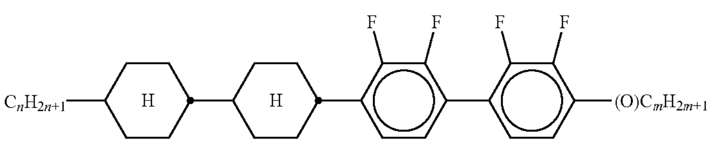
CCYY-*n*-(O)*m*
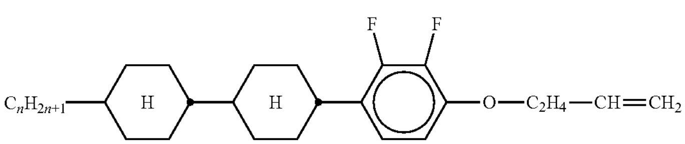
CCY-*n*-O2V
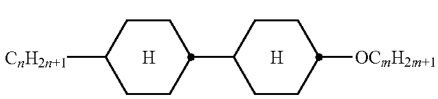
CCH-*n*O*m*

TABLE A-continued
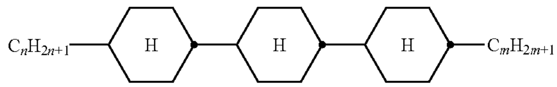
CCC-*n*-*m*
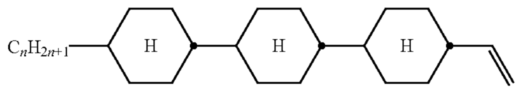
CCC-*n*-V
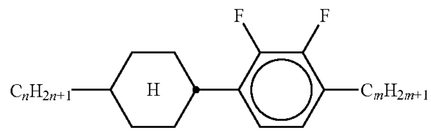
CY-*n*-*m*
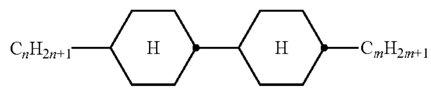
CCH-*nm*
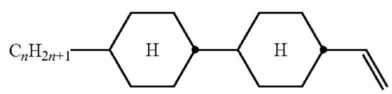
CC-*n*-V
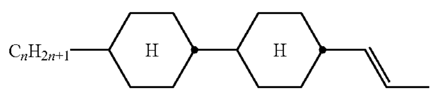
CC-*n*-V1
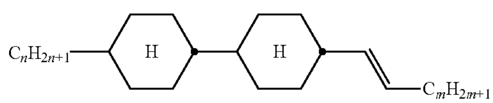
CC-*n*-V*m*
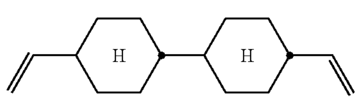
CC-V-V
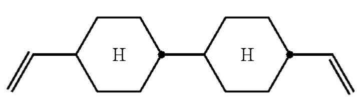
CC-V-V1
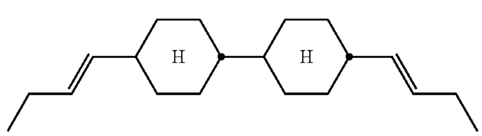
CC-2V-V2

TABLE A-continued
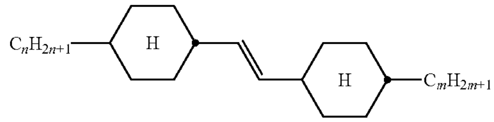
CVC-*n*-*m*
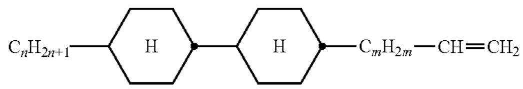
CC-*n*-*m*V
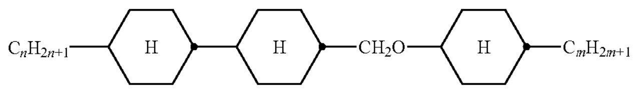
CCOC-*n*-*m*
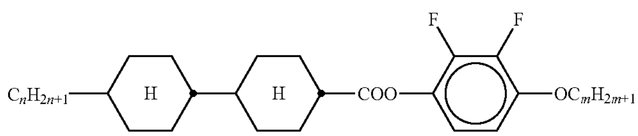
CP-*n*O*m*FF
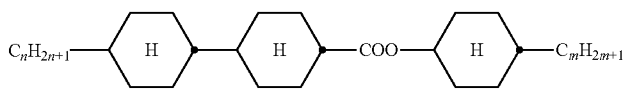
CH-*nm*
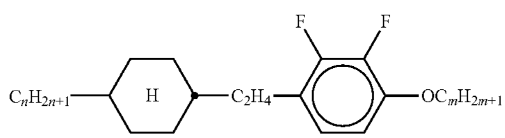
CEY-*n*-O*m*
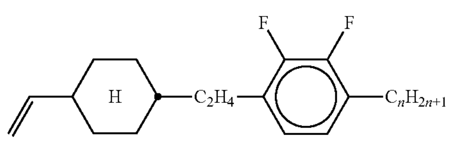
CEY-V-*n*
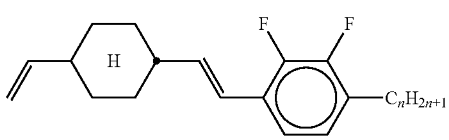
CVY-V-*n*
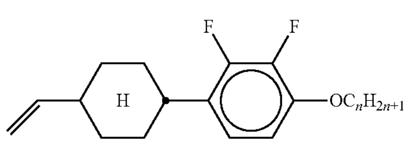
CY-V-O*n*

TABLE A-continued
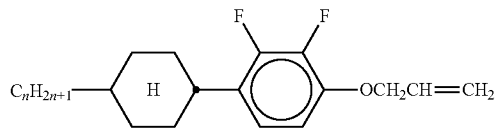
CY-*n*-O1V
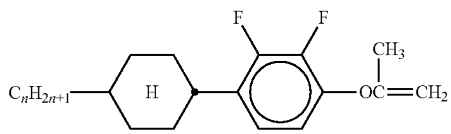
CY-*n*-OC($CH_3$)=$CH_2$
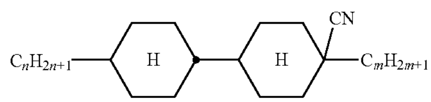
CCN-*nm*
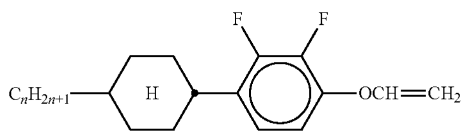
CY-*n*-OV
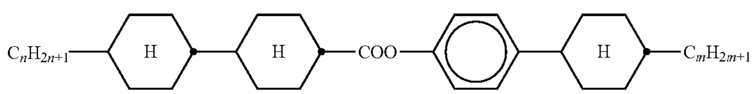
CCPC-*nm*
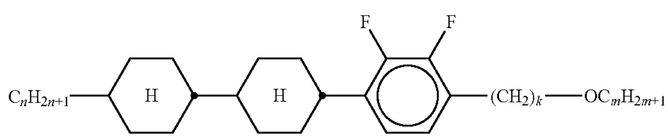
CCY-*n*-*k*O*m*
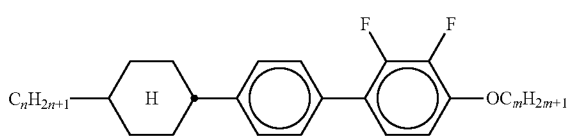
CPY-*n*-O*m*
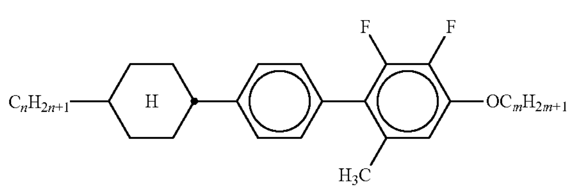
CP(1Y)-*n*-O*m*

TABLE A-continued
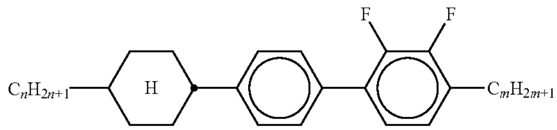
CPY-*n*-*m*
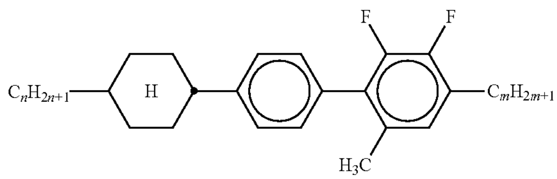
CP(1Y)-*n*-*m*
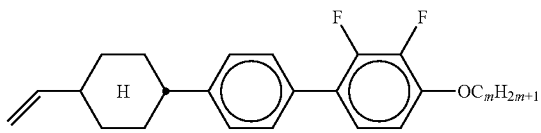
CPY-V-O*m*
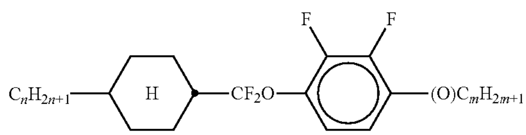
CQY-*n*-(O)*m*
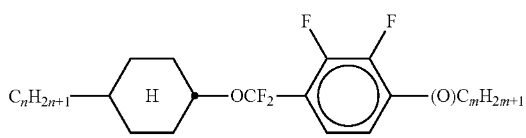
CQIY-*n*-(O)*m*
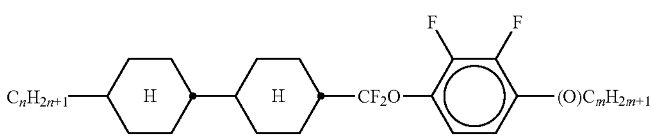
CCQY-*n*-(O)*m*
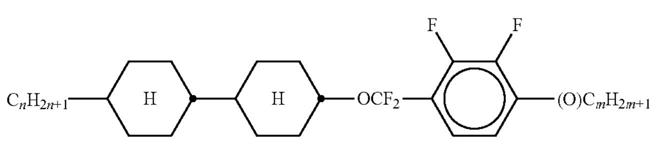
CCQIY-*n*-(O)*m*
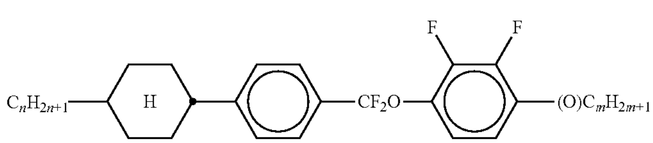
CPQY-*n*-(O)*m*

TABLE A-continued
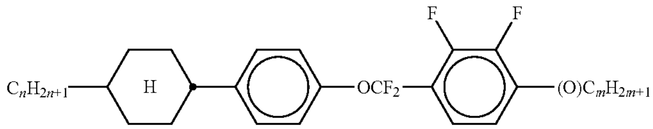
CPQIY-*n*-(O)*m*
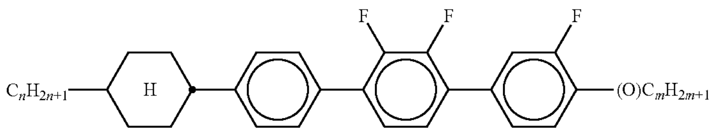
CPYG-*n*-(O)*m*
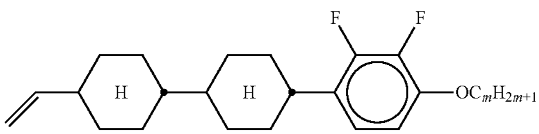
CCY-V-O*m*
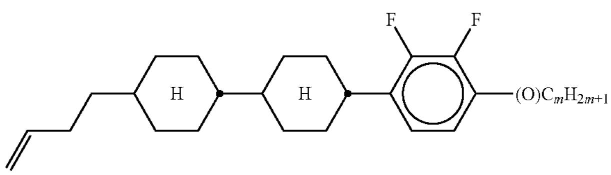
CCY-V2-(O)*m*
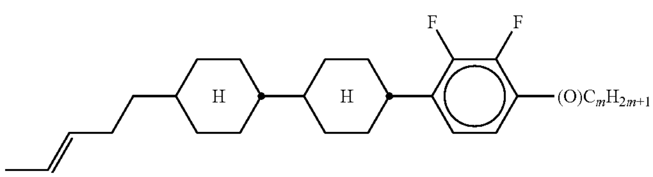
CCY-1V2-(O)*m*
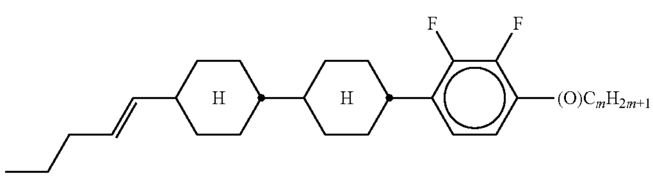
CCY-3V-(O)*m*
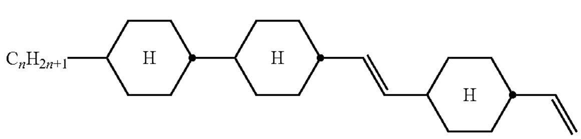
CCVC-*n*-V
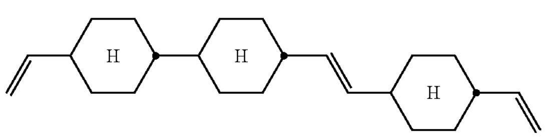
CCVC-V-V TABLE A-continued
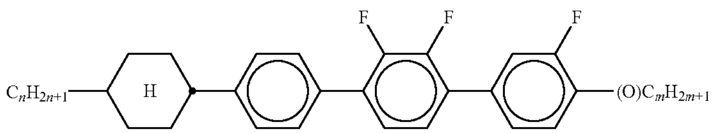
CPYG-*n*-(O)*m*
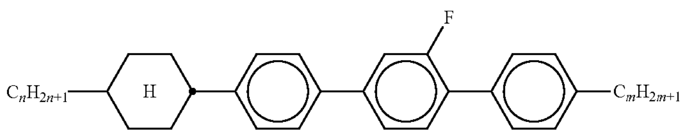
CPGP-*n*-*m*
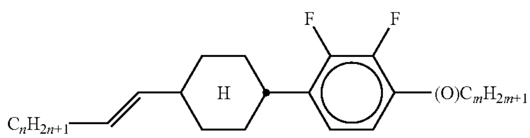
CY-*n*V-(O)*m*
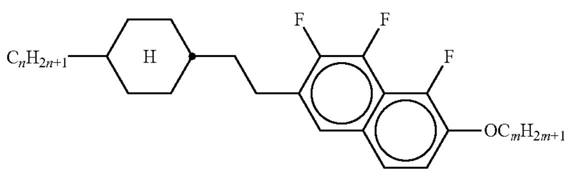
CENaph-*n*-O*m*
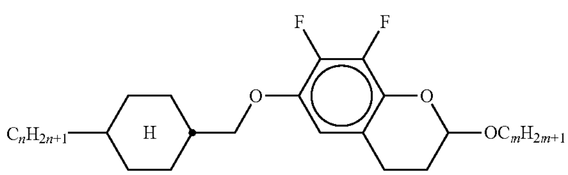
COChrom-*n*-O*m*
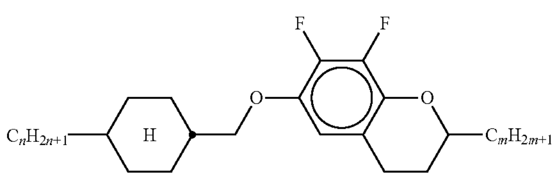
COChrom-*n*-*m*
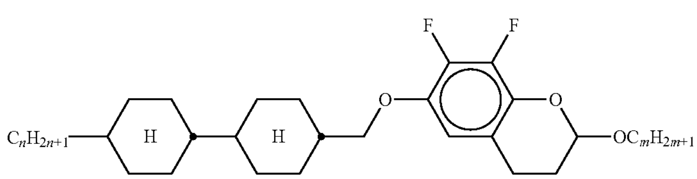
CCOChrom-*n*-O*m*

TABLE A-continued
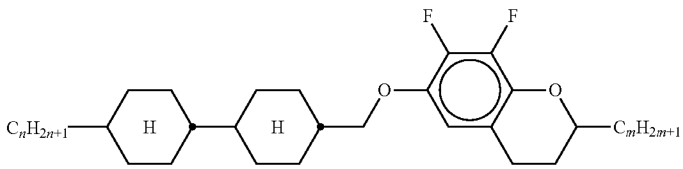
CCOChrom-*n*-*m*
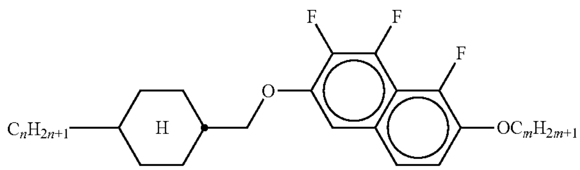
CONaph-*n*-O*m*
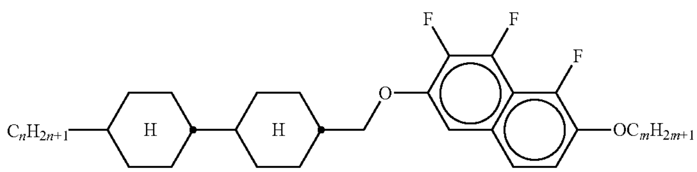
CCONaph-*n*-O*m*
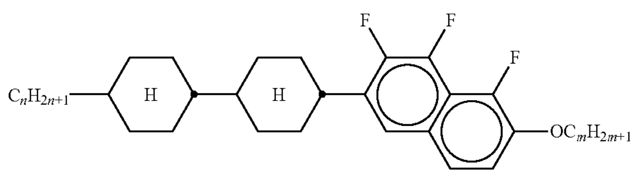
CCNaph-*n*-O*m*
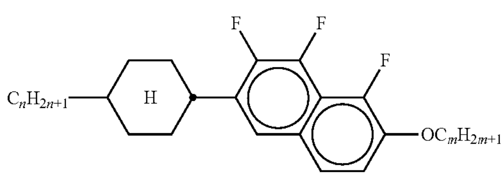
CNaph-*n*-O*m*
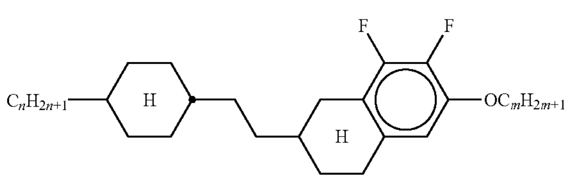
CETNaph-*n*-O*m*
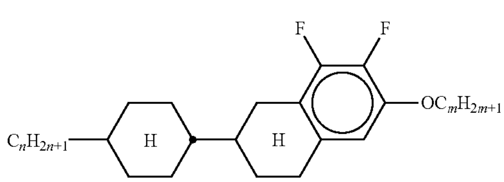
CTNaph-*n*-O*m*

TABLE A-continued
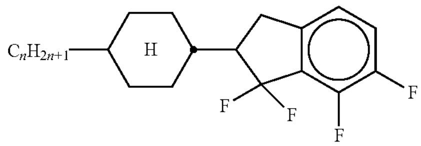
CK-*n*-F
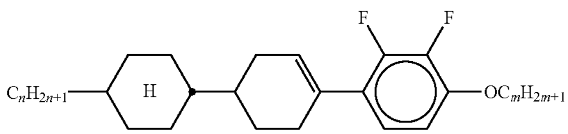
CLY-*n*-O*m*
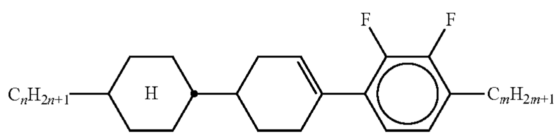
CLY-*n*-*m*
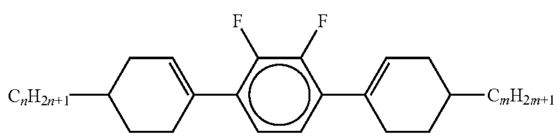
LYLI-*n*-*m*
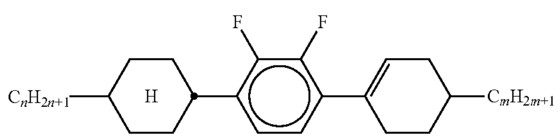
CYLI-*n*-*m*
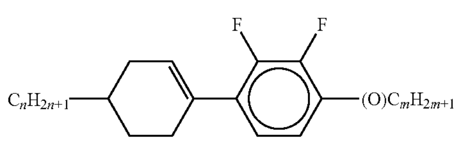
LY-*n*-(O)*m*
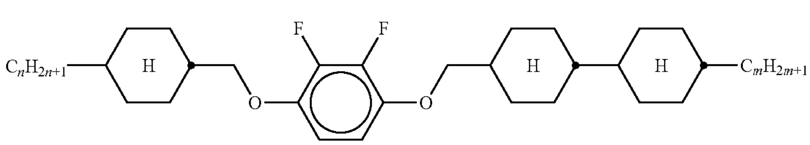
COYOICC-*n*-*m*
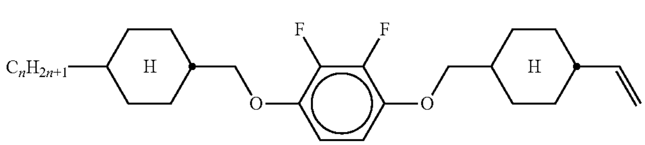
COYOIC-*n*-V TABLE A-continued
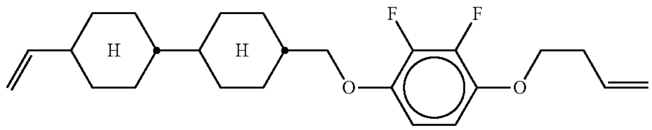
CCOY-V-O2V
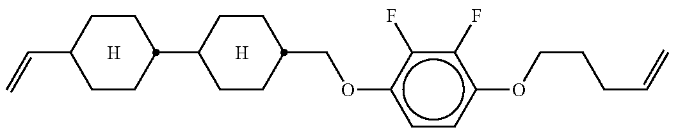
CCOY-V-O3V
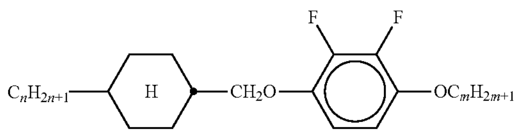
COY-*n*-O*m*
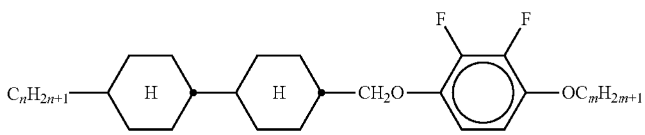
CCOY-*n*-O*m*
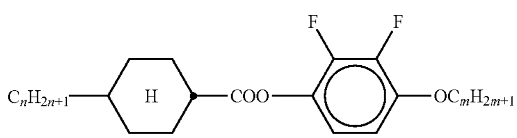
D-*n*O*m*FF
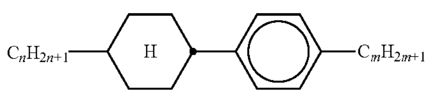
PCH-*nm*
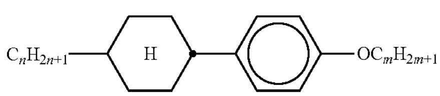
PCH-*n*O*m*
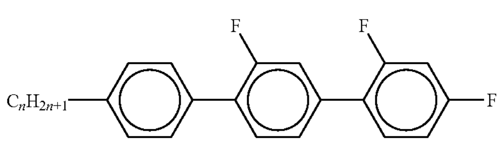
PGIGI-*n*-F
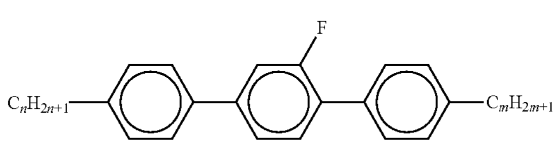
PGP-*n*-*m*

TABLE A-continued
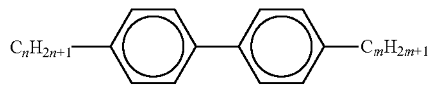
PP-n-m
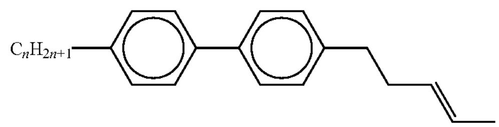
PP-n-2V1
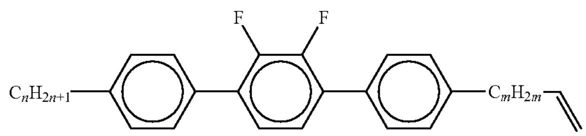
PYP-n-mV
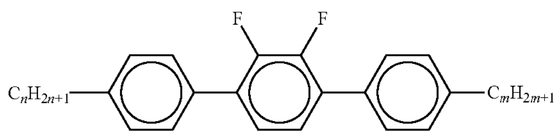
PYP-n-m
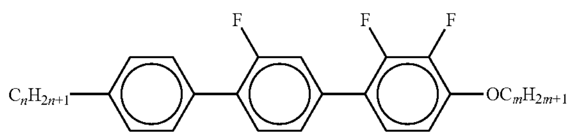
PGIY-n-Om
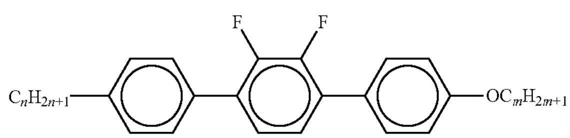
PYP-n-Om
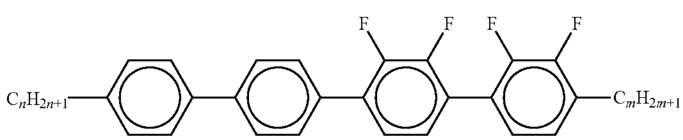
PPYY-n-m
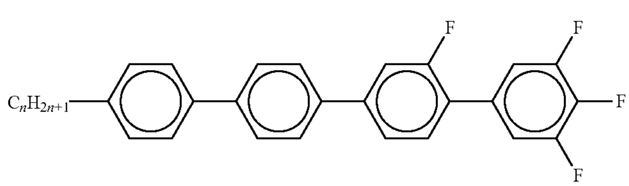
PPGU-n-F TABLE A-continued
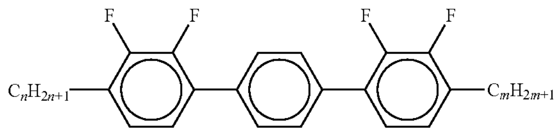
YPY-*n*-*m*
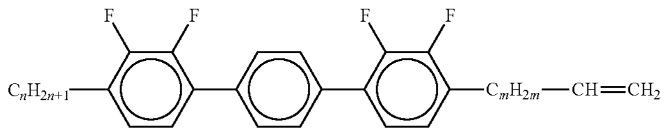
YPY-*n*-*m*V
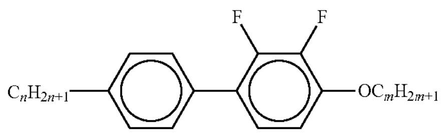
PY-*n*-O*m*
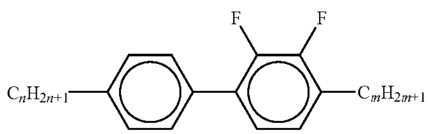
PY-*n*-*m*
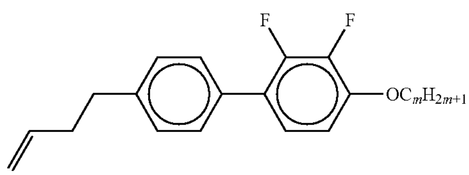
PY-V2-O*m*
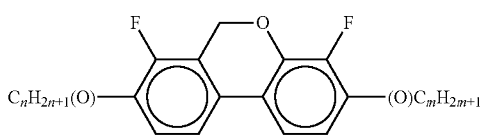
DFDBC-*n*(O)-(O)*m*
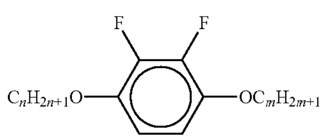
Y-*n*O-O*m*
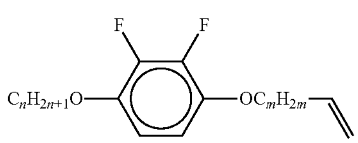
Y-*n*O-O*m*V TABLE A-continued
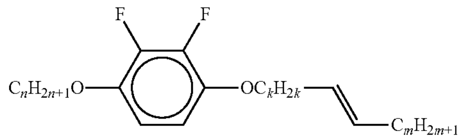
Y-*n*O-O*k*V*m*
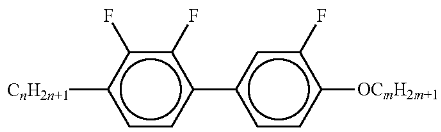
YG-*n*-O*m*
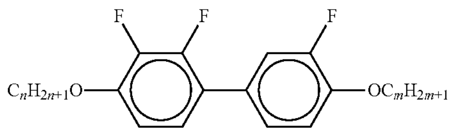
YG-*n*O-O*m*
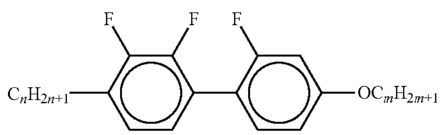
YGI-*n*-O*m*
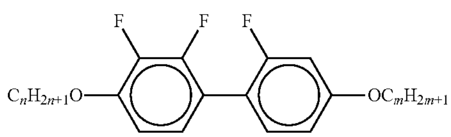
YGI-*n*O-O*m*
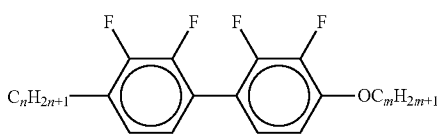
YY-*n*-O*m*
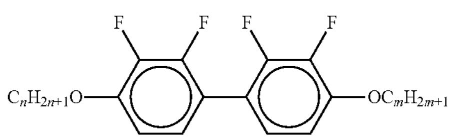
YY-*n*O-O*m*
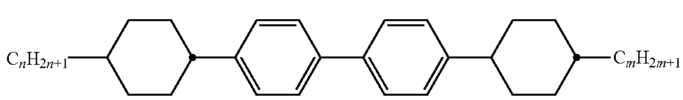
CPPC-*n*-*m*
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
Preferably the LC media according to the invention comprise one or more compounds selected from the group consisting of compounds from Table A.

TABLE B
| Table B shows chiral dopants which can be added to the LC media according to the invention. |
|---|
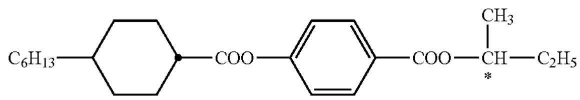
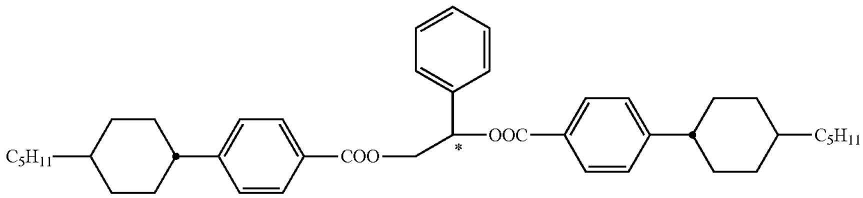
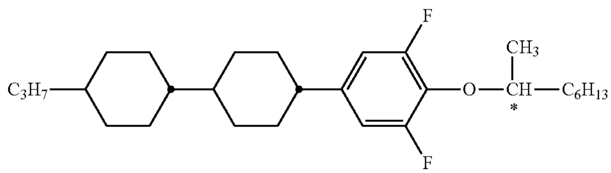
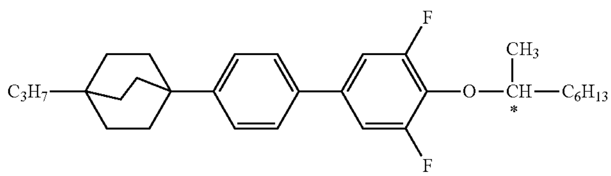
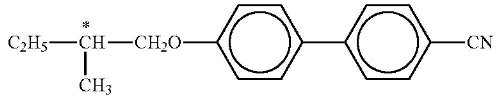
C 15
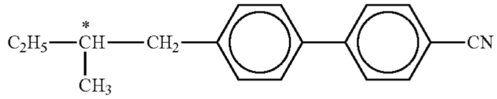
CB 15
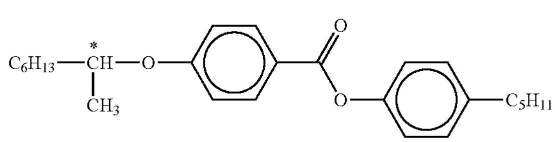
CM 21
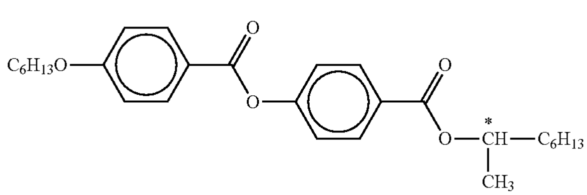
R/S-811
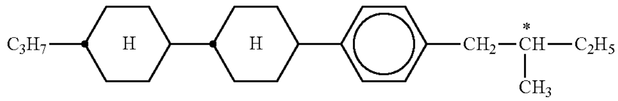
CM 44

TABLE B-continued
| Table B shows chiral dopants which can be added to the LC media according to the invention. |
|---|
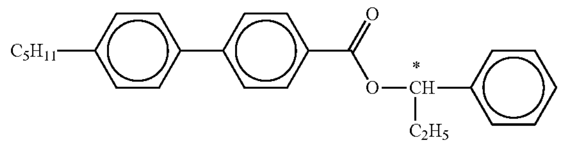
CM 45
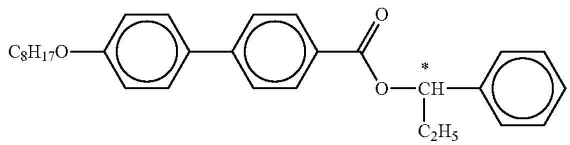
CM 47
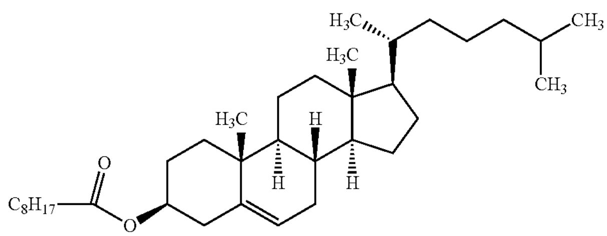
CN
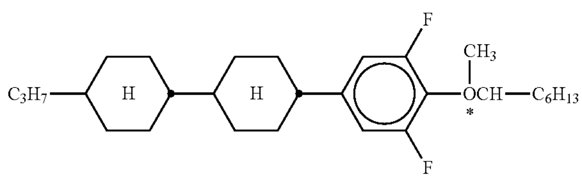
R/S-2011
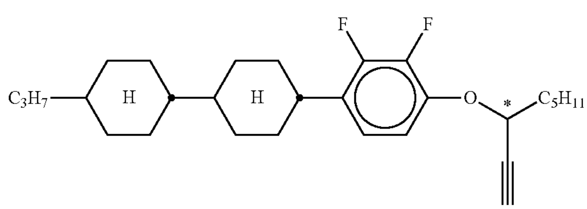
R/S-3011
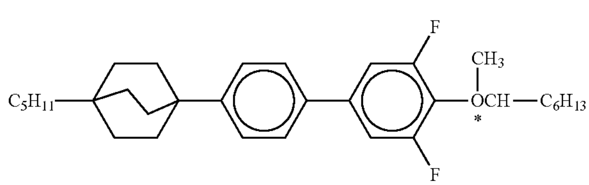
R/S-4011

TABLE B-continued
| Table B shows chiral dopants which can be added to the LC media according to the invention. |
| --- |
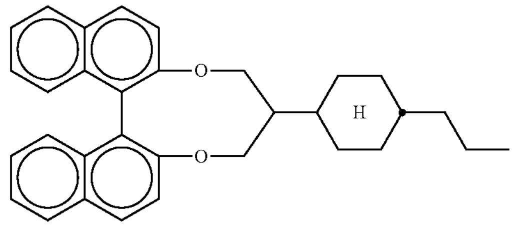
R/S-5011
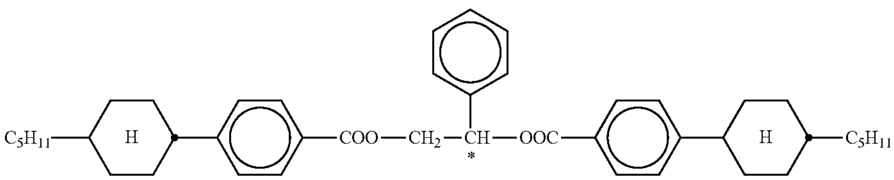
R/S-1011
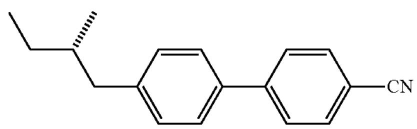 [SMILES: CC[C@H](C)Cc1ccc(-c2ccc(C#N)cc2)cc1]
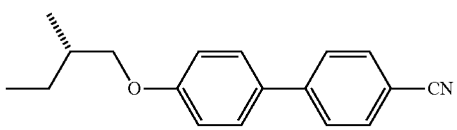 [SMILES: CC[C@H](C)COc1ccc(-c2ccc(C#N)cc2)cc1]
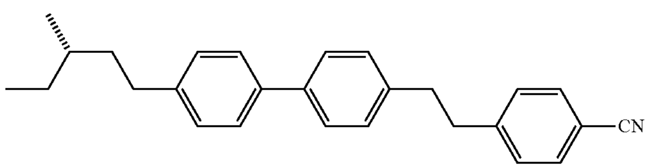 [SMILES: CC[C@H](C)CCc1ccc(-c2ccc(CCc3ccc(C#N)cc3)cc2)cc1]
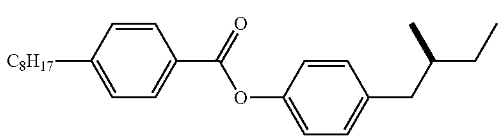
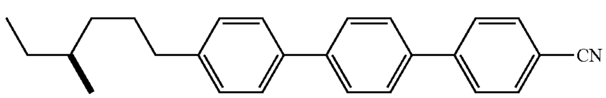
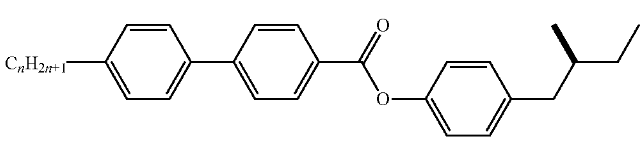
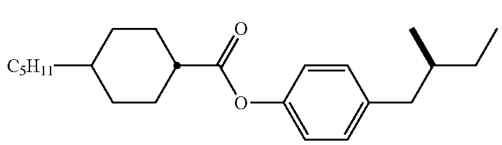

TABLE B-continued
| Table B shows chiral dopants which can be added to the LC media according to the invention. |
| --- |
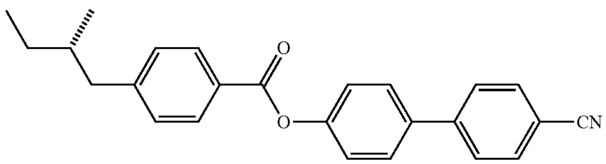 [SMILES: CC[C@H](C)Cc1ccc(C(=O)Oc2ccc(-c3ccc(C#N)cc3)cc2)cc1]
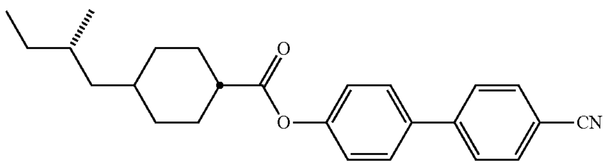
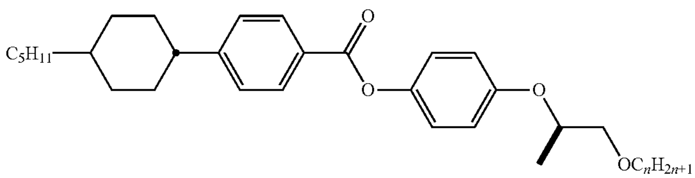
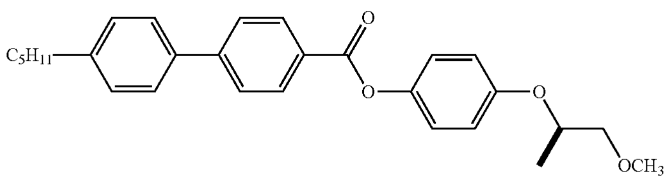
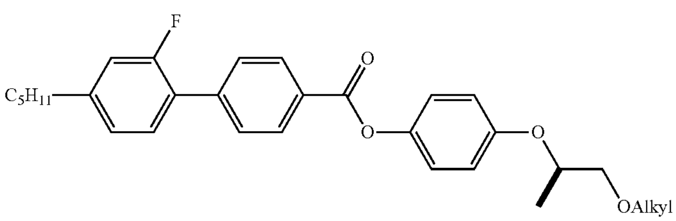
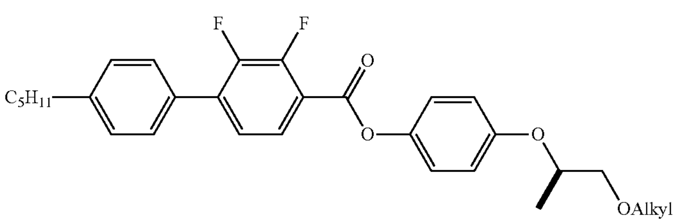
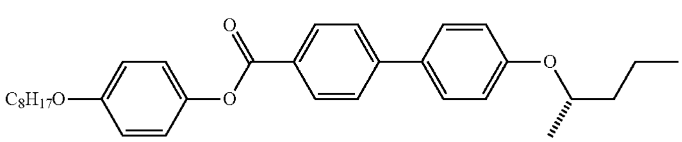
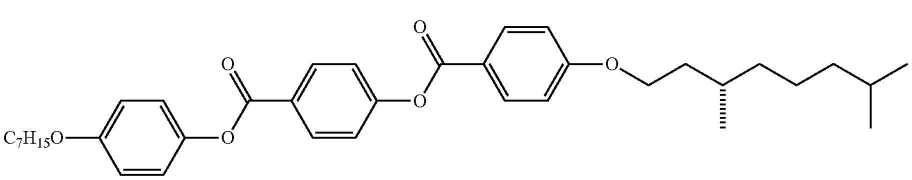

TABLE B-continued
Table B shows chiral dopants which can be added to the LC media according to the invention.
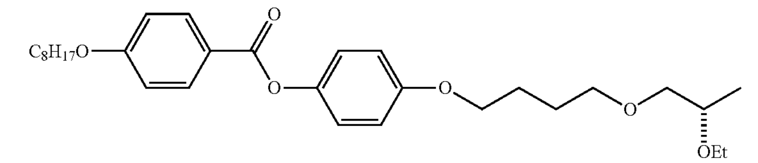
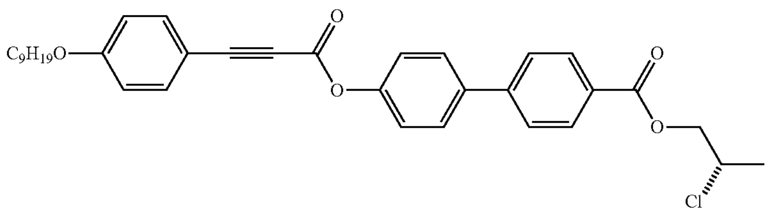
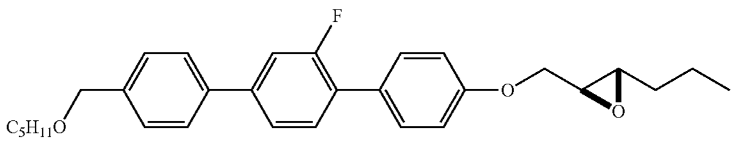
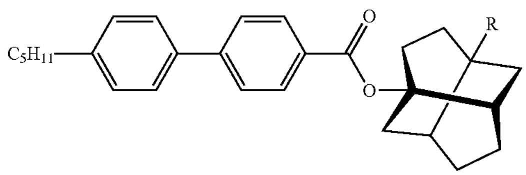
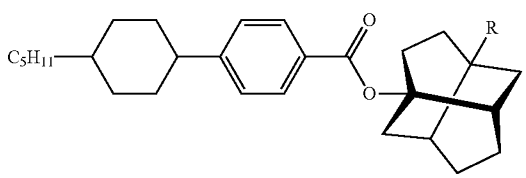
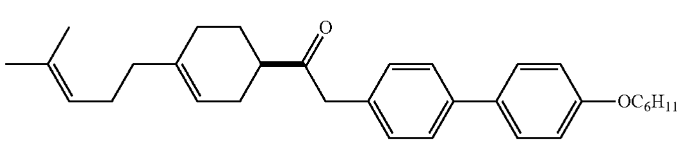
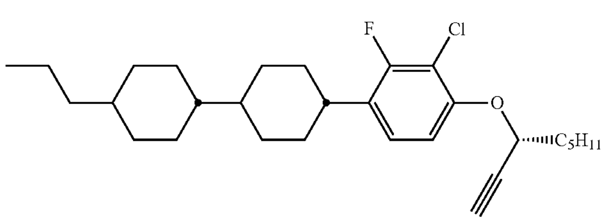

TABLE C
| |
|---|
| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
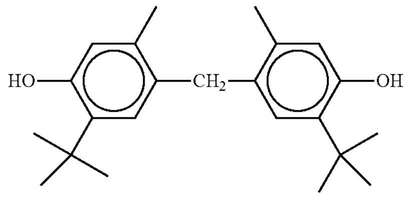
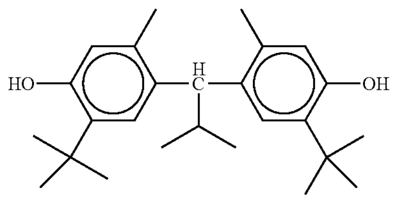
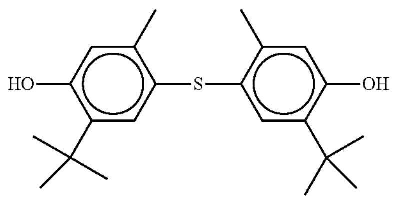
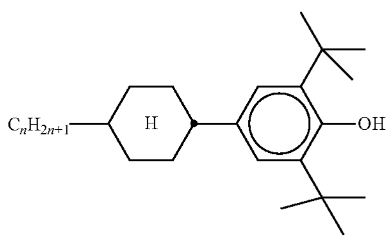
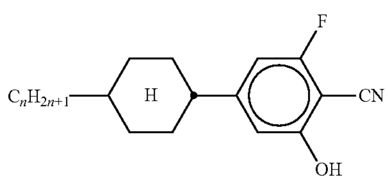
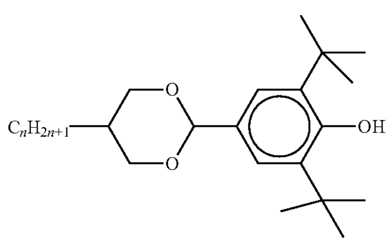
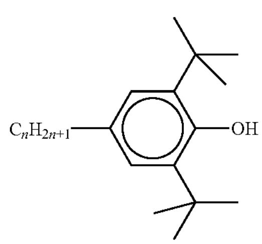

TABLE C-continued
| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
|---|
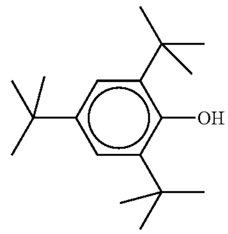
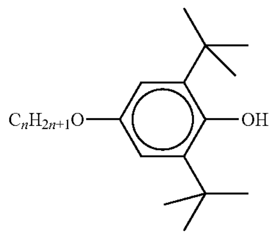
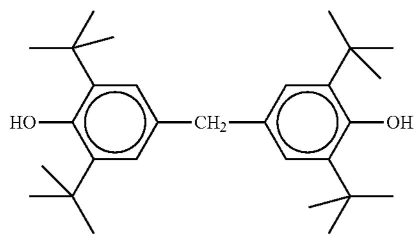
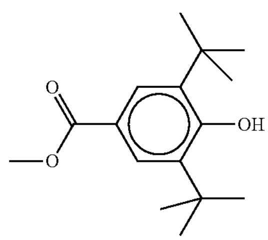
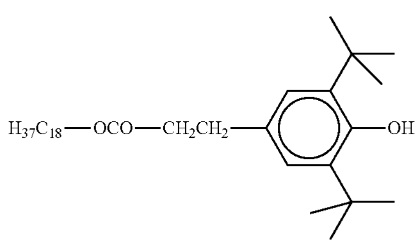
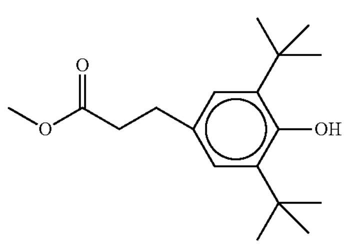

TABLE C-continued
| |
|---|
| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
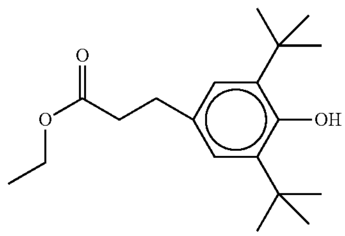
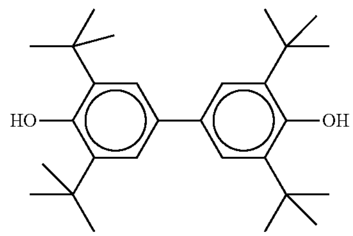
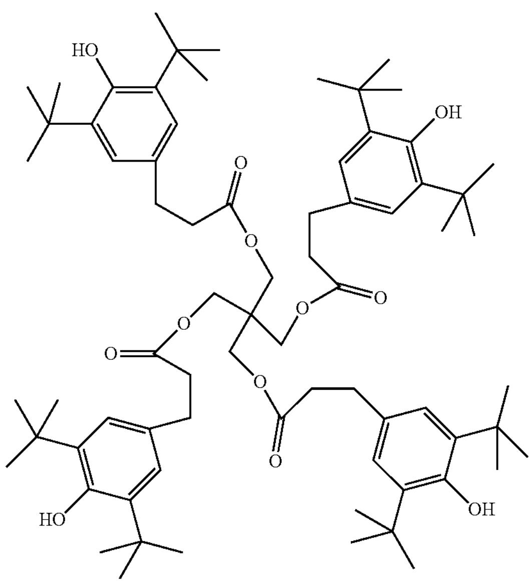 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
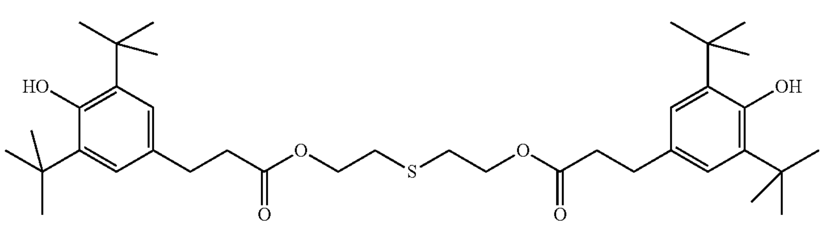 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
| --- |
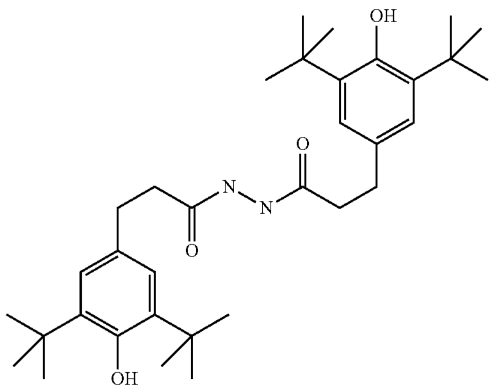 [SMILES: CC(C)(C)c1cc(CCC(=O)NNC(=O)CCc2cc(C(C)(C)C)c(O)c(C(C)(C)C)c2)cc(C(C)(C)C)c1O]
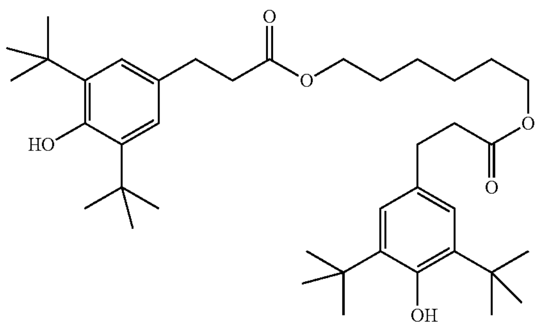 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
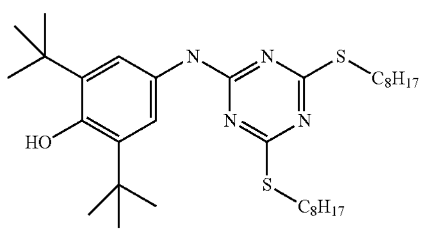
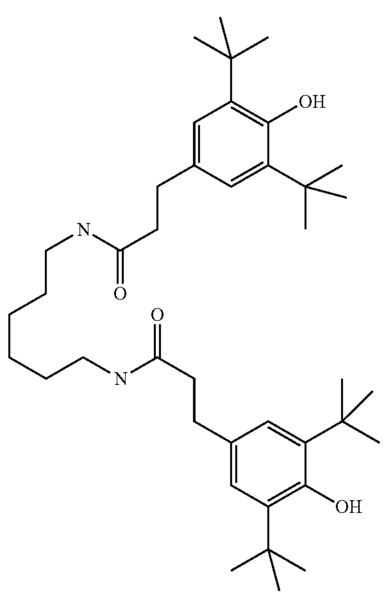 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE C-continued
| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
| --- |
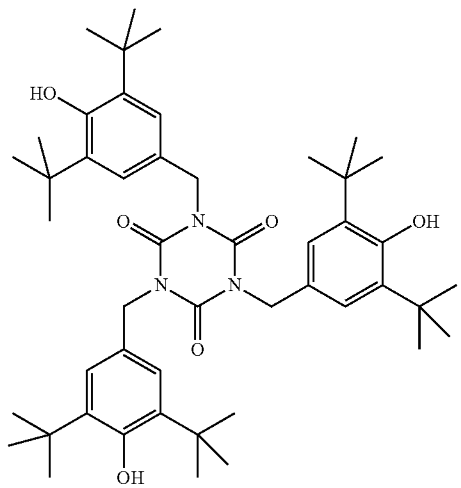 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
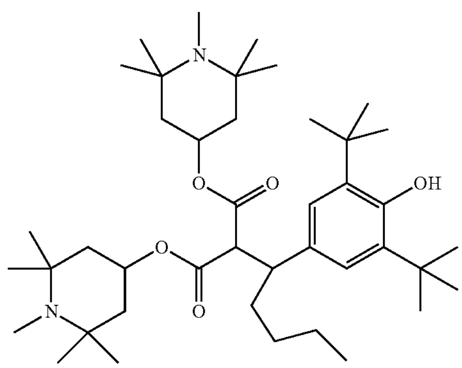 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
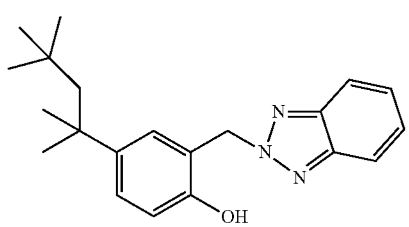 [SMILES: CC(C)(C)CC(C)(C)c1ccc(O)c(Cn2nc3ccccc3n2)c1]
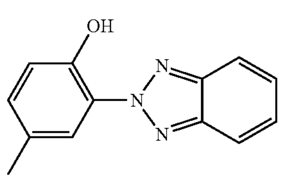 [SMILES: Cc1ccc(O)c(-n2nc3ccccc3n2)c1]
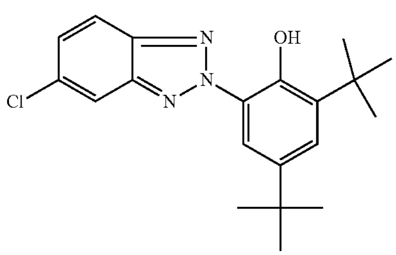 [SMILES: CC(C)(C)c1cc(-n2nc3ccc(Cl)cc3n2)c(O)c(C(C)(C)C)c1]

TABLE C-continued
| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
| --- |
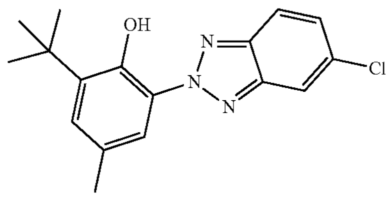 [SMILES: Cc1cc(-n2nc3ccc(Cl)cc3n2)c(O)c(C(C)(C)C)c1]
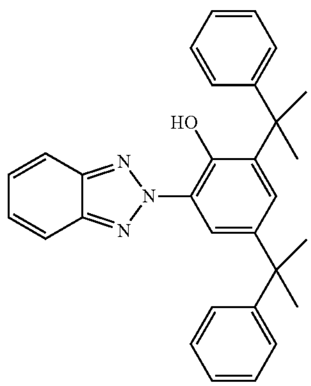 [SMILES: CC(C)(c1ccccc1)c1cc(-n2nc3ccccc3n2)c(O)c(C(C)(C)c2ccccc2)c1]
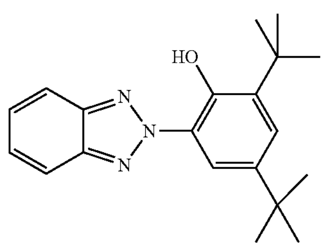 [SMILES: CC(C)(C)c1cc(-n2nc3ccccc3n2)c(O)c(C(C)(C)C)c1]
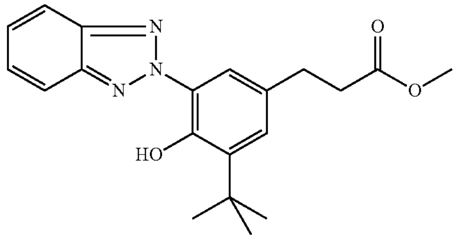 [SMILES: COC(=O)CCc1cc(-n2nc3ccccc3n2)c(O)c(C(C)(C)C)c1]
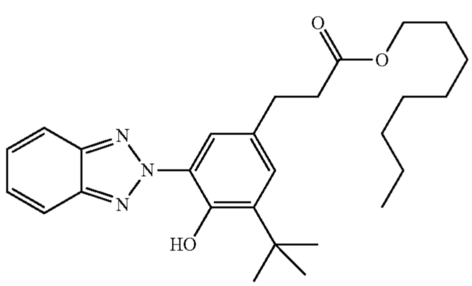 [SMILES: CCCCCCCCOC(=O)CCc1cc(-n2nc3ccccc3n2)c(O)c(C(C)(C)C)c1]

TABLE C-continued
| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
| --- |
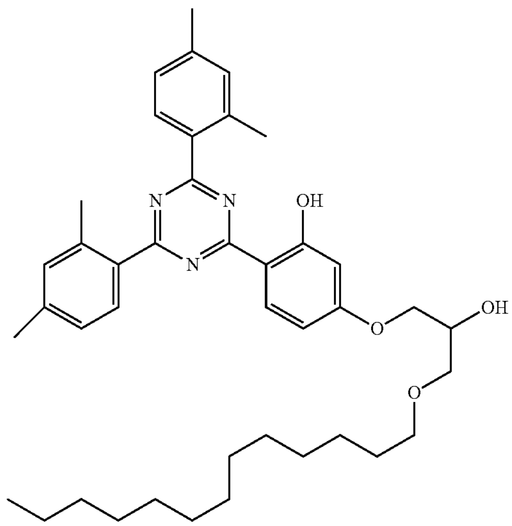 [SMILES: CCCCCCCCCCCCCOCC(O)COc1ccc(-c2nc(-c3ccc(C)cc3C)nc(-c3ccc(C)cc3C)n2)c(O)c1]
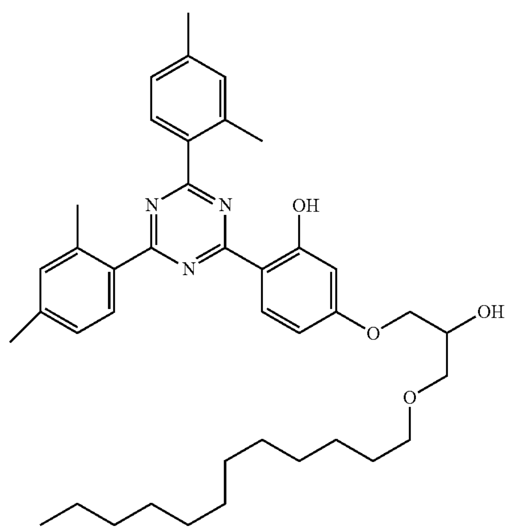 [SMILES: CCCCCCCCCCCCOCC(O)COc1ccc(-c2nc(-c3ccc(C)cc3C)nc(-c3ccc(C)cc3C)n2)c(O)c1]
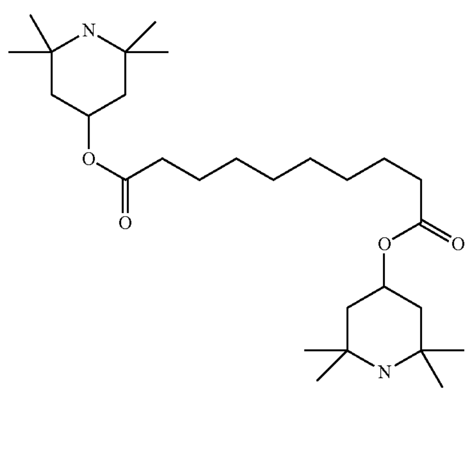

TABLE C-continued
| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
|---|
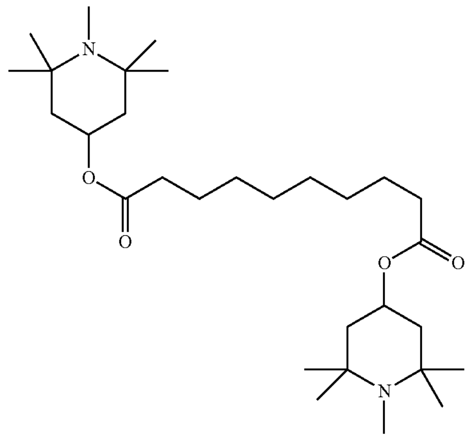
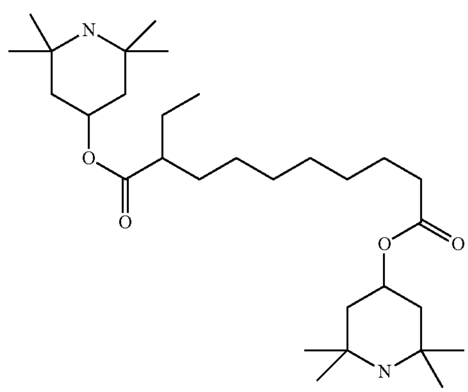
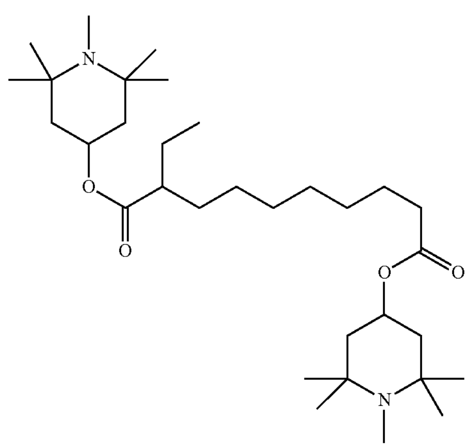

TABLE C-continued
| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
|---|
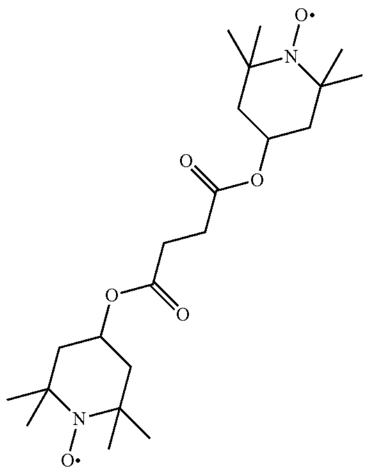
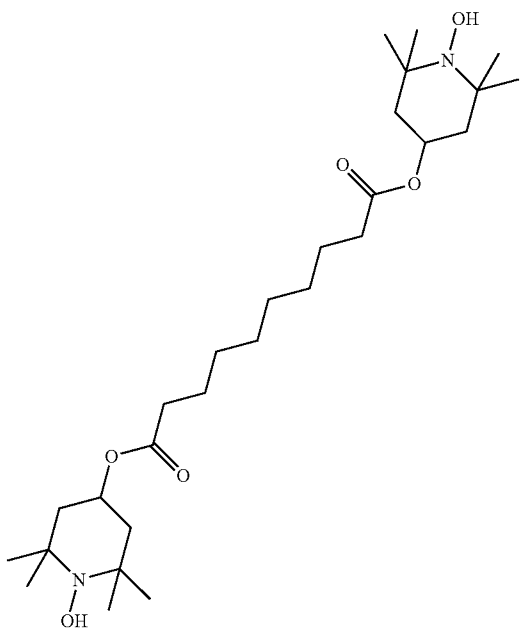
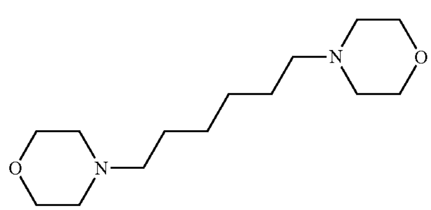 [SMILES: C(CCCN1CCOCC1)CCN1CCOCC1]

TABLE C-continued
| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
| --- |
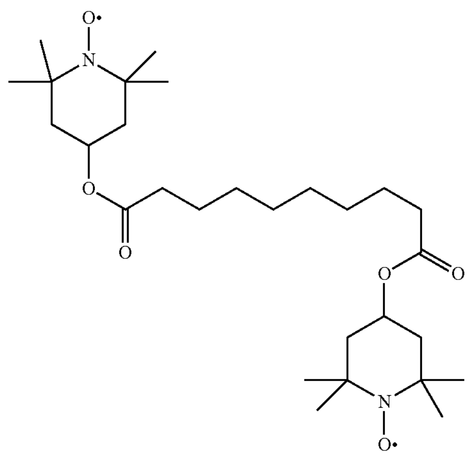
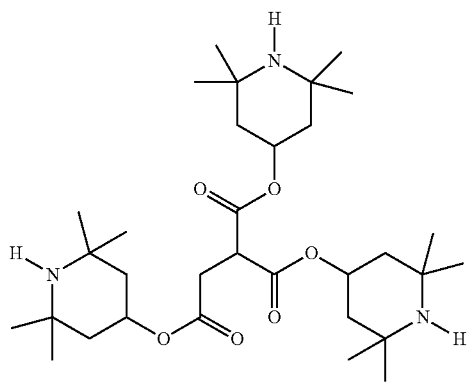
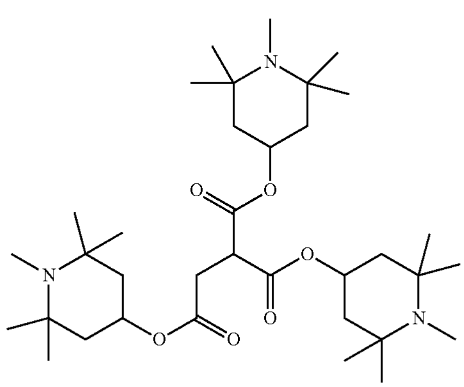

TABLE C-continued
| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
|---|
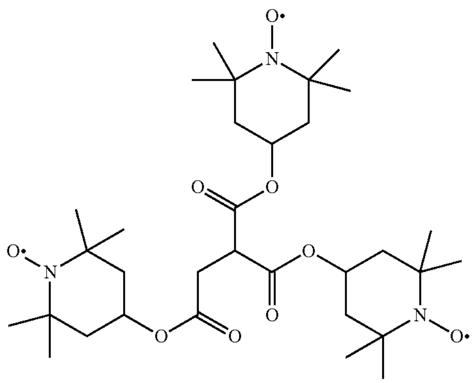
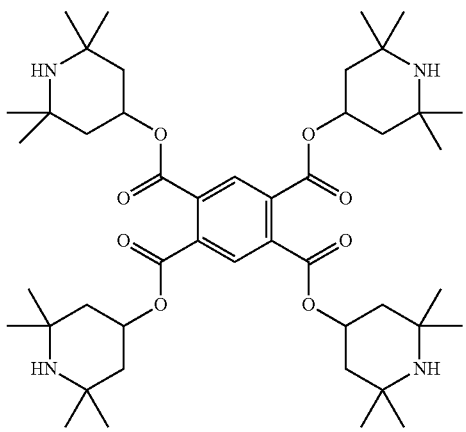
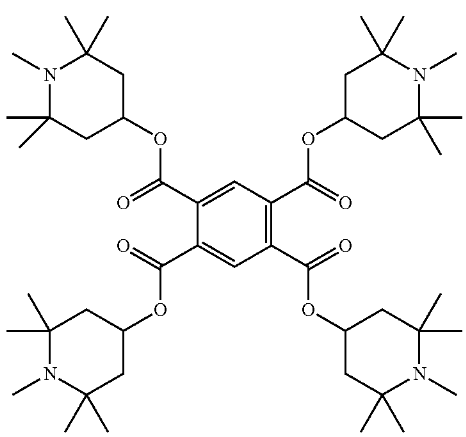

TABLE C-continued

| Table C shows possible stabilizers which can be added to the LC media according to the invention. Therein n denotes an integer from 1 to 12, preferably 1, 2, 3, 4, 5, 6, 7 or 8, and terminal methyl groups are not shown. |
| --- |
| 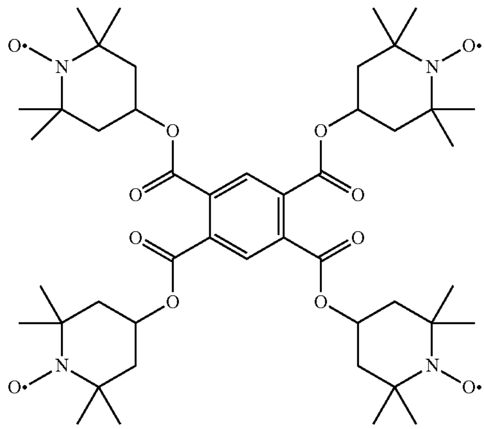 |
| 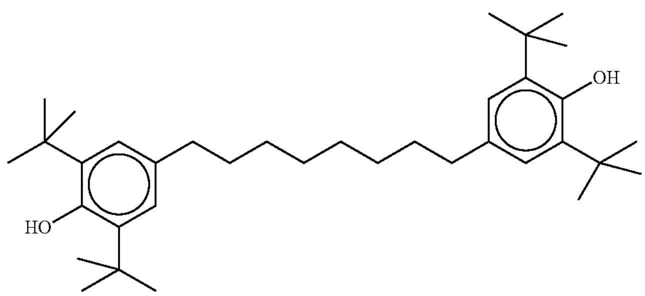 |

The LC media preferably comprise 0 to 10% by weight, in particular 1 ppm to 5% by weight, particularly preferably 1 ppm to 1% by weight, of stabilizers. The LC media preferably comprise one or more stabilizers selected from the group consisting of compounds from Table C.

TABLE D

| Table D shows illustrative reactive mesogenic compounds of formula R which can be used in the LC media in accordance with the present invention. | |
| --- | --- |
| 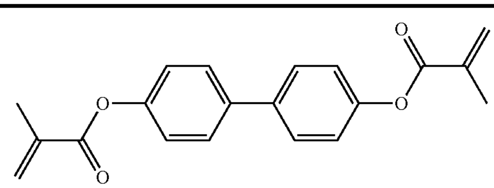 | RM-1 |
| 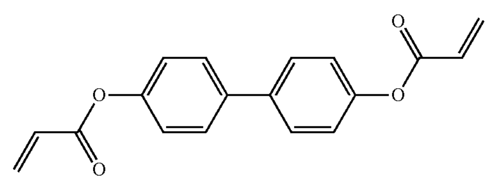 [SMILES: C=CC(=O)Oc1ccc(-c2ccc(OC(=O)C=C)cc2)cc1] | RM-2 |
| 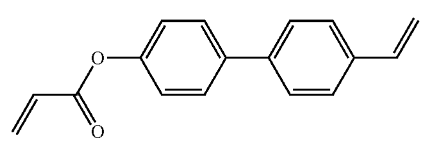 [SMILES: C=CC(=O)Oc1ccc(-c2ccc(C=C)cc2)cc1] | RM-3 |

TABLE D-continued
| Table D shows illustrative reactive mesogenic compounds of formula R which can be used in the LC media in accordance with the present invention. |
| --- |
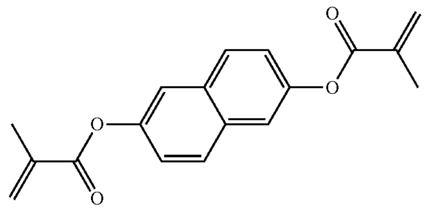 [SMILES: C=C(C)C(=O)Oc1ccc2cc(OC(=O)C(=C)C)ccc2c1]
RM-4
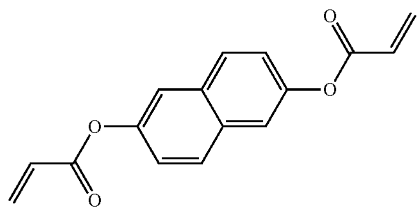 [SMILES: C=CC(=O)Oc1ccc2cc(OC(=O)C=C)ccc2c1]
RM-5
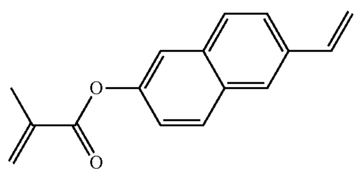 [SMILES: C=Cc1ccc2cc(OC(=O)C(=C)C)ccc2c1]
RM-6
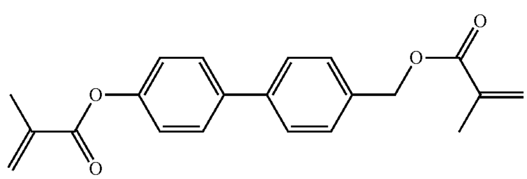 [SMILES: C=C(C)C(=O)OCc1ccc(-c2ccc(OC(=O)C(=C)C)cc2)cc1]
RM-7
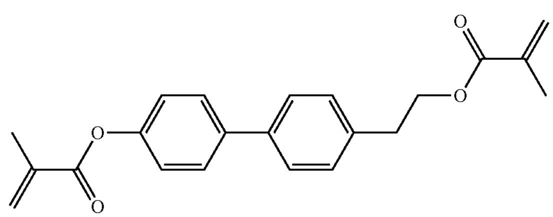 [SMILES: C=C(C)C(=O)OCCc1ccc(-c2ccc(OC(=O)C(=C)C)cc2)cc1]
RM-8
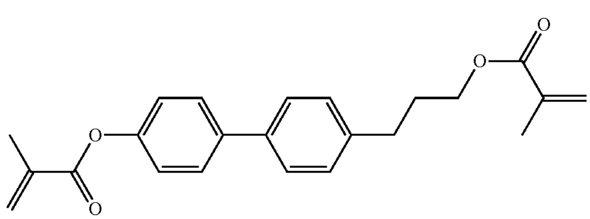 [SMILES: C=C(C)C(=O)OCCCc1ccc(-c2ccc(OC(=O)C(=C)C)cc2)cc1]
RM-9
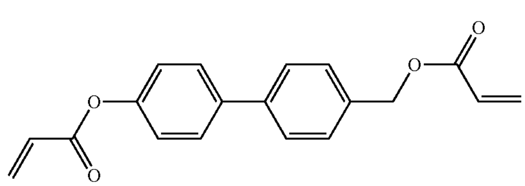 [SMILES: C=CC(=O)OCc1ccc(-c2ccc(OC(=O)C=C)cc2)cc1]
RM-10

TABLE D-continued
Table D shows illustrative reactive mesogenic compounds of formula R which can be used in the LC media in accordance with the present invention.
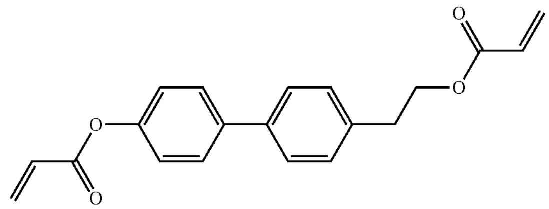 [SMILES: C=CC(=O)OCCc1ccc(-c2ccc(OC(=O)C=C)cc2)cc1]
RM-11
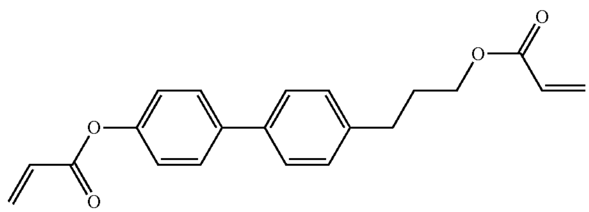 [SMILES: C=CC(=O)OCCCc1ccc(-c2ccc(OC(=O)C=C)cc2)cc1]
RM-12
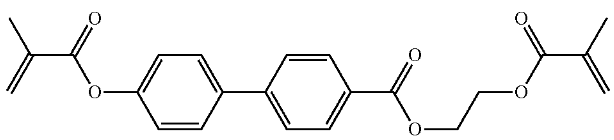 [SMILES: C=C(C)C(=O)OCCOC(=O)c1ccc(-c2ccc(OC(=O)C(=C)C)cc2)cc1]
RM-13
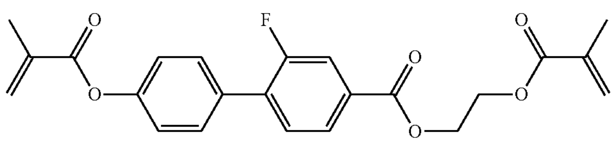 [SMILES: C=C(C)C(=O)OCCOC(=O)c1ccc(-c2ccc(OC(=O)C(=C)C)cc2)c(F)c1]
RM-14
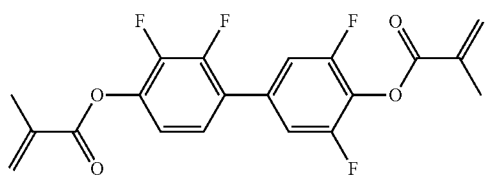
RM-15
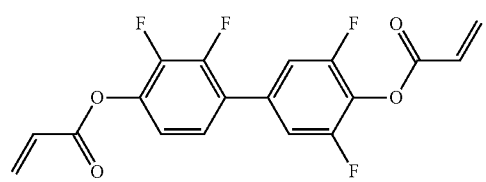 [SMILES: C=CC(=O)Oc1ccc(-c2cc(F)c(OC(=O)C=C)c(F)c2)c(F)c1F]
RM-16
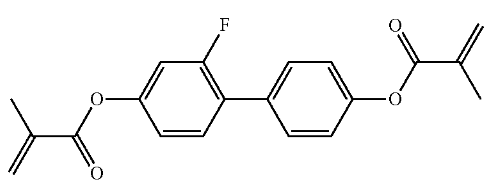
RM-17
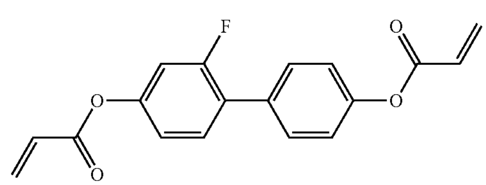
RM-18

TABLE D-continued
Table D shows illustrative reactive mesogenic compounds of formula R which can be used in the LC media in accordance with the present invention.
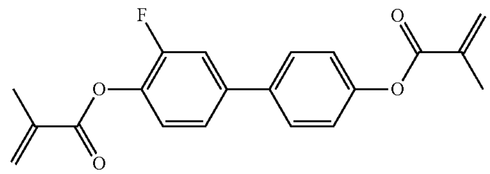
RM-19
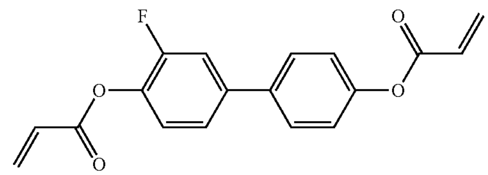 [SMILES: C=CC(=O)Oc1ccc(-c2ccc(OC(=O)C=C)c(F)c2)cc1]
RM-20
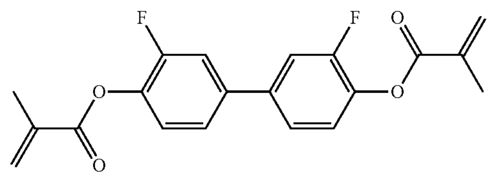
RM-21
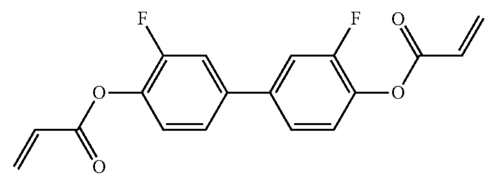
RM-22
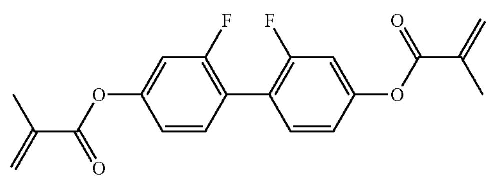 [SMILES: C=C(C)C(=O)Oc1ccc(-c2ccc(OC(=O)C(=C)C)cc2F)c(F)c1]
RM-23
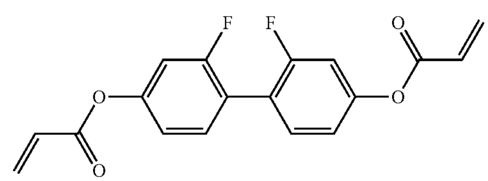 [SMILES: C=CC(=O)Oc1ccc(-c2ccc(OC(=O)C=C)cc2F)c(F)c1]
RM-24
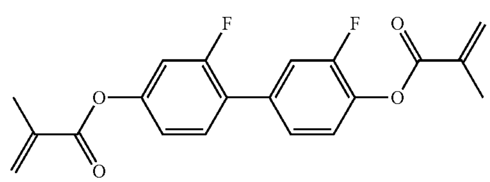 [SMILES: C=C(C)C(=O)Oc1ccc(-c2ccc(OC(=O)C(=C)C)c(F)c2)c(F)c1]
RM-25
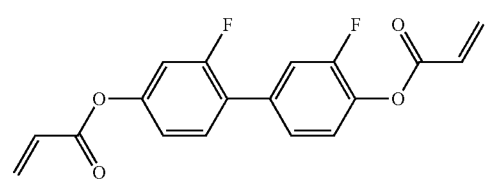 [SMILES: C=CC(=O)Oc1ccc(-c2ccc(OC(=O)C=C)c(F)c2)c(F)c1]
RM-26

TABLE D-continued
| Table D shows illustrative reactive mesogenic compounds of formula R which can be used in the LC media in accordance with the present invention. |
| --- |
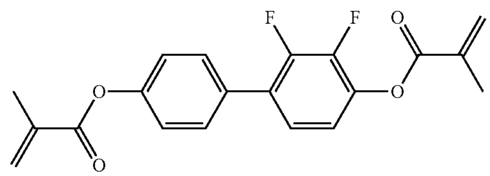
RM-27
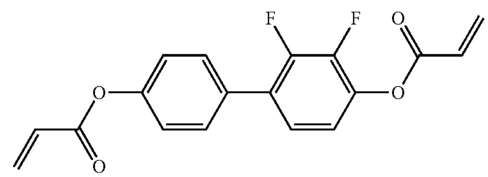 [SMILES: C=CC(=O)Oc1ccc(-c2ccc(OC(=O)C=C)c(F)c2F)cc1]
RM-28
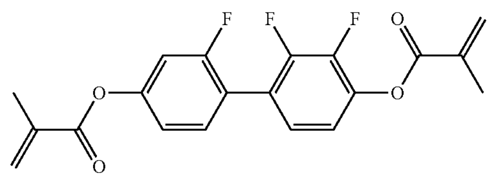 [SMILES: C=C(C)C(=O)Oc1ccc(-c2ccc(OC(=O)C(=C)C)c(F)c2F)c(F)c1]
RM-29
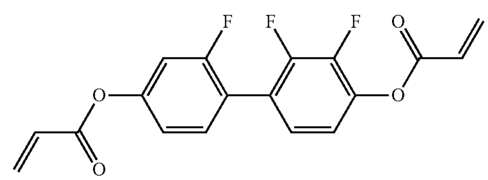
RM-30
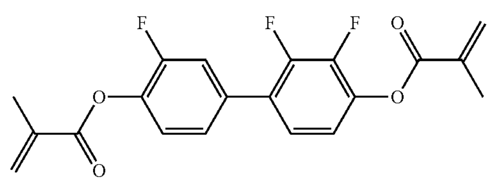
RM-31
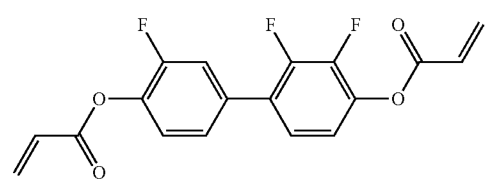
RM-32
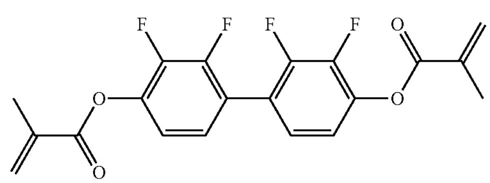 [SMILES: C=C(C)C(=O)Oc1ccc(-c2ccc(OC(=O)C(=C)C)c(F)c2F)cc1F]
RM-33
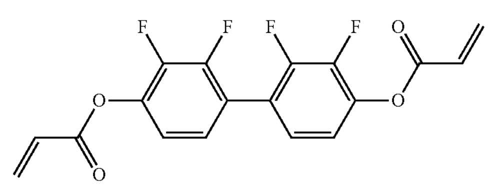 [SMILES: C=CC(=O)Oc1ccc(-c2ccc(OC(=O)C=C)c(F)c2F)c(F)c1F]
RM-34

TABLE D-continued
Table D shows illustrative reactive mesogenic compounds of formula R which can be used in the LC media in accordance with the present invention.
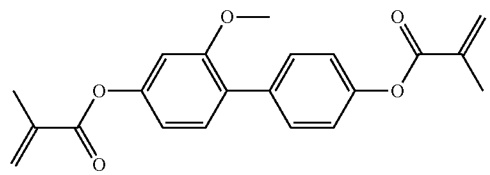 [SMILES: C=C(C)C(=O)Oc1ccc(-c2ccc(OC(=O)C(=C)C)cc2OC)cc1]
RM-35
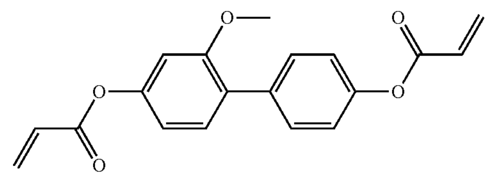 [SMILES: C=CC(=O)Oc1ccc(-c2ccc(OC(=O)C=C)cc2OC)cc1]
RM-36
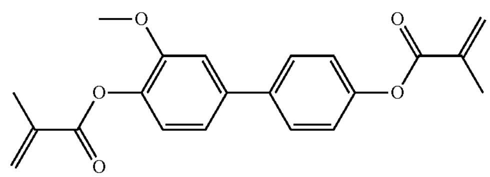 [SMILES: C=C(C)C(=O)Oc1ccc(-c2ccc(OC(=O)C(=C)C)c(OC)c2)cc1]
RM-37
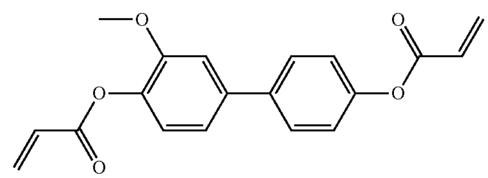 [SMILES: C=CC(=O)Oc1ccc(-c2ccc(OC(=O)C=C)c(OC)c2)cc1]
RM-38
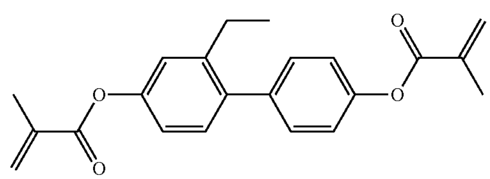 [SMILES: C=C(C)C(=O)Oc1ccc(-c2ccc(OC(=O)C(=C)C)cc2CC)cc1]
RM-39
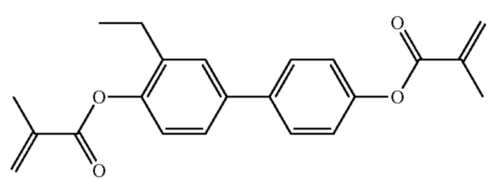
RM-40
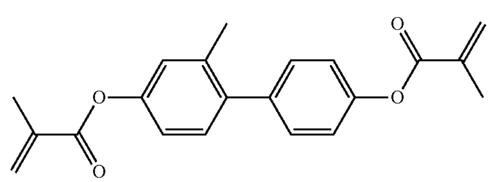 [SMILES: C=C(C)C(=O)Oc1ccc(-c2ccc(OC(=O)C(=C)C)cc2C)cc1]
RM-41
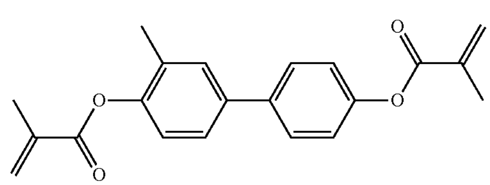
RM-42

TABLE D-continued
| Table D shows illustrative reactive mesogenic compounds of formula R which can be used in the LC media in accordance with the present invention. |
|---|
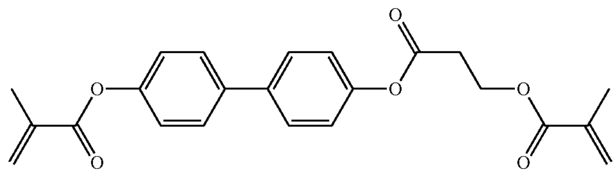 [SMILES: C=C(C)C(=O)OCCC(=O)Oc1ccc(-c2ccc(OC(=O)C(=C)C)cc2)cc1]
RM-43
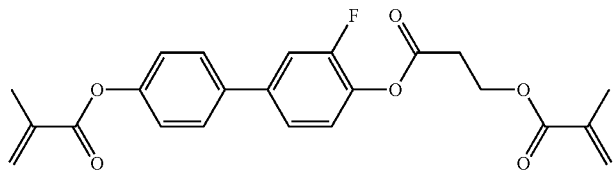 [SMILES: C=C(C)C(=O)OCCC(=O)Oc1ccc(-c2ccc(OC(=O)C(=C)C)cc2)cc1F]
RM-44
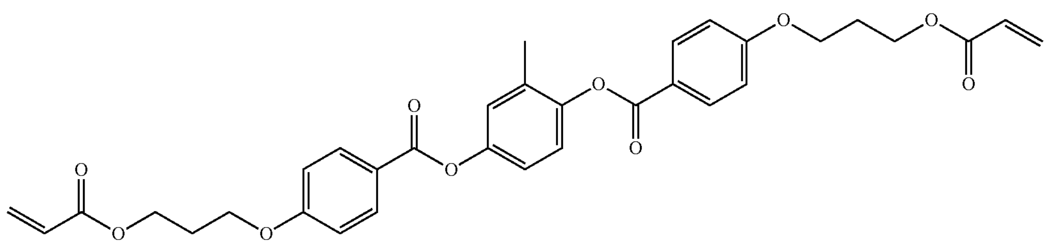 [SMILES: C=CC(=O)OCCCOc1ccc(C(=O)Oc2ccc(OC(=O)c3ccc(OCCCOC(=O)C=C)cc3)c(C)c2)cc1]
RM-45
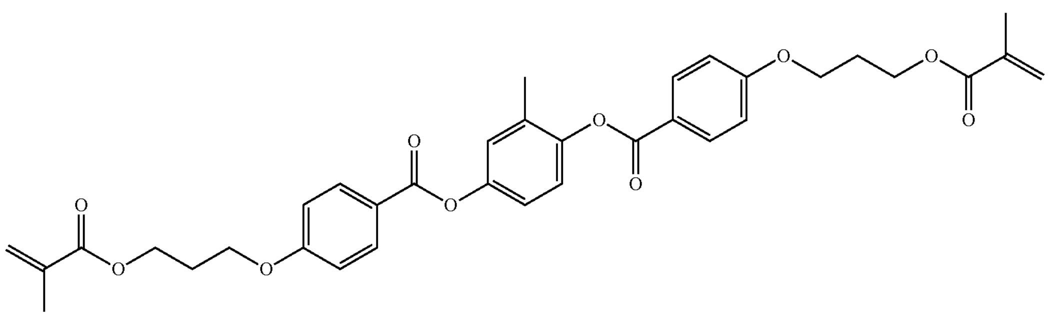 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-46
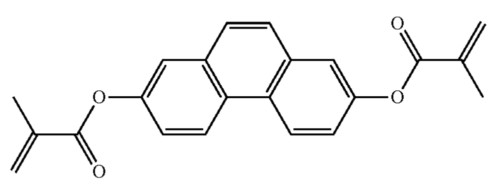 [SMILES: C=C(C)C(=O)Oc1ccc2c(ccc3cc(OC(=O)C(=C)C)ccc32)c1]
RM-47
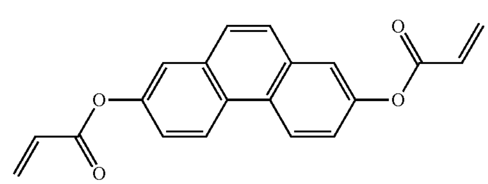 [SMILES: C=CC(=O)Oc1ccc2c(ccc3cc(OC(=O)C=C)ccc32)c1]
RM-48
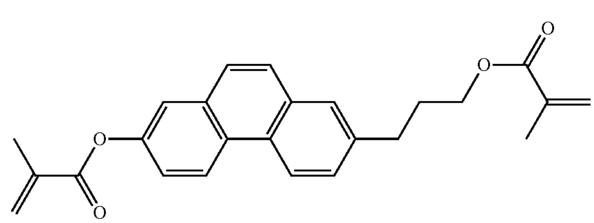 [SMILES: C=C(C)C(=O)OCCCc1ccc2c(ccc3cc(OC(=O)C(=C)C)ccc32)c1]
RM-49

TABLE D-continued
| Table D shows illustrative reactive mesogenic compounds of formula R which can be used in the LC media in accordance with the present invention. |
| --- |
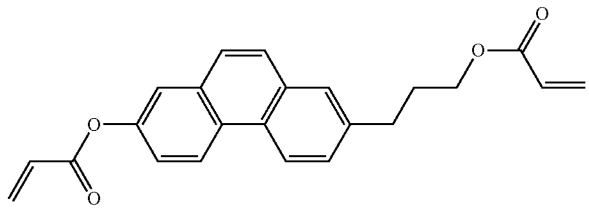 [SMILES: C=CC(=O)OCCCc1ccc2c(ccc3cc(OC(=O)C=C)ccc32)c1]
RM-50
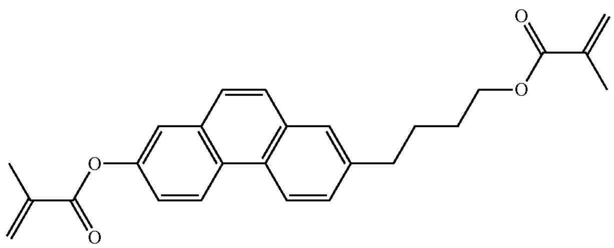 [SMILES: C=C(C)C(=O)OCCCCc1ccc2c(ccc3cc(OC(=O)C(=C)C)ccc32)c1]
RM-51
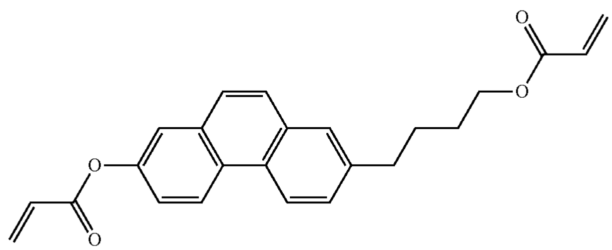 [SMILES: C=CC(=O)OCCCCc1ccc2c(ccc3cc(OC(=O)C=C)ccc32)c1]
RM-52
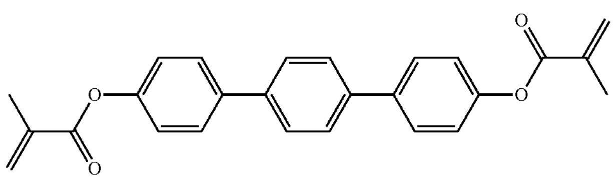 [SMILES: C=C(C)C(=O)Oc1ccc(-c2ccc(-c3ccc(OC(=O)C(=C)C)cc3)cc2)cc1]
RM-53
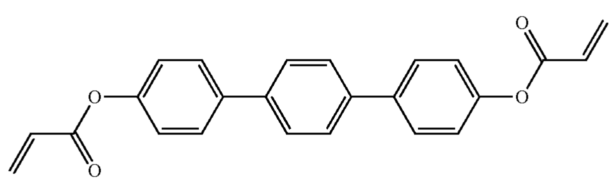
RM-54
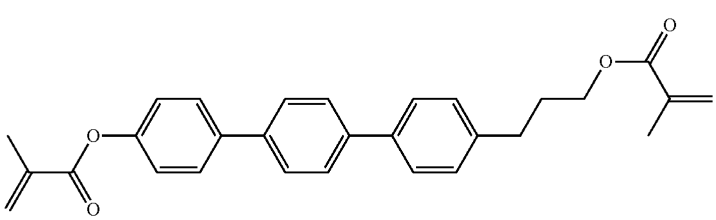 [SMILES: C=C(C)C(=O)OCCCc1ccc(-c2ccc(-c3ccc(OC(=O)C(=C)C)cc3)cc2)cc1]
RM-55
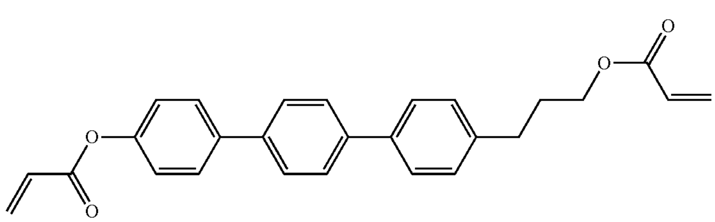 [SMILES: C=CC(=O)OCCCc1ccc(-c2ccc(-c3ccc(OC(=O)C=C)cc3)cc2)cc1]
RM-56

TABLE D-continued
Table D shows illustrative reactive mesogenic compounds of formula R which can be used in the LC media in accordance with the present invention.
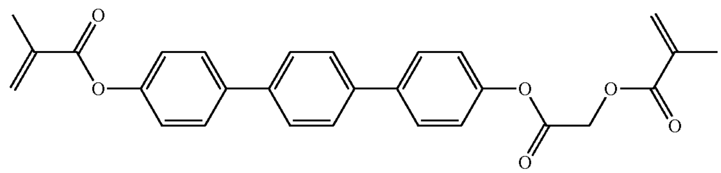 [SMILES: C=C(C)C(=O)OCC(=O)Oc1ccc(-c2ccc(-c3ccc(OC(=O)C(=C)C)cc3)cc2)cc1]
RM-57
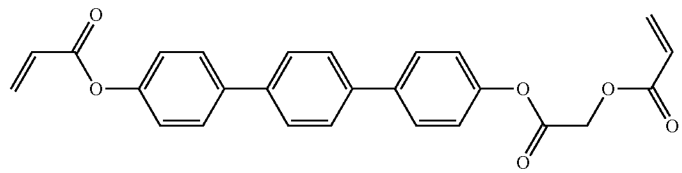 [SMILES: C=CC(=O)OCC(=O)Oc1ccc(-c2ccc(-c3ccc(OC(=O)C=C)cc3)cc2)cc1]
RM-58
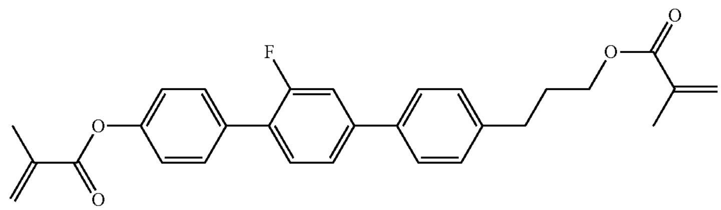 [SMILES: C=C(C)C(=O)OCCCc1ccc(-c2ccc(-c3ccc(OC(=O)C(=C)C)cc3)c(F)c2)cc1]
RM-59
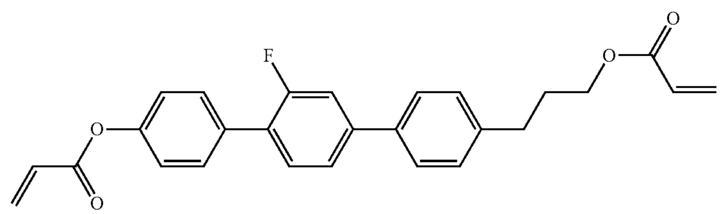 [SMILES: C=CC(=O)OCCCc1ccc(-c2ccc(-c3ccc(OC(=O)C=C)cc3)c(F)c2)cc1]
RM-60
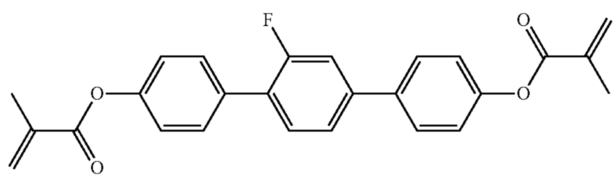 [SMILES: C=C(C)C(=O)Oc1ccc(-c2ccc(-c3ccc(OC(=O)C(=C)C)cc3)c(F)c2)cc1]
RM-61
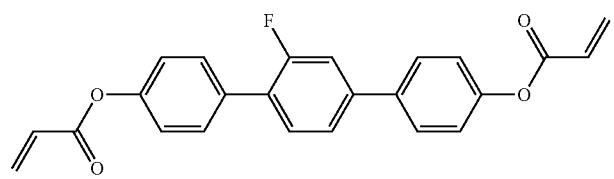 [SMILES: C=CC(=O)Oc1ccc(-c2ccc(-c3ccc(OC(=O)C=C)cc3)c(F)c2)cc1]
RM-62
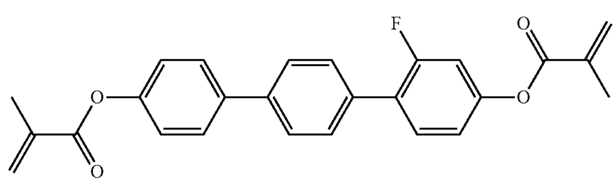 [SMILES: C=C(C)C(=O)Oc1ccc(-c2ccc(-c3ccc(OC(=O)C(=C)C)cc3F)cc2)cc1]
RM-63
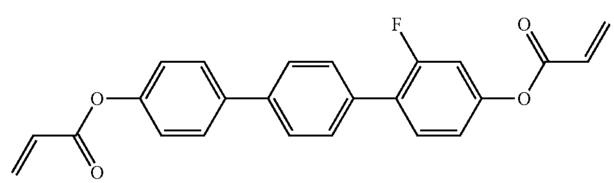
RM-64

TABLE D-continued
| Table D shows illustrative reactive mesogenic compounds of formula R which can be used in the LC media in accordance with the present invention. |
| --- |
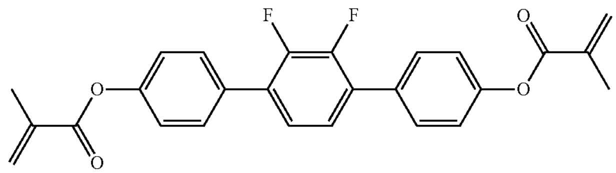 [SMILES: C=C(C)C(=O)Oc1ccc(-c2ccc(-c3ccc(OC(=O)C(=C)C)cc3)c(F)c2F)cc1]
RM-65
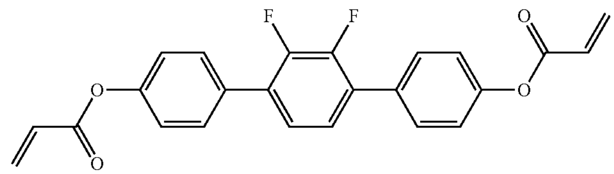 [SMILES: C=CC(=O)Oc1ccc(-c2ccc(-c3ccc(OC(=O)C=C)cc3)c(F)c2F)cc1]
RM-66
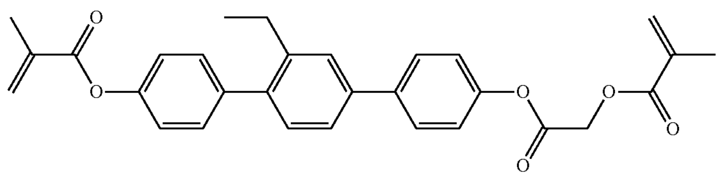 [SMILES: C=C(C)C(=O)OCC(=O)Oc1ccc(-c2ccc(-c3ccc(OC(=O)C(=C)C)cc3)c(CC)c2)cc1]
RM-67
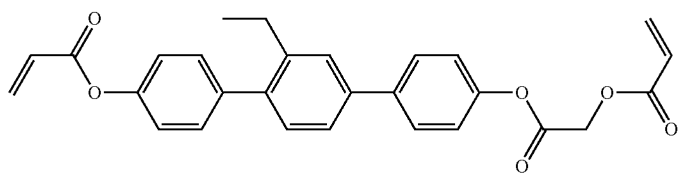 [SMILES: C=CC(=O)OCC(=O)Oc1ccc(-c2ccc(-c3ccc(OC(=O)C=C)cc3)c(CC)c2)cc1]
RM-68
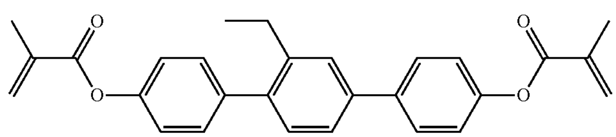 [SMILES: C=C(C)C(=O)Oc1ccc(-c2ccc(-c3ccc(OC(=O)C(=C)C)cc3)c(CC)c2)cc1]
RM-69
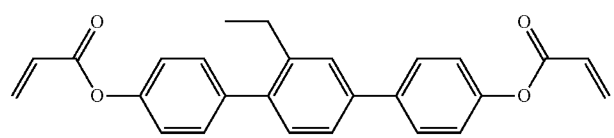 [SMILES: C=CC(=O)Oc1ccc(-c2ccc(-c3ccc(OC(=O)C=C)cc3)c(CC)c2)cc1]
RM-70
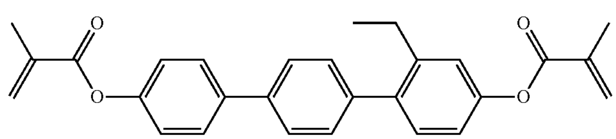 [SMILES: C=C(C)C(=O)Oc1ccc(-c2ccc(-c3ccc(OC(=O)C(=C)C)cc3CC)cc2)cc1]
RM-71
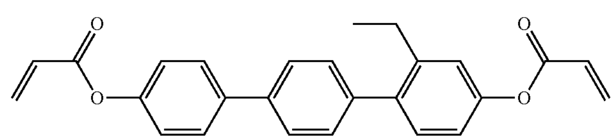 [SMILES: C=CC(=O)Oc1ccc(-c2ccc(-c3ccc(OC(=O)C=C)cc3CC)cc2)cc1]
RM-72
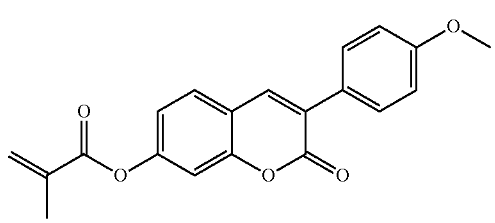 [SMILES: C=C(C)C(=O)Oc1ccc2cc(-c3ccc(OC)cc3)c(=O)oc2c1]
RM-73

TABLE D-continued
Table D shows illustrative reactive mesogenic compounds of formula R which can be used in the LC media in accordance with the present invention.
RM-74
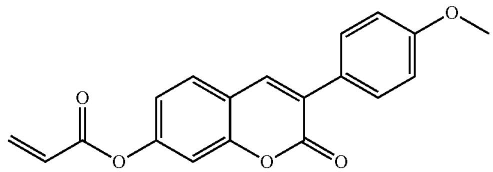 [SMILES: C=CC(=O)Oc1ccc2cc(-c3ccc(OC)cc3)c(=O)oc2c1]
RM-75
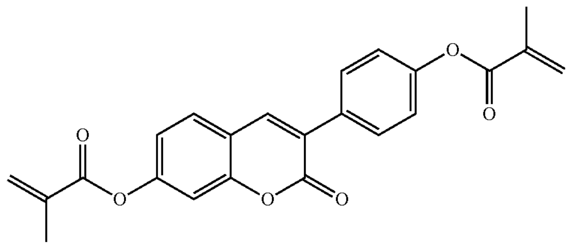 [SMILES: C=C(C)C(=O)Oc1ccc(-c2cc3ccc(OC(=O)C(=C)C)cc3oc2=O)cc1]
RM-76
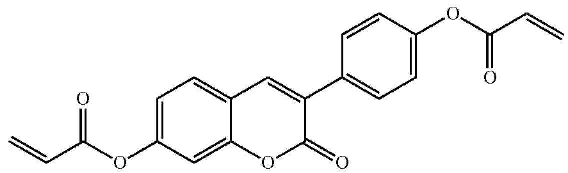 [SMILES: C=CC(=O)Oc1ccc(-c2cc3ccc(OC(=O)C=C)cc3oc2=O)cc1]
RM-77
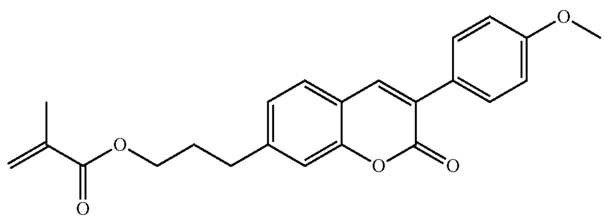 [SMILES: C=C(C)C(=O)OCCCc1ccc2cc(-c3ccc(OC)cc3)c(=O)oc2c1]
RM-78
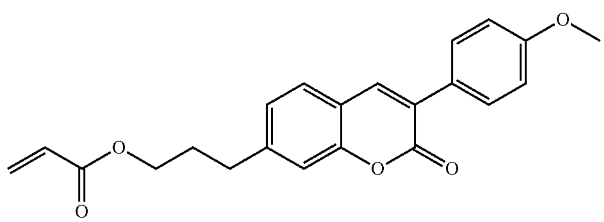 [SMILES: C=CC(=O)OCCCc1ccc2cc(-c3ccc(OC)cc3)c(=O)oc2c1]
RM-79
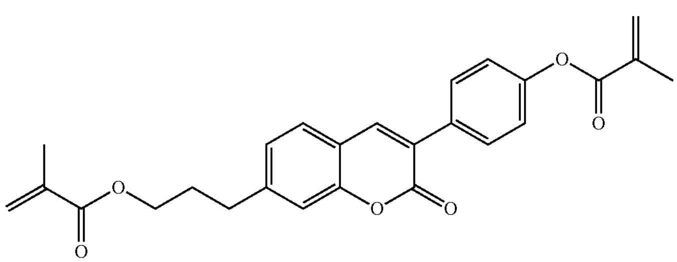 [SMILES: C=C(C)C(=O)OCCCc1ccc2cc(-c3ccc(OC(=O)C(=C)C)cc3)c(=O)oc2c1]
RM-80
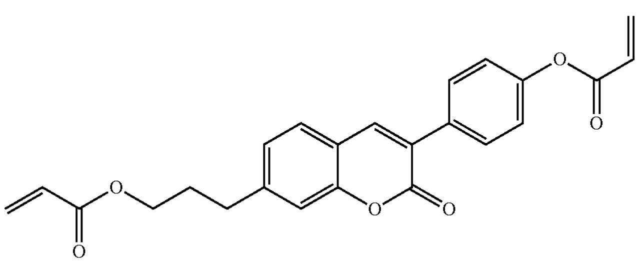 [SMILES: C=CC(=O)OCCCc1ccc2cc(-c3ccc(OC(=O)C=C)cc3)c(=O)oc2c1]

TABLE D-continued
| Table D shows illustrative reactive mesogenic compounds of formula R which can be used in the LC media in accordance with the present invention. |
| --- |
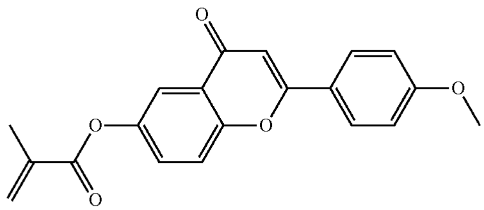 [SMILES: C=C(C)C(=O)Oc1ccc2oc(-c3ccc(OC)cc3)cc(=O)c2c1]
RM-81
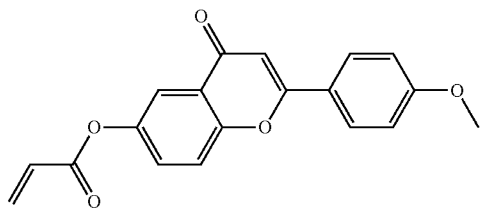 [SMILES: C=CC(=O)Oc1ccc2oc(-c3ccc(OC)cc3)cc(=O)c2c1]
RM-82
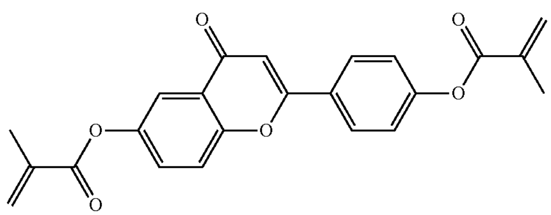 [SMILES: C=C(C)C(=O)Oc1ccc(-c2cc(=O)c3cc(OC(=O)C(=C)C)ccc3o2)cc1]
RM-83
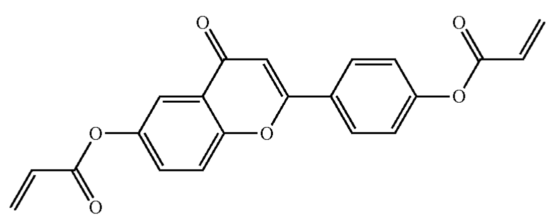 [SMILES: C=CC(=O)Oc1ccc(-c2cc(=O)c3cc(OC(=O)C=C)ccc3o2)cc1]
RM-84
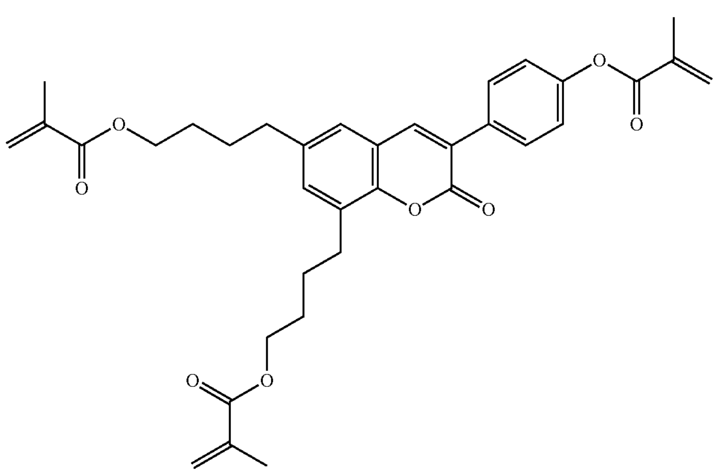 [SMILES: C=C(C)C(=O)OCCCCc1cc(CCCCOC(=O)C(=C)C)c2oc(=O)c(-c3ccc(OC(=O)C(=C)C)cc3)cc2c1]
RM-85

TABLE D-continued
Table D shows illustrative reactive mesogenic compounds of formula R which can be used in the LC media in accordance with the present invention.
RM-86
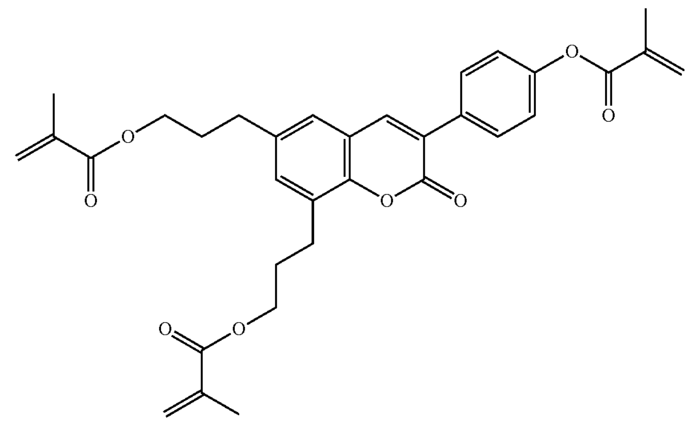 [SMILES: C=C(C)C(=O)OCCCc1cc(CCCOC(=O)C(=C)C)c2oc(=O)c(-c3ccc(OC(=O)C(=C)C)cc3)cc2c1]
RM-87
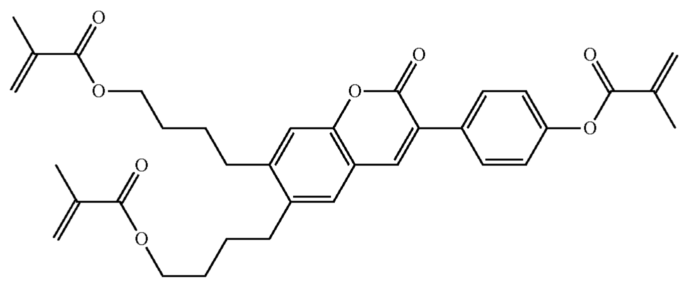 [SMILES: C=C(C)C(=O)OCCCCc1cc2cc(-c3ccc(OC(=O)C(=C)C)cc3)c(=O)oc2cc1CCCCOC(=O)C(=C)C]
RM-88
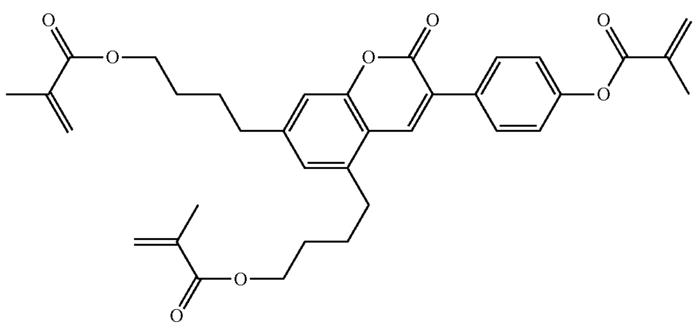 [SMILES: C=C(C)C(=O)OCCCCc1cc(CCCCOC(=O)C(=C)C)c2cc(-c3ccc(OC(=O)C(=C)C)cc3)c(=O)oc2c1]
RM-89
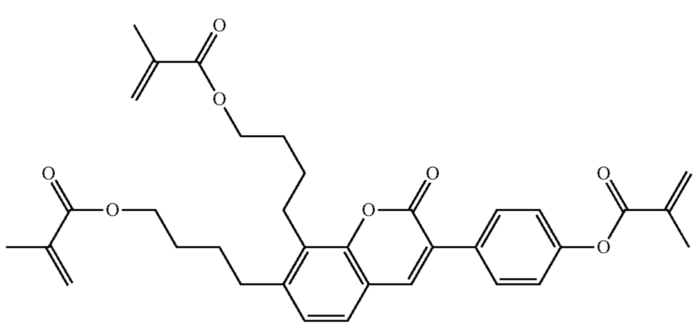 [SMILES: C=C(C)C(=O)OCCCCc1ccc2cc(-c3ccc(OC(=O)C(=C)C)cc3)c(=O)oc2c1CCCCOC(=O)C(=C)C]
RM-90
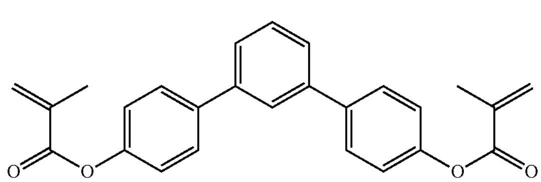 [SMILES: C=C(C)C(=O)Oc1ccc(-c2cccc(-c3ccc(OC(=O)C(=C)C)cc3)c2)cc1]

TABLE D-continued
| Table D shows illustrative reactive mesogenic compounds of formula R which can be used in the LC media in accordance with the present invention. |
|---|
RM-91
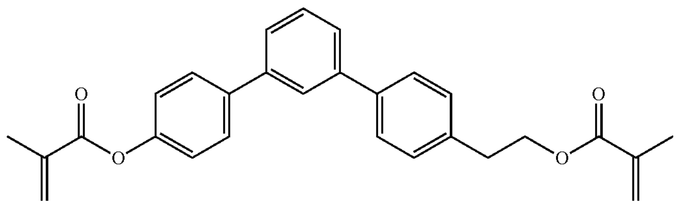 [SMILES: C=C(C)C(=O)OCCc1ccc(-c2cccc(-c3ccc(OC(=O)C(=C)C)cc3)c2)cc1]
RM-92
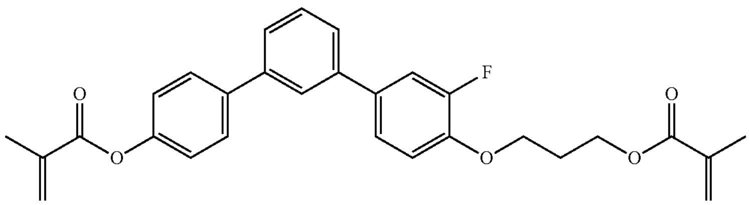 [SMILES: C=C(C)C(=O)OCCCOc1ccc(-c2cccc(-c3ccc(OC(=O)C(=C)C)cc3)c2)cc1F]
RM-93
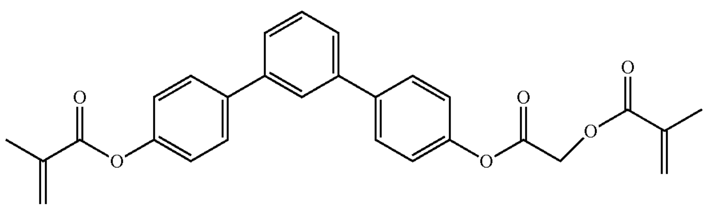 [SMILES: C=C(C)C(=O)OCC(=O)Oc1ccc(-c2cccc(-c3ccc(OC(=O)C(=C)C)cc3)c2)cc1]
RM-94
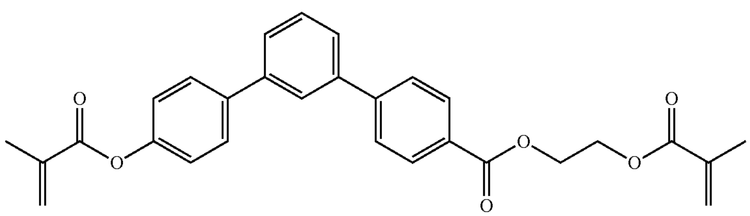 [SMILES: C=C(C)C(=O)OCCOC(=O)c1ccc(-c2cccc(-c3ccc(OC(=O)C(=C)C)cc3)c2)cc1]
RM-95
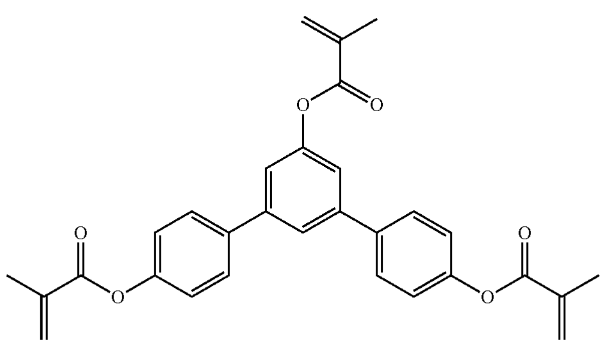 [SMILES: C=C(C)C(=O)Oc1ccc(-c2cc(OC(=O)C(=C)C)cc(-c3ccc(OC(=O)C(=C)C)cc3)c2)cc1]
RM-96
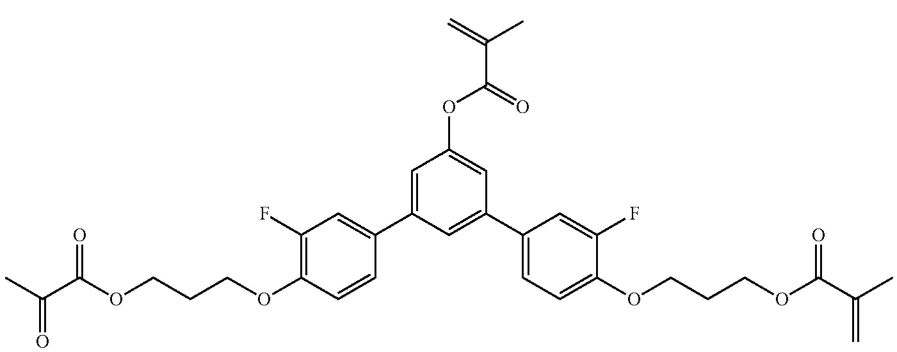 [SMILES: C=C(C)C(=O)OCCCOc1ccc(-c2cc(OC(=O)C(=C)C)cc(-c3ccc(OCCCOC(=O)C(C)=O)c(F)c3)c2)cc1F]

TABLE D-continued
| Table D shows illustrative reactive mesogenic compounds of formula R which can be used in the LC media in accordance with the present invention. |
| --- |
RM-97
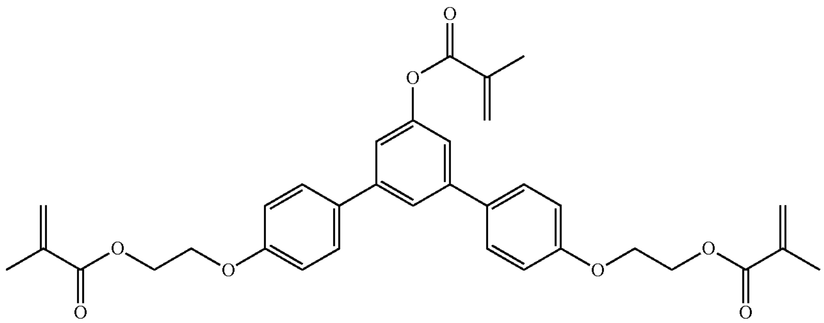 [SMILES: C=C(C)C(=O)OCCOc1ccc(-c2cc(OC(=O)C(=C)C)cc(-c3ccc(OCCOC(=O)C(=C)C)cc3)c2)cc1]
RM-98
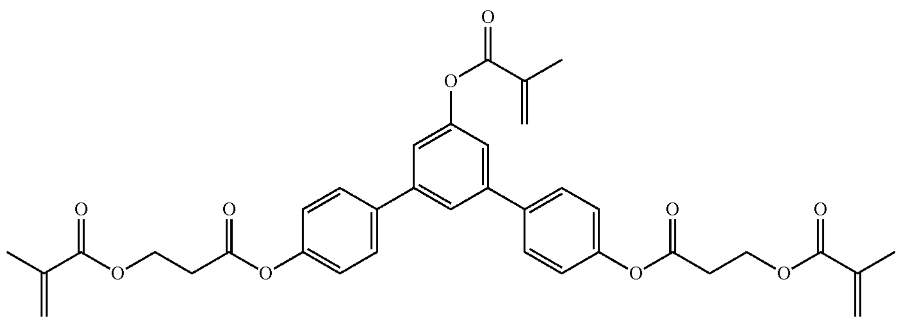 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-99
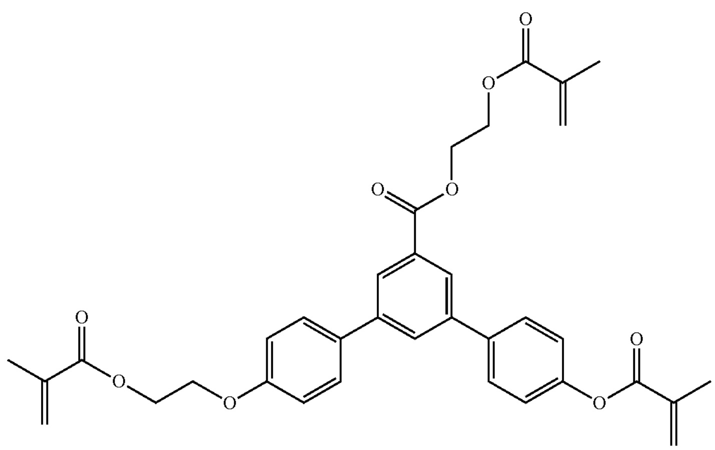 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-100
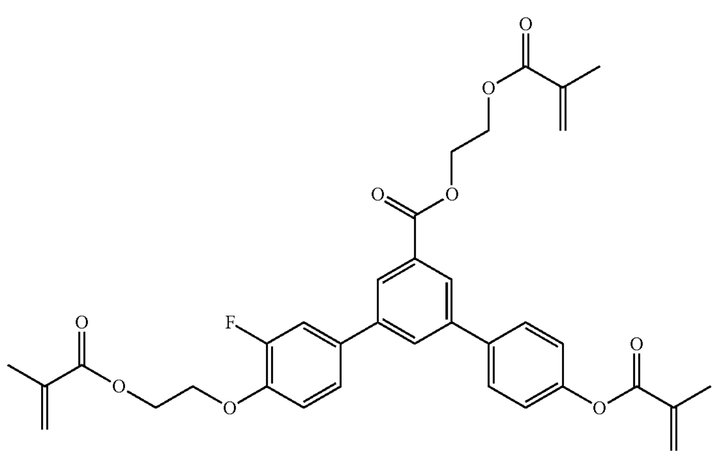 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]

TABLE D-continued
Table D shows illustrative reactive mesogenic compounds of formula R which can be used in the LC media in accordance with the present invention.
RM-101
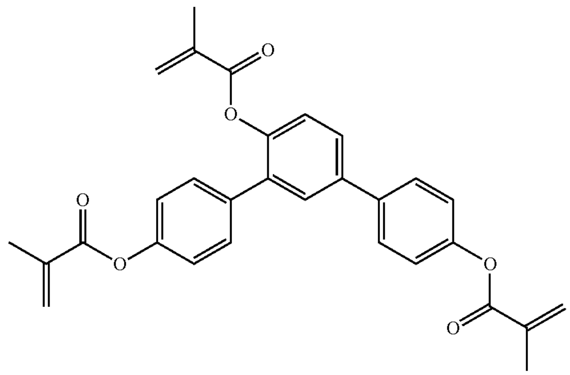 [SMILES: C=C(C)C(=O)Oc1ccc(-c2ccc(OC(=O)C(=C)C)c(-c3ccc(OC(=O)C(=C)C)cc3)c2)cc1]
RM-102
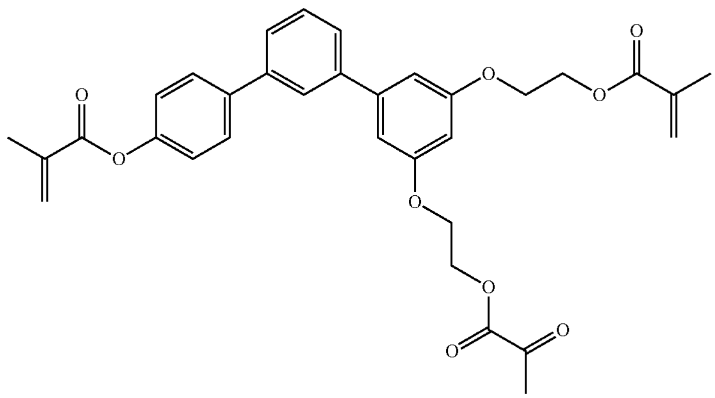 [SMILES: C=C(C)C(=O)OCCOc1cc(OCCOC(=O)C(C)=O)cc(-c2cccc(-c3ccc(OC(=O)C(=C)C)cc3)c2)c1]
RM-103
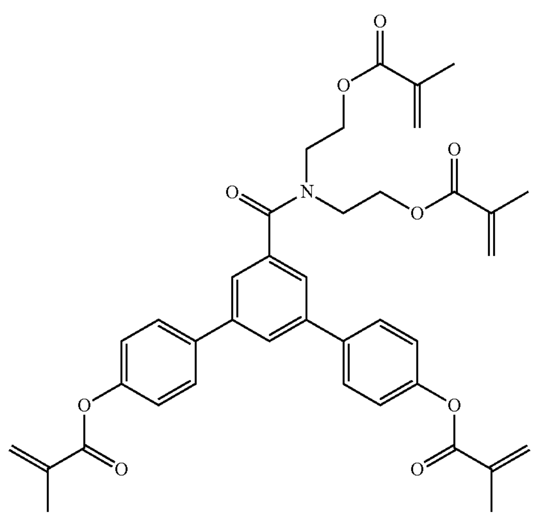 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-104
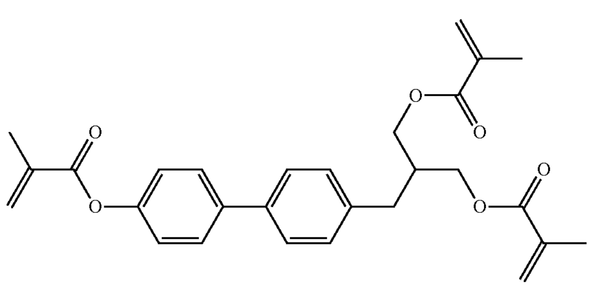

TABLE D-continued
Table D shows illustrative reactive mesogenic compounds of formula R which can be used in the LC media in accordance with the present invention.
RM-105
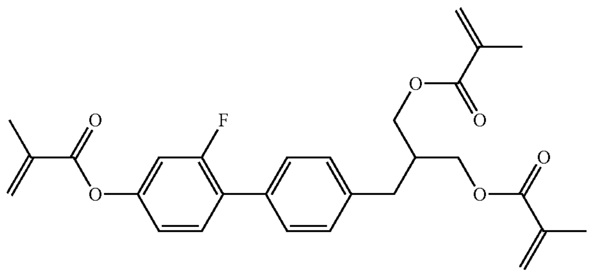 [SMILES: C=C(C)C(=O)OCC(COC(=O)C(=C)C)Cc1ccc(-c2ccc(OC(=O)C(=C)C)cc2F)cc1]
RM-106
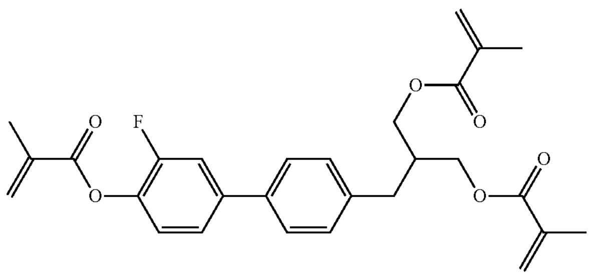 [SMILES: C=C(C)C(=O)OCC(COC(=O)C(=C)C)Cc1ccc(-c2ccc(OC(=O)C(=C)C)c(F)c2)cc1]
RM-107
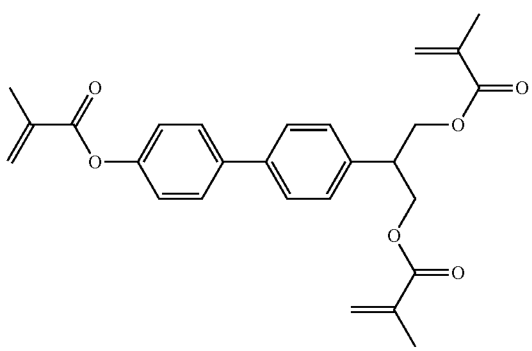 [SMILES: C=C(C)C(=O)OCC(COC(=O)C(=C)C)c1ccc(-c2ccc(OC(=O)C(=C)C)cc2)cc1]
RM-108
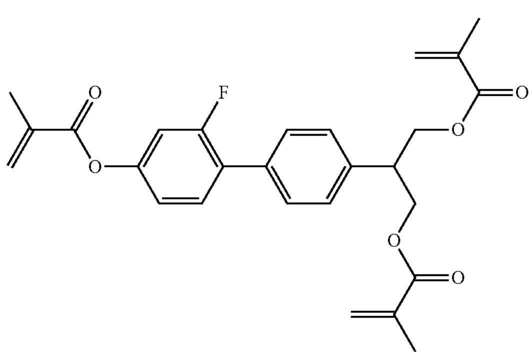 [SMILES: C=C(C)C(=O)OCC(COC(=O)C(=C)C)c1ccc(-c2ccc(OC(=O)C(=C)C)cc2F)cc1]

TABLE D-continued
| Table D shows illustrative reactive mesogenic compounds of formula R which can be used in the LC media in accordance with the present invention. |
|---|
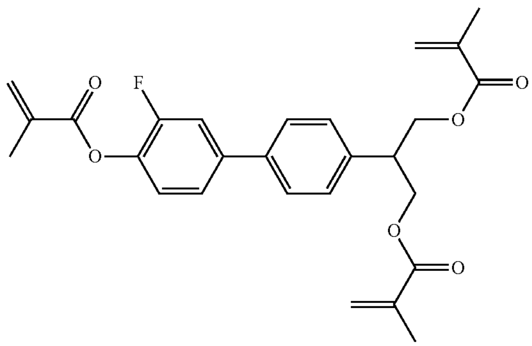 [SMILES: C=C(C)C(=O)OCC(COC(=O)C(=C)C)c1ccc(-c2ccc(OC(=O)C(=C)C)c(F)c2)cc1]
RM-109
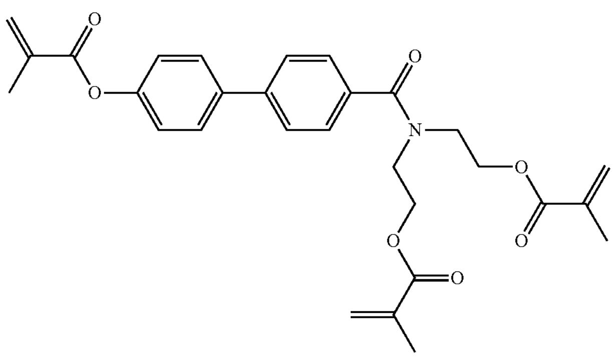 [SMILES: C=C(C)C(=O)OCCN(CCOC(=O)C(=C)C)C(=O)c1ccc(-c2ccc(OC(=O)C(=C)C)cc2)cc1]
RM-110
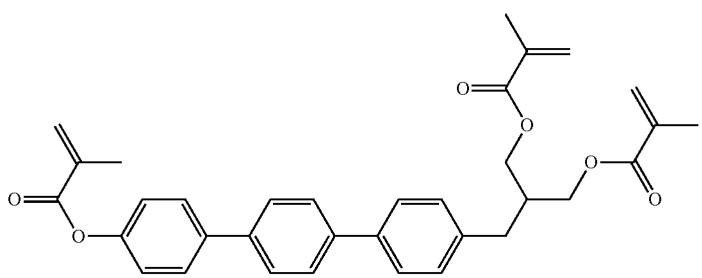 [SMILES: C=C(C)C(=O)OCC(COC(=O)C(=C)C)Cc1ccc(-c2ccc(-c3ccc(OC(=O)C(=C)C)cc3)cc2)cc1]
RM-111
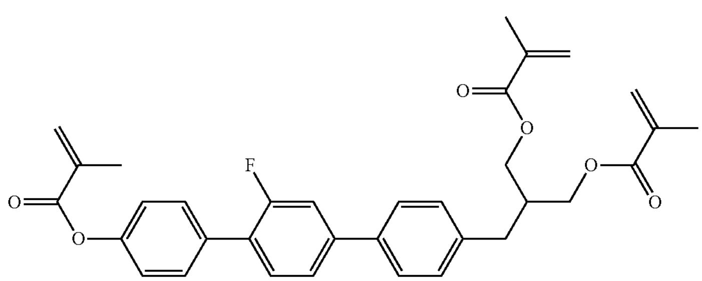
RM-112

TABLE D-continued
| Table D shows illustrative reactive mesogenic compounds of formula R which can be used in the LC media in accordance with the present invention. |
| --- |
RM-113
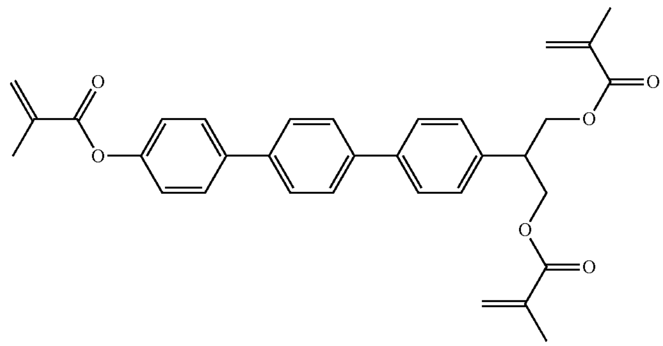
RM-114
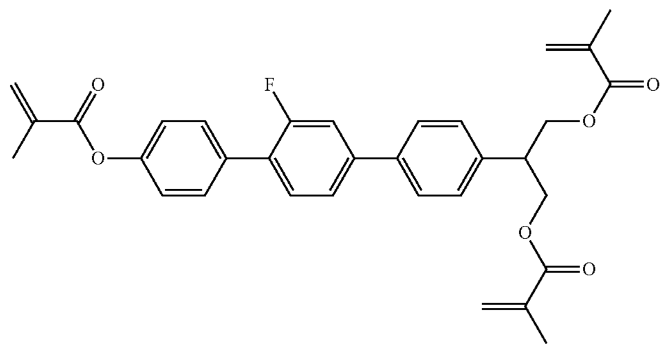 [SMILES: C=C(C)C(=O)OCC(COC(=O)C(=C)C)c1ccc(-c2ccc(-c3ccc(OC(=O)C(=C)C)cc3)c(F)c2)cc1]
RM-115
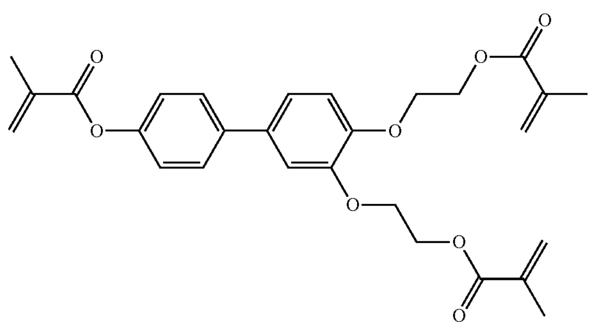 [SMILES: C=C(C)C(=O)OCCOc1ccc(-c2ccc(OC(=O)C(=C)C)cc2)cc1OCCOC(=O)C(=C)C]
RM-116
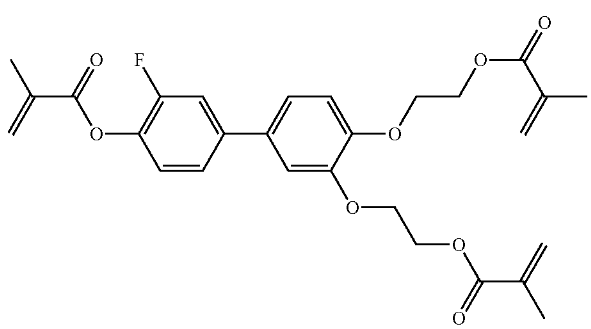 [SMILES: C=C(C)C(=O)OCCOc1ccc(-c2ccc(OC(=O)C(=C)C)c(F)c2)cc1OCCOC(=O)C(=C)C]

TABLE D-continued
Table D shows illustrative reactive mesogenic compounds of formula R which can be used in the LC media in accordance with the present invention.
RM-117
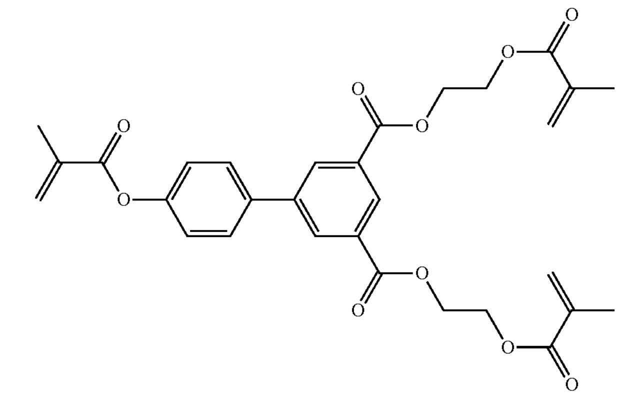 [SMILES: C=C(C)C(=O)OCCOC(=O)c1cc(C(=O)OCCOC(=O)C(=C)C)cc(-c2ccc(OC(=O)C(=C)C)cc2)c1]
RM-118
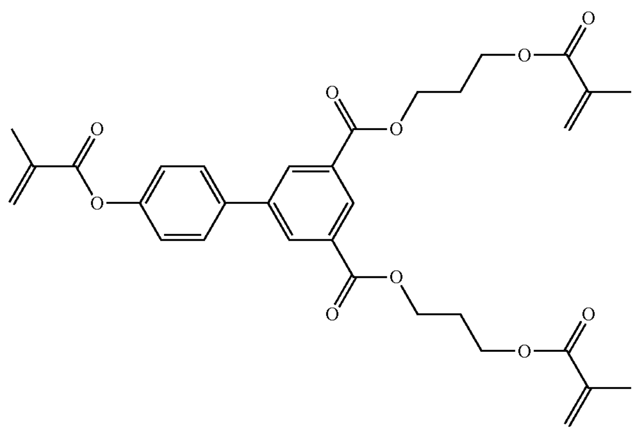 [SMILES: C=C(C)C(=O)OCCCOC(=O)c1cc(C(=O)OCCCOC(=O)C(=C)C)cc(-c2ccc(OC(=O)C(=C)C)cc2)c1]
RM-119
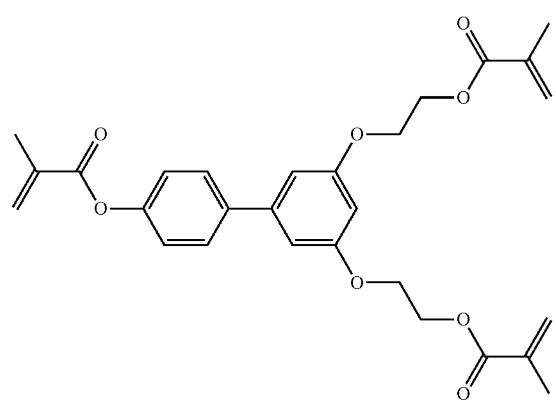 [SMILES: C=C(C)C(=O)OCCOc1cc(OCCOC(=O)C(=C)C)cc(-c2ccc(OC(=O)C(=C)C)cc2)c1]

TABLE D-continued
| Table D shows illustrative reactive mesogenic compounds of formula R which can be used in the LC media in accordance with the present invention. |
|---|
RM-120
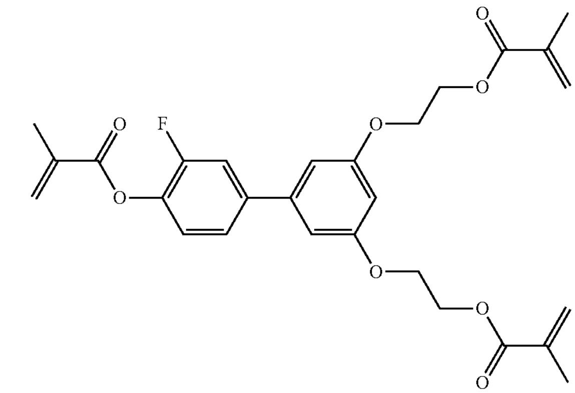 [SMILES: C=C(C)C(=O)OCCOc1cc(OCCOC(=O)C(=C)C)cc(-c2ccc(OC(=O)C(=C)C)c(F)c2)c1]
RM-121
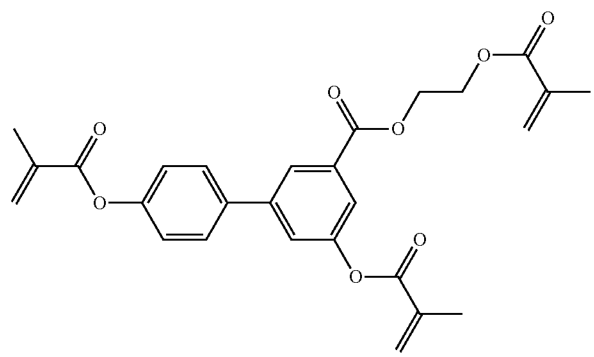 [SMILES: C=C(C)C(=O)OCCOC(=O)c1cc(OC(=O)C(=C)C)cc(-c2ccc(OC(=O)C(=C)C)cc2)c1]
RM-122
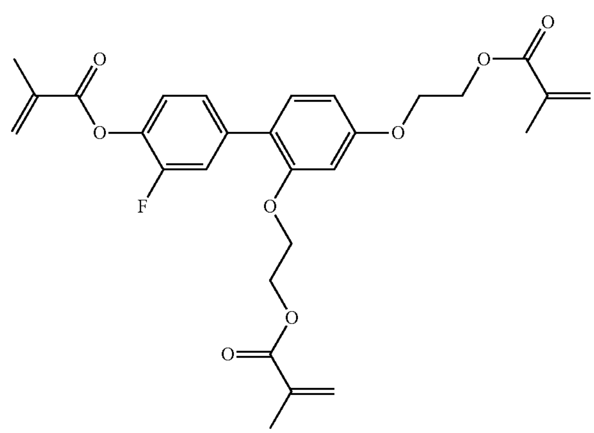 [SMILES: C=C(C)C(=O)OCCOc1ccc(-c2ccc(OC(=O)C(=C)C)c(F)c2)c(OCCOC(=O)C(=C)C)c1]
RM-123
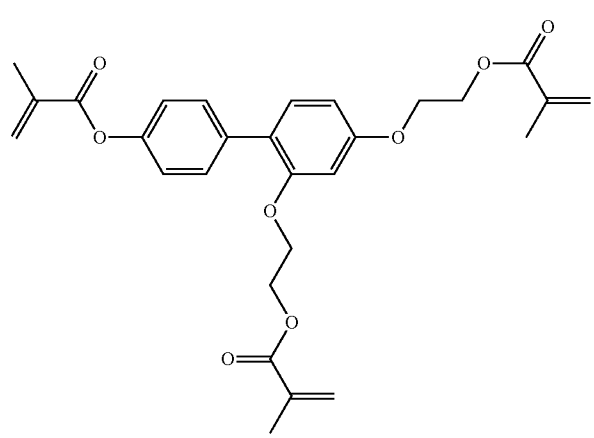 [SMILES: C=C(C)C(=O)OCCOc1ccc(-c2ccc(OC(=O)C(=C)C)cc2)c(OCCOC(=O)C(=C)C)c1]

TABLE D-continued
| Table D shows illustrative reactive mesogenic compounds of formula R which can be used in the LC media in accordance with the present invention. |
|---|
RM-124
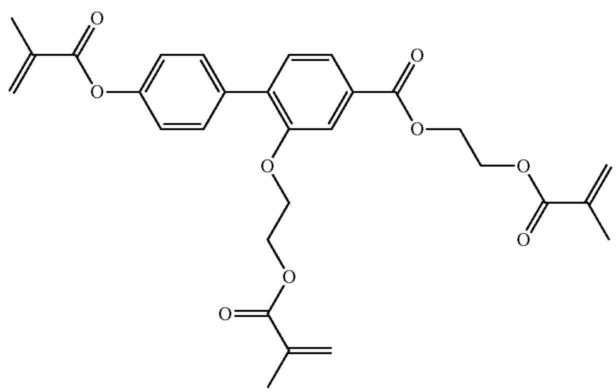 [SMILES: C=C(C)C(=O)OCCOC(=O)c1ccc(-c2ccc(OC(=O)C(=C)C)cc2)c(OCCOC(=O)C(=C)C)c1]
RM-125
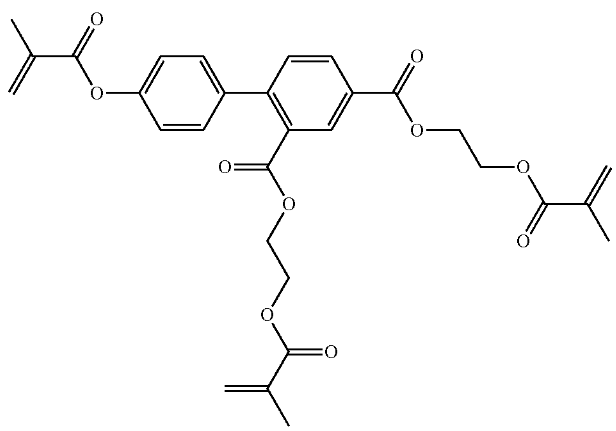 [SMILES: C=C(C)C(=O)OCCOC(=O)c1ccc(-c2ccc(OC(=O)C(=C)C)cc2)c(C(=O)OCCOC(=O)C(=C)C)c1]
RM-126
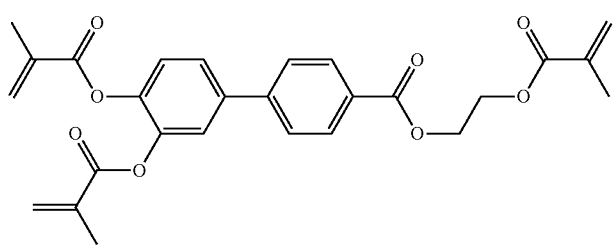 [SMILES: C=C(C)C(=O)OCCOC(=O)c1ccc(-c2ccc(OC(=O)C(=C)C)c(OC(=O)C(=C)C)c2)cc1]
RM-127
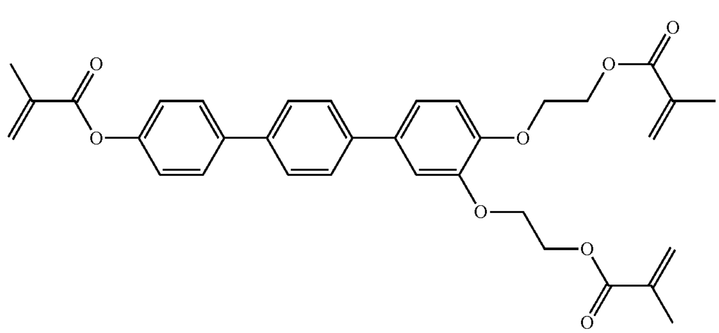 [SMILES: C=C(C)C(=O)OCCOc1ccc(-c2ccc(-c3ccc(OC(=O)C(=C)C)cc3)cc2)cc1OCCOC(=O)C(=C)C]

TABLE D-continued
| Table D shows illustrative reactive mesogenic compounds of formula R which can be used in the LC media in accordance with the present invention. |
|---|
RM-128
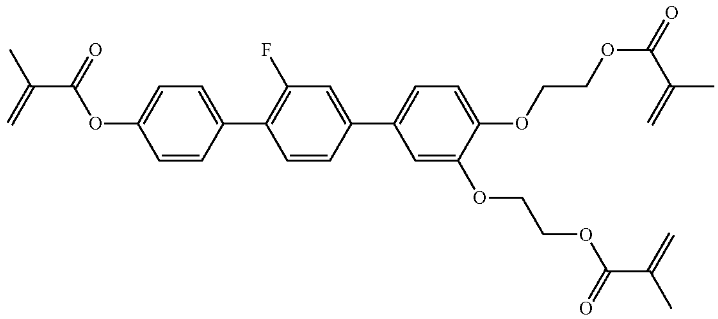 [SMILES: C=C(C)C(=O)OCCOc1ccc(-c2ccc(-c3ccc(OC(=O)C(=C)C)cc3)c(F)c2)cc1OCCOC(=O)C(=C)C]
RM-129
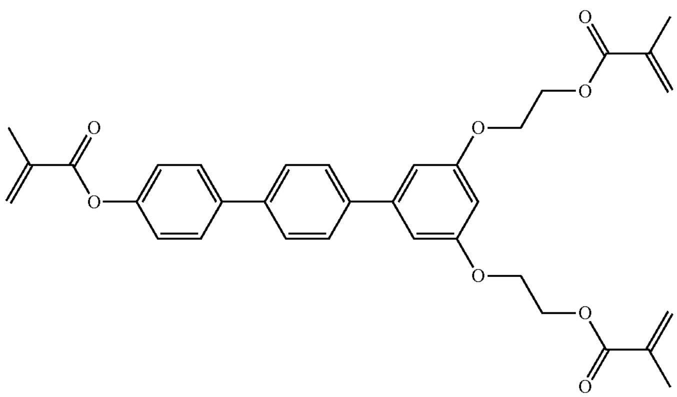
RM-130
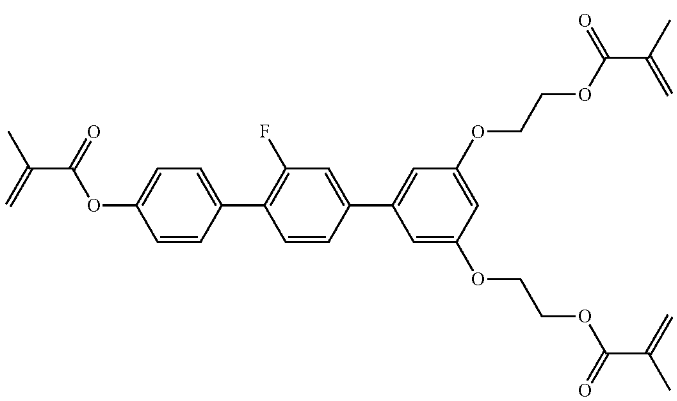 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-131
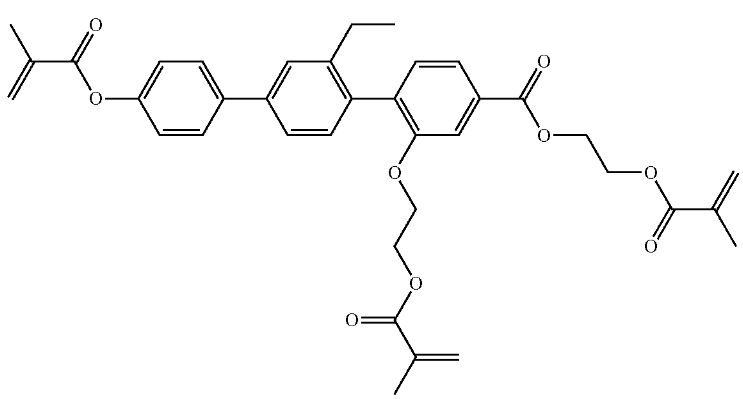 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]

In a preferred embodiment, the mixtures according to the invention comprise one or more polymerizable compounds, preferably selected from the polymerizable compounds of the formulae RM-1 to RM-131. Of these, compounds RM-1, RM-4, RM-8, RM-17, RM-19, RM-35, RM-37, RM-43, RM-47, RM-49, RM-51, RM-59, RM-69, RM-71, RM-83, RM-97, RM-98, RM-104, RM-112, RM-115, RM-116, and RM-128 are particularly preferred.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:

$V_D$ threshold voltage, capacitive [V] at 20° C.,
$n_e$ extraordinary refractive index at 20° C. and 589 nm,
$n_o$ ordinary refractive index at 20° C. and 589 nm,
An optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
$\Delta\varepsilon$ dielectric anisotropy at 20° C. and 1 kHz,
cl.p., T(N,I) clearing point [° C.],
$Y_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\varepsilon$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerizing the polymerizable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 m, each of which has on the inside an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 m, each of which has on the inside an electrode layer and a polyimide alignment layer on top, where the two polyimide layers are rubbed antiparallel to one another and effect a homeotropic edge alignment of the liquid-crystal molecules.

The polymerizable compounds are polymerized in the display or test cell by irradiation with UV light of defined intensity for a prespecified time, with a voltage simultaneously being applied to the display (usually 10 V to 30 V alternating current, 1 kHz). In the examples, unless indicated otherwise, a fluorescent lamp and an intensity of 0 to 20 mW/cm$^2$ is used for polymerization. The intensity is measured using a standard meter (Ushio Accumulate UV meter with central wavelength of 313 nm).

The transmission measurements are performed in test cells with fishbone electrode layout (from Merck Ltd., Japan; 1 pixel fishbone electrode (ITO, 10×10 mm, 47.7° angle of fishbone with 3 μm line/3 μm space), 3.2 μm cell gap, AF-glass, tilt angle 1°).

Mixture Examples

The nematic LC host mixtures N1 to N14 are formulated as follows:

Mixture N1

| | | | |
|---|---|---|---|
| BCH-32 | 11.0% | $T_{(N,I)}$ · [° C.]: | 75.2 |
| CC-3-V | 15.0% | Δn (589 nm, 20° C.): | 0.1263 |
| CC-3-V1 | 9.0% | $n_e$ (20° C., 589.3 nm]: | 1.6201 |
| CC-4-V | 9.0% | $n_o$ (20° C., 589.3 nm]: | 1.4938 |
| CCY-3-O2 | 7.0% | Δε (1 kHz, 20° C.): | −2.7 |
| CPY-2-O2 | 10.0% | $\varepsilon_\parallel$ (1 kHz, 20° C.): | 3.5 |
| CPY-3-O2 | 10.0% | $\varepsilon_\perp$ (1 kHz, 20° C.): | 6.2 |
| PP-1-2V1 | 4.0% | $K_1$ [pN], (20° C.): | 14.6 |
| PY-3-O2 | 11.0% | $K_3$ [pN], (20° C.): | 14.4 |
| PY-4-O2 | 11.0% | $\gamma_1$ [mPa · s], (20° C.): | 98 |
| PYP-2-4 | 3.0% | $V_0$ [V], (20° C.): | 2.44 |

Mixture N2

| | | | |
|---|---|---|---|
| BCH-32 | 2.0% | $T_{(N,I)}$ · [° C.]: | 79.9 |
| CC-3-V | 25.0% | Δn (589 nm, 20° C.): | 0.1346 |
| CC-3-V1 | 5.0% | $n_e$ (20° C., 589.3 nm]: | 1.6288 |
| CCY-3-O1 | 10.0% | $n_o$ (20° C., 589.3 nm]: | 1.4942 |
| CCY-3-O2 | 10.0% | Δε (1 kHz, 20° C.): | −2.5 |
| CPY-2-O2 | 11.0% | $\varepsilon_\parallel$ (1 kHz, 20° C.): | 3.4 |
| PP-1-2V1 | 11.0% | $\varepsilon_\perp$ (1 kHz, 20° C.): | 5.9 |
| PY-3-O2 | 10.0% | $K_1$ [pN], (20° C.): | 15.2 |
| PYP-2-3 | 8.0% | $K_3$ [pN], (20° C.): | 15.4 |
| PYP-2-4 | 8.0% | $\gamma_1$ [mPa · s], (20° C.): | 105 |
| | | $V_0$ [V], (20° C.): | 2.63 |

Mixture N3

| | | | |
|---|---|---|---|
| CC-3-V | 28.0% | $T_{(N,I)}$ · [° C.]: | 74.0 |
| CCY-3-O1 | 2.0% | Δn (589 nm, 20° C.): | 0.1345 |
| CCY-3-O2 | 10.0% | $n_e$ (20° C., 589.3 nm]: | 1.6288 |
| CLY-3-O2 | 8.5% | $n_o$ (20° C., 589.3 nm]: | 1.4943 |
| CPY-3-O2 | 7.5% | Δε (1 kHz, 20° C.): | −2.9 |
| CY-3-O2 | 2.5% | $ε_{\|\|}$ (1 kHz, 20° C.): | 3.5 |
| PP-1-2V1 | 9.0% | $ε_⊥$ (1 kHz, 20° C.): | 6.4 |
| PY-3-O2 | 4.5% | $K_1$ [pN], (20° C.): | 14.0 |
| PY-4-O2 | 10.0% | $K_3$ [pN], (20° C.): | 14.8 |
| PYP-2-3 | 9.0% | $γ_1$ [mPa · s], (20° C.): | 102 |
| PYP-2-4 | 9.0% | $V_0$ [V], (20° C.): | 2.41 |

Mixture N4

| | | | |
|---|---|---|---|
| CC-3-V | 28.0% | $T_{(N,I)}$ · [° C.]: | 74.0 |
| CCY-3-O2 | 6.5% | Δn (589 nm, 20° C.): | 0.1347 |
| CLY-3-O2 | 8.5% | $n_e$ (20° C., 589.3 nm]: | 1.6287 |
| CPY-2-O2 | 5.0% | $n_o$ (20° C., 589.3 nm]: | 1.4940 |
| CPY-3-O2 | 10.0% | Δε (1 kHz, 20° C.): | −3.2 |
| CY-3-O2 | 4.5% | $ε_{\|\|}$ (1 kHz, 20° C.): | 3.6 |
| PP-1 -2V1 | 6.0% | $ε_⊥$ (1 kHz, 20° C.): | 6.8 |
| PY-3-O2 | 4.5% | $K_1$ [pN], (20° C.): | 13.8 |
| PY-4-O2 | 10.0% | $K_3$ [pN], (20° C.): | 14.5 |
| PYP-2-3 | 9.0% | $γ_1$ [mPa · s], (20° C.): | 108 |
| PYP-2-4 | 8.0% | $V_0$ [V], (20° C.): | 2.26 |

Mixture N5

| | | | |
|---|---|---|---|
| BCH-52 | 5.0% | $T_{(N,I)}$ · [° C.]: | 74.0 |
| CCH-13 | 17.0% | Δn (589 nm, 20° C.): | 0.1355 |
| CCH-34 | 6.5% | $n_e$ (20° C., 589.3 nm]: | 1.6288 |
| CCH-35 | 6.0% | $n_o$ (20° C., 589.3 nm]: | 1.4933 |
| CCY-3-O2 | 7.0% | Δε (1 kHz, 20° C.): | −3.1 |
| CPY-2-O2 | 10.0% | $ε_{\|\|}$ (1 kHz, 20° C.): | 3.6 |
| CPY-3-O2 | 10.0% | $ε_⊥$ (1 kHz, 20° C.): | 6.6 |
| PY-1-O4 | 8.0% | $K_1$ [pN], (20° C.): | 14.1 |
| PY-3-O2 | 11.0% | $K_3$ [pN], (20° C.): | 13.8 |
| PYP-2-3 | 10.0% | $γ_1$ [mPa · s], (20° C.): | 129 |
| PYP-2-4 | 9.5% | $V_0$ [V], (20° C.): | 2.24 |

Mixture N6

| | | | |
|---|---|---|---|
| BCH-52 | 5.0% | $T_{(N,I)}$ · [° C.]: | 74.2 |
| CCH-13 | 17.0% | Δn (589 nm, 20° C.): | 0.1349 |
| CCH-34 | 7.0% | $n_e$ (20° C., 589.3 nm]: | 1.6290 |
| CCH-35 | 5.0% | $n_o$ (20° C., 589.3 nm]: | 1.4941 |
| CCP-3-1 | 6.5% | Δε (1 kHz, 20° C.): | −2.7 |
| CPY-2-O2 | 11.0% | $ε_{\|\|}$ (1 kHz, 20° C.): | 3.5 |
| CPY-3-O2 | 11.0% | $ε_⊥$ (1 kHz, 20° C.): | 6.2 |
| PY-1-O4 | 7.5% | $K_1$ [pN], (20° C.): | 14.2 |
| PY-3-O2 | 12.0% | $K_3$ [pN], (20° C.): | 13.8 |
| PYP-2-3 | 9.0% | $γ_1$ [mPa · s], (20° C.): | 119 |
| PYP-2-4 | 9.0% | $V_0$ [V], (20° C.): | 2.40 |

Mixture N7

| | | | |
|---|---|---|---|
| CCH-3O1 | 16.0% | $T_{(N,I)}$ · [° C.]: | 74.0 |
| CCH-34 | 7.0% | Δn (589 nm, 20° C.): | 0.1354 |
| CCH-35 | 7.0% | $n_e$ (20° C., 589.3 nm]: | 1.6295 |
| CCP-3-1 | 8.0% | $n_o$ (20° C., 589.3 nm]: | 1.4941 |
| CCY-3-O2 | 3.0% | Δε (1 kHz, 20° C.): | −3.1 |
| CPY-2-O2 | 10.0% | $ε_{\|\|}$ (1 kHz, 20° C.): | 3.8 |
| CPY-3-O2 | 9.0% | $ε_⊥$ (1 kHz, 20° C.): | 6.8 |
| PP-1-2V1 | 1.0% | $K_1$ [pN], (20° C.): | 13.6 |
| PY-1-O2 | 12.0% | $K_3$ [pN], (20° C.): | 13.9 |
| PY-3-O2 | 7.5% | $γ_1$ [mPa · s], (20° C.): | 128 |
| PYP-2-3 | 10.0% | $V_0$ [V], (20° C.): | 2.25 |
| PYP-2-4 | 9.5% | | |

Mixture N8

| | | | |
|---|---|---|---|
| B(S)-2O-O4 | 5.0% | $T_{(N,I)}$ · [° C.]: | 74.3 |
| B(S)-2O-O5 | 5.0% | Δn (589 nm, 20° C.): | 0.1357 |
| CC-3-V | 24.5% | $n_e$ (20° C., 589.3 nm]: | 1.6305 |
| CC-3-V1 | 8.0% | $n_o$ (20° C., 589.3 nm]: | 1.4948 |
| CCP-3-1 | 13.0% | Δε (1 kHz, 20° C.): | −3.1 |
| CPY-3-O2 | 11.0% | $ε_{\|\|}$ (1 kHz, 20° C.): | 3.7 |
| PP-1-2V1 | 3.0% | $ε_⊥$ (1 kHz, 20° C.): | 6.8 |
| PY-1-O2 | 12.0% | $K_1$ [pN], (20° C.): | 15.0 |
| PY-3-O2 | 5.5% | $K_3$ [pN], (20° C.): | 15.9 |
| PYP-2-3 | 10.0% | $γ_1$ [mPa · s], (20° C.): | 93 |
| PYP-2-4 | 3.0% | $V_0$ [V], (20° C.): | 2.39 |

Mixture N9

| | | | |
|---|---|---|---|
| BCH-32 | 6.0% | $T_{(N,I)}$ · [° C.]: | 74.3 |
| CC-3-V1 | 8.0% | Δn (589 nm, 20° C.): | 0.1352 |
| CCH-35 | 9.0% | $n_e$ (20° C., 589.3 nm]: | 1.6285 |
| CCP-3-1 | 13.0% | $n_o$ (20° C., 589.3 nm]: | 1.4933 |
| CCY-3-O1 | 5.0% | Δε (1 kHz, 20° C.): | −3.1 |
| CCY-3-O2 | 8.0% | $ε_{\|\|}$ (1 kHz, 20° C.): | 3.6 |
| CY-3-O2 | 11.5% | $ε_⊥$ (1 kHz, 20° C.): | 6.7 |
| PP-1-2V1 | 8.0% | $K_1$ [pN], (20° C.): | 15.8 |
| PY-1-O2 | 12.0% | $K_3$ [pN], (20° C.): | 18.2 |
| PY-3-O2 | 9.5% | $γ_1$ [mPa · s], (20° C.): | 124 |
| PYP-2-3 | 10.0% | $V_0$ [V], (20° C.): | 2.55 |

Mixture N10

| | | | |
|---|---|---|---|
| CC-3-O1 | 12.0% | $T_{(N,I)}$ · [° C.]: | 85.3 |
| CCH-34 | 8.0% | Δn (589 nm, 20° C.): | 0.1140 |
| CCPC-34 | 2.0% | Δϵ (1 kHz, 20° C.): | −4.0 |
| CCY-3-O2 | 2.0% | | |
| CCY-3-O3 | 8.0% | | |
| CCY-4-O2 | 8.0% | | |
| CPY-2-O2 | 10.0% | | |
| CPY-3-O2 | 10.0% | | |
| CY-5-O4 | 28.0% | | |
| PGP-2-3 | 6.0% | | |
| PGP-2-4 | 6.0% | | |

Mixture N11

| | | | |
|---|---|---|---|
| CC-3-V | 29.5% | $T_{(N,I)}$ · [° C.]: | 80.4 |
| CCPC-33 | 3.5% | Δn (589 nm, 20° C.): | 0.1060 |
| CLY-2-O4 | 5.0% | Δε (1 kHz, 20° C.): | −3.6 |
| CLY-3-O2 | 5.0% | | |
| CLY-3-O3 | 5.0% | | |
| CPY-2-O2 | 10.0% | | |
| CPY-3-O2 | 11.0% | | |
| CY-3-O4 | 25.0% | | |
| PGP-2-4 | 6.0% | | |

Mixture N12

| | | | |
|---|---|---|---|
| CY-3-O4 | 15.0% | $T_{(N,I)}$ · [° C.]: | 86.6 |
| CY-5-O2 | 8.0% | Δn (589 nm, 20° C.): | 0.1022 |
| CY-5-O4 | 6.0% | $n_e$ (20° C., 589.3 nm]: | 1.5852 |
| CCY-3-O2 | 6.0% | $n_o$ (20° C., 589.3 nm]: | 1.4830 |
| CCY-3-O3 | 7.0% | Δε (1 kHz, 20° C.): | −4.0 |
| CCY-4-O2 | 6.0% | $ε_{\|\|}$ (1 kHz, 20° C.): | 3.6 |
| CCY-2-1 | 9.0% | $ε_⊥$ (1 kHz, 20° C.): | 7.6 |
| CCY-3-1 | 9.0% | $K_1$ [pN], (20° C.): | 15.1 |
| BCH-32 | 8.0% | $K_3$ [pN], (20° C.): | 14.6 |
| PCH-53 | 7.0% | $γ_1$ [mPa · s], (20° C.): | 210 |
| CCH-34 | 7.0% | $V_0$ [V], (20° C.): | 2.01 |
| CPY-2-O2 | 5.0% | | |
| CPY-3-O2 | 5.0% | | |
| CPPC-3-3 | 2.0% | | |

Mixture N13

| | | | |
|---|---|---|---|
| CBC-33 | 2.0% | $T_{(N,I)}$ · [° C.]: | 89.8 |
| CCH-3O1 | 11.5% | Δn (589 nm, 20° C.): | 0.1208 |
| CCH-34 | 5.0% | $n_e$ (20° C., 589.3 nm]: | 1.6065 |
| CCY-3-O2 | 8.0% | $n_o$ (20° C., 589.3 nm]: | 1.4857 |
| CCY-3-O3 | 8.0% | Δε (1 kHz, 20° C.): | −4.9 |
| CCY-4-O2 | 8.0% | $ε_{\|}$ (1 kHz, 20° C.): | 3.9 |
| CPY-2-O2 | 10.0% | $ε_{⊥}$ (1 kHz, 20° C.): | 8.8 |
| CPY-3-O2 | 10.0% | $K_1$ [pN], (20° C.): | 14.8 |
| CY-3-O4 | 24.0% | $K_3$ [pN], (20° C.): | 14.9 |
| PYP-2-3 | 8.0% | $γ_1$ [mPa · s], (20° C.): | 245 |
| PYP-2-4 | 5.5% | $V_0$ [V], (20° C.): | 1.84 |

Mixture N14

| | | | |
|---|---|---|---|
| B(S)-2O-O4 | 5.0% | $T_{(N,I)}$ · [° C.]: | 73.4 |
| B(S)-2O-O5 | 5.0% | Δn (589 nm, 20° C.): | 0.1358 |
| CC-3-V | 24.5% | $n_e$ (20° C., 589.3 nm]: | 1.6309 |
| CC-3-V1 | 8.0% | $n_o$ (20° C., 589.3 nm]: | 1.4951 |
| CCP-3-1 | 13.0% | Δε (1 kHz, 20° C.): | −3.0 |
| CP(1Y)-3-O2 | 11.0% | $ε_{\|}$ (1 kHz, 20° C.): | 3.8 |
| PP-1-2V1 | 3.0% | $ε_{⊥}$ (1 kHz, 20° C.): | 6.8 |
| PY-1-O2 | 12.0% | $K_1$ [pN], (20° C.): | 15.1 |
| PY-3-O2 | 5.5% | $K_3$ [pN], (20° C.): | 15.9 |
| PYP-2-3 | 10.0% | $γ_1$ [mPa · s], (20° C.): | 95 |
| PYP-2-4 | 3.0% | $V_0$ [V], (20° C.): | 2.41 |

Comparative Mixture Example C1 is prepared as follows:

Mixture C1

| | | | |
|---|---|---|---|
| CC-3-V1 | 8.00% | $T_{(N,I)}$ · [° C.]: | 74.6 |
| CCH-23 | 15.00% | Δn (589 nm, 20° C.): | 0.0899 |
| CCH-34 | 5.00% | $n_e$ (20° C., 589.3 nm]: | 1.5694 |
| CCH-35 | 6.00% | $n_o$ (20° C., 589.3 nm]: | 1.4795 |
| CCP-3-1 | 3.00% | Δε (1 kHz, 20° C.): | −3.3 |
| CCY-3-O1 | 8.00% | $ε_{\|}$ (1 kHz, 20° C.): | 3.5 |
| CCY-3-O2 | 10.00% | $ε_{⊥}$ (1 kHz, 20° C.): | 6.8 |
| CCY-3-O3 | 6.00% | $K_1$ [pN], (20° C.): | 13.9 |
| CCY-4-O2 | 6.00% | $K_3$ [pN], (20° C.): | 14.6 |
| CY-3-O2 | 12.00% | $γ_1$ [mPa · s], 20° C.): | 114 |
| CY-3-O4 | 3.75% | $V_0$ [V], (20° C.): | 2.23 |

-continued

| | |
|---|---|
| PCH-3O1 | 3.00% |
| PY-3-O2 | 2.75% |
| PY-4-O2 | 6.50% |
| PYP-2-3 | 5.00% |

Comparative Mixture Example C2

Comparative mixture C2 consists of 99.7% of mixture C1 and 0.3% of RM3.

Chiral Nematic Mixtures

The Chiral Nematic Mixtures of Table 1 are prepared from the nematic host mixtures N1 to N14 above, by adding the chiral dopant S-811, S-2011 or S-4011, respectively, in the amount given in Table 1:

S-4011

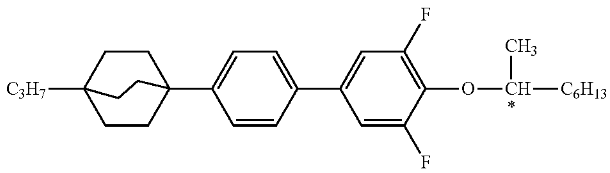

S-811

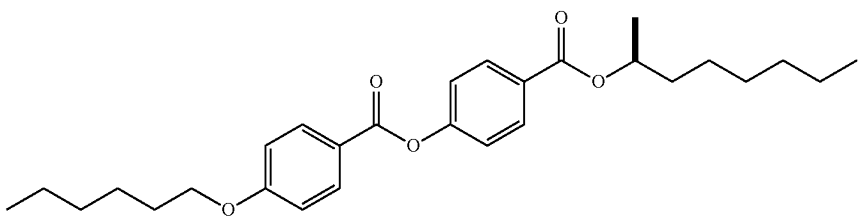

S-2011

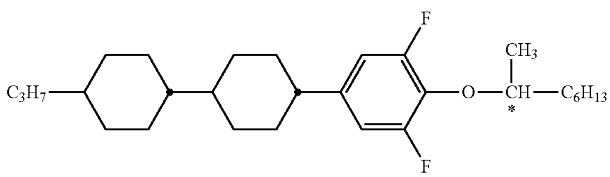

TABLE 1

| Chiral Nematic Mixtures | | | |
|---|---|---|---|
| Mixture | LC Host | Dopant | wt. % Dopant |
| Ch1 | N1 | S-4011 | 0.80% |
| Ch2 | N2 | S-4011 | 0.89% |
| Ch3 | N3 | S-4011 | 0.82% |
| Ch4 | N4 | S-4011 | 0.81% |
| Ch5 | N5 | S-4011 | 0.81% |
| Ch6 | N6 | S-4011 | 0.82% |
| Ch7 | N7 | S-4011 | 0.81% |
| Ch8 | N8 | S-4011 | 0.89% |
| Ch9 | N9 | S-4011 | 0.83% |
| Ch10 | N10 | S-4011 | 0.80% |
| Ch11 | N11 | S-4011 | 0.80% |
| Ch12 | N12 | S-4011 | 0.80% |
| Ch13 | N13 | S-4011 | 0.80% |
| Ch13a | N14 | S-4011 | 0.83% |
| Ch14 | N1 | S-811 | 0.80% |
| Ch15 | N2 | S-811 | 0.80% |
| Ch16 | N3 | S-811 | 0.80% |
| Ch17 | N4 | S-811 | 0.80% |
| Ch18 | N5 | S-811 | 0.70% |
| Ch19 | N6 | S-811 | 0.80% |
| Ch20 | N7 | S-811 | 0.80% |
| Ch21 | N8 | S-811 | 0.72% |
| Ch22 | N9 | S-811 | 0.70% |
| Ch23 | N10 | S-811 | 0.80% |

TABLE 1-continued

| Chiral Nematic Mixtures | | | |
|---|---|---|---|
| Mixture | LC Host | Dopant | wt. % Dopant |
| Ch24 | N11 | S-811 | 0.80% |
| Ch25 | N12 | S-811 | 0.80% |
| Ch26 | N13 | S-811 | 0.80% |
| Ch27 | N1 | S-2011 | 0.80% |
| Ch28 | N2 | S-2011 | 0.80% |
| Ch29 | N3 | S-2011 | 0.80% |
| Ch31 | N4 | S-2011 | 0.80% |
| Ch31 | N5 | S-2011 | 0.80% |
| Ch32 | N6 | S-2011 | 0.80% |
| Ch33 | N7 | S-2011 | 0.80% |
| Ch34 | N8 | S-2011 | 0.80% |
| Ch35 | N9 | S-2011 | 0.80% |
| Ch36 | N10 | S-2011 | 0.80% |
| Ch37 | N11 | S-2011 | 0.80% |
| Ch38 | N12 | S-2011 | 0.80% |
| Ch39 | N13 | S-2011 | 0.80% |

The following mixtures Ch40 to Ch105 additionally contain stabilizers as indicated above. The amount of host mixture and the amount of stabilizer given in the table add up to give 100% by weight.

TABLE 2

| chiral nematic mixtures comprising stabilizers. | | |
|---|---|---|
| Mixture | Host-Mixture | Stabilizer (percentage in the mixture) |
| Ch40 | Ch5 | 0.02% of ST-8-1 |
| Ch41 | Ch5 | 0.02% of ST-12 |
| Ch42 | Ch5 | 0.01% of ST-3b-1 |
| Ch43 | Ch5 | 0.03% of ST-2a-1 and 0.02% of ST-3a-1 |
| Ch44 | Ch5 | 0.03% of ST-2a-1 |
| Ch45 | Ch5 | 0.015% of ST-9-1 |
| Ch46 | Ch5 | 0.015% of ST-8-1 |
| Ch47 | Ch5 | 0.03% of ST-12 |
| Ch48 | Ch5 | 0.03% of ST-8-1 |
| Ch49 | Ch5 | 0.25% of ST-3a-1 |
| Ch50 | Ch5 | 0.02% of ST-8-1 and 0.01% of ST-3a-1 |
| Ch51 | Ch5 | 0.02% of ST-8-1 and 0.1% of ST-3a-1 |
| Ch52 | Ch5 | 0.01% of ST-3a-1 |
| Ch53 | Ch5 | 0.025% of ST-8-1 |
| Ch54 | Ch5 | 0.025% of ST-12 |
| Ch55 | Ch5 | 0.02% of ST-9-1 and 0.02% of ST-3b-1 |
| Ch56 | Ch5 | 0.04% of ST-3b-1 and 0.01% of ST-9-1 |
| Ch57 | Ch5 | 0.02% of ST-3a-1 and 0.05% of ST-3b-1 |
| Ch58 | Ch5 | 0.02% of ST-3a-1 and 0.01% of ST-8-1 |
| Ch59 | Ch5 | 0.02% of ST-3a-1 and 0.3% of the compound of the formula 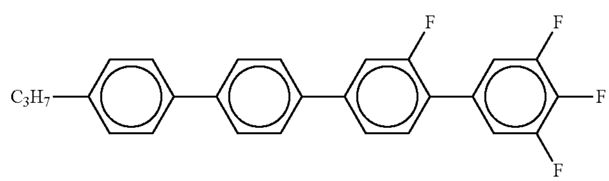 |
| Ch60 | Ch5 | 0.01% of ST-17 |
| Ch61 | Ch5 | 0.05% of ST-3b-1 and 0.15% of ST-12 |
| Ch62 | Ch8 | 0.02% of ST-8-1 |
| Ch63 | Ch8 | 0.02% of ST-12 |
| Ch64 | Ch8 | 0.01% of ST-3b-1 |
| Ch65 | Ch8 | 0.03% of ST-2a-1 and 0.02% of ST-3a-1 |
| Ch66 | Ch8 | 0.03% of ST-2a-1 |
| Ch67 | Ch8 | 0.015% of ST-9-1 |
| Ch68 | Ch8 | 0.015% of ST-8-1 |
| Ch69 | Ch8 | 0.03% of ST-12 |
| Ch70 | Ch8 | 0.03% of ST-8-1 |
| Ch71 | Ch8 | 025% of ST-3a-1 |
| Ch72 | Ch8 | 0.02% of ST-8-1 and 0.01% of ST-3a-1 |
| Ch73 | Ch8 | 0.02% of ST-8-1 and 0.1% of ST-3a-1 |
| Ch74 | Ch8 | 0.01% of ST-3a-1 |
| Ch75 | Ch8 | 0.025% of ST-8-1 |
| Ch76 | Ch8 | 0.025% of ST-12 |
| Ch77 | Ch8 | 0.02% of ST-9-1 and 0.02% of ST-3b-1 |
| Ch78 | Ch8 | 0.04% of ST-3b-1 and 0.01% of ST-9-1 |
| Ch79 | Ch8 | 0.02% of ST-3a-1 and 0.05% of ST-3b-1 |
| Ch80 | Ch8 | 0.02% of ST-3a-1 and 0.01% of ST-8-1 |
| Ch81 | Ch8 | 0.02% of ST-3a-1 and 0.3% of the compound of the formula |

TABLE 2-continued

| chiral nematic mixtures comprising stabilizers. | | |
|---|---|---|
| Mixture | Host-Mixture | Stabilizer (percentage in the mixture) |
| | | 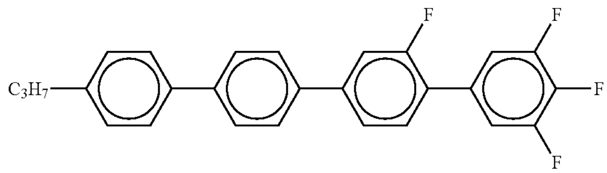 |
| Ch82 | Ch8 | 0.01% of ST-17 |
| Ch83 | Ch8 | 0.05% of ST-3b-1 and 0.15% of ST-12 |
| Ch84 | Ch9 | 0.02% of ST-8-1 |
| Ch85 | Ch9 | 0.02% of ST-12 |
| Ch86 | Ch9 | 0.01% of ST-3b-1 |
| Ch87 | Ch9 | 0.03% of ST-2a-1 and 0.02% of ST-3a-1 |
| Ch88 | Ch9 | 0.03% of ST-2a-1 |
| Ch89 | Ch9 | 0.015% of ST-9-1 |
| Ch90 | Ch9 | 0.015% of ST-8-1 |
| Ch91 | Ch9 | 0.03% of ST-12 |
| Ch92 | Ch9 | 0.03% of ST-8-1 |
| Ch93 | Ch9 | 025% of ST-3a-1 |
| Ch94 | Ch9 | 0.02% of ST-8-1 and 0.01% of ST-3a-1 |
| Ch95 | Ch9 | 0.02% of ST-8-1 and 0.1% of ST-3a-1 |
| Ch96 | Ch9 | 0.01% of ST-3a-1 |
| Ch97 | Ch9 | 0.025% of ST-8-1 |
| Ch98 | Ch9 | 0.025% of ST-12 |
| Ch99 | Ch9 | 0.02% of ST-9-1 and 0.02% of ST-3b-1 |
| Ch100 | Ch9 | 0.04% of ST-3b-1 and 0.01% of ST-9-1 |
| Ch101 | Ch9 | 0.02% of ST-3a-1 and 0.05% of ST-3b-1 |
| Ch102 | Ch9 | 0.02% of ST-3a-1 and 0.01% of ST-8-1 |
| Ch103 | Ch9 | 0.02% of ST-3a-1 and 0.3% of the compound of the formula 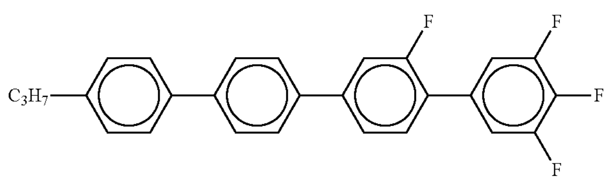 |
| Ch104 | Ch9 | 0.01% of ST-17 |
| Ch105 | Ch9 | 0.05% of ST-3b-1 and 0.15% of ST-12 |

Polymerizable Chiral Nematic Mixtures

The following polymerizable chiral nematic mixtures are prepared from the chiral nematic mixtures given in Table 1 by adding a reactive mesogen (RM) selected from the group of compounds of the formulae RM1, RM2 and RM3 in the amount given in the Table 4 (% RM).

RM1

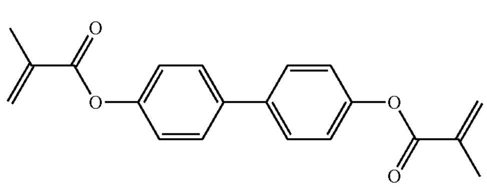

-continued

RM2

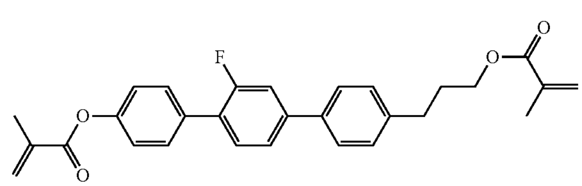

RM3

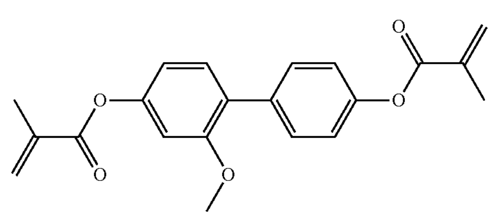

TABLE 4

Polymerizable Chiral Nematic Mixtures.

| Mixture | LC Host | RM | % RM | Dopant | % dopant | pitch [µm] |
|---|---|---|---|---|---|---|
| PCh1 | N1 | RM1 | 0.3 | S-4011 | 0.79 | |
| PCh2 | N2 | RM1 | 0.3 | S-4011 | 0.89 | |
| PCh3 | N3 | RM1 | 0.3 | S-4011 | 0.82 | |
| PCh4 | N4 | RM1 | 0.3 | S-4011 | 0.81 | |
| PCh5 | N5 | RM1 | 0.3 | S-4011 | 0.81 | 13 |
| PCh6 | N6 | RM1 | 0.3 | S-4011 | 0.82 | 13 |
| PCh7 | N7 | RM1 | 0.3 | S-4011 | 0.81 | 13 |
| PCh8 | N8 | RM1 | 0.3 | S-4011 | 0.89 | 13 |
| PCh9 | N9 | RM1 | 0.3 | S-4011 | 0.83 | 13 |
| PCh10 | N10 | RM1 | 0.3 | S-4011 | 0.91 | |
| PCh11 | N11 | RM1 | 0.3 | S-4011 | 0.67 | |
| PCh12 | N12 | RM1 | 0.3 | S-4011 | 0.99 | |
| PCh13 | N13 | RM1 | 0.3 | S-4011 | 1.18 | |
| PCh14 | N1 | RM1 | 0.3 | S-811 | 0.23 | |
| PCh15 | N2 | RM1 | 0.3 | S-811 | 0.44 | |
| PCh16 | N3 | RM1 | 0.3 | S-811 | 0.56 | |
| PCh17 | N4 | RM1 | 0.3 | S-811 | 0.87 | |
| PCh18 | N5 | RM1 | 0.3 | S-811 | 0.70 | 13 |
| PCh19 | N6 | RM1 | 0.3 | S-811 | 0.92 | |
| PCh20 | N7 | RM1 | 0.3 | S-811 | 0.12 | |
| PCh21 | N8 | RM1 | 0.3 | S-811 | 0.72 | 13 |
| PCh22 | N9 | RM1 | 0.3 | S-811 | 0.70 | 13 |
| PCh23 | N10 | RM1 | 0.3 | S-811 | 0.47 | |
| PCh24 | N11 | RM1 | 0.3 | S-811 | 0.84 | |
| PCh25 | N12 | RM1 | 0.3 | S-811 | 0.81 | |
| PCh26 | N13 | RM1 | 0.3 | S-811 | 0.81 | |
| PCh27 | N1 | RM1 | 0.3 | S-2011 | 0.82 | |
| PCh28 | N2 | RM1 | 0.3 | S-2011 | 0.31 | |
| PCh29 | N3 | RM1 | 0.3 | S-2011 | 0.87 | |
| PCh31 | N4 | RM1 | 0.3 | S-2011 | 0.53 | |
| PCh31 | N5 | RM1 | 0.3 | S-2011 | 0.45 | |
| PCh32 | N6 | RM1 | 0.3 | S-2011 | 0.46 | |
| PCh33 | N7 | RM1 | 0.3 | S-2011 | 0.44 | |
| PCh34 | N8 | RM1 | 0.3 | S-2011 | 0.27 | |
| PCh35 | N9 | RM1 | 0.3 | S-2011 | 1.55 | |
| PCh36 | N10 | RM1 | 0.3 | S-2011 | 0.56 | |
| PCh37 | N11 | RM1 | 0.3 | S-2011 | 0.81 | |
| PCh38 | N12 | RM1 | 0.3 | S-2011 | 0.82 | |
| PCh39 | N13 | RM1 | 0.3 | S-2011 | 0.37 | |
| PCh40 | N1 | RM2 | 0.4 | S-4011 | 0.88 | |
| PCh41 | N2 | RM2 | 0.4 | S-4011 | 0.89 | |
| PCh42 | N3 | RM2 | 0.4 | S-4011 | 0.82 | |
| PCh43 | N4 | RM2 | 0.4 | S-4011 | 0.81 | |
| PCh44 | N5 | RM2 | 0.4 | S-4011 | 0.81 | 13 |
| PCh45 | N6 | RM2 | 0.4 | S-4011 | 0.82 | 13 |
| PCh46 | N7 | RM2 | 0.4 | S-4011 | 0.81 | 13 |
| PCh47 | N8 | RM2 | 0.4 | S-4011 | 0.89 | 13 |
| PCh48 | N9 | RM2 | 0.4 | S-4011 | 0.83 | 13 |
| PCh49 | N10 | RM2 | 0.4 | S-4011 | 0.31 | |
| PCh50 | N11 | RM2 | 0.4 | S-4011 | 0.87 | |
| PCh51 | N12 | RM2 | 0.4 | S-4011 | 0.53 | |
| PCh52 | N13 | RM2 | 0.4 | S-4011 | 0.45 | |
| PCh53 | N1 | RM2 | 0.4 | S-811 | 0.46 | |
| PCh54 | N2 | RM2 | 0.4 | S-811 | 0.44 | |
| PCh55 | N3 | RM2 | 0.4 | S-811 | 0.27 | |
| PCh56 | N4 | RM2 | 0.4 | S-811 | 0.36 | |
| PCh57 | N5 | RM2 | 0.4 | S-811 | 0.70 | 13 |
| PCh58 | N6 | RM2 | 0.4 | S-811 | 0.56 | |
| PCh59 | N7 | RM2 | 0.4 | S-811 | 0.81 | |
| PCh60 | N8 | RM2 | 0.4 | S-811 | 0.72 | 13 |
| PCh61 | N9 | RM2 | 0.4 | S-811 | 0.70 | 13 |
| PCh62 | N10 | RM2 | 0.4 | S-811 | 0.36 | |
| PCh63 | N11 | RM2 | 0.4 | S-811 | 0.47 | |

TABLE 4-continued

Polymerizable Chiral Nematic Mixtures.

| Mixture | LC Host | RM | % RM | Dopant | % dopant | pitch [µm] |
|---|---|---|---|---|---|---|
| PCh64 | N12 | RM2 | 0.4 | S-811 | 0.53 | |
| PCh65 | N13 | RM2 | 0.4 | S-811 | 0.45 | |
| PCh66 | N1 | RM2 | 0.4 | S-2011 | 0.46 | |
| PCh67 | N2 | RM2 | 0.4 | S-2011 | 0.44 | |
| PCh68 | N3 | RM2 | 0.4 | S-2011 | 0.27 | |
| PCh69 | N4 | RM2 | 0.4 | S-2011 | 1.55 | |
| PCh70 | N5 | RM2 | 0.4 | S-2011 | 0.81 | |
| PCh71 | N6 | RM2 | 0.4 | S-2011 | 0.81 | |
| PCh72 | N7 | RM2 | 0.4 | S-2011 | 0.82 | |
| PCh73 | N8 | RM2 | 0.4 | S-2011 | 0.89 | |
| PCh74 | N9 | RM2 | 0.4 | S-2011 | 0.83 | |
| PCh75 | N10 | RM2 | 0.4 | S-2011 | 0.47 | |
| PCh76 | N11 | RM2 | 0.4 | S-2011 | 0.84 | |
| PCh77 | N12 | RM2 | 0.4 | S-2011 | 0.81 | |
| PCh78 | N13 | RM2 | 0.4 | S-2011 | 0.81 | |
| PCh79 | N1 | RM3 | 0.3 | S-4011 | 0.52 | |
| PCh80 | N2 | RM3 | 0.3 | S-4011 | 0.89 | |
| PCh81 | N3 | RM3 | 0.3 | S-4011 | 0.82 | |
| PCh82 | N4 | RM3 | 0.3 | S-4011 | 0.81 | |
| PCh83 | N5 | RM3 | 0.3 | S-4011 | 0.81 | 13 |
| PCh84 | N6 | RM3 | 0.3 | S-4011 | 0.82 | 13 |
| PCh85 | N7 | RM3 | 0.3 | S-4011 | 0.81 | 13 |
| PCh86 | N8 | RM3 | 0.3 | S-4011 | 0.89 | 13 |
| PCh87 | N9 | RM3 | 0.3 | S-4011 | 0.83 | 13 |
| PCh88 | N10 | RM3 | 0.3 | S-4011 | 0.73 | |
| PCh89 | N11 | RM3 | 0.3 | S-4011 | 0.68 | |
| PCh90 | N12 | RM3 | 0.3 | S-4011 | 0.68 | |
| PCh91 | N13 | RM3 | 0.3 | S-4011 | 0.90 | |
| PCh92 | N1 | RM3 | 0.3 | S-811 | 0.91 | |
| PCh93 | N2 | RM3 | 0.3 | S-811 | 0.66 | |
| PCh94 | N3 | RM3 | 0.3 | S-811 | 0.82 | |
| PCh95 | N4 | RM3 | 0.3 | S-811 | 0.54 | |
| PCh96 | N5 | RM3 | 0.3 | S-811 | 0.70 | 13 |
| PCh97 | N6 | RM3 | 0.3 | S-811 | 0.83 | |
| PCh98 | N7 | RM3 | 0.3 | S-811 | 0.73 | |
| PCh99 | N8 | RM3 | 0.3 | S-811 | 0.72 | 13 |
| PCh100 | N9 | RM3 | 0.3 | S-811 | 0.70 | 13 |
| PCh101 | N10 | RM3 | 0.3 | S-811 | 0.77 | |
| PCh102 | N11 | RM3 | 0.3 | S-811 | 0.85 | |
| PCh103 | N12 | RM3 | 0.3 | S-811 | 0.86 | |
| PCh104 | N13 | RM3 | 0.3 | S-811 | 0.93 | |
| PCh105 | N1 | RM3 | 0.3 | S-2011 | 0.68 | |
| PCh106 | N2 | RM3 | 0.3 | S-2011 | 0.87 | |
| PCh107 | N3 | RM3 | 0.3 | S-2011 | 0.88 | |
| PCh108 | N4 | RM3 | 0.3 | S-2011 | 0.92 | |
| PCh109 | N5 | RM3 | 0.3 | S-2011 | 0.43 | |
| PCh110 | N6 | RM3 | 0.3 | S-2011 | 0.58 | |
| PCh111 | N7 | RM3 | 0.3 | S-2011 | 0.59 | |
| PCh112 | N8 | RM3 | 0.3 | S-2011 | 0.67 | |
| PCh113 | N9 | RM3 | 0.3 | S-2011 | 0.34 | |
| PCh114 | N10 | RM3 | 0.3 | S-2011 | 0.79 | |
| PCh115 | N11 | RM3 | 0.3 | S-2011 | 0.83 | |
| PCh116 | N12 | RM3 | 0.3 | S-2011 | 0.83 | |
| PCh117 | N13 | RM3 | 0.3 | S-2011 | 0.83 | |

The polymerizable mixtures PCh1 to PCh117 preferably contain stabilizers in the same concentration as given in Table 2 for chiral nematic mixtures.

The following mixtures PCh118 to PCh183 additionally contain stabilizers as indicated above. The amount of host mixture and the amount of stabilizer given in the table add up to give 100% by weight.

TABLE 5

Polymerizable chiral nematic mixtures comprising stabilizers.

| Mixture | Host-Mixture | Stabilizer (percentage in the mixture) |
|---|---|---|
| PCh118 | PCh5 | 0.02% of ST-8-1 |
| PCh119 | PCh5 | 0.02% of ST-12 |

TABLE 5-continued

Polymerizable chiral nematic mixtures comprising stabilizers.

| Mixture | Host-Mixture | Stabilizer (percentage in the mixture) |
|---|---|---|
| PCh120 | PCh5 | 0.01% of ST-3b-1 |
| PCh121 | PCh5 | 0.03% of ST-2a-1 and 0.02% of ST-3a-1 |
| PCh122 | PCh5 | 0.03% of ST-2a-1 |
| PCh123 | PCh5 | 0.015% of ST-9-1 |
| PCh124 | PCh5 | 0.015% of ST-8-1 |
| PCh125 | PCh5 | 0.03% of ST-12 |
| PCh126 | PCh5 | 0.03% of ST-8-1 |
| PCh127 | PCh5 | 0.25% of ST-3a-1 |
| PCh128 | PCh5 | 0.02% of ST-8-1 and 0.01% of ST-3a-1 |
| PCh129 | PCh5 | 0.02% of ST-8-1 and 0.1% of ST-3a-1 |
| PCh130 | PCh5 | 0.01% of ST-3a-1 |
| PCh131 | PCh5 | 0.025% of ST-8-1 |
| PCh132 | PCh5 | 0.025% of ST-12 |
| PCh133 | PCh5 | 0.02% of ST-9-1 and 0.02% of ST-3b-1 |
| PCh134 | PCh5 | 0.04% of ST-3b-1 and 0.01% of ST-9-1 |
| PCh135 | PCh5 | 0.02% of ST-3a-1 and 0.05% of ST-3b-1 |
| PCh136 | PCh5 | 0.02% of ST-3a-1 and 0.01% of ST-8-1 |
| PCh137 | PCh5 | 0.02% of ST-3a-1 and 0.3% of the compound of the formula |

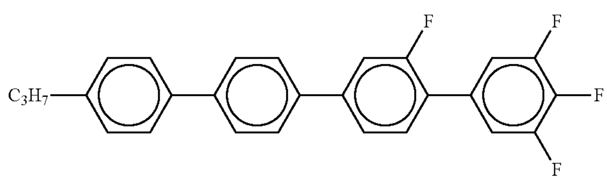

| | | |
|---|---|---|
| PCh138 | PCh5 | 0.01% of ST-17 |
| PCh139 | PCh5 | 0.05% of ST-3b-1 and 0.15% of ST-12 |
| PCh140 | PCh8 | 0.02% of ST-8-1 |
| PCh141 | PCh8 | 0.02% of ST-12 |
| PCh142 | PCh8 | 0.01% of ST-3b-1 |
| PCh143 | PCh8 | 0.03% of ST-2a-1 and 0.02% of ST-3a-1 |
| PCh144 | PCh8 | 0.03% of ST-2a-1 |
| PCh145 | PCh8 | 0.015% of ST-9-1 |
| PCh146 | PCh8 | 0.015% of ST-8-1 |
| PCh147 | PCh8 | 0.03% of ST-12 |
| PCh148 | PCh8 | 0.03% of ST-8-1 |
| PCh149 | PCh8 | 025% of ST-3a-1 |
| PCh150 | PCh8 | 0.02% of ST-8-1 and 0.01% of ST-3a-1 |
| PCh151 | PCh8 | 0.02% of ST-8-1 and 0.1% of ST-3a-1 |
| PCh152 | PCh8 | 0.01% of ST-3a-1 |
| PCh153 | PCh8 | 0.025% of ST-8-1 |
| PCh154 | PCh8 | 0.025% of ST-12 |
| PCh155 | PCh8 | 0.02% of ST-9-1 and 0.02% of ST-3b-1 |
| PCh156 | PCh8 | 0.04% of ST-3b-1 and 0.01% of ST-9-1 |
| PCh157 | PCh8 | 0.02% of ST-3a-1 and 0.05% of ST-3b-1 |
| PCh158 | PCh8 | 0.02% of ST-3a-1 and 0.01% of ST-8-1 |
| PCh159 | PCh8 | 0.02% of ST-3a-1 and 0.3% of the compound of the formula |

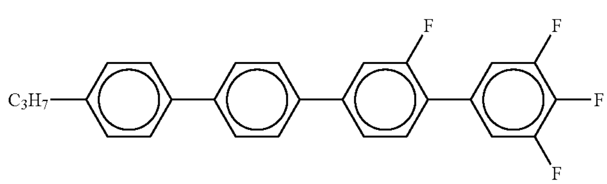

| | | |
|---|---|---|
| PCh160 | PCh8 | 0.01% of ST-17 |
| PCh161 | PCh8 | 0.05% of ST-3b-1 and 0.15% of ST-12 |
| PCh162 | PCh9 | 0.02% of ST-8-1 |
| PCh163 | PCh9 | 0.02% of ST-12 |
| PCh164 | PCh9 | 0.01% of ST-3b-1 |
| PCh165 | PCh9 | 0.03% of ST-2a-1 and 0.02% of ST-3a-1 |
| PCh166 | PCh9 | 0.03% of ST-2a-1 |
| PCh167 | PCh9 | 0.015% of ST-9-1 |
| PCh168 | PCh9 | 0.015% of ST-8-1 |
| PCh169 | PCh9 | 0.03% of ST-12 |
| PCh170 | PCh9 | 0.03% of ST-8-1 |
| PCh171 | PCh9 | 025% of ST-3a-1 |
| PCh172 | PCh9 | 0.02% of ST-8-1 and 0.01% of ST-3a-1 |

TABLE 5-continued

Polymerizable chiral nematic mixtures comprising stabilizers.

| Mixture | Host-Mixture | Stabilizer (percentage in the mixture) |
|---|---|---|
| PCh173 | PCh9 | 0.02% of ST-8-1 and 0.1% of ST-3a-1 |
| PCh174 | PCh9 | 0.01% of ST-3a-1 |
| PCh175 | PCh9 | 0.025% of ST-8-1 |
| PCh176 | PCh9 | 0.025% of ST-12 |
| PCh177 | PCh9 | 0.02% of ST-9-1 and 0.02% of ST-3b-1 |
| PCh178 | PCh9 | 0.04% of ST-3b-1 and 0.01% of ST-9-1 |
| PCh179 | PCh9 | 0.02% of ST-3a-1 and 0.05% of ST-3b-1 |
| PCh180 | PCh9 | 0.02% of ST-3a-1 and 0.01% of ST-8-1 |
| PCh181 | PCh9 | 0.02% of ST-3a-1 and 0.3% of the compound of the formula |

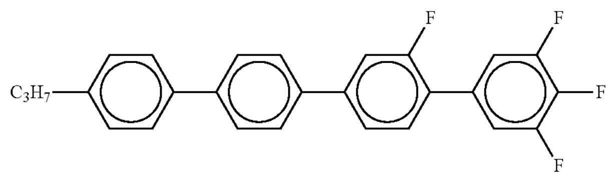

| | | |
|---|---|---|
| PCh182 | PCh9 | 0.01% of ST-17 |
| PCh183 | PCh9 | 0.05% of ST-3b-1 and 0.15% of ST-12 |

Transmission Measurements

Transmission values of the above mixtures are exemplified as follows.

For the transmission measurement, a Zeiss AxioScope measurement system is used and the voltage-transmission curve is measured at a temperature of 25° C. (frequency: 60 Hz; range: 0-10V with an increment of 0.1 V). The results are shown in Tables 6 and 7.

The transmission of the chiral nematic mixtures is measured in VA test cells.

TABLE 6

Transmission values of chiral nematic mixtures

| Voltage [V] | Transmission [a.u.] of Mixture | | | | | | |
|---|---|---|---|---|---|---|---|
| | C1 | Ch5 | Ch8 | Ch9 | Ch18 | Ch21 | Ch22 |
| 1.0 | 0.023 | 0.025 | 0.026 | 0.026 | 0.025 | 0.023 | 0.025 |
| 2.0 | 0.025 | 0.027 | 0.026 | 0.025 | 0.027 | 0.025 | 0.025 |
| 2.5 | 0.071 | 0.141 | 0.044 | 0.029 | 0.145 | 0.041 | 0.028 |
| 3.0 | 0.869 | 1.030 | 0.661 | 0.314 | 1.030 | 0.653 | 0.324 |
| 3.5 | 2.122 | 2.231 | 1.761 | 1.267 | 2.219 | 1.742 | 1.278 |
| 4.0 | 3.206 | 3.414 | 2.927 | 2.365 | 3.392 | 2.904 | 2.392 |
| 4.5 | 3.970 | 4.408 | 3.992 | 3.420 | 4.391 | 3.960 | 3.470 |
| 5.0 | 4.484 | 5.148 | 4.841 | 4.331 | 5.148 | 4.796 | 4.384 |
| 5.5 | 4.829 | 5.671 | 5.465 | 5.036 | 5.693 | 5.409 | 5.085 |
| 6.0 | 5.081 | 6.037 | 5.912 | 5.548 | 6.079 | 5.845 | 5.594 |
| 6.5 | 5.280 | 6.297 | 6.236 | 5.914 | 6.359 | 6.163 | 5.964 |
| 7.0 | 5.440 | 6.474 | 6.469 | 6.183 | 6.551 | 6.395 | 6.233 |
| 7.5 | 5.572 | 6.597 | 6.634 | 6.380 | 6.689 | 6.559 | 6.435 |
| 8.0 | 5.684 | 6.684 | 6.749 | 6.521 | 6.786 | 6.674 | 6.578 |

The test cells for the transmission measurements of the polymerizable chiral nematic mixtures are prepared as follows:

Test cells having a fishbone electrode layout specified above are filled with a polymerizable chiral nematic mixture, and are then irradiated (UV fluorescent lamp, 5.1 mW/cm$^2$ at 313 nm) with an applied voltage (20V AC with square wave form, 1 kHz) and post-cured (UV intensity 2.6 mW/cm$^2$ at 313 nm) for 2 h. The transmission values are determined as described above and are shown in Table 6.

TABLE 7

Transmission values of polymerizable chiral nematic mixtures

| Voltage | Transmission [a.u.] of Mixture | | | | | | |
|---|---|---|---|---|---|---|---|
| [V] | C2 | PCh5 | PCh86 | PCh87 | PCh18 | PCh99 | PCh100 |
| 1.0 | 0.024 | 0.025 | 0.026 | 0.025 | 0.025 | 0.025 | 0.023 |
| 2.0 | 0.025 | 0.026 | 0.027 | 0.026 | 0.026 | 0.026 | 0.025 |
| 2.5 | 0.060 | 0.111 | 0.077 | 0.031 | 0.116 | 0.070 | 0.029 |
| 3.0 | 0.809 | 0.904 | 1.027 | 0.373 | 1.003 | 1.038 | 0.365 |
| 3.5 | 2.044 | 2.012 | 2.587 | 1.657 | 2.226 | 2.635 | 1.614 |
| 4.0 | 3.135 | 3.119 | 3.837 | 2.966 | 3.388 | 3.914 | 2.899 |
| 4.5 | 3.915 | 4.092 | 4.696 | 3.955 | 4.364 | 4.795 | 3.901 |
| 5.0 | 4.443 | 4.856 | 5.287 | 4.670 | 5.111 | 5.405 | 4.656 |
| 5.5 | 4.803 | 5.424 | 5.706 | 5.193 | 5.656 | 5.837 | 5.221 |
| 6.0 | 5.065 | 5.839 | 6.011 | 5.576 | 6.047 | 6.150 | 5.646 |
| 6.5 | 5.272 | 6.141 | 6.239 | 5.860 | 6.332 | 6.384 | 5.965 |
| 7.0 | 5.438 | 6.354 | 6.408 | 6.078 | 6.530 | 6.561 | 6.207 |
| 7.5 | 5.575 | 6.510 | 6.533 | 6.246 | 6.672 | 6.685 | 6.392 |
| 8.0 | 5.690 | 6.622 | 6.624 | 6.369 | 6.774 | 6.780 | 6.529 |

In the on-state, the mixtures Ch5, Ch8, Ch9, Ch18, Ch21, Ch22 according to the invention show improved transmission compared to mixture $C_1$ from the state of the art.

In the on-state, the mixtures PCh5, PCh86, PCh87, PCh18, PCh99, PCh100 according to the invention show improved transmission compared to mixture C2 from the state of the art.

The following table, Table 8, shows the transmission values for the nematic host mixtures N5, N8 and N9 and the corresponding mixtures Ch5, Ch8 and Ch9 comprising the chiral dopant S-4011. As can be seen, the transmission of the mixtures Ch5, Ch8 and Ch9 is clearly improved compared to the mixtures without chiral dopant. The same is the case for the mixtures Ch18, Ch21 and Ch22 (not shown here, see Table 6 above), which comprise the chiral dopant S-811.

TABLE 8

| | Transmission [a.u.] of Mixture | | | | | |
|---|---|---|---|---|---|---|
| Voltage [V] | N5 | Ch5 | N8 | Ch8 | N9 | Ch9 |
| 1.0 | 0.025 | 0.025 | 0.025 | 0.026 | 0.025 | 0.026 |
| 2.0 | 0.026 | 0.027 | 0.026 | 0.026 | 0.025 | 0.025 |
| 2.5 | 0.077 | 0.141 | 0.032 | 0.044 | 0.028 | 0.029 |
| 3.0 | 1.264 | 1.030 | 0.763 | 0.661 | 0.285 | 0.314 |
| 3.5 | 3.043 | 2.231 | 2.527 | 1.761 | 1.782 | 1.267 |
| 4.0 | 4.313 | 3.414 | 4.014 | 2.927 | 3.454 | 2.365 |
| 4.5 | 4.952 | 4.408 | 4.837 | 3.992 | 4.543 | 3.420 |
| 5.0 | 5.203 | 5.148 | 5.190 | 4.841 | 5.077 | 4.331 |
| 5.5 | 5.271 | 5.671 | 5.300 | 5.465 | 5.284 | 5.036 |
| 6.0 | 5.260 | 6.037 | 5.302 | 5.912 | 5.332 | 5.548 |
| 6.5 | 5.222 | 6.297 | 5.266 | 6.236 | 5.315 | 5.914 |
| 7.0 | 5.222 | 6.474 | 5.266 | 6.469 | 5.315 | 6.183 |
| 7.5 | 5.184 | 6.597 | 5.193 | 6.634 | 5.232 | 6.380 |
| 8.0 | 5.187 | 6.684 | 5.184 | 6.749 | 5.208 | 6.521 |

The above shown transmission values of the polymerizable chiral nematic mixtures (Table 7) are equally improved over the transmission values of the host mixtures N5, N8 and N9.

Self Aligning Mixtures

Alignment Additive Example 1

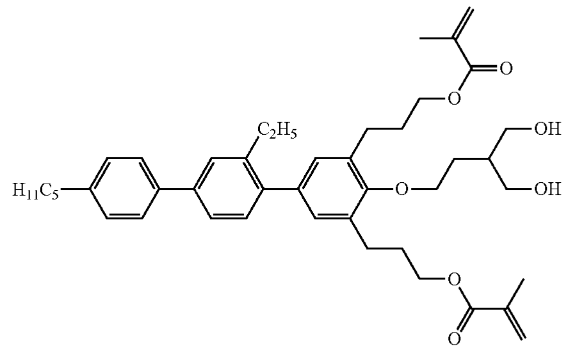

The additive is prepared as described in WO 2017/041893.
Phases: $T_g$-33 K 26 I
Together with the above host mixtures the following alignment additives are used:

SA-1

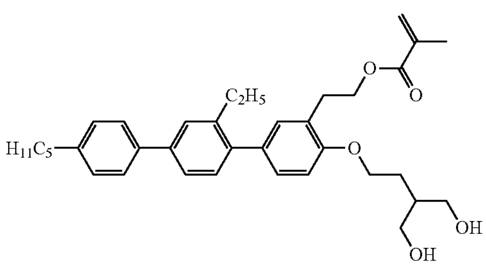

(prepared as described in EP 2918658)

SA-2

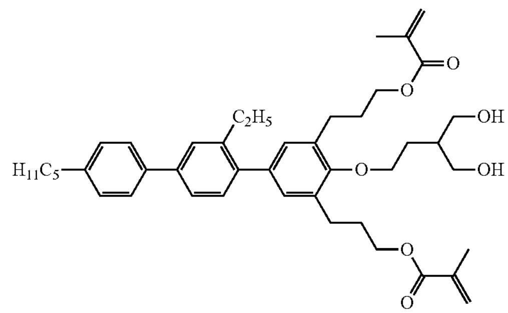

SA-3

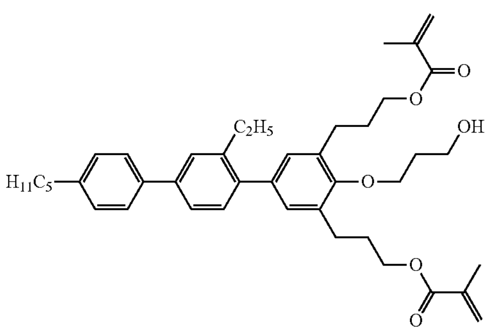

SA-4

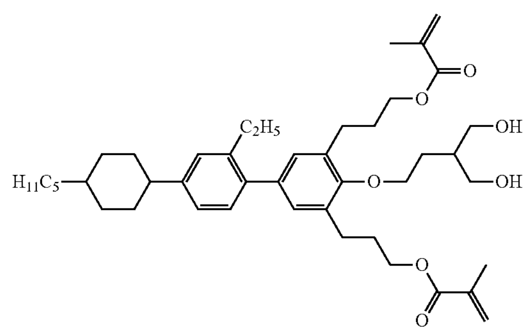

SA-5

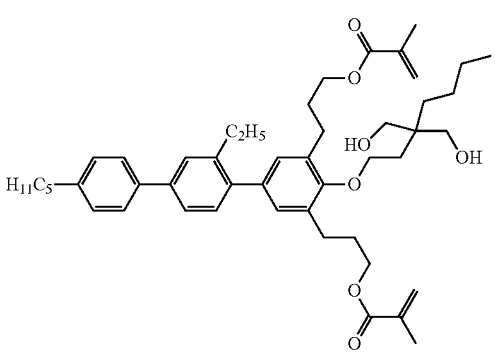

SA-6

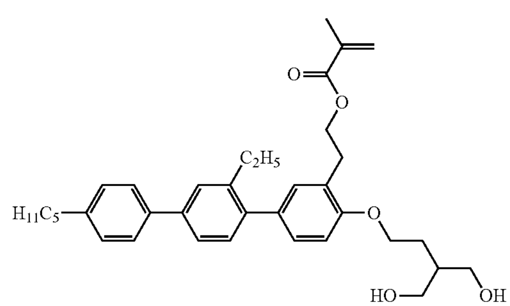

-continued
SA-7
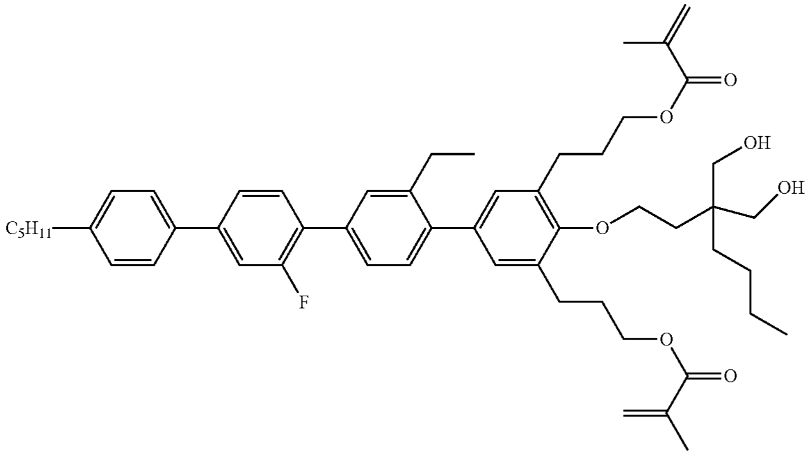
SA-8
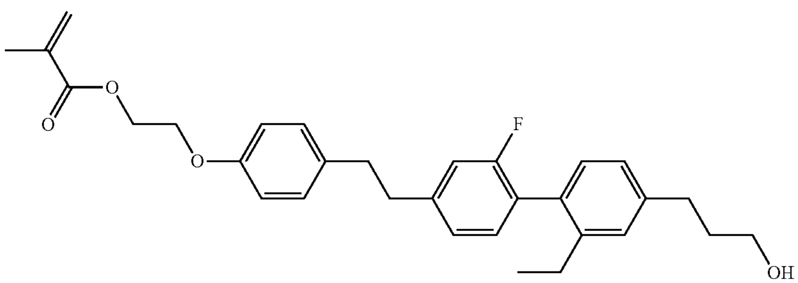
SA-9
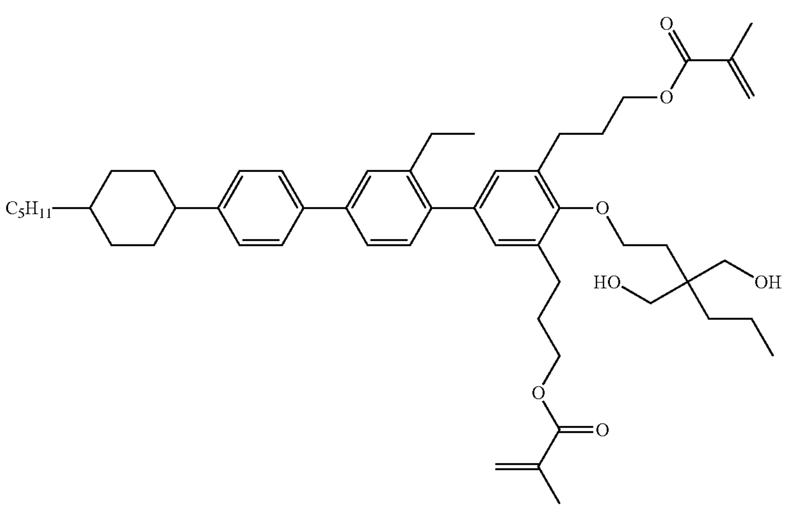

-continued
SA-10
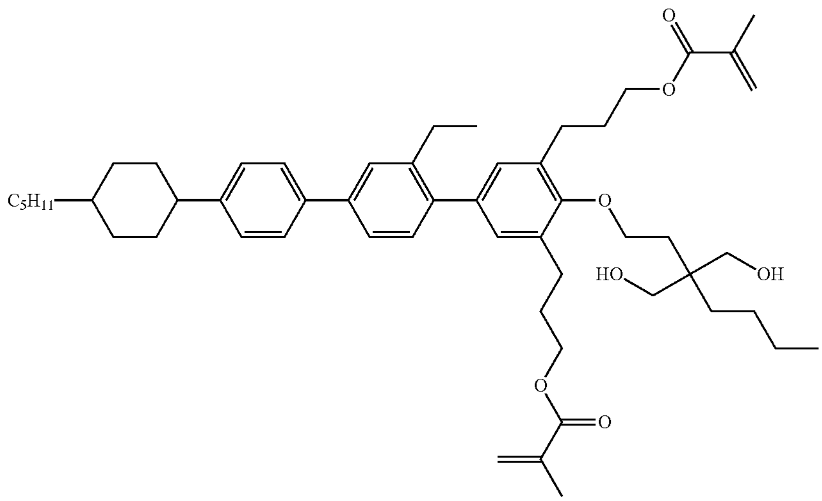
SA-11
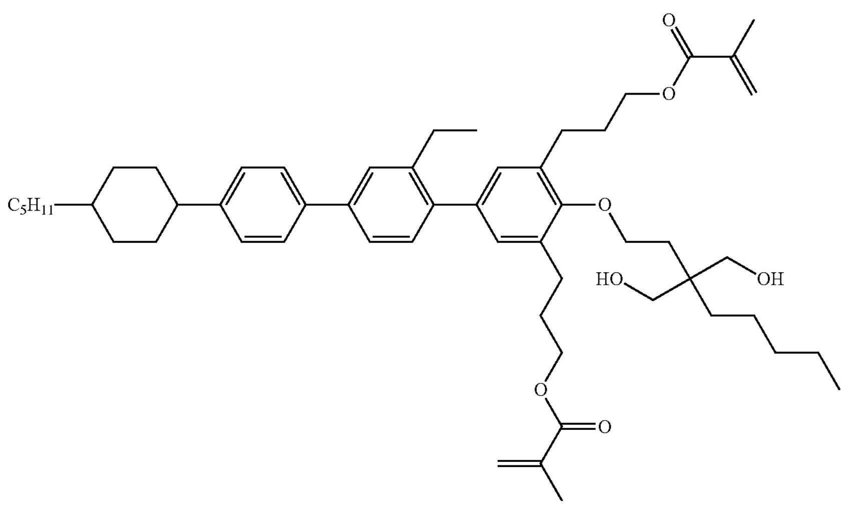
SA-12
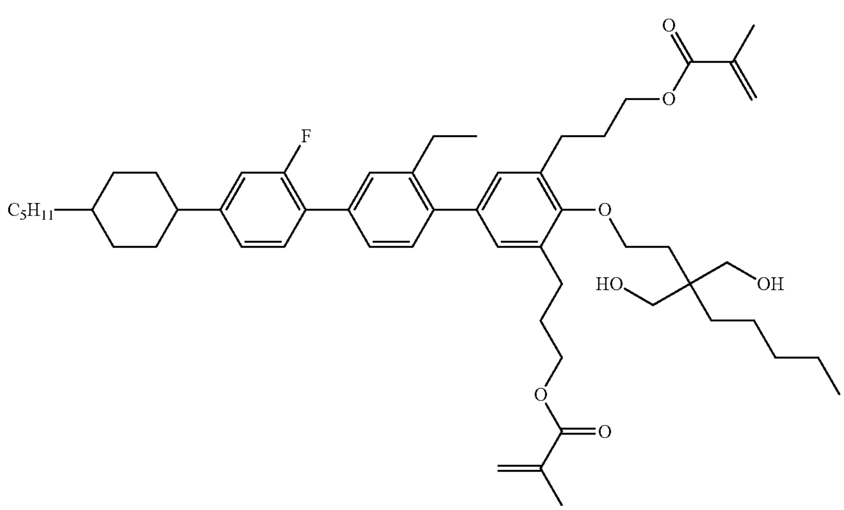

-continued

SA-13

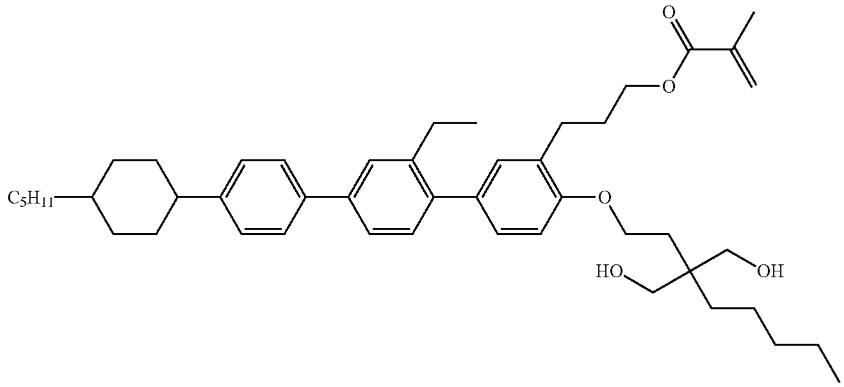

all prepared analogously to compound SA-2.

Self aligning LC media according to the invention are prepared with each of the above host mixtures Ch1 to Ch105 according to the following table, by adding the alignment additive(s) and reactive mesogen (RM) indicated, followed by homogenization.

TABLE 9

Composition of Mixture Examples SM1 to SM1365 (all percentages are % by weight based on the whole mixture)

| Mix. No. | LC host [weight %] | alignment additive | RM |
|---|---|---|---|
| SM1-SM105 | Ch1 to Ch105 (99.4%) | SA-1 (0.3%) | RM1 (0.3%) |
| SM106 to SM210 | Ch1 to Ch105 (99.4%) | SA-2 (0.3%) | RM1 (0.3%) |
| SM211 to SM315 | Ch1 to Ch105 (99.4%) | SA-3 (0.3%) | RM1 (0.3%) |
| SM316 to SM420 | Ch1 to Ch105 (99.4%) | SA-4 (0.3%) | RM1 (0.3%) |
| SM421 to SM525 | Ch1 to Ch105 (99.4%) | SA-5 (0.3%) | RM1 (0.3%) |
| SM526 to SM630 | Ch1 to Ch105 (99.4%) | SA-6 (0.3%) | RM1 (0.3%) |
| SM631 to SM735 | Ch1 to Ch105 (99.4%) | SA-7 (0.3%) | RM1 (0.3%) |
| SM736 to SM840 | Ch1 to Ch105 (99.4%) | SA-8 (0.3%) | RM1 (0.3%) |
| SM841 to SM945 | Ch1 to Ch105 (99.4%) | SA-9 (0.3%) | RM1 (0.3%) |
| SM946 to SM1050 | Ch1 to Ch105 (99.4%) | SA-10 (0.3%) | RM1 (0.3%) |
| SM1051 to SM1155 | Ch1 to Ch105 (99.4%) | SA-11 (0.3%) | RM1 (0.3%) |
| SM1156 to SM1260 | Ch1 to Ch105 (99.4%) | SA-12 (0.3%) | RM1 (0.3%) |
| SM1261 to SM1365 | Ch1 to Ch105 (99.4%) | SA-13 (0.3%) | RM1 (0.3%) |

The resulting mixtures are homogenized and filled into "alignment-free" test cells (cell thickness d 4.0 μm, ITO coating on both sides (structured ITO in case of a multi-domain switching), no alignment layer and no passivation layer).

The LC-mixtures show a spontaneous homeotropic (vertical) orientation with respect to the surface of the substrates. The orientation is stable to elevated temperatures up to the clearing point of the respective host mixture Ch1 to Ch105. The resulting VA-cell can be reversibly switched. Crossed polarizers are applied to visualize the switching operation.

By using alignment additives like the compound of the formula SA-1 to SA-13, no alignment layer (e.g. no PI coating) is required for vertical orientation for any kind of display technologies. In addition, the transmission values of the test cells produced using the mixtures SA1 to SA1165 are comparable to those given in table 6 above where test cells with polyimide are used.

The entire disclosures of all applications, patents and publications, cited herein and of corresponding European Application No. EP 17208846.0, filed Dec. 20, 2017, and European Application No. EP 18156003.8, filed Feb. 9, 2018, are incorporated by reference herein.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid crystal display comprising:

two substrates, at least one which is transparent to light;

an electrode provided on each substrate or two electrodes provided on only one of the substrates; and located between the substrates a layer of a liquid-crystal medium;

the liquid-crystal medium comprising:

a liquid-crystalline host containing a liquid crystal component, and an optically active component, wherein the liquid crystal component comprises one or more compounds of formula CPY-n-Om, one or more compounds of formula PY-n-Om and one or more compounds of formula PYP-n-m in a total concentration in the range of from 45 to 70%:

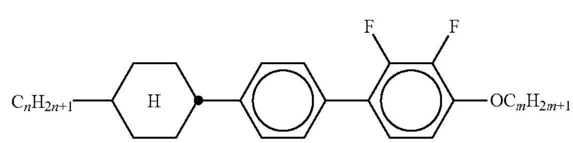

CPY-n-Om

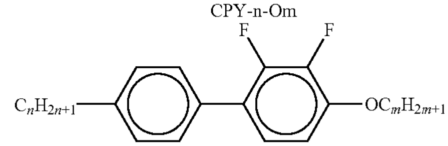

PY-n-Om

-continued

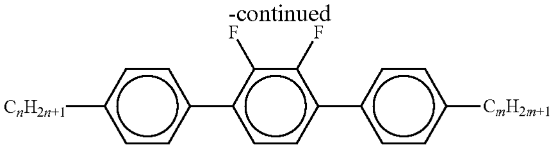

PYP-n-m wherein m and n are each, independently of each other, an integer from 1 to 12, wherein the liquid crystal medium has negative dielectric anisotropy and the molecules in the layer of the liquid crystal medium in the switched-off state are aligned perpendicular to the electrode surfaces or have a tilted homeotropic alignment, the liquid-crystalline host has a chiral pitch, p, in the range of from 8 to 30 μm, the liquid crystal component has a birefringence Δn in the range of from 0.110 to 0.150;

wherein the display has a cell gap and the thickness, d, of the cell gap is in the range of from 3 μm to 5 μm; and wherein the ratio d/p between the thickness of the cell gap d and the chiral pitch p is 0.1 to 1.

2. The liquid crystal display according to claim 1, wherein the optically active component comprises one or more compounds selected from the formulae

A-I

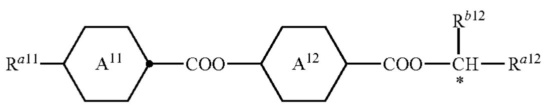

A-II

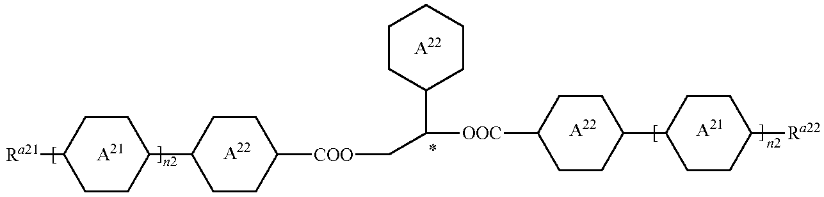

A-III

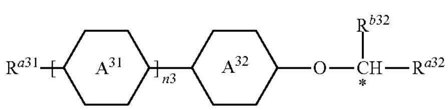

A-Ch

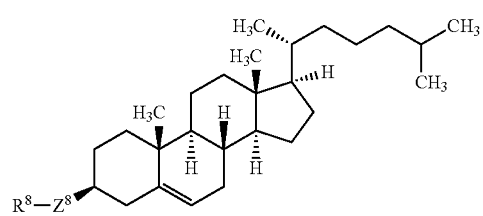

in which $R^{a11}$, $R^{a12}$ and $R^{b12}$, independently of one another, denote alkyl having 1 to 15 C atoms, in which, in addition, one or more non-adjacent $CH_2$ groups may each be replaced, independently of one another, by —C($R^z$)═C($R^z$)—, —C≡C—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, with the proviso that $R^{a12}$ is different from $R^{b12}$, $R^{a21}$ and $R^{a22}$, independently of one another, denote alkyl having 1 to 15 C atoms, in which, in addition, one or more non-adjacent $CH_2$ groups may each be replaced, independently of one another, by —C($R^z$)═C($R^z$)—, —C≡C—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, $R^{a31}$, $R^{a31}$ and $R^{b32}$, independently of one another, denote straight-chain alkyl having 1 to 15 C atoms or branched alkyl having 3 to 15 C atoms, in which, in addition, one or more non-adjacent $CH_2$ groups may each be replaced, independently of one another, by —C($R^z$)═C($R^z$)—, —C≡C—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, with the proviso that $R^{a32}$ is different from $R^{b32}$, $R^z$ denotes H, $CH_3$, F, Cl, or CN, $R^8$ denotes alkyl having 1 to 15 C atoms, in which, in addition, one or more non-adjacent $CH_2$ groups may each be replaced, independently of one another, by —C($R^z$)═C($R^z$)—, —C≡C—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, $Z^8$ denotes —C(O)O—, —$CH_2$O—, —$CF_2$O— or a single bond, $A^{11}$ is defined as $A^{12}$ below, or alternatively denotes

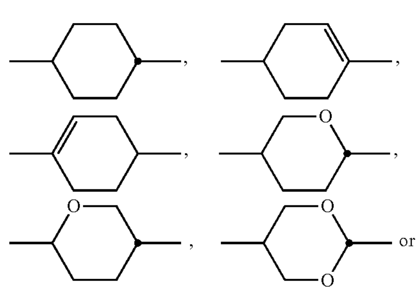

or

-continued

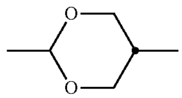

$A^{12}$ denotes

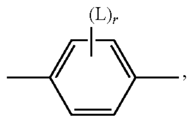

$L^{11}$ denotes F, Cl, —CN, P-Sp-, or straight chain alkyl having 1 to 25 C atoms, branched alkyl having 3 to 25 C atoms, or cyclic alkyl having 3 to 25 C atoms, wherein in said alkyl groups one or more non-adjacent $CH_2$— groups are each optionally replaced by —O—, —S—, —CO—, —CO—O—, —O—CO—, or —O—CO—O— in such a manner that O- and/or S-atoms are not directly connected with each other, and wherein one or more H atoms are each optionally replaced by P-Sp-, F or Cl, $A^{21}$ denotes

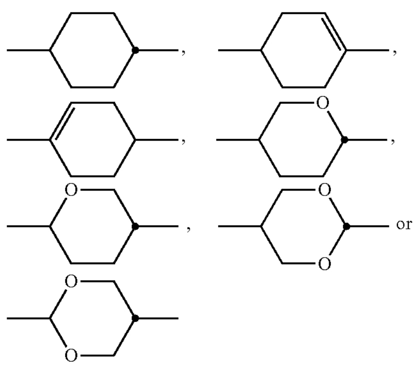

$A^{22}$ has one of the meanings given for $A^{12}$ $A^{31}$ has one of the meanings given for $A^{11}$, alternatively denotes

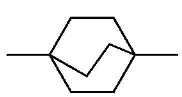

$A^{32}$ has one of the meanings given for $A^{12}$, n2 on each occurrence, identically or differently, is 0, 1 or 2, and n3 is 1, 2 or 3.

3. The liquid crystal display according to claim 1, wherein the liquid-crystalline host further comprises one or more compounds of the formulae

PH

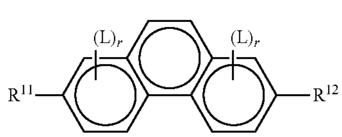

-continued

BF

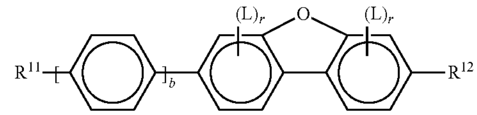

BT

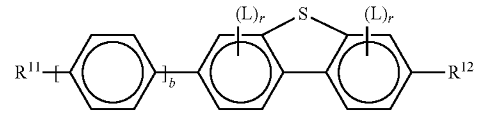

in which $R^{11}$ and $R^{12}$ each, independently of one another, denote alkyl having 1 to 12 C atoms, where one or two non-adjacent $CH_2$ groups may each be replaced by —O—, —CH═CH—, —CO—, —OCO— or —COO— in such a way that O atoms are not linked directly to one another, L denotes F, b denotes 0 or 1, and r denotes 1, 2 or 3.

4. The liquid crystal display according to claim 1, wherein the liquid-crystalline host additionally comprises one or more compounds of the following formulae:

B1

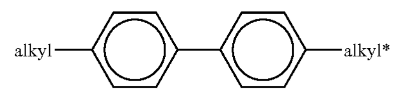

B2

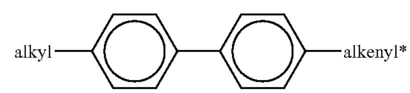

B3

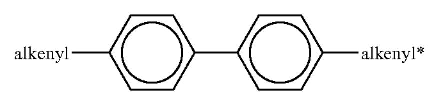

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

5. The liquid crystal display according to claim 1, wherein the liquid-crystalline host additionally comprises one or more compounds of the following formula:

T

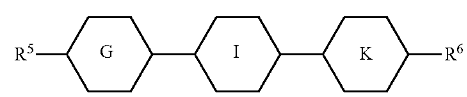

in which $R^5$ and $R^6$ each, independently of one another, denote alkyl having 1 to 12 C atoms, where, in addition, one or two non-adjacent $CH_2$ groups may each be replaced by —O—, —CH═CH—, —CO—, —OCO— or —COO— in such a way that O atoms are not linked directly to one another,

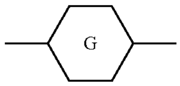, 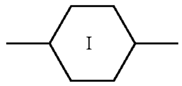 and

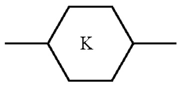

each, independently of one another, denote

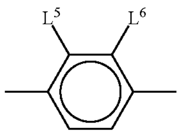, 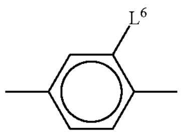,

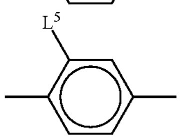 or 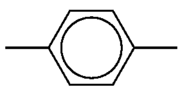

in which $L^5$ denotes F or Cl, and $L^6$ denotes F, Cl, $OCF_3$, $CF_3$, $CH_3$, $CH_2F$ or $CHF_2$.

6. The liquid crystal display according to claim 1, wherein the liquid-crystalline host further comprises one or more compounds of the following formula:

ZK

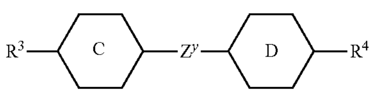

in which the individual radicals have the following meanings:

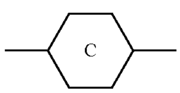 denotes 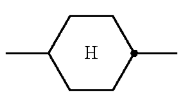,

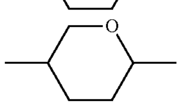, 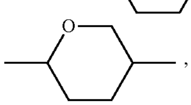,

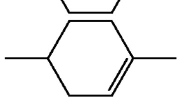 or 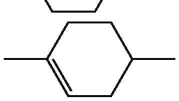,

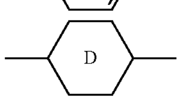 denotes 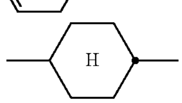 or

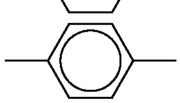, $R^3$ and $R^4$ each, independently of one another, denote alkyl having 1 to 12 C atoms, in which, in addition, one or two non-adjacent $CH_2$ groups may each be replaced by —O—, —CH═CH—, —CO—, —O—CO— or —CO—O— in such a way that O atoms are not linked directly to one another, and $Z^y$ denotes —$CH_2CH_2$—, —CH═CH—, —$CF_2O$—, —$OCF_2$—, —$CH_2O$—, —$OCH_2$—, —COO—, —OCO—, —$C_2F_4$—, —CF═CF— or a single bond.

7. The liquid crystal display according to claim 1, wherein the liquid crystal medium additionally comprises one or more self-alignment additives of formula SA $$\text{MES-}R^A \qquad \text{SA}$$

in which

MES denotes a mesogenic group comprising one or more rings, and optionally one or more polymerizable groups, and $R^A$ is a polar anchor group.

8. The liquid crystal display according to claim 7, wherein the one or more self-alignment additives of formula SA are selected from the compounds of formula SAa $$R^1\text{-}[A^2\text{-}Z^2]_m\text{-}A^1\text{-}R^a \qquad \text{SAa}$$

in which $A^1$, $A^2$ each, independently of one another, denote an aromatic, hetero-aromatic, alicyclic or heterocyclic group, which may also contain fused rings, and which may also be mono- or polysubstituted by any of groups L and -Sp-P, L in each case, independently of one another, denotes H, F, Cl, Br, I, —CN, —$NO_2$, —NCO, —NCS, —OCN, —SCN, —C(═O)N($R^0$)$_2$, —C(═O)$R^0$, optionally substituted silyl, optionally substituted aryl or cycloalkyl having 3 to 20 C atoms, or straight-chain alkyl having 1 to 25 C atoms, branched alkyl having 3 to 25 C atoms, alkoxy having 1 to 25 C atoms, branched alkoxy having 3 to 25 C atoms, alkylcarbonyl having 2 to 25 C atoms, branched alkylcarbonyl having 4 to 25 atoms, alkoxycarbonyl having 2 to 25 C atoms, branched alkoxycarbonyl having 4 to 25 C atoms, alkylcarbonyloxy having 2 to 25 C atoms, branched alkylcarbonyloxy having 4 to 25 C atoms, alkoxycarbonyloxy having 2 to 25 C atoms, or branched alkoxycarbonyloxy having 4 to 25 C atoms, in which, in addition, one or more H atoms may each be replaced by F or Cl, P denotes a polymerizable group, Sp denotes a spacer group or a single bond, $Z^2$ in each case, independently of one another, denotes a single bond, —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —C≡C—, —CH═CH—COO—, —OCO—CH═CH—, —$(CR^0R^{00})_{n1}$—, —CH(-Sp-P)—, —$CH_2$CH(-Sp-P)—, —CH(-Sp-P)CH(-Sp-P)—, n1 denotes 1, 2, 3 or 4, m denotes 1, 2, 3, 4, 5 or 6, $R^0$ in each case, independently of one another, denotes alkyl having 1 to 12 C atoms, $R^{00}$ in each case, independently of one another, denotes H or alkyl having 1 to 12 C atoms, $R^1$ independently of one another, denotes H, halogen, or straight-chain alkyl having 1 to 25 C atoms or, branched alkyl having 3 to 25 C atoms, or cyclic alkyl having 3 to 25 C atoms, in which, in addition, one or more non-adjacent $CH_2$ groups may each be replaced by —O—, —S—, —CO—, —CO—O—, —O—CO—, or —O—CO—O— in such a way that O and/or S atoms are not linked directly to one another and in which, in addition, one or more H atoms may each be replaced by F or Cl, or a group -Sp-P, and $R^a$ denotes a polar anchor group having at least one group selected from —OH, —$NH_2$, $NHR^{11}$, —SH, C(O)OH and —CHO, in which $R^{11}$ denotes alkyl having 1 to 12 C atoms.

9. The liquid crystal display according to claim 7, wherein the polar anchor group $R^a$ or $R^A$ of the self-alignment additive is of the formulae

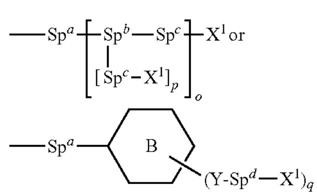

in which p denotes 1 or 2, q denotes 2 or 3,

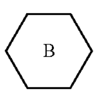

denotes a substituted or unsubstituted ring system or condensed ring system,

Y, on each occurrence, identically or differently, denotes —O—, —S—, —C(O)—, —C(O)O—, —OC(O)—, —$NR^{11}$— or a single bond, denotes 0 or 1, $X^1$, on each occurrence, identically or differently, denotes H, alkyl, fluoroalkyl, OH, $NH_2$, $NHR^{11}$, $NR^{11}_2$, —SH, $OR^{11}$, C(O)OH, —CHO, where at least one group $X^1$ denotes a radical selected from —OH, —$NH_2$, $NHR^{11}$, —SH, C(O)OH and —CHO, $R^{11}$ denotes alkyl having 1 to 12 C atoms, $Sp^a$, $Sp^c$, $Sp^d$ each, independently of one another, denote a spacer group or a single bond, and $Sp^b$ denotes a tri- or tetravalent group.

10. The liquid crystal display according to claim 1, wherein the liquid crystal medium additionally comprises a polymerizable component comprising one or more polymerizable compounds.

11. The liquid crystal display according to claim 10, wherein the one or more polymerizable compounds are of formula R $$P\text{-}Sp\text{-}A^1\text{-}(Z^1\text{-}A^2)_z\text{-}R \qquad R$$

in which the individual radicals, independently of each other and on each occurrence identically or differently, have the following meanings:

P a polymerizable group,

Sp a spacer group or a single bond, $A^1$, $A^2$ an aromatic, heteroaromatic, alicyclic or heterocyclic group which may also contain fused rings, and which is unsubstituted, or mono- or polysubstituted by L, $Z^1$ —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^0R^{00}$—, or a single bond, $R^0$,$R^{00}$ H or alkyl having 1 to 12 C atoms, R H, L, or P-Sp-, L F, Cl, —CN, P-Sp-, or straight chain alkyl having 1 to 25 C atoms, branched alkyl having 3 to 25 C atoms, or cyclic alkyl having 3 to 25 C atoms, wherein one or more non-adjacent $CH_2$-groups are each optionally replaced by —O—, —S—, —CO—, —CO—O—, —O—CO—, or —O—CO—O— in such a manner that O- and/or S-atoms are not directly connected with each other, and wherein one or more H atoms are each optionally replaced by P-Sp-, F or Cl, z 0, 1, 2 or 3, and n1 1, 2, 3 or 4.

12. The liquid crystal display according to claim 10, where the one or more polymerizable compounds are of formulae M1 to M31:

M1

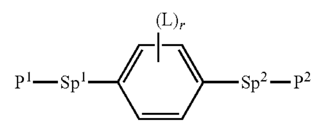

M2

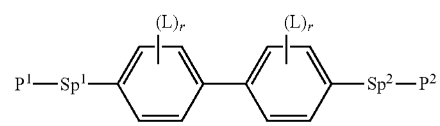

M3

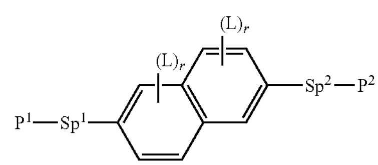

M4

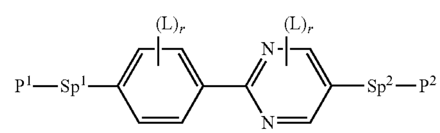

M5

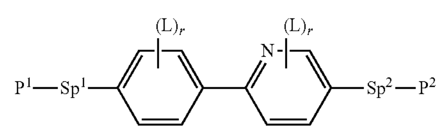

M6

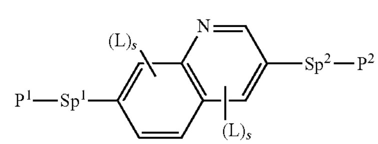

M7

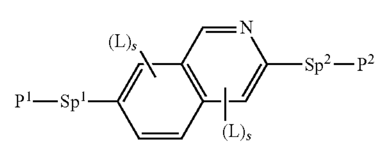

M8

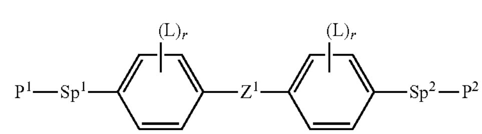

-continued
M9
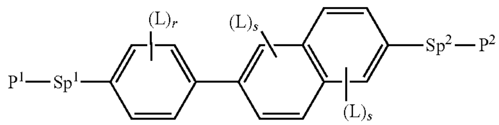
M10
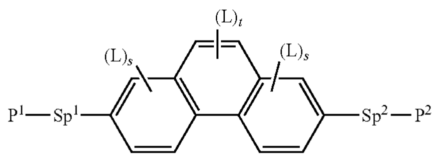
M11
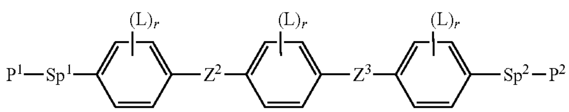
M12
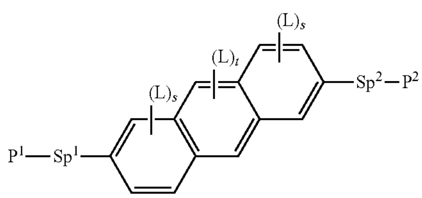
M13
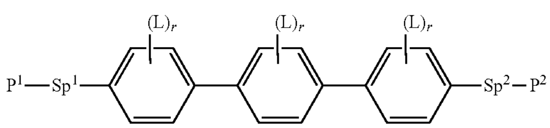
M14
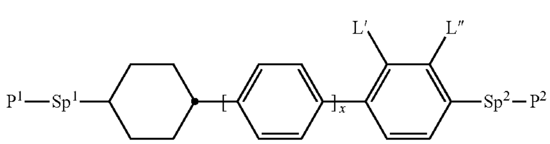
M15
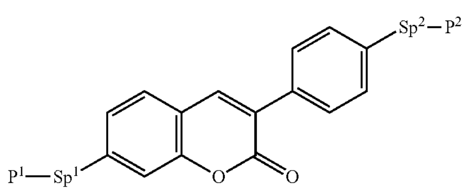
M16
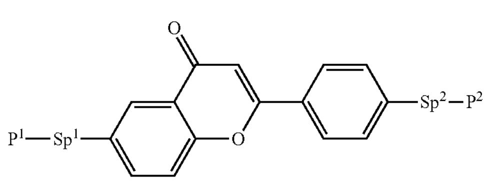
M17
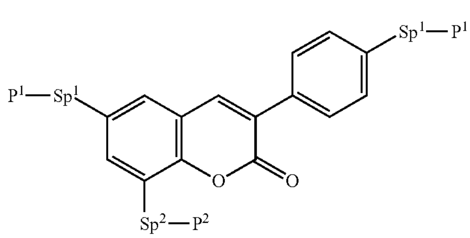
-continued
M18
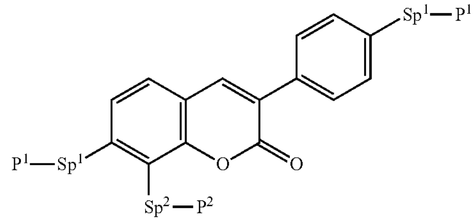
M19
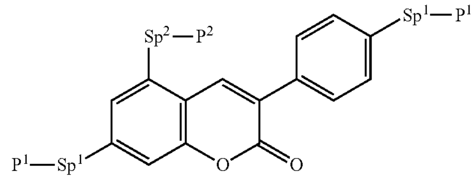
M20
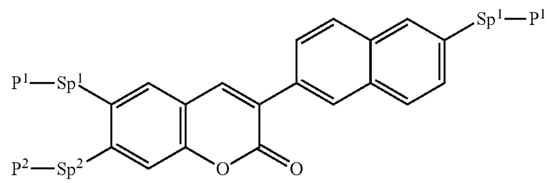
M21
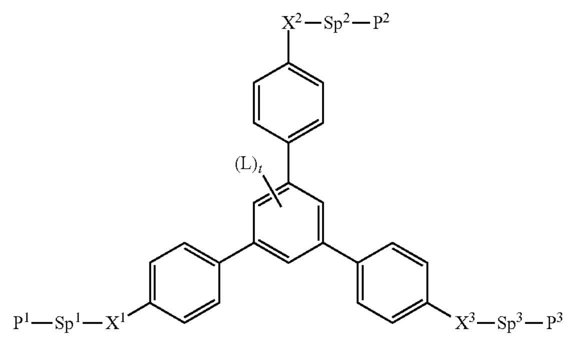
M22
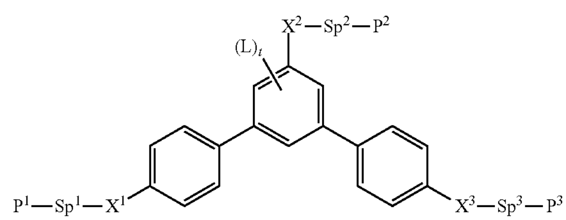
M23
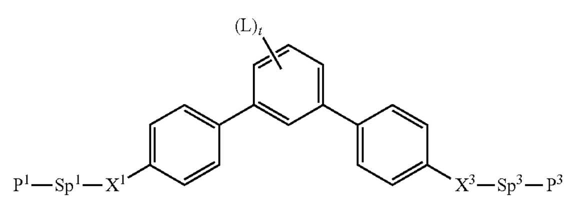
M24
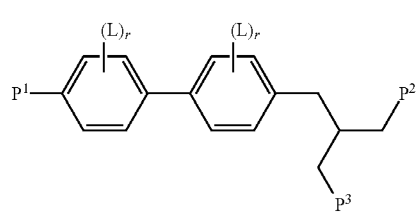

-continued

M25

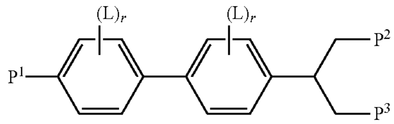

M26

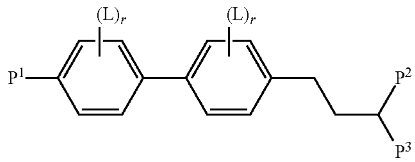

M27

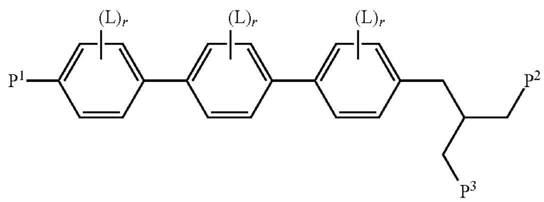

M28

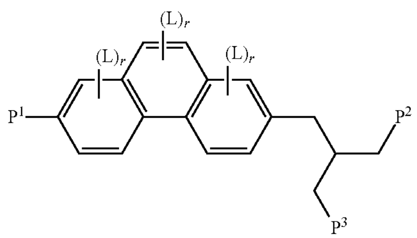

M29

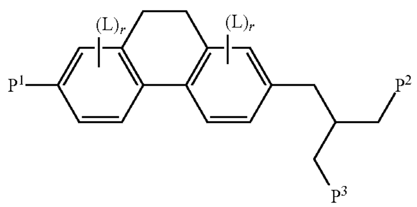

M30

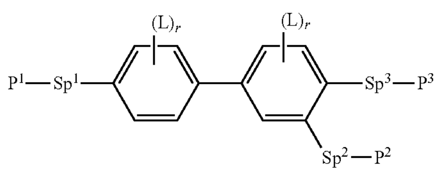

M31

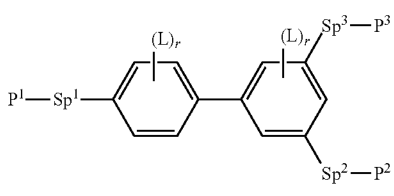

in which $P^1$, $P^2$ and $P^3$ each, independently of one another, denote an acrylate or methacrylate group, $Sp^1$, $Sp^2$ and $Sp^3$ each, independently of one another, denote a single bond or a spacer group having one of the meanings indicated above and below for Sp, where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, $R^{aa}$ denotes H, F, Cl, CN, or straight-chain alkyl having 1 to 25 C atoms or branched alkyl having 3 to 25 C atoms, in which, in addition, one or more non-adjacent $CH_2$ groups may each be replaced, independently of one another, by $C(R^0)$=$C(R^{00})$—, —C≡C—, —$N(R^0)$—, —O—, —S—, —CO—, —CO—O—, —O—CO—, or —O—CO—O— in such a way that O and/or S atoms are not linked directly to one another, and in which, in addition, one or more H atoms may each be replaced by F, Cl, CN or $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denotes —O—, —CO—, —$C(R^yR^z)$— or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$—, where n is 2, 3 or 4, L on each occurrence, identically or differently, denotes F, Cl, CN, or straight-chain, optionally mono- or polyfluorinated alkyl having 1 to 12 C atoms, branched alkyl having 3 to 12 C atoms, alkoxy having 1 to 12 C atoms, branched alkoxy having 3 to 12 C atoms, alkenyl having 2 to 12 C atoms, branched alkenyl having 3 to 12 C atoms, alkynyl having 2 to 12 C atoms, branched alkynyl having 4 to 12 C atoms, alkylcarbonyl having 2 to 12 C atoms, branched alkylcarbonyl having 4 to 12 C atoms, alkoxycarbonyl having 2 to 12 C atoms, branched alkoxycarbonyl having 4 to 12 C atoms alkylcarbonyloxy having 2 to 12 C atoms, branched alkylcarbonyloxy having 4 to 12 C atoms, alkoxycarbonyloxy having 2 to 12 C atoms, or branched alkoxycarbonyloxy having 4 to 12 C atoms, L' and L" each, independently of one another, denote H, F or Cl, r denotes 0, 1, 2, 3 or 4, s denotes 0, 1, 2 or 3, t denotes 0, 1 or 2, and x denotes 0 or 1.

13. The liquid crystal display according to claim 10, wherein the polymerizable compounds are polymerized.

14. The liquid crystal display of claim 1, wherein the display is a VA display.

15. The liquid crystal display according to claim 7, wherein the display is a SA-VA display.

16. The liquid crystal display according to claim 10, wherein the display is a PS-VA or a polymer stabilized SA-VA display.

17. A process for the production of a liquid crystal display according to claim 13, comprising: providing the liquid crystal medium between the substrates of the display, and polymerizing the polymerizable compounds.

18. The liquid crystal display of claim 1, wherein the display is a VA display, a PS-VA display, an SA-VA display, or a polymer stabilized SA-VA display.

* * * * *